(12) United States Patent
Korey et al.

(10) Patent No.: US 10,609,997 B2
(45) Date of Patent: Apr. 7, 2020

(54) TELESCOPICALLY-EXTENDABLE HANDLE AND RECHARGEABLE POWER SUPPLY ASSEMBLY FOR LUGGAGE

(71) Applicant: JRSK, Inc., New York, NY (US)

(72) Inventors: Stephanie Korey, New York, NY (US); Bret Recor, San Francisco, CA (US); Seth Murray, San Francisco, CA (US); Charles Weber, San Francisco, CA (US); Ahyoung Park, San Francisco, CA (US); Jennifer Rubio, New York, NY (US)

(73) Assignee: JRSK, Inc., New York, NY (US)

( * ) Notice: Subject to any disclaimer, the term of this patent is extended or adjusted under 35 U.S.C. 154(b) by 0 days.

(21) Appl. No.: 15/647,817

(22) Filed: Jul. 12, 2017

(65) Prior Publication Data

US 2018/0000214 A1    Jan. 4, 2018

Related U.S. Application Data

(63) Continuation of application No. 14/935,335, filed on Nov. 6, 2015, now Pat. No. 10,219,599.

(51) Int. Cl.
*H02J 7/00* (2006.01)
*A45C 13/03* (2006.01)
(Continued)

(52) U.S. Cl.
CPC ............... *A45C 13/03* (2013.01); *A45C 5/03* (2013.01); *A45C 5/06* (2013.01); *A45C 5/14* (2013.01);
(Continued)

(58) Field of Classification Search
USPC .................................. 320/107, 129, 137, 152
See application file for complete search history.

(56) References Cited

U.S. PATENT DOCUMENTS 2,005,004 A    6/1935    Peo
2,009,035 A    7/1935    Towers
(Continued)

FOREIGN PATENT DOCUMENTS

CA    1285250          6/1991
CA    2928310 A1    5/2015
(Continued)

OTHER PUBLICATIONS

International Search Report (ISR) from the International Searching Authority (ISA) in International Application No. PCT/US16/60738, dated Feb. 27, 2017, 5 Pages.
(Continued)

*Primary Examiner* — Brian Ngo
(74) *Attorney, Agent, or Firm* — Proskauer Rose LLP

(57) ABSTRACT

A telescopically-extendable handle and rechargeable power supply assembly for mounting in a piece of luggage. The assembly includes a pair of spaced apart guide tubes supporting a pair of telescopically-extendable rods joined to a handle structure. A base housing component is mounted in an aperture formed in the luggage, and has a top surface. A battery module casing is mounted to and beneath the base housing component, and disposed substantially in the same plane as and between the pair of spaced apart guide tubes. A rechargeable DC battery power module is contained in the battery module casing, and provides a DC battery recharging port and a set of DC power supplying ports. Each such port is directly accessible through the top surface of the base housing component. A power port cover panel is hinged to the base housing component and has a closed configuration and an open configuration.

20 Claims, 98 Drawing Sheets

(51) Int. Cl.
  *A45C 5/03* (2006.01)
  *A45C 5/06* (2006.01)
  *A45C 5/14* (2006.01)
  *A45C 13/26* (2006.01)
  *A45C 15/00* (2006.01)
  *A45C 13/02* (2006.01)
  *A45C 13/10* (2006.01)
  *A45C 13/18* (2006.01)

(52) U.S. Cl.
  CPC ............ *A45C 13/02* (2013.01); *A45C 13/103* (2013.01); *A45C 13/18* (2013.01); *A45C 13/262* (2013.01); *A45C 15/00* (2013.01); *H02J 7/0045* (2013.01); *H02J 7/0052* (2013.01); *H02J 7/0068* (2013.01); *A45C 2005/037* (2013.01); *A45C 2013/025* (2013.01); *A45C 2013/267* (2013.01); *H02J 2007/0062* (2013.01)

(56) References Cited

U.S. PATENT DOCUMENTS

| | | | |
|---|---|---|---|
| 2,016,520 A | 10/1935 | Short | |
| 2,040,559 A | 5/1936 | Luttrell | |
| 2,064,594 A | 12/1936 | Dickey | |
| 2,325,806 A | 8/1943 | Simmons | |
| 3,315,772 A | 4/1967 | Katz | |
| 3,963,102 A | 6/1976 | Carp | |
| 4,244,453 A | 1/1981 | Herz | |
| 4,411,343 A | 10/1983 | Cassimally | |
| 4,580,667 A | 4/1986 | Herwood | |
| 4,693,368 A | 9/1987 | King | |
| 4,773,515 A | 9/1988 | Kotkins | |
| 4,854,431 A | 8/1989 | Pulichino | |
| 4,856,627 A | 8/1989 | Polatov | |
| 4,913,252 A | 4/1990 | Bartley | |
| 4,966,259 A | 10/1990 | Bergman | |
| 5,048,649 A | 9/1991 | Carpenter | |
| 5,054,589 A | 10/1991 | Bomes | |
| 5,105,920 A | 4/1992 | Grebenstein | |
| 5,160,001 A | 11/1992 | Marceau | |
| 5,217,119 A | 6/1993 | Hollingsworth | |
| 5,316,096 A | 5/1994 | Good | |
| 5,330,026 A | 7/1994 | Hsu | |
| 5,398,807 A * | 3/1995 | Plath | A45C 5/14 190/109 |
| 5,515,954 A | 5/1996 | Nordstrom | |
| 5,522,943 A | 6/1996 | Spencer | |
| 5,535,880 A | 7/1996 | Plath | |
| 5,566,797 A | 10/1996 | Van Himbeeck | |
| 5,621,299 A | 4/1997 | Krall | |
| 5,639,109 A | 6/1997 | Liang | |
| 5,666,265 A | 9/1997 | Lutz | |
| 5,671,831 A | 9/1997 | Chiu | |
| 5,685,403 A | 11/1997 | Morszeck | |
| 5,690,196 A | 11/1997 | Wang | |
| D392,099 S | 3/1998 | Wang | |
| 5,782,325 A | 7/1998 | O'Shea | |
| 5,875,876 A | 3/1999 | Wang | |
| D417,134 S | 11/1999 | Workman | |
| 5,992,588 A | 11/1999 | Morszeck | |
| D425,301 S | 5/2000 | Sagol | |
| 6,073,738 A | 6/2000 | Abraham | |
| D428,698 S | 8/2000 | Cheng | |
| D428,797 S | 8/2000 | Lin | |
| 6,109,402 A | 8/2000 | Godshaw | |
| D434,224 S | 11/2000 | Tiramani | |
| 6,147,602 A | 11/2000 | Bender | |
| 6,158,872 A | 12/2000 | Rodgers | |
| D435,967 S | 1/2001 | Tiramani | |
| D438,005 S | 2/2001 | Tiramani | |
| 6,213,266 B1 * | 4/2001 | Hollingsworth | A45C 5/14 150/111 |
| 6,220,411 B1 | 4/2001 | Scicluna | |
| 6,267,485 B1 | 7/2001 | Rodgers | |
| D447,929 S | 9/2001 | Chang | |
| D448,275 S | 9/2001 | Kuo | |
| 6,378,642 B1 | 4/2002 | Sutton | |
| 6,390,259 B1 | 5/2002 | Lu | |
| 6,408,997 B1 | 6/2002 | Chen | |
| 6,434,032 B1 | 8/2002 | Romano | |
| 6,481,574 B1 | 11/2002 | Pakosh | |
| 6,502,656 B2 | 1/2003 | Weiss | |
| D472,713 S | 4/2003 | Lee | |
| 6,575,274 B1 | 6/2003 | Huang | |
| 6,591,950 B1 | 7/2003 | Scicluna | |
| D479,651 S | 9/2003 | Shen | |
| 6,655,565 B2 | 12/2003 | Godshaw | |
| D489,531 S | 5/2004 | Oh | |
| D497,480 S | 10/2004 | Drew | |
| 6,805,225 B2 | 10/2004 | Freedman | |
| 6,837,346 B2 | 1/2005 | Hollingsworth | |
| D506,313 S | 6/2005 | Neumann | |
| 6,923,302 B2 | 8/2005 | Godshaw | |
| 6,975,221 B2 | 12/2005 | Monck | |
| 7,082,641 B1 | 8/2006 | Jung | |
| 7,140,479 B2 | 11/2006 | Mangano | |
| 7,143,878 B2 | 12/2006 | Selvi | |
| 7,204,330 B1 | 4/2007 | Lauren | |
| 7,296,665 B2 | 11/2007 | Morszeck | |
| 7,322,583 B2 | 1/2008 | Kim | |
| D563,101 S | 3/2008 | Kuchler | |
| 7,358,449 B2 | 4/2008 | Hannon | |
| 7,374,183 B1 | 5/2008 | Yen-Lung | |
| D570,601 S | 6/2008 | Drew | |
| 7,394,165 B2 | 7/2008 | Schiller | |
| 7,398,868 B2 | 7/2008 | Morszeck | |
| 7,422,476 B2 | 9/2008 | Marmaropoulos | |
| 7,557,705 B2 | 7/2009 | Oas | |
| 7,593,222 B2 | 9/2009 | Zbikowski | |
| 7,641,030 B2 | 1/2010 | Selvi | |
| D613,054 S | 4/2010 | Morszeck | |
| 7,884,570 B2 | 2/2011 | Purdy | |
| D633,300 S | 3/2011 | Fair | |
| 7,900,758 B2 | 3/2011 | King | |
| 7,916,025 B2 | 3/2011 | Locker | |
| RE42,385 E | 5/2011 | Wong | |
| 7,954,610 B2 | 6/2011 | Dayton et al. | |
| D640,868 S | 7/2011 | Jongchul | |
| 8,006,326 B2 | 8/2011 | Thomas | |
| 8,056,185 B2 | 11/2011 | Lai | |
| 8,104,594 B2 | 1/2012 | Chisholm | |
| 8,118,146 B2 | 2/2012 | Shalgi | |
| 8,125,186 B2 | 2/2012 | Carkner | |
| D659,395 S | 5/2012 | Sijmons | |
| 8,245,825 B2 | 8/2012 | Yoneno | |
| 8,316,483 B2 | 11/2012 | Thomas | |
| 8,359,708 B2 | 1/2013 | Scicluna | |
| 8,386,814 B2 | 2/2013 | Tom | |
| 8,453,813 B2 | 6/2013 | Lai | |
| 8,499,417 B1 | 8/2013 | Lai | |
| D694,008 S | 11/2013 | Morszeck | |
| D695,012 S | 12/2013 | Morszeck | |
| D695,016 S | 12/2013 | Moon | |
| D695,518 S | 12/2013 | Morszeck | |
| 8,607,947 B2 | 12/2013 | Morszeck | |
| D696,865 S | 1/2014 | Morszeck | |
| D699,438 S | 2/2014 | Mathieu | |
| D703,433 S | 4/2014 | Morszeck | |
| 8,783,420 B2 | 7/2014 | Lai | |
| 8,843,770 B2 | 9/2014 | Ghosh | |
| D715,541 S | 10/2014 | Morszeck | |
| 8,884,583 B2 | 11/2014 | Edwards | |
| D720,537 S | 1/2015 | Taller | |
| D720,928 S | 1/2015 | Roncato | |
| D722,771 S | 2/2015 | Wu | |
| 8,988,038 B2 | 3/2015 | Samuel | |
| D728,236 S | 5/2015 | Virassamy | |
| D730,050 S | 5/2015 | Hogan | |
| 9,101,186 B2 | 8/2015 | Lai | |
| D740,558 S | 10/2015 | Liao | |
| D743,168 S | 11/2015 | Niu | |
| D744,898 S | 12/2015 | Morszeck | |

(56) References Cited

U.S. PATENT DOCUMENTS

| | | | |
|---|---|---|---|
| D745,433 S | 12/2015 | Morszeck | |
| 9,198,492 B2 | 12/2015 | Chehebar | |
| D752,867 S | 4/2016 | Morszeck | |
| 9,419,258 B2 | 8/2016 | Pickens | |
| 9,425,632 B2 | 8/2016 | Pickens | |
| D767,893 S | 10/2016 | Diz | |
| D768,985 S | 10/2016 | Morszeck | |
| D771,385 S | 11/2016 | Morszeck | |
| D771,948 S | 11/2016 | Bhatnagar | |
| D779,211 S | 2/2017 | Diz | |
| D784,016 S | 4/2017 | Morszeck | |
| D784,021 S | 4/2017 | Morszeck | |
| D784,702 S | 4/2017 | Morszeck | |
| D785,336 S | 5/2017 | Morszeck | |
| D785,337 S | 5/2017 | Morszeck | |
| D785,937 S | 5/2017 | Morszeck | |
| 2002/0148743 A1 | 10/2002 | Tong | |
| 2002/0185350 A1 | 12/2002 | Chang | |
| 2002/0195304 A1 | 12/2002 | Godshaw | |
| 2003/0000784 A1 | 1/2003 | Hsu | |
| 2003/0188943 A1 | 10/2003 | Freedman | |
| 2003/0234515 A1 | 12/2003 | Han | |
| 2004/0065518 A1* | 4/2004 | Hoberman | A45C 13/385 190/107 |
| 2004/0065519 A1 | 4/2004 | Morszeck | |
| 2004/0085043 A1 | 5/2004 | Germagian | |
| 2004/0108179 A1 | 6/2004 | Scicluna | |
| 2004/0129469 A1 | 7/2004 | Kader | |
| 2005/0000964 A1 | 1/2005 | Morszeck | |
| 2005/0045500 A1 | 3/2005 | Mangano | |
| 2005/0098402 A1 | 5/2005 | Cohen | |
| 2005/0194227 A1 | 9/2005 | Mitchell | |
| 2006/0032687 A1 | 2/2006 | Park | |
| 2006/0077058 A1 | 4/2006 | Asher | |
| 2006/0201764 A1 | 9/2006 | Morszeck | |
| 2006/0225981 A1 | 10/2006 | Lin | |
| 2006/0243550 A1 | 11/2006 | Morszeck | |
| 2007/0007737 A1 | 1/2007 | Dayton | |
| 2007/0034424 A1 | 2/2007 | Snowden | |
| 2007/0045072 A1 | 3/2007 | Selvi | |
| 2007/0090702 A1 | 4/2007 | Schiller | |
| 2007/0131462 A1 | 6/2007 | Hemsley | |
| 2008/0029153 A1 | 2/2008 | Margalit | |
| 2008/0087513 A1 | 4/2008 | Majeau | |
| 2008/0180059 A1 | 7/2008 | Carrier | |
| 2009/0139814 A1* | 6/2009 | Grossman | A45C 7/0086 190/18 A |
| 2010/0163359 A1 | 7/2010 | Shalgi | |
| 2010/0294607 A1 | 11/2010 | Morszeck | |
| 2010/0320047 A1 | 12/2010 | Morszeck | |
| 2011/0011761 A1 | 1/2011 | Enmon | |
| 2011/0050162 A1 | 3/2011 | FallHowe | |
| 2011/0174583 A1* | 7/2011 | Yoneno | A45C 5/14 190/103 |
| 2011/0186396 A1 | 8/2011 | Sheikh | |
| 2011/0272232 A1 | 11/2011 | Sheikh | |
| 2012/0046177 A1 | 2/2012 | Huang et al. | |
| 2012/0111679 A1* | 5/2012 | Van Den Biggelaar | A45C 5/14 190/8 |
| 2012/0152677 A1 | 6/2012 | Lu | |
| 2012/0161712 A1* | 6/2012 | Saito | H02J 7/0031 320/129 |
| 2012/0222932 A1 | 9/2012 | Wang | |
| 2012/0247897 A1* | 10/2012 | Sheikh | A45C 7/0027 190/115 |
| 2012/0255824 A1* | 10/2012 | Schnell | A45C 5/14 190/18 A |
| 2012/0262117 A1 | 10/2012 | Ferber | |
| 2013/0032443 A1 | 2/2013 | Soedomo | |
| 2013/0056373 A1 | 3/2013 | Benson | |
| 2013/0098721 A1 | 4/2013 | Lai | |
| 2013/0126286 A1* | 5/2013 | Chehebar | A45C 13/00 190/108 |
| 2013/0175130 A1* | 7/2013 | Liang | A45C 3/00 190/18 A |
| 2013/0221898 A1 | 8/2013 | Frost | |
| 2013/0233661 A1 | 9/2013 | Scott | |
| 2013/0248309 A1 | 9/2013 | Lein | |
| 2013/0255335 A1 | 10/2013 | Jonely | |
| 2013/0271063 A1 | 10/2013 | Wilson | |
| 2013/0300343 A1 | 11/2013 | Files | |
| 2014/0027224 A1 | 1/2014 | Lai | |
| 2014/0041978 A1 | 2/2014 | Chang | |
| 2014/0076679 A1* | 3/2014 | Hughes | A45C 13/262 190/18 A |
| 2014/0131156 A1 | 5/2014 | Farrelly | |
| 2014/0158564 A1 | 6/2014 | Blasingame | |
| 2014/0283335 A1 | 9/2014 | Meersschaert | |
| 2014/0327401 A1 | 11/2014 | Pickens | |
| 2014/0353104 A1 | 12/2014 | Sheikh | |
| 2015/0014108 A1 | 1/2015 | Vecellio | |
| 2015/0021132 A1 | 1/2015 | Sijmons | |
| 2015/0027835 A1 | 1/2015 | Moon | |
| 2015/0027836 A1* | 1/2015 | Zhou | A45C 9/00 190/12 A |
| 2015/0034440 A1 | 2/2015 | Lai | |
| 2015/0084578 A1 | 3/2015 | Pickens | |
| 2015/0084592 A1 | 3/2015 | Pickens | |
| 2015/0084596 A1 | 3/2015 | Pickens | |
| 2015/0089903 A1 | 4/2015 | Carey | |
| 2015/0144449 A1 | 5/2015 | Sheikh | |
| 2015/0207350 A1* | 7/2015 | Chen | H02J 7/0042 320/111 |
| 2015/0295441 A1 | 10/2015 | Winger | |
| 2015/0318716 A1 | 11/2015 | Pickens | |
| 2015/0326044 A1 | 11/2015 | Ashley | |
| 2015/0348347 A1 | 12/2015 | Diz | |
| 2016/0004287 A1 | 1/2016 | Qiu | |
| 2016/0051022 A1 | 2/2016 | Morszeck | |
| 2016/0141904 A1 | 5/2016 | Zhijian | |
| 2016/0153626 A1 | 6/2016 | Ozaka et al. | |
| 2016/0255928 A1* | 9/2016 | O'Donnell | A45C 5/03 |
| 2016/0255934 A1* | 9/2016 | Attebery | A45C 15/00 |
| 2016/0262510 A1 | 9/2016 | Shalgi | |
| 2016/0278492 A1 | 9/2016 | Morszeck | |
| 2016/0286912 A1 | 10/2016 | Morszeck | |
| 2016/0308381 A1 | 10/2016 | Edwards | |
| 2016/0322843 A1 | 11/2016 | Pickens | |
| 2016/0322844 A1 | 11/2016 | Pickens | |
| 2016/0338463 A1 | 11/2016 | Morszeck | |
| 2016/0381499 A1 | 12/2016 | Draghici | |
| 2017/0079398 A1 | 3/2017 | Reh | |
| 2017/0091500 A1 | 3/2017 | Reh | |
| 2017/0100961 A1 | 4/2017 | Diz | |
| 2017/0103292 A1 | 4/2017 | Reh | |
| 2017/0103598 A1 | 4/2017 | Diz | |
| 2017/0117742 A1 | 4/2017 | Nakhjiri | |
| 2017/0127776 A1 | 5/2017 | Korey | |
| 2017/0127781 A1 | 5/2017 | Korey | |
| 2017/0127782 A1 | 5/2017 | Korey | |
| 2017/0127783 A1 | 5/2017 | Korey | |

FOREIGN PATENT DOCUMENTS

| | | |
|---|---|---|
| CA | 2899478 | 2/2016 |
| CN | 202035634 | 11/2011 |
| CN | 104082929 | 10/2014 |
| CN | 204426982 U | 12/2014 |
| CN | 204336082 | 5/2015 |
| CN | 204444632 U | 7/2015 |
| CN | 204599651 U | 9/2015 |
| CN | 0204682824 U | 10/2015 |
| CN | 104082929 B | 1/2016 |
| CN | 105639954 A | 6/2016 |
| EP | 0940099 | 9/1999 |
| JP | 2007185407 | 7/2007 |
| TW | M410495 U | 9/2011 |
| WO | 199408485 A1 | 4/1994 |
| WO | 1994008484 A1 | 4/1994 |
| WO | 95019118 A1 | 7/1995 |
| WO | 1995019118 A1 | 7/1995 |

(56) References Cited

FOREIGN PATENT DOCUMENTS

| | | |
|---|---|---|
| WO | 199631140 A1 | 10/1996 |
| WO | 199725894 A1 | 7/1997 |
| WO | 2001019214 A1 | 2/2001 |
| WO | 2002065869 A1 | 8/2002 |
| WO | 2003007748 A1 | 1/2003 |
| WO | 2004095971 A1 | 11/2004 |
| WO | 2004103114 | 12/2004 |
| WO | 2004103114 A1 | 12/2004 |
| WO | 2004107141 A1 | 12/2004 |
| WO | 2007014804 A1 | 8/2005 |
| WO | 2007063302 A1 | 6/2007 |
| WO | 2007073590 A1 | 7/2007 |
| WO | 2008104558 A1 | 9/2008 |
| WO | 2008131796 A1 | 11/2008 |
| WO | 2009002499 A9 | 4/2009 |
| WO | 2009045542 A1 | 4/2009 |
| WO | 2009077215 A1 | 6/2009 |
| WO | 2010135402 A2 | 11/2010 |
| WO | 2011112655 A1 | 9/2011 |
| WO | 2011139318 A1 | 11/2011 |
| WO | 2012046177 A1 | 4/2012 |
| WO | 2013126459 A2 | 8/2013 |
| WO | 2013142984 A1 | 10/2013 |
| WO | 2014048763 A1 | 4/2014 |
| WO | 2014073971 A1 | 5/2014 |
| WO | 2014154855 | 10/2014 |
| WO | 2014154855 A1 | 10/2014 |
| WO | 2014166665 A1 | 10/2014 |
| WO | 2014170116 A1 | 10/2014 |
| WO | 2015006948 A1 | 1/2015 |
| WO | 2015048871 A1 | 4/2015 |
| WO | 2015091554 A1 | 6/2015 |
| WO | 2015063752 A1 | 7/2015 |
| WO | 2015100415 A1 | 7/2015 |
| WO | 2015107207 A1 | 7/2015 |
| WO | 2015121293 A1 | 8/2015 |
| WO | 2015177124 A1 | 11/2015 |
| WO | 2015183949 A1 | 12/2015 |
| WO | 2015193447 A1 | 12/2015 |
| WO | 2016025906 A1 | 2/2016 |
| WO | 20160259061 | 2/2016 |
| WO | 2016116425 A1 | 7/2016 |
| WO | 2016202777 A1 | 12/2016 |
| WO | 2016202783 A1 | 12/2016 |
| WO | 2017021312 A1 | 2/2017 |
| WO | 2017021392 A1 | 2/2017 |
| WO | 2017079707 A1 | 5/2017 |

OTHER PUBLICATIONS

Written Opinion (WO) of the International Searching Authority (ISA) in International Application No. PCT/US16/60738, dated Feb. 27, 2017, 16 Pages.

Lojel LookBook, Photography by Agnon Wong & Taby Cheng, Published on the WWW, 2015, 23 Pages.

Office Action dated Jul. 31, 2017 for U.S. Appl. No. 14/935,335; (pp. 1-12).

Office Action dated Sep. 21, 2017 for U.S. Appl. No. 15/333,270; (pp. 1-10).

* cited by examiner

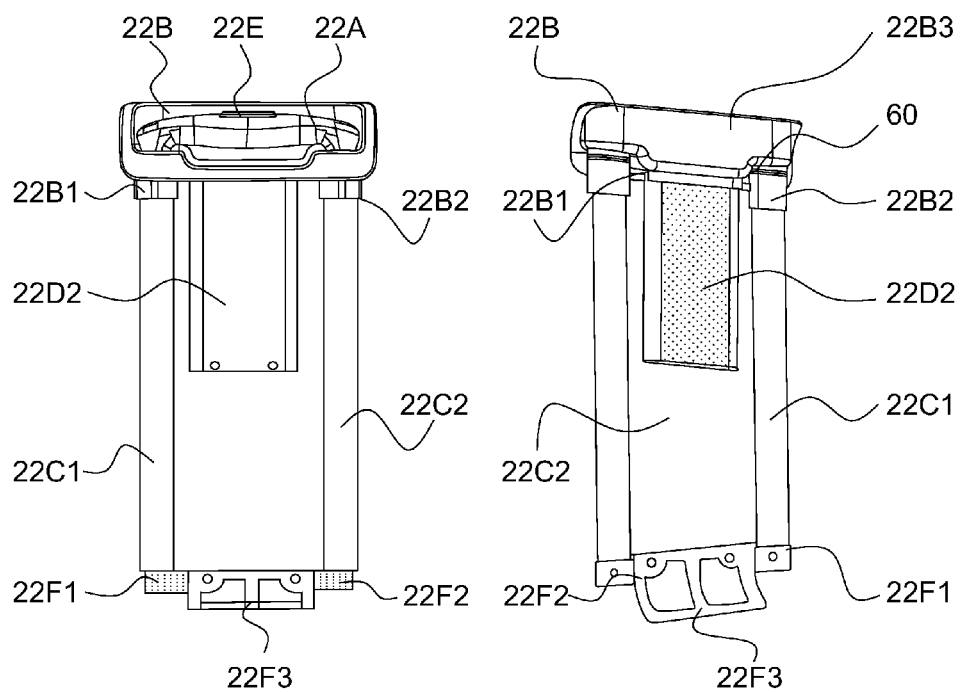
FIG. 5J1   FIG. 5J2

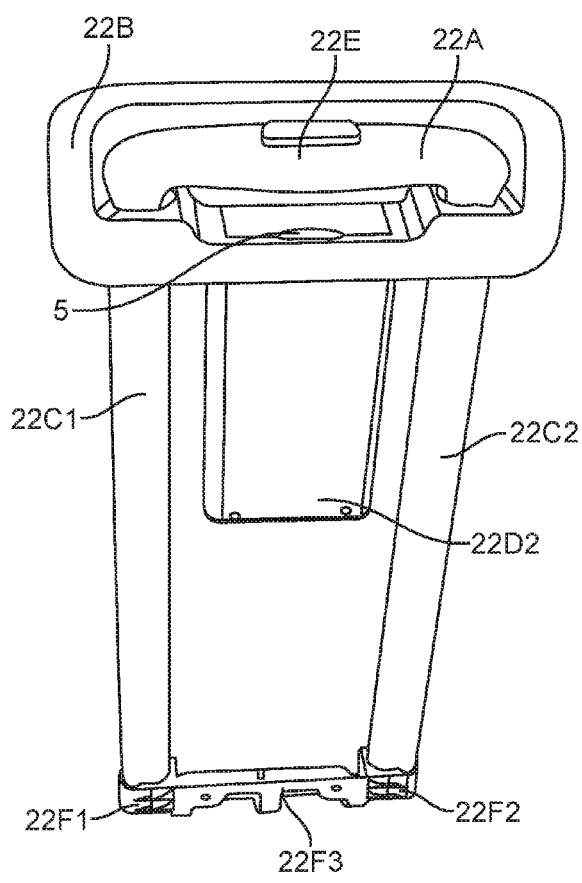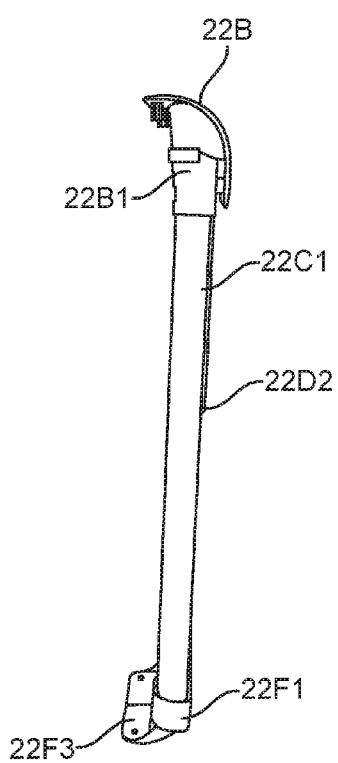
FIG. 5J3
FIG. 5J4

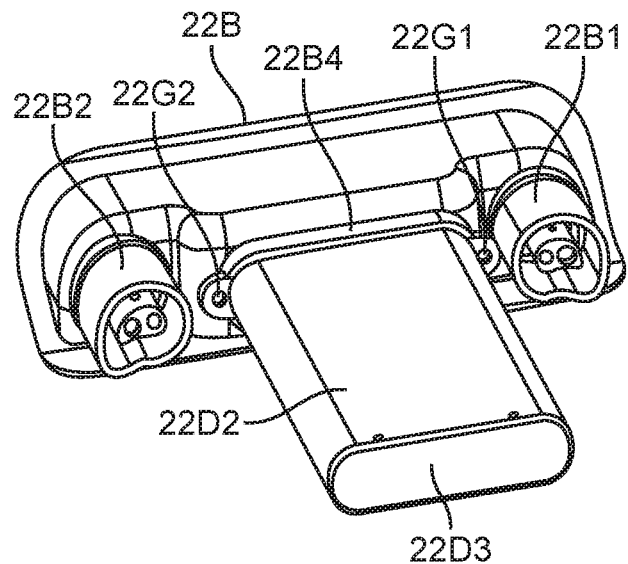
FIG. 5J5
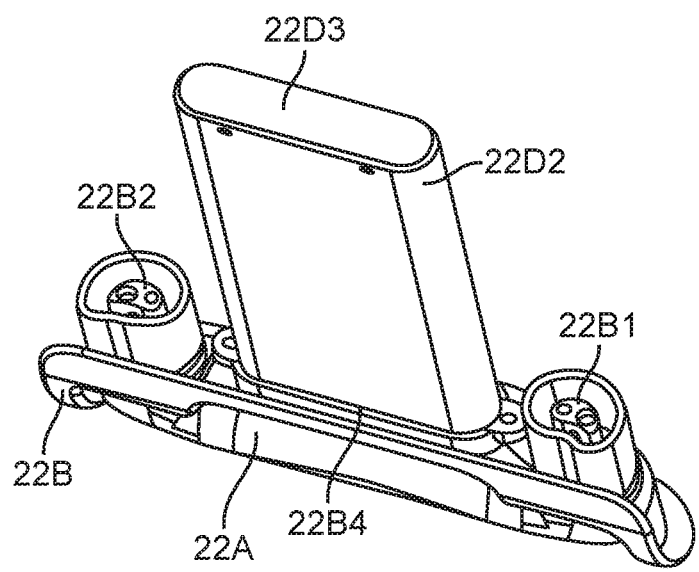
FIG. 5J6

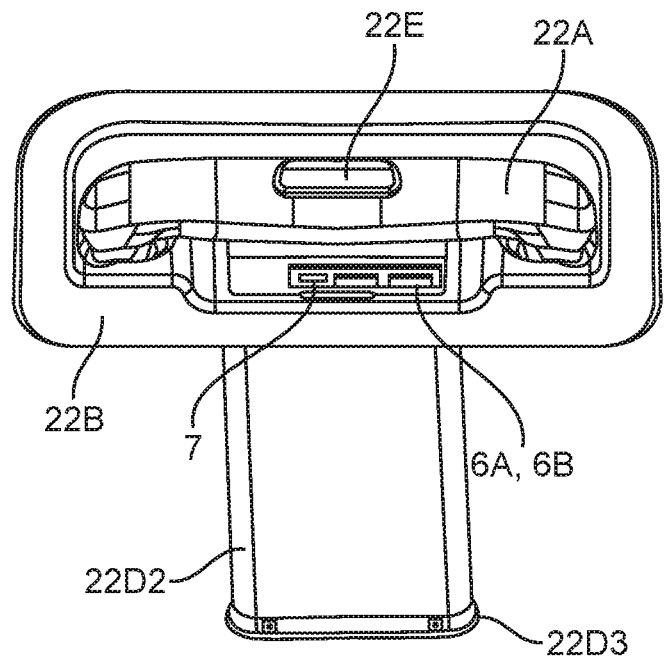
FIG. 5K1
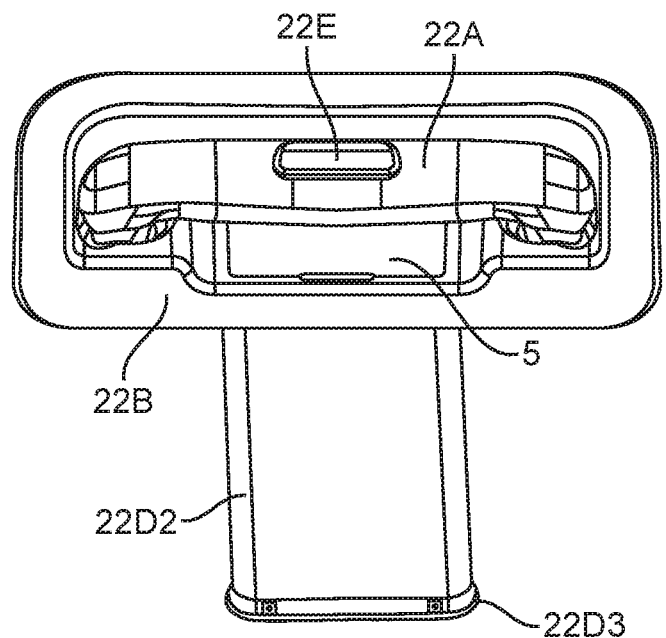
FIG. 5K2

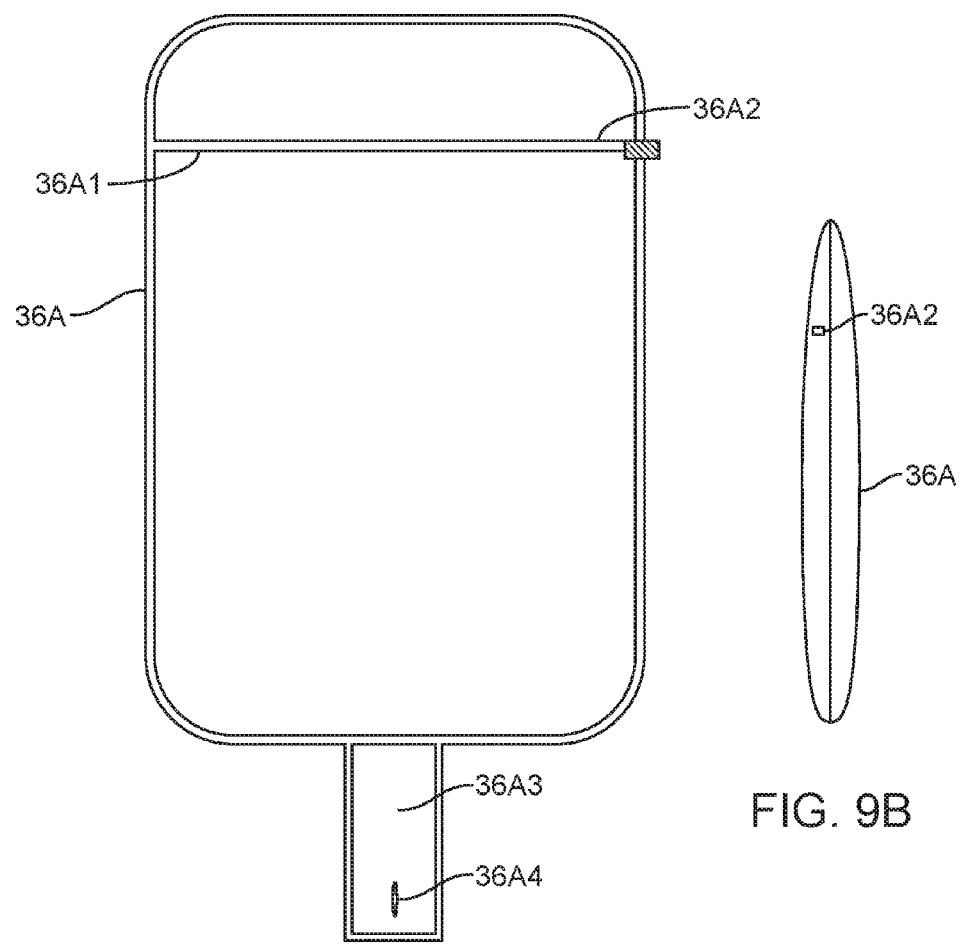

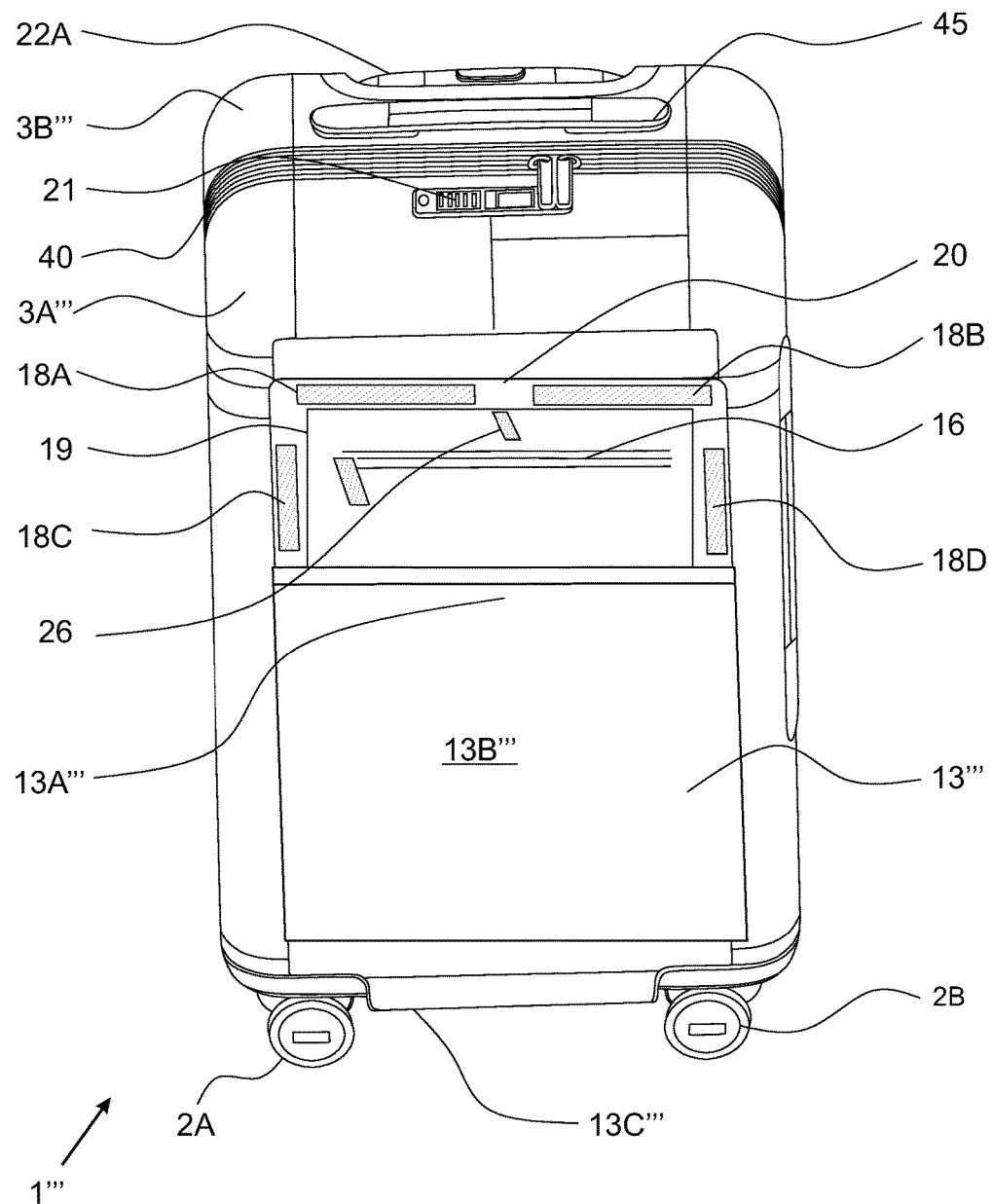
FIG. 14H1

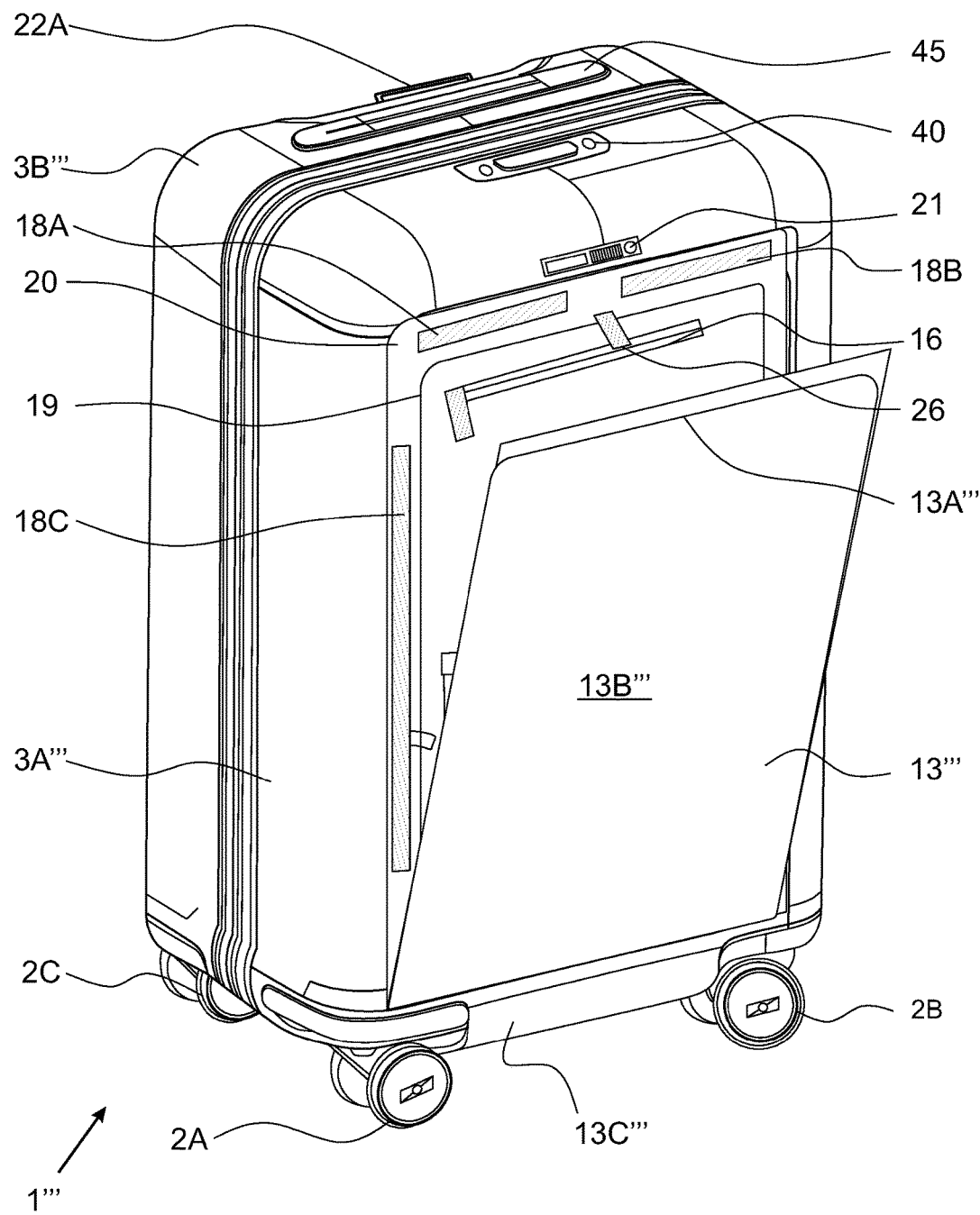
FIG. 14H2

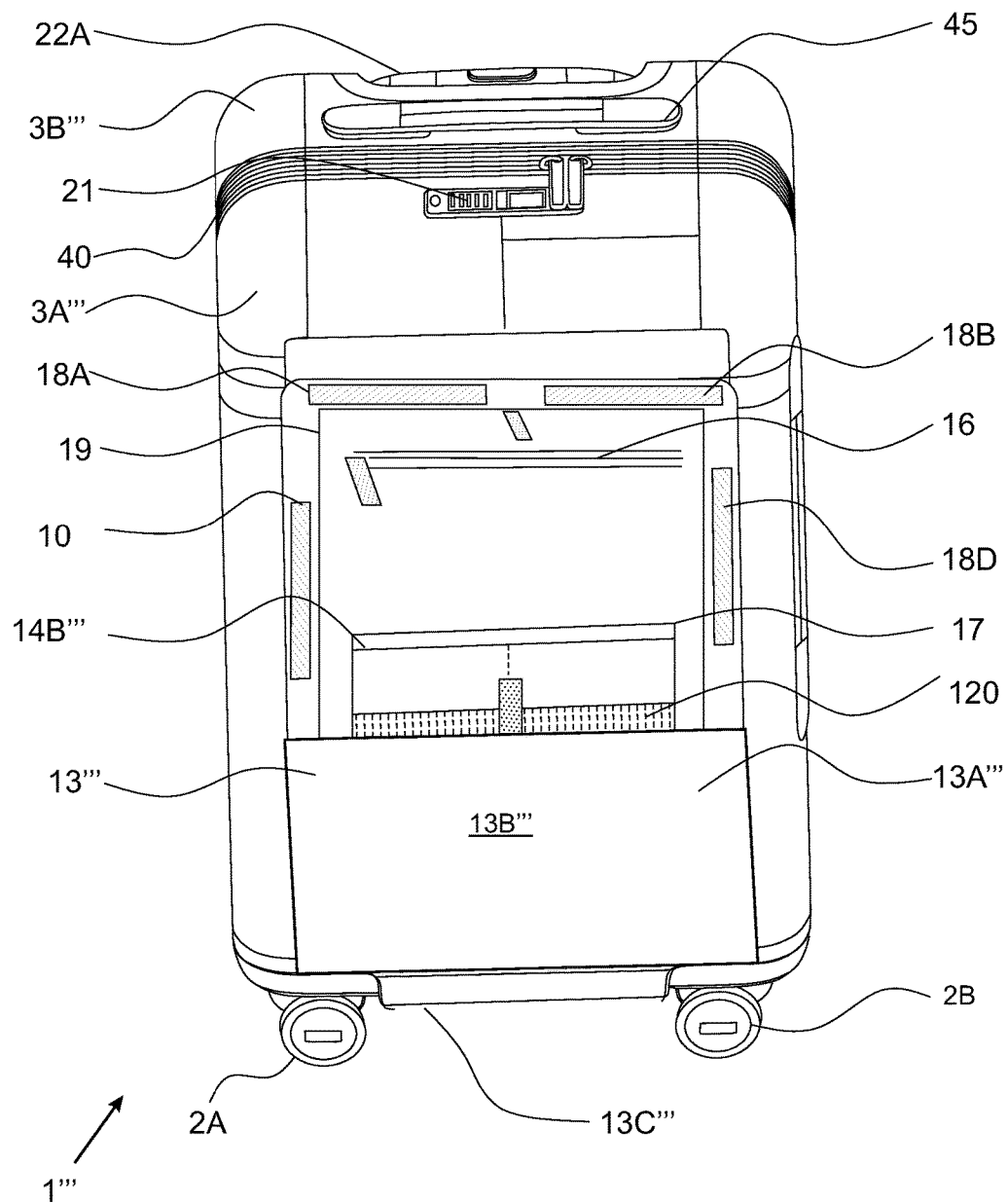
FIG. 14I1

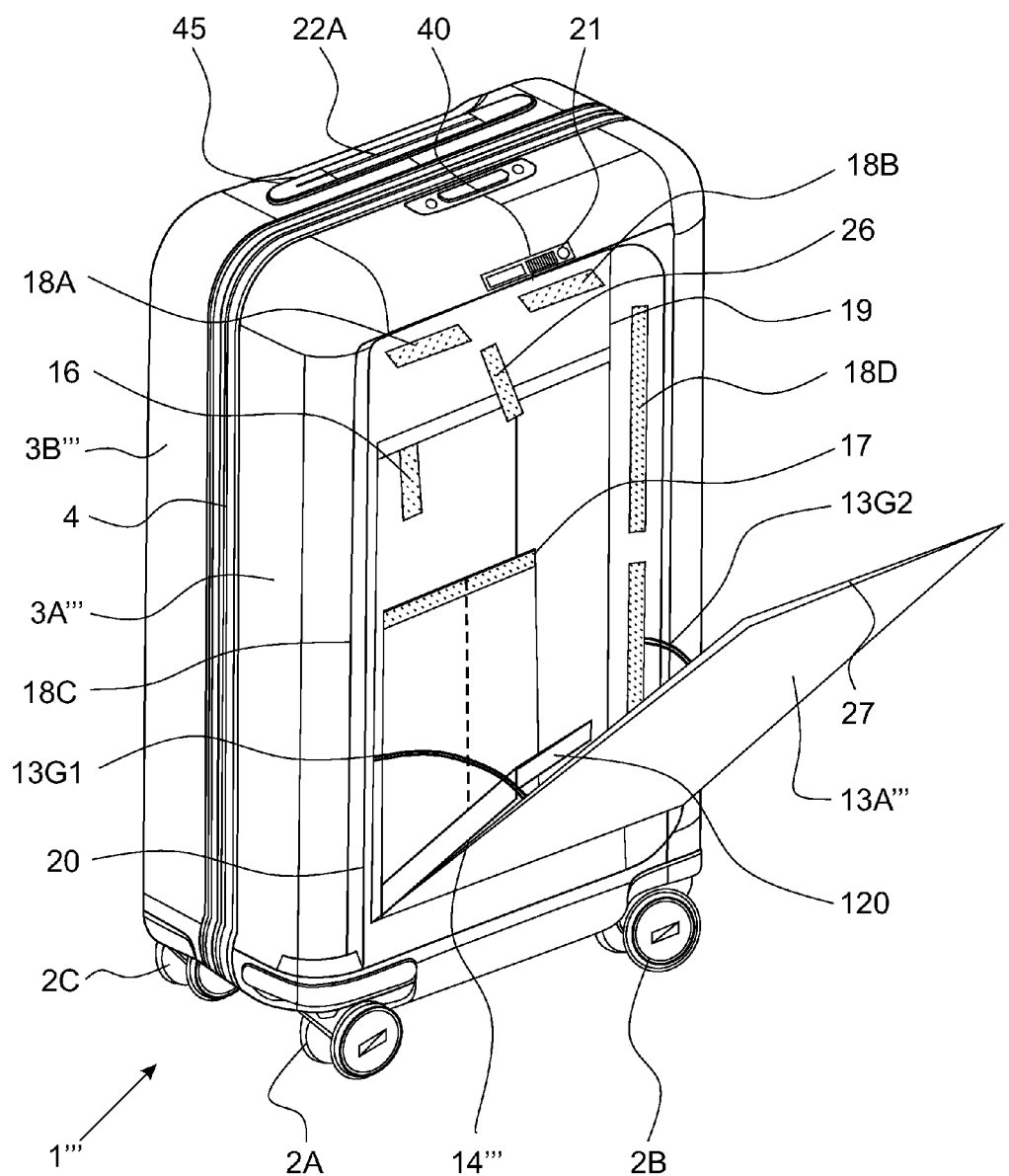
FIG. 14I2

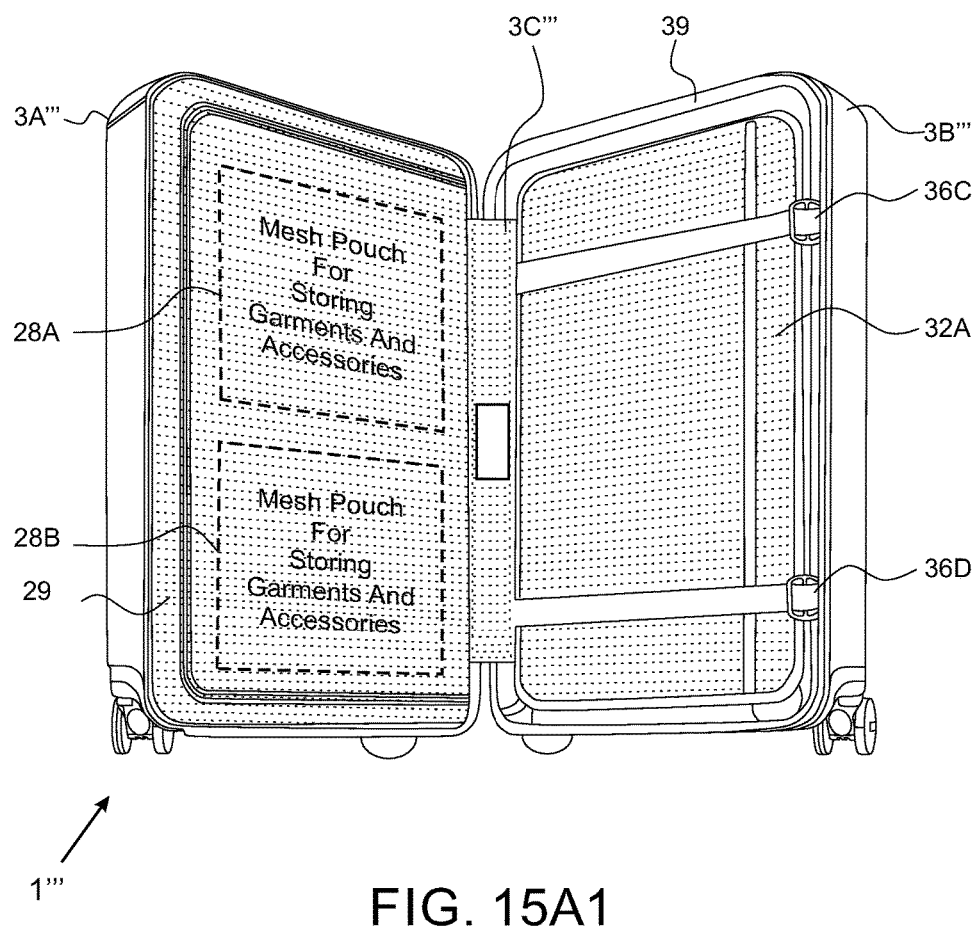
FIG. 15A1

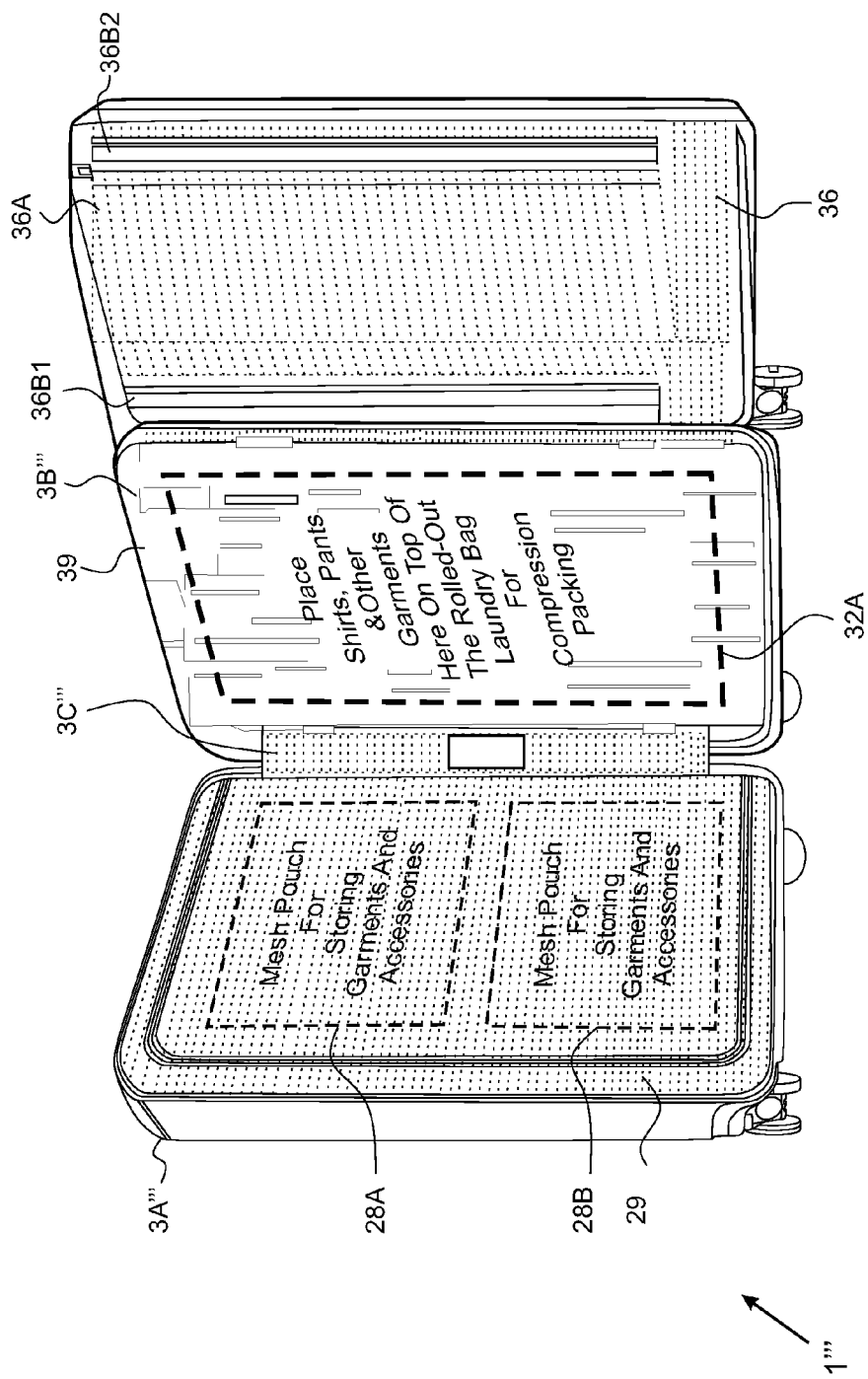
FIG. 15A2

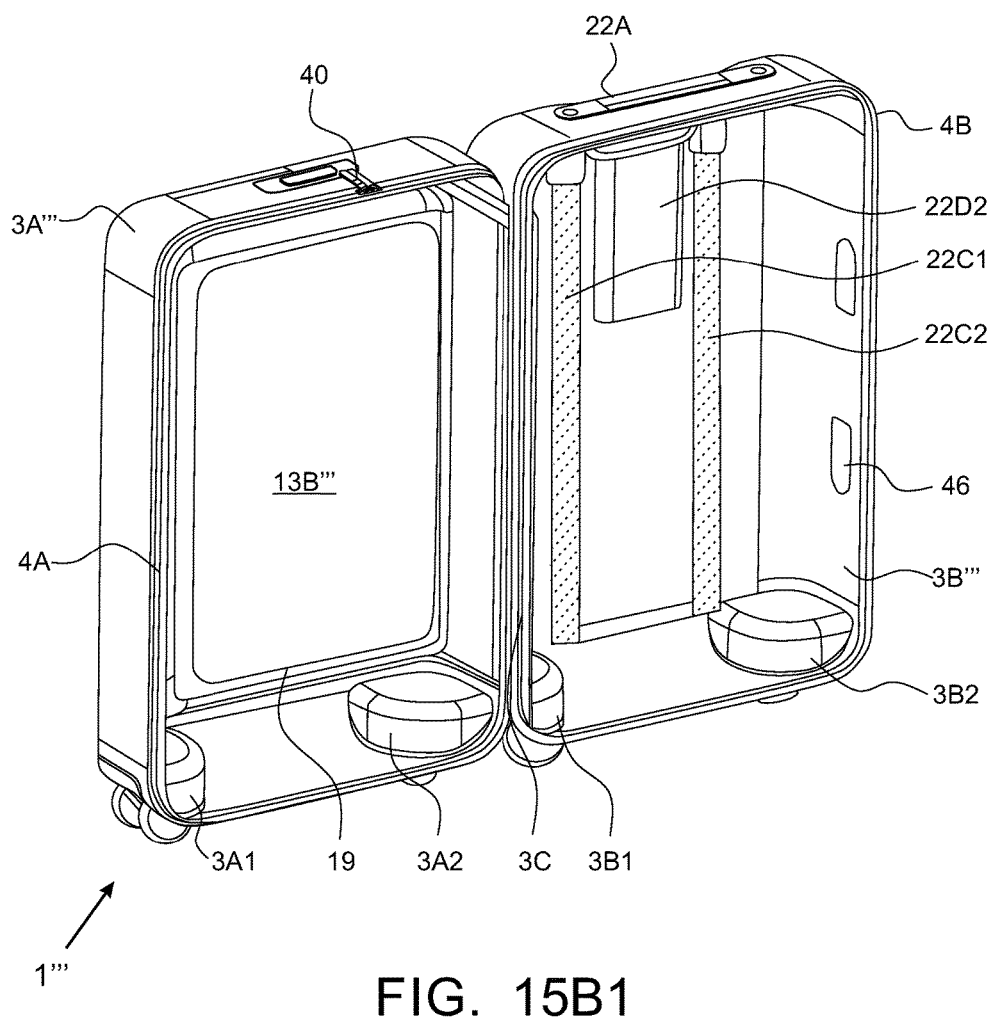
FIG. 15B1

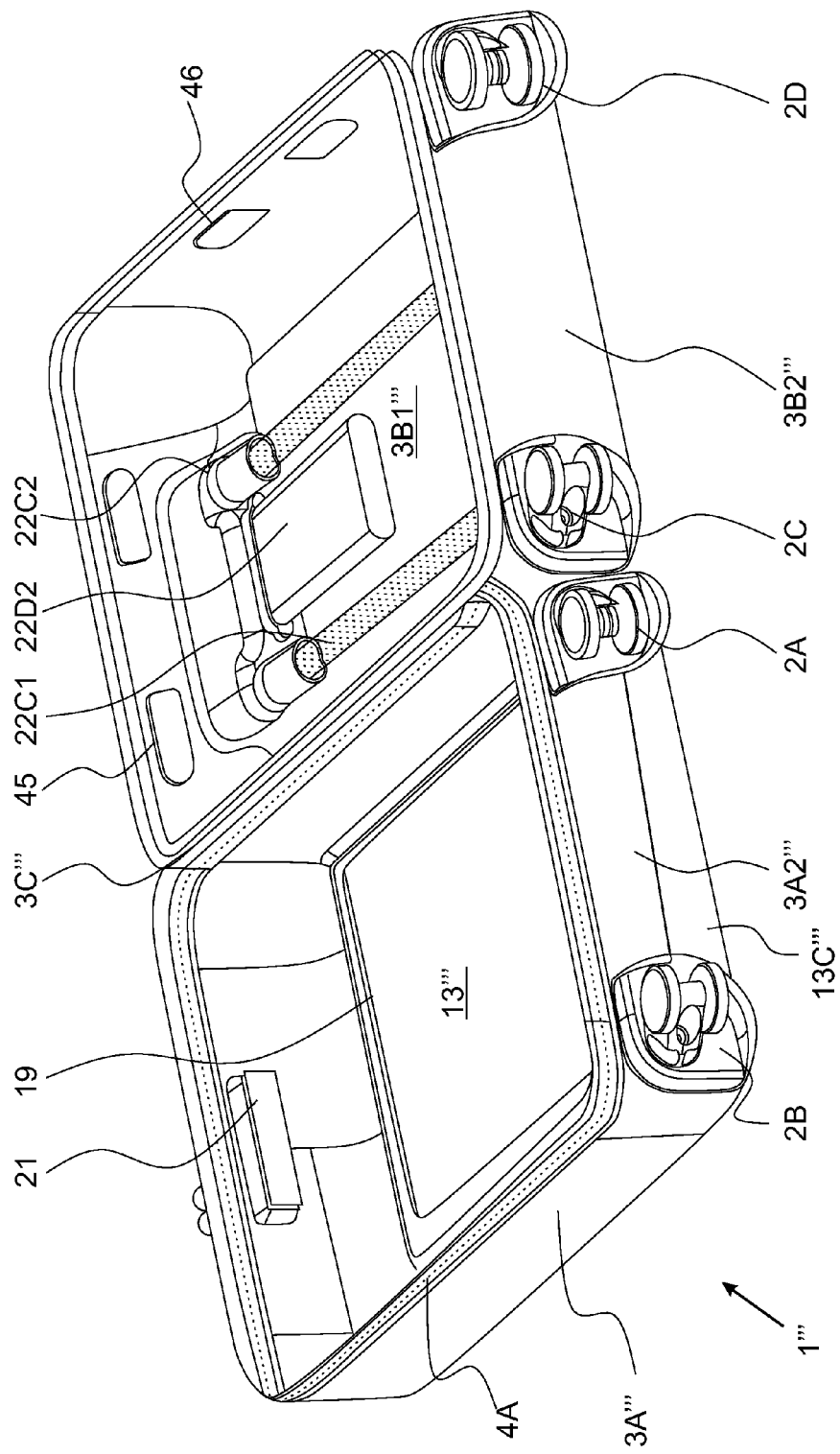
FIG. 15B2

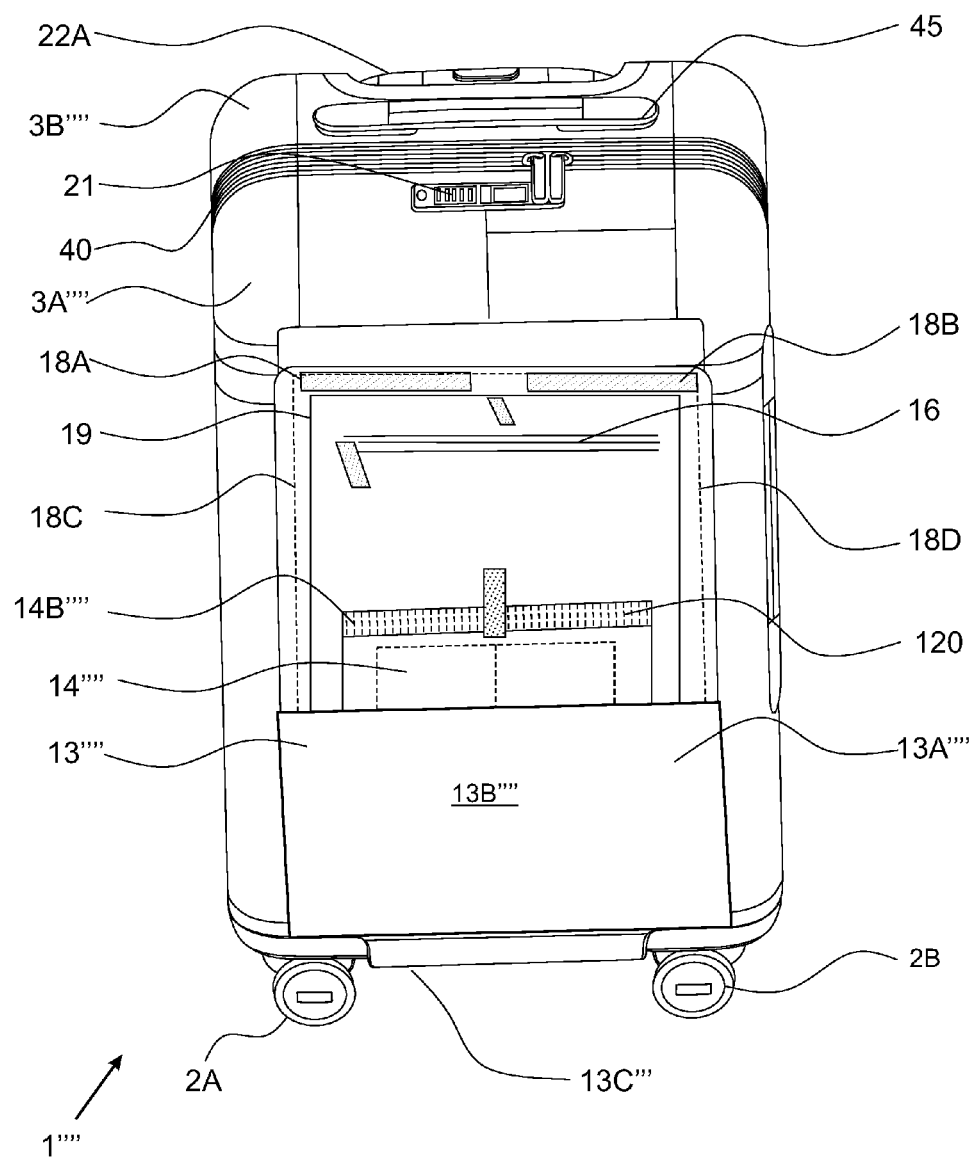
FIG. 16K1

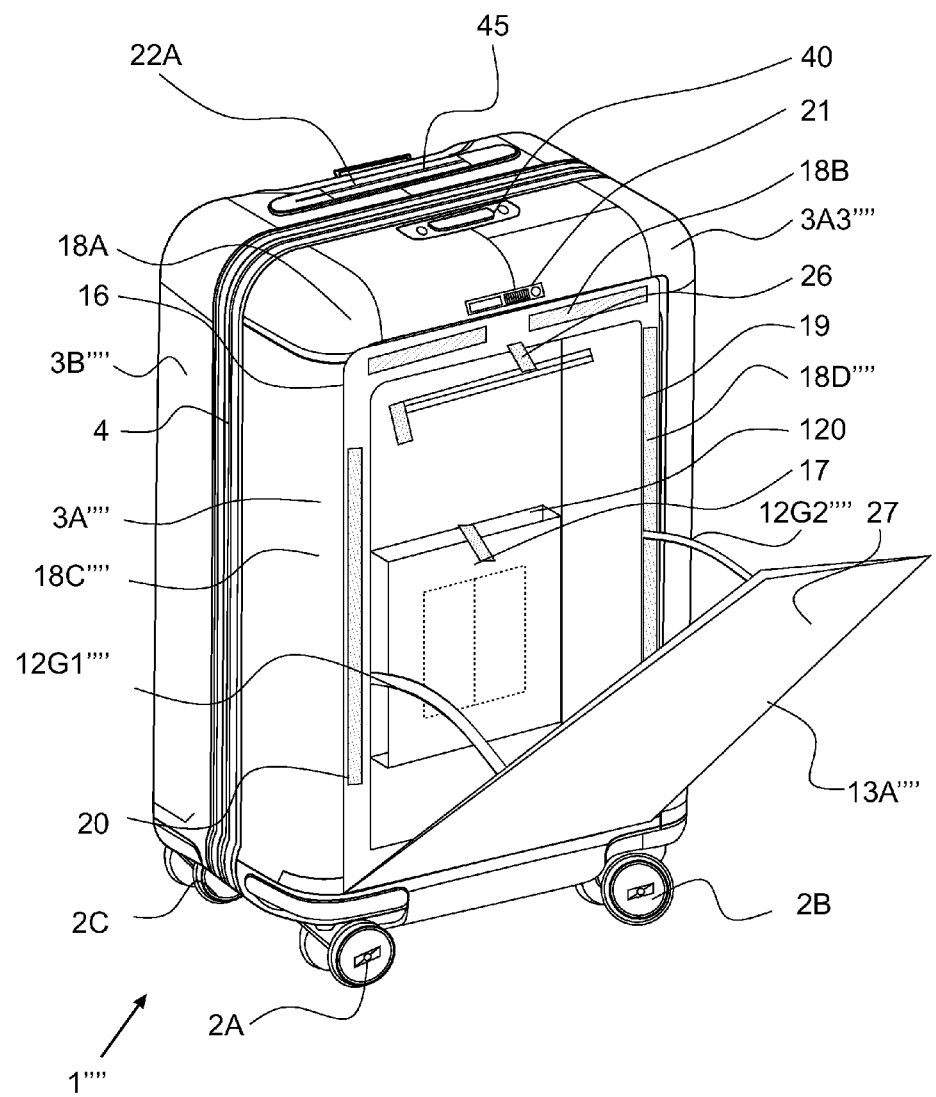
FIG. 16K2

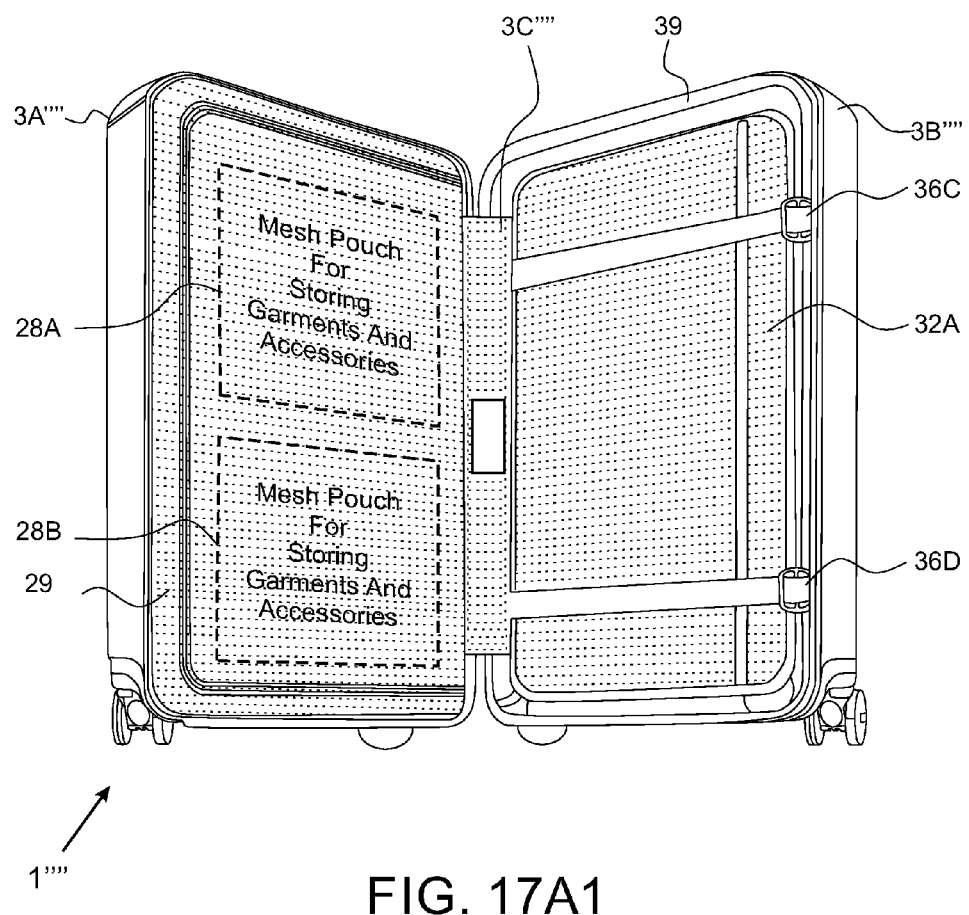
FIG. 17A1

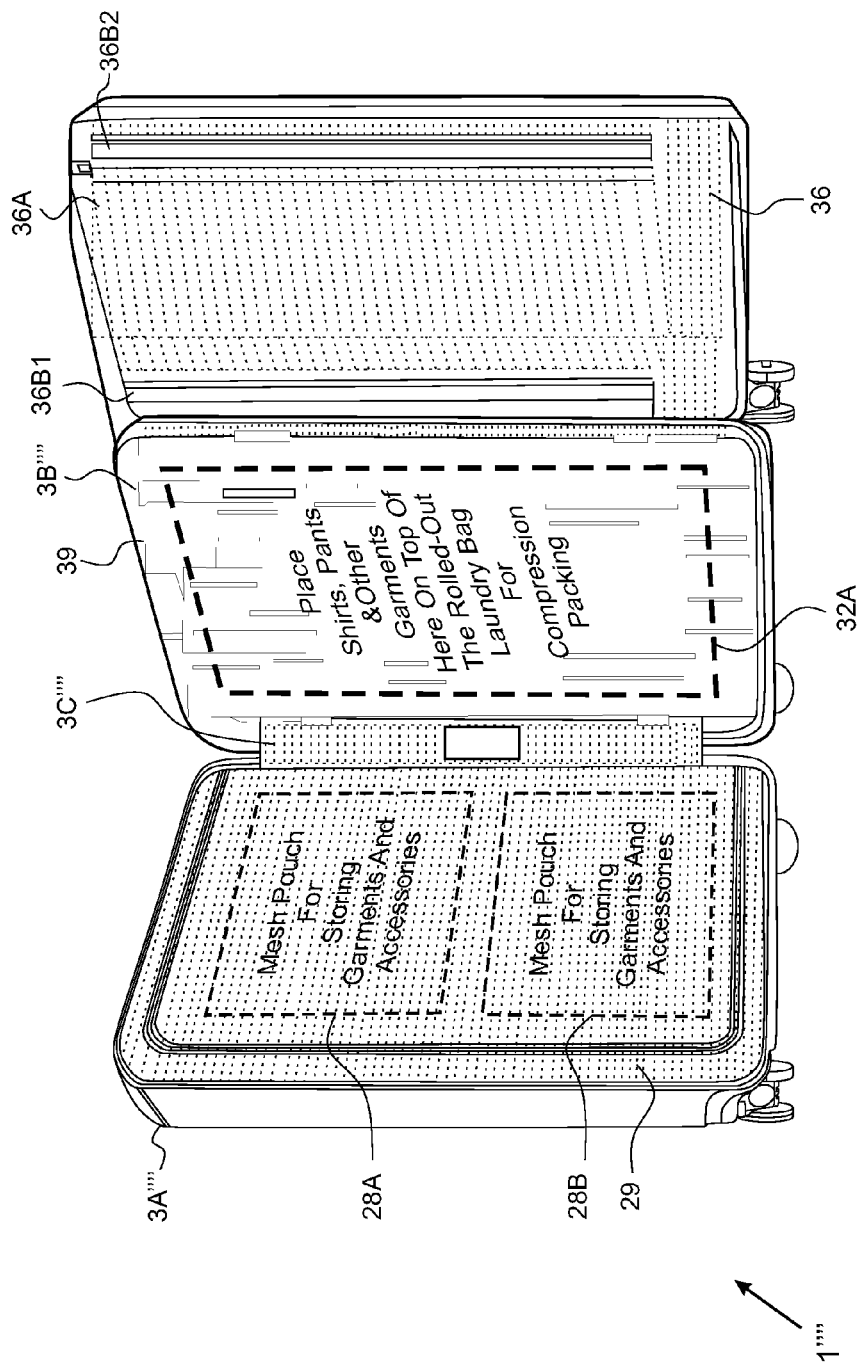
FIG. 17A2

TELESCOPICALLY-EXTENDABLE HANDLE AND RECHARGEABLE POWER SUPPLY ASSEMBLY FOR LUGGAGE

RELATED CASES

The present application is a Continuation of application Ser. No. 14/935,335 filed Nov. 6, 2015, owned by Applicant, JRSK, Inc., and incorporated herein by reference as if fully set forth herein.

BACKGROUND OF INVENTION

Field of Invention

The present invention relates to new and improved hard-shell luggage systems for helping individuals transport their personal items through airports, terminals, and other transportation systems, while overcoming the shortcomings and drawbacks associated with prior art technologies.

Brief Overview of the State of Knowledge and Skill in the Art

Luggage systems have evolved greatly over the past 100 years in step with developments in transportation systems (i.e. airports, terminals, bus stations and railways, and ocean liners), electronic communication and computing technologies, and evolving consumer behaviors and lifestyles. Consequently, particular groups of travelers have developed particular sets of expectations when it comes to particular classes of travel. At the same time, manufacturers of luggage systems have worked hard to ensure their evolving lines of luggage systems and related products will meet and satisfy these evolving expectations relating to utility, functionality, aesthetics as well as beauty.

While thousands of luggage systems have been designed, developed, manufactured and sold throughout the global marketplace over the past three decades, for both carry-on and check-in luggage systems alike, there still remains, however, a great need for new and improved luggage systems that address the new ways in which many people like to travel, in styles they feel most comfortable, and with unprecedented levels of convenience which they naturally welcome.

In view, therefore, of these facts and circumstances of the global luggage system marketplace, there is a great need in the art for new and improved luggage systems that that better address the ways in which many people like to travel, in a style they feel most comfortable, while enjoying an unprecedented level of convenience which they will naturally welcome, while overcoming the shortcomings and drawback of prior art luggage systems, methods and technologies.

SUMMARY AND OBJECTS OF THE PRESENT INVENTION

Accordingly, a primary object of the present invention is to provide improved luggage systems that that better address the ways in which many people like to travel, in a style they feel most comfortable, while enjoying an unprecedented level of convenience which they will naturally welcome, and overcoming the shortcomings and drawback of prior art luggage systems, methods and technologies.

In furtherance of this primary object, a new and improved hard-shell luggage system is provided comprising a set of four spinner wheels mounted in the four corners of a hard-shell housing assembly, wherein a telescopic-handle assembly supports a rechargeable battery power module, a set of USB-type DC electrical power supply ports and a USB-type DC power recharging port configured with the rechargeable battery module.

Another object of the present invention is to provide such a new and improved hard-shell luggage system, wherein when its telescopic handle assembly is arranged in a retracted configuration, its USB-type DC electrical power supply ports and USB-type DC power recharging port are not accessible, and when the telescopic handle assembly is arranged in a protracted configuration, the USB-type DC electrical power supply ports and the USB-type DC power recharging port are accessible for supplying electrical power to electrical power consuming devices and/or recharging the rechargeable battery module aboard the luggage system.

Another object of the present invention is to provide such a new and improved luggage system, wherein the telescopically extendable handle and rechargeable power supply assembly includes a GPS-based luggage position tracking device that is recharged with electrical power from said rechargeable battery storage module, and includes a GSM transceiver.

Another object of the present invention is to provide such a new and improved hard-shell luggage system comprising a set of four spinner wheels mounted in the four corners of the luggage system in an inset manner, and wherein its first and second hard-shell housing portions are hinged together using the same front flexible panel structure that extends to cover the front access opening formed in the front hard-shell housing portion, providing access to a front accessible interior storage volume, isolated from the interior storage volume within the rear hard-shell housing portion, where a laptop or other electronic device can be stored in a pouch formed on the back of the front opening cover structure while traveling, while the first and second hard-shell housing portions can remain securely locked using a conventional TSA-approved combination lock assembly.

Another object of the present invention is to provide such a new and improved hard-shell luggage system, wherein the front cover flap structure is completely flush with (i.e. disposed in substantially the same plane as) the front surface of the front hard-shell housing in which the front access opening is formed, thereby allowing users to more easily access their on-the-go necessities (e.g. laptop, tablet, passport, headphones, etc.) while traveling without the ugly bulk other bags create.

Another object of the present invention is to provide such a new and improved hard-shell luggage system, wherein a compression-pad structure is fastened and strapped down to the interior volume of the rear hard-shell housing portion, so as to compress shirts, pants and other garments against the bottom surface of the rear hard-shell housing portion of the luggage system when the straps are buckled and tightened to generate compression forces between the compression pad and the bottom surface of the rear hard-shell housing portion.

Another object of the present invention is to provide such a new and improved hard-shell luggage system, wherein the compression-pad structure can be quickly un-fastened and folded back away from the bottom of the rear hard-shell housing structure to reveal the interior volume of the rear hard-shell housing portion, allowing the user to access the interior storage volume of the luggage system and stack shirts, pants and other garments which are compressed when strapped down using the compression-pad structure.

Another object of the present invention is to provide such a new and improved hard-shell luggage system, wherein the front and rear hard-shell housing portions are sealable using an integrated zipper mechanism arranged in a zipped configuration, while its front cover flap can be manually opened to reveal the front access port opening formed through the top surface of the front hard-shell housing portion.

Another object of the present invention is to provide such a new and improved hard-shell luggage system, wherein a single piece of multi-ply material is used to form the hinge structure of the front and rear hard-shell housing portions of the luggage system, and as well as the flexible front cover flap structure that is used to cover the front access opening formed in the front hard-shell housing portion.

Another object of the present invention is to provide such a new and improved hard-shell luggage system, wherein the single piece of multi-ply material used to form the hinge structure of the front and rear hard-shell housing portions of the system, and flexible front cover flap structure comprises a sheet of dense flexible foam bonded to a layer of exterior fabric, a rigid plastic panel in the shape of a laptop perimeter to support the laptop sleeve and Velcro strap, and a pair of rigid plastic panels to form a hinge axis for the front and rear hard-shell housing portions, and a hinge axis for the front cover flap panel.

Another object of the present invention is to provide such a new and improved hard-shell luggage system comprising front first and rear hard-shell housing portions (i.e. shells) hinged together and sealed using its integrated zipper mechanism, a front access opening formed in the front hard-shell housing portion providing access to the interior volume of the front hard-shell housing portion bounded by its interior lining structure, a set of four spinner wheels mounted in the four corners of the luggage system, a telescopic-handle assembly supporting a USB rechargeable battery power supply, and a front cover flap structure (i) providing a hinge structure for the front and rear hard-shell housing portions, (ii) providing a front cover flap panel for the front access opening, (iii) employing a magnetic-stripe based front cover panel retention mechanism for retaining the front cover flap panel securely in place over the front access opening when arranged in its closed configuration, (iv) supporting a Velcro-locked laptop computer (or iPad) pouch on the inside of the front cover flap structure, and (v) allowing access to an interior storage volume within the front hard-shell housing portion of the luggage system, wherein the interior liner structure mounted within the interior volume of the front hard-shell housing portion supports a shallow zippered pouch for storing power adapters, memory sticks, and other items, and a divided unzippered mesh pouch for holding items that need to be quickly grabbed during travel, such a mobile phone, bottle of water, snacks etc.

Another object of the present invention is to provide such a new and improved hard-shell luggage system comprising front and rear hard-shell housing portions hinged together and sealed using a two-part zippering mechanism, wherein a front cover flap portion is disposed over a front access opening formed in the front hard-shell housing portion, and a telescopic-handle assembly is mounted in the rear hard-shell housing portion and having a base housing assembly supporting a rechargeable battery power module, a set of USB-type DC electrical power supply ports and a USB-type DC power recharging port configured with the rechargeable battery module, wherein a USB-type DC power port cover panel is hinged to a base housing component and covers the USB-type DC power ports and USB-type DC power recharging port formed in the base housing component.

Another object of the present invention is to provide such a new and improved hard-shell luggage system, comprising (i) a front hard-shell housing portion with a molded port for mounting a first TSA-approved combination lock assembly and a second TSA-approved combination lock assembly, (ii) a rear hard-shell housing portion with a set of molded ports for mounting the top handle structure and a side handle structure, and a molded port for mounting the base housing component of the telescoping handle and DC power supply assembly, (iii) a two-part zipper subsystem having a first zipper structure stitched to the lip portion of the opening around the front hard-shell housing portion and a second zipper portion stitched to the lip portion of the opening around the rear hard-shell housing portion, (iv) a flexible cover flap structure functioning as a first hinge structure for the front and rear hard-shell housing portions, and a second hinge structure for a front cover flap panel for covering the front access opening formed in the front surface of the front hard-shell housing portion and supporting on its interior side, a pouch for storage of a laptop computer and/or other articles without opening up the front and rear hard-shell housing portions, and (v) a set of indented wheel-wells formed in each of the corners of the bottom portion of the front and rear hard-shell housing portions, for mounting a set of four spinner wheels.

Another object of the present invention is to provide such a new and improved hard-shell luggage system comprising (i) a front hard-shell housing portion, (ii) a rear hard-shell housing portion hinged to the front hard-shell housing portion, (iii) a set of four spinner wheels mounted in the front and rear hard-shell housing portions, (iv) a handle assembly for pulling the system about on its set of spinner wheels, and (v) a compression pad subsystem installed in the interior volume region of the rear hard-shell housing portion, wherein said compression pad subsystem comprises a compression pad like structure for holding a stack of shirts, pants and other garments in the interior volume region, beneath the pad structure while it is strapped down under tension using a set of buckle straps that pass through compression pad structure and are fastened to the rear hard-shell housing portion using screw or other fasteners known in the art, while a laundry bag subsystem supported at the bottom surface of the rear hard-shell housing portion is also compressed in volume using the compression-pad structure of the compression pad subsystem.

Another object of the present invention is to provide such a new and improved hard-shell luggage system comprising (i) a front hard-shell housing, (ii) a rear hard-shell housing portion hinged to the front hard-shell housing portion, (iii) a set of four spinner wheels mounted in the front and rear hard-shell housing portions, (iv) a handle assembly for pulling the system about on its set of spinner wheels, (v) a compression pad subsystem installed in the interior volume region of the rear hard-shell housing portion, and (vi) a laundry bag subsystem installed in the interior volume region of the rear hard-shell housing portion, wherein the laundry bag subsystem further comprises (i) a laundry bag component of expandable pouch-like geometry and having a capacity to store soiled clothes, and (ii) a laundry bag storage pouch (i.e. compartment) formed between a set of wheel wells molded into the rear hard-shell housing portion of the hard-shell luggage system, for containing the laundry bag component when empty of soiled clothes and folded in a compact manner for storage in the laundry bag storage pouch.

Another object of the present invention is to provide such a new and improved hard-shell luggage system comprising (i) a front hard-shell housing, (ii) a rear hard-shell housing portion hinged to the front hard-shell housing portion, (iii) a set of four spinner wheels mounted in the front and rear hard-shell housing portions, (iv) a handle assembly for pulling the system about on its set of spinner wheels, (v) a compression pad subsystem installed in the interior volume region of the rear hard-shell housing portion, and (vi) an interior lining subsystem installed in the interior volume region of the front hard-shell housing portion, supporting an upper mesh pocket structure with a zippered access opening, and a lower mesh pocket structure with a zippered access opening.

Another object of the present invention is to provide such a new and improved hard-shell luggage system comprising (i) a front hard-shell housing portion, (ii) a rear hard-shell housing portion hinged to the front hard-shell housing portion, (iii) a set of four spinner wheels mounted in the front and rear hard-shell housing portions, (iv) a handle assembly for pulling the system about on its set of spinner wheels, and (v) a laundry bag subsystem is mounted inside the rear hard-shell housing portion between a pair of wheel wells molded in the rear hard-shell housing portion, wherein the laundry bag subsystem includes laundry bag storage pouch mounted between the wheel wells and ready to be un-zippered to reveal its pull-out and releasable laundry bag for containing soiled laundry while traveling, and releasably removed from its laundry bag storage pouch by way of a button or like fastener during laundry operations.

Another object of the present invention is to provide such a new and improved hard-shell luggage system, wherein the laundry bag subsystem also cooperates with a compression pad subsystem installed in the rear hard-shell housing portion by compressing (i) the laundry bag rolled out onto the bottom surface of the rear hard-shell housing portion and containing (in a separated manner) soiled clothes stored therein, as well as (ii) shirts, pants and other garments stacked or placed on top of the rolled-out laundry bag, using a set of compression belts with buckles and pull straps that are pulled taut to create the desired degree of compression for the application at hand.

Another object of the present invention is to provide such a new and improved hard-shell luggage system, wherein the hard-shell luggage system is supported by a set of four spinner wheels mounted in the four corners of the luggage system, wherein its front and rear hard-shell housing portions are hinged together and sealed using its integrated zipper mechanism, and wherein when its telescopic-handle assembly is arranged in its retracted configuration, the handle structure is disposed over a hinged power port cover panel that conceals and protects a set of USB DC electrical power supply ports and DC power recharging port from rain, spilled fluids and debris.

Another object of the present invention is to provide a new and improved hard-shell luggage system, comprising (i) front and rear hard-shell housing portions are hinged together and sealed with its integrated zipper mechanism, (ii) set of four spinner wheels mounted in the four corners of the luggage system, (iii) a telescopic-handle assembly that can be arranged in a retracted configuration with a power port cover panel closed to conceal both its USB DC electrical power supply ports, and DC power recharging port, and also in protracted configuration where the power port cover panel can be opened to reveal both the USB DC electrical power supply ports, and DC power recharging port while the user pulls (i.e. trolleys) the luggage system around during travel, and (iv) a series of horizontally-formed, evenly spaced-apart ridges (i.e. corrugations) formed around the circumference of the front and rear hard-shell housing portions molded from durable plastic material, and up and down along the longitudinal axis of the luggage system, to provide added strength to the housing portions and create an attractive business-like appearance for its user.

Another object of the present invention is to provide a new and improved hard-shell luggage system, wherein a USB rechargeable DC battery power supply subsystem is integrated within the luggage system, and comprises (i) an AC/DC power adapter connected to a 100-120 volt (60 Hz) or like AC power receptacle by way of a conventional power cord, (ii) a battery recharging circuit operably connected to the AD/DC power adapter by way of a USB or like power cord, (iii) a battery power storage module operably connected to the battery recharging circuit by way of electrical conductors, (iv) a power switching control circuit operably connected to the battery power storage module, the battery recharging circuit and the AC/DC power adapter, and also a set of USB power output ports for receiving the USB plugs of electrically-powered devices (e.g. smartphones, laptops iPads, etc.) and supplying electrical DC power to these devices in a regulated manner.

Another object of the present invention is to provide a new and improved hard-shell luggage system, comprising (i) front and rear hard-shell housing portions hinged together and sealed with its integrated zipper mechanism, (ii) a set of four spinner wheels mounted in the four corners of the luggage system, (iii) a telescopic-handle assembly that can be arranged in a retracted configuration with a USB power port cover panel closed to conceal both its USB DC electrical power supply ports, and DC power recharging port, and also in protracted configuration where the power port cover panel can be opened to reveal both the USB DC electrical power supply ports, and DC power recharging port while the user pulls (i.e. trolleys) the luggage system around during travel, wherein while a user is pulling the luggage system along a rainy surface, while talking on a mobile phone that is being recharged with the telescopic handle assembly protracted and a USB power plug cable connected between the mobile phone and a USB power port in the luggage system, the USB power port cover panel will automatically close down on the USB power plug and unused USB power ports, so as to minimize pouring rain from seeping into the USB power ports of the luggage system.

Another object of the present invention is to provide a new and improved Internet-based luggage tracking system comprising (i) a packet switched communication network, (iii) a plurality of mobile luggage systems containing GPS-based position tracking devices integrated therein, and (iii) a data center with communication, application and database servers supporting real-time luggage tracking operations using mobile smartphones (e.g. iPhone, Android phone, etc.) and mobile applications installed thereon.

These and other objects of the present invention will become apparent hereinafter and in view of the appended Claims to Invention.

BRIEF DESCRIPTION OF THE DRAWINGS

The Objects of the Present Invention will be more fully understood when read in conjunction with the Figure Drawings, wherein:

FIG. 2A-2 is front perspective view of the first illustrative embodiment of the hard-shell luggage system shown in FIGS. 1A, 1B and 1C, wherein the hard-shell luggage system is positioned on its set of four spinner wheels mounted in the four corners of the luggage system, wherein its first and second hard-shell housing portions are arranged in an open configuration and its integrated zipper mechanism being un-zipped, wherein its telescopic-handle assembly is arranged in its protracted configuration, wherein a set of mesh pockets are supported on the interior lining installed within the interior volume of the front hard-shell housing portion of the luggage system, and wherein the fabric compression straps and buckles associated with the compression-pad subsystem are un-fastened, and the compression pad structure is folded back and away from the bottom of the rear hard-shell housing structure to reveal the interior volume of the rear hard-shell housing portion, allowing user to access to the interior storage volume of the rear hard-shell housing portion of the luggage system where stack shirts, pants and other garments can be stacked and subsequently compressed when strapped down using the compression-pad structure of the present invention;

FIG. 5J1 is a first front perspective view of the telescopic handle and USB DC power supply assembly of the present invention shown removed from the first illustrative embodiment of the hard-shell luggage system shown in FIGS. 1A through 2A-2, and comprising (i) a manually-releasable handle portion containing an internal lock and release mechanism triggered by a manually-depressible button located centrally on the handle portion, (ii) a base housing component having a set of spaced apart telescoping guide tubes, through which a set of telescoping rod members pass and connect on one end to mounting apertures formed in the handle portion, and on the other end to mounting apertures formed in a telescopic rod member mounting bracket mountable to the surface of the rear hard-shell housing portion of the luggage system, (ii) a set of USB DC power supply ports and a DC battery recharging port formed in the top surface of the base housing component, and operably connected to a PC board mounted in a replaceable and rechargeable DC battery power module contained in a battery module casing that is supported within the plane of and between the pair of spaced apart telescopic guide tubes, beneath the base housing portion, and (iv) a power port cover panel hinged to the base housing component for covering the USB DC power ports and DC power recharging port formed through the top surface of the base housing component;

FIG. 5J2 is a rear perspective view of the telescopic handle and USB DC power supply assembly of the present invention shown in FIG. 5J1;

FIG. 5J3 is a second front perspective view of the telescopic handle and USB DC power supply assembly of the present invention shown in FIGS. 5J1 and 5J2;

FIG. 5J4 is an elevated side view of the telescopic handle and USB DC power supply assembly of the present invention shown in FIGS. 5J1 through 5J3;

FIG. 5J5 is a first perspective view of the underside of telescopic handle and USB DC power supply assembly of the present invention shown in FIGS. 5J1 through 5J4, with the telescopic rod members removed for purposes of illustration, showing the replaceable rechargeable DC battery power supply module;

FIG. 5J6 is a perspective view of the underside of telescopic handle and USB DC power supply assembly of the present invention shown in FIGS. 5J1 through 5J4, with the telescopic rod members removed for purposes of illustration, showing the replaceable rechargeable DC battery power supply module;

FIG. 5K1 is a perspective view of the underside of telescopic handle and USB DC power supply assembly of the present invention shown in FIGS. 5J1 through 5J4, with the telescopic rod members and hinged power port cover panel removed for purposes of illustration, showing the replaceable rechargeable DC battery power supply module and power ports of the telescopic handle and USB DC power supply assembly;

FIG. 5K2 is a perspective view of the underside of telescopic handle and USB DC power supply assembly of the present invention shown in FIGS. 5J1 through 5J4, with the telescopic rod members removed for purposes of illustration, showing the replaceable rechargeable DC battery power supply module and hinged power port cover panel concealing and sealing off the power ports from the environment;

FIG. 9A is a schematic illustration of the laundry bag component of the laundry bag subsystem of the present invention, for fold and roll-up storage within a laundry bag storage pouch (i.e. compartment) formed between the wheel-wells molded into the rear hard-shell housing portion of the luggage system;

FIG. 9B is a schematic illustration providing a side view of the laundry bag component shown stuffed with some soiled clothes, to illustrative its expandable pouch-like geometry and capacity to store soiled clothes;

FIG. 12C-1 is front perspective view of the second illustrative embodiment of the hard-shell luggage system shown in FIGS. 11A through 11E, wherein the hard-shell luggage system is positioned on its set of four spinner wheels mounted in the four corners of the luggage system, wherein its front and rear hard-shell housing portions are arranged in an open configuration and its integrated zipper mechanism being un-zipped, wherein a set of mesh pockets are supported on the interior lining installed within the interior volume of the front hard-shell housing portion of the luggage system, and wherein the compression-pad structure is fastened and strapped down to the interior volume of the rear hard-shell housing portion, so as to compress between the compression pad structure and the bottom of the rear hard-shell housing portion, (i) shirts, pants and other garments stacked upon (ii) an expandable laundry bag rolled out from a laundry bag storage pouch supported on the molded wheel wells of the rear hard-shell housing portion, and filled with soiled clothes;

FIG. 12C-2 is front perspective view of the second illustrative embodiment of the hard-shell luggage system shown in FIGS. 11A through 11E, wherein the hard-shell luggage system is positioned on its set of four spinner wheels mounted in the four corners of the luggage system, wherein its front and rear hard-shell housing portions are arranged in an open configuration and its integrated zipper mechanism being un-zipped, wherein a set of mesh pockets are supported on the interior lining installed within the interior volume of the front hard-shell housing portion of the luggage system, and wherein the compression-pad structure is un-fastened and folded back away from the bottom of the rear hard-shell housing structure to reveal the interior volume of the rear hard-shell housing portion, allowing user to access to the interior storage volume of the luggage system and stack shirts, pants and other garments to be compressed when strapped down using the compression-pad structure of the present invention;

FIG. 14H1 is a front perspective view of the fourth illustrative embodiment of the hard-shell luggage system shown in FIGS. 14A through 14F, wherein its front and rear hard-shell housing portions are arranged in a closed configuration and sealed using its integrated zipper mechanism, and wherein the front cover flap structure is arranged in its open configuration revealing (i) interior storage volume of the front hard-shell housing portion of the luggage system, including its shallow zippered pouch for storing power adapters, memory sticks, and other items, and (ii) its magnetic stripe based front cover panel retention mechanism for retaining the front cover flap panel securely in place over the front access opening when arranged in its closed configuration;

FIG. 14H2 is a side perspective view of the fourth illustrative embodiment of the hard-shell luggage system shown in FIGS. 14A through 14H1, wherein its front and rear hard-shell housing portions are arranged in a closed configuration and sealed using its integrated zipper mechanism, and wherein the front cover flap structure is arranged in its open configuration revealing (i) interior storage volume of the front hard-shell housing portion of the luggage system, including its shallow zippered pouch for storing power adapters, memory sticks, and other items, and (ii) its magnetic stripe based front cover panel retention mechanism for retaining the front cover flap panel securely in place over the front access opening when arranged in its closed configuration;

FIG. 14I1 is a front perspective view of the fourth illustrative embodiment of the hard-shell luggage system shown in FIGS. 14A through 14H2, wherein its front and rear hard-shell housing portions are arranged in a closed configuration and sealed using its integrated zipper mechanism, and wherein the front cover flap structure is arranged in its open configuration revealing (i) its Velcro-locked laptop computer (or iPad) pouch on the inside of the front cover flap structure, (ii) interior storage volume of the front hard-shell housing portion of the luggage system, including its shallow zippered pouch for storing power adapters, memory sticks, and other items, and a lower divided mesh pouch for hold items that need to be quickly grabbed such a mobile phone, bottle of water, snacks etc., and (iii) its magnetic stripe based front cover panel retention mechanism for retaining the front cover flap panel securely in place over the front access opening when arranged in its closed configuration;

FIG. 14I2 is a front side perspective view of the fourth illustrative embodiment of the hard-shell luggage system shown in FIGS. 14A through 14H2, wherein its front and rear hard-shell housing portions are arranged in a closed configuration and sealed using its integrated zipper mechanism, and wherein the front cover flap structure is arranged in its open configuration revealing (i) its Velcro-locked laptop computer (or iPad) pouch on the inside of the front cover flap structure, (ii) interior storage volume of the front hard-shell housing portion of the luggage system, including its shallow zippered pouch for storing power adapters, memory sticks, and other items, and a lower divided mesh pouch for hold items that need to be quickly grabbed such a mobile phone, bottle of water, snacks etc., and (iii) its magnetic stripe based front cover panel retention mechanism for retaining the front cover flap panel securely in place over the front access opening when arranged in its closed configuration;

FIG. 15A1 is front perspective view of the fourth illustrative embodiment of the hard-shell luggage system shown in FIGS. 14A through 14I2, wherein its front and rear hard-shell housing portions are arranged in an open configuration and its integrated zipper mechanism are unzipped, wherein a set of mesh pockets are supported on the interior lining structure installed within the interior volume of the front hard-shell housing portion of the luggage system, and wherein the compression-pad structure is fastened and strapped down to the interior volume of the rear hard-shell housing portion so as to compress items disposed between the compression pad structure and the bottom of the rear hard-shell housing portion, which may include shirts, pants and other garments alone or stacked upon an expandable laundry bag rolled out from a laundry bag storage pouch supported between the molded wheel wells of the rear hard-shell housing portion, and filled with soiled clothes;

FIG. 15A2 is front perspective view of the fourth illustrative embodiment of the hard-shell luggage system shown in FIGS. 14A, 14B and 14C, wherein its first and second hard-shell housing portions are arranged in an open configuration and its integrated zipper mechanism are unzipped, wherein a set of mesh pockets are supported on the interior lining installed within the interior volume of the front hard-shell housing portion of the luggage system, and wherein the fabric compression straps and buckles associated with the compression-pad subsystem are un-fastened, and the compression pad structure is folded back and away from the bottom of the rear hard-shell housing structure to reveal the interior volume of the rear hard-shell housing portion, allowing user to access to the interior storage volume of the rear hard-shell housing portion of the luggage system where stack shirts, pants and other garments can be stacked and subsequently compressed when strapped down using the compression-pad structure of the present invention;

FIG. 15B1 is a first perspective view of the fourth illustrative embodiment of the hard-shell luggage system shown in FIGS. 14A, 14B and 14C, positioned on its set of four spinner wheels mounted in the four corners of the luggage system, wherein its front and rear hard-shell housing portions are arranged in an open configuration with its integrated zipper mechanism arranged in an unzipped configuration and revealing the interior volume of the luggage system with its interior lining removed for purposes of illustration, wherein its telescopic-handle assembly is arranged in its retracted configuration, wherein the front cover flap is closed to conceal the front access port opening formed through the top surface of the front hard-shell housing portion, and wherein the interior lining structures have been removed from both the interior storage volumetric regions of the front and rear hard-shell housing portions of the luggage system;

FIG. 15B2 is a second perspective view of the fourth illustrative embodiment of the hard-shell luggage system shown in FIGS. 14A, 14B and 14C, wherein its front and rear hard-shell housing portions are arranged in an open configuration with its integrated zipper mechanism arranged in an unzipped configuration, wherein its telescopic-handle assembly is arranged in its retracted configuration, wherein the front cover flap is closed to conceal the front access port opening formed through the top surface of the front hard-shell housing portion, and wherein the interior lining structures have been removed from both the interior storage volumetric regions of the front and rear hard-shell housing portions of the luggage system, for purposes of illustration;

FIG. 16K1 is a front perspective view of the fifth illustrative embodiment of the hard-shell luggage system shown in FIGS. 16A through 16E, wherein its telescopic-handle assembly is arranged in its retracted configuration, and wherein the front cover flap structure is arranged in its fully opened configuration revealing (i) interior storage volume of the front hard-shell housing portion of the luggage system, including its shallow zippered pouch for storing power adapters, memory sticks, and other items, and a lower divided mesh pouch for hold items that need to be quickly grabbed such a mobile phone, bottle of water, snacks etc., (ii) its Velcro-locked laptop computer (or iPad) pouch on the inside surface of the interior lining structure, below the shallow zippered pouch, and (iii) its magnetic stripe based front cover panel retention mechanism for retaining the front cover flap panel securely in place over the front access opening when arranged in its closed configuration;

FIG. 16K2 is a front side perspective view of the fifth illustrative embodiment of the hard-shell luggage system shown and arranged in FIG. 16K1;

FIG. 17A1 is a front perspective view of the fifth illustrative embodiment of the hard-shell luggage system shown in FIGS. 16A, 16B and 16C, wherein the hard-shell luggage system is positioned on its set of four spinner wheels mounted in the four corners of the luggage system, wherein its front and rear hard-shell housing portions are arranged in an open configuration and its integrated zipper mechanism being un-zipped, wherein a set of mesh pockets are supported on the interior lining structure installed within the interior volume of the front hard-shell housing portion of the luggage system, and wherein the compression-pad structure is fastened and strapped down to the interior volume of the rear hard-shell housing portion so as to compress items disposed between the compression pad structure and the bottom of the rear hard-shell housing portion, which may include shirts, pants and other garments alone or stacked upon an expandable laundry bag rolled out from a laundry bag storage pouch supported between the molded wheel wells of the rear hard-shell housing portion, and filled with soiled clothes;

FIG. 17A2 is front perspective view of the fifth illustrative embodiment of the hard-shell luggage system shown in FIGS. 14A, 14B and 14C, wherein the hard-shell luggage system is positioned on its set of four spinner wheels mounted in the four corners of the luggage system, wherein its first and second hard-shell housing portions are arranged in an open configuration and its integrated zipper mechanism being un-zipped, wherein a set of mesh pockets are supported on the interior lining installed within the interior volume of the front hard-shell housing portion of the luggage system, and wherein the fabric compression straps and buckles associated with the compression-pad subsystem are un-fastened, and the compression pad structure is folded back and away from the bottom of the rear hard-shell housing structure to reveal the interior volume of the rear hard-shell housing portion, allowing user to access to the interior storage volume of the rear hard-shell housing portion of the luggage system where stack shirts, pants and other garments can be stacked and subsequently compressed when strapped down using the compression-pad structure of the present invention;

DETAILED DESCRIPTION OF THE ILLUSTRATIVE EMBODIMENTS OF THE PRESENT INVENTION

Figure 1A:
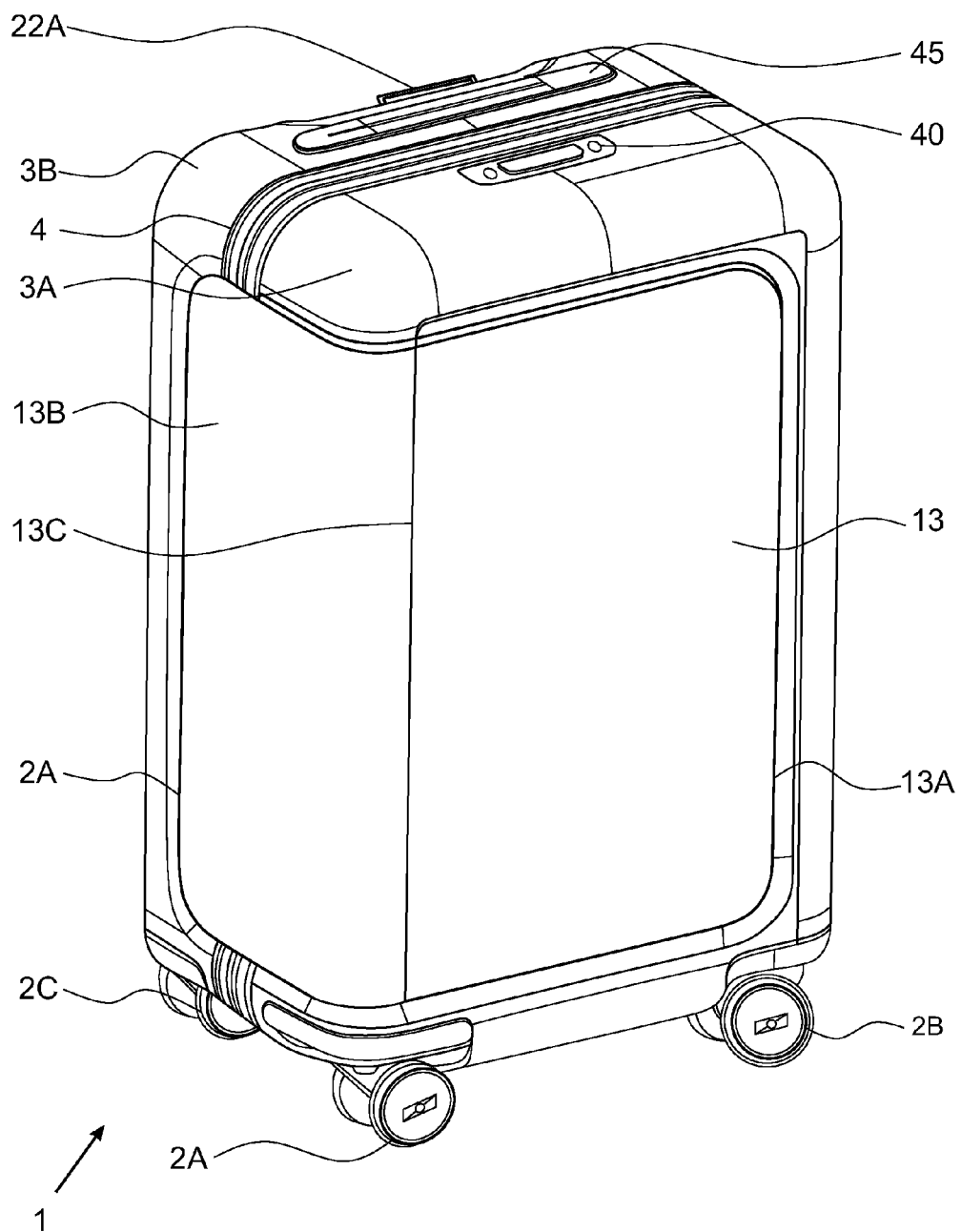
FIG. 1A is a front perspective view of a first illustrative embodiment of the hard-shell luggage system of the present invention, wherein the hard-shell luggage system is positioned on its set of four spinner wheels mounted in the four corners of the luggage system, wherein its front and rear hard-shell housing portions are arranged in a closed configuration and sealed using its integrated zipper mechanism, and wherein its telescopic-handle assembly is arranged in its protracted configuration over the hinged power port cover panel concealing its USB DC electrical power supply ports, and DC power recharging port.
Figure 1B:
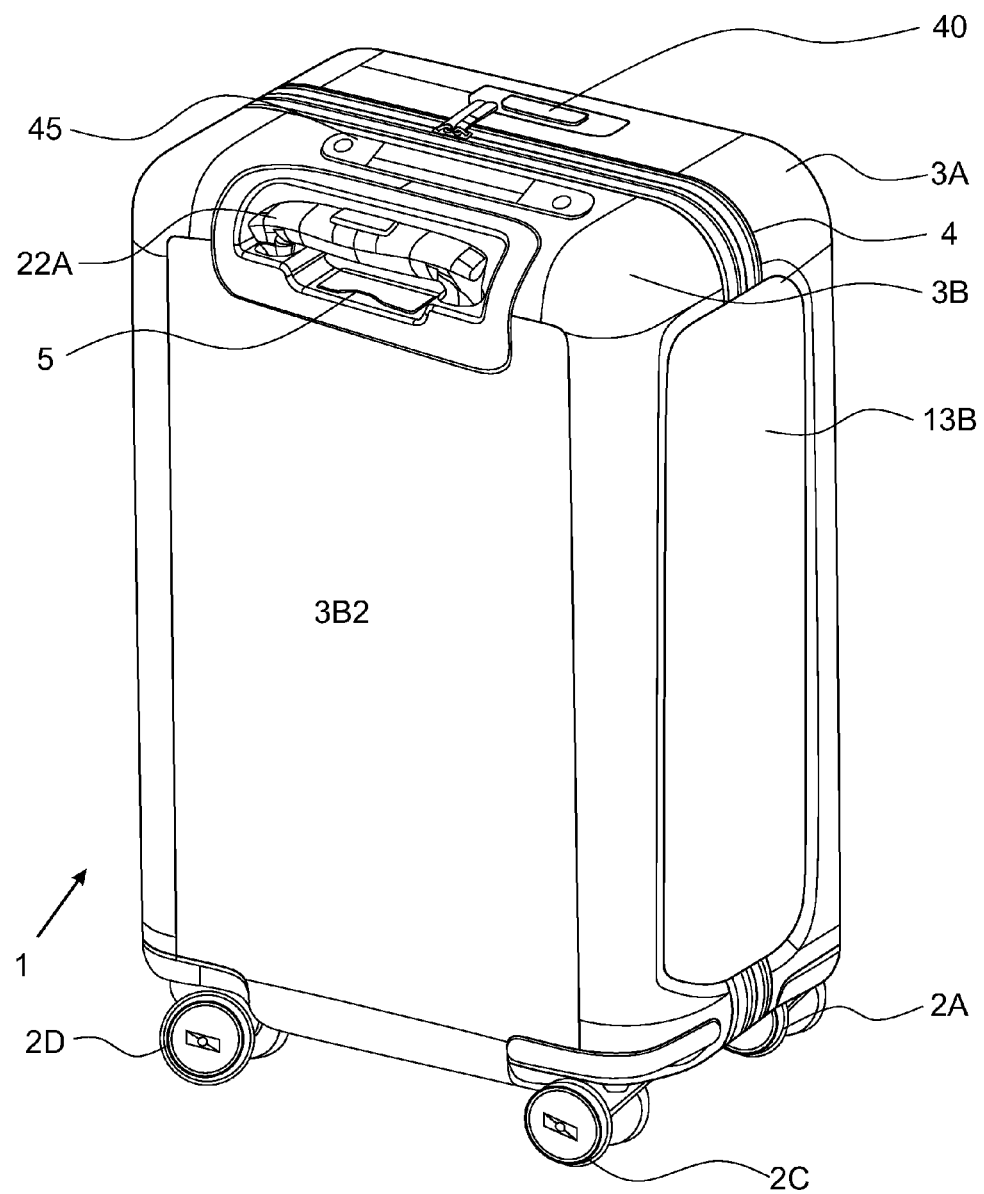
FIG. 1B is a rear perspective view of a first illustrative embodiment of the hard-shell luggage system of the present invention, wherein the hard-shell luggage system is positioned on its set of four spinner wheels mounted in the four corners of the luggage system, wherein its front and rear hard-shell housing portions are arranged in a closed configuration and sealed using its integrated zipper mechanism, and wherein its telescopic-handle assembly is arranged in its protracted configuration over the hinged power port cover panel concealing its USB DC electrical power supply ports, and DC power recharging port.
Figure 1C:
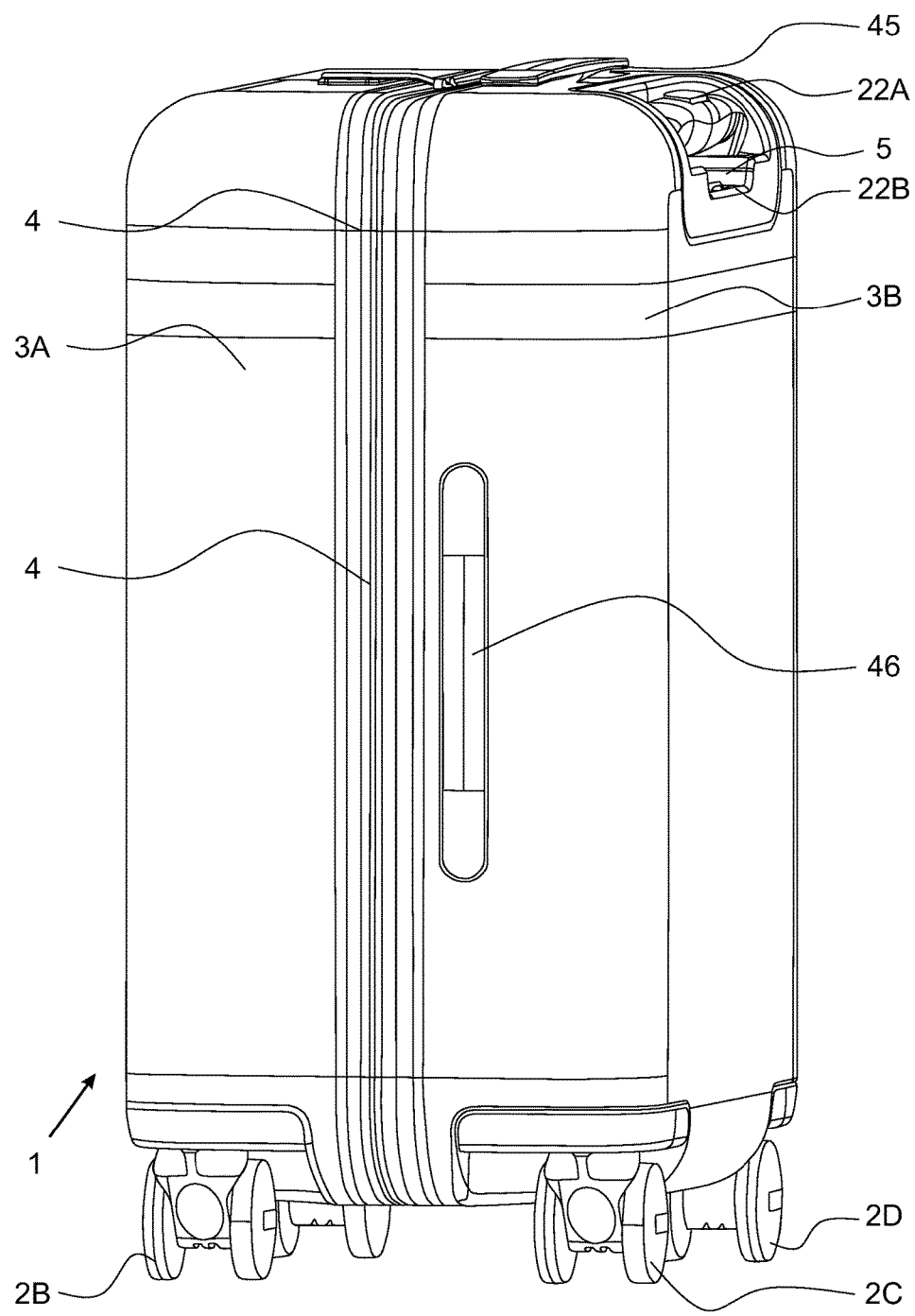
FIG. 1C is a side perspective view of the first illustrative embodiment of the hard-shell luggage system shown in FIGS. 1A and 1B.

Referring to the accompanying Drawings, like structures and elements shown throughout the figures thereof shall be indicated with like reference numerals.

Specification of the Carry-on Luggage System of the First Illustrative Embodiment of the Present Invention Referring to FIGS. 1A through 10A, the carry-on luggage system of the first illustrative embodiment of the present invention 1 will now be described in detail.

As shown in FIGS. 1A through 1E, the hard-shell luggage system of the first illustrative embodiment 1 is positioned on its set of four double-spinner wheels 2A through 2D mounted in the four corners of the luggage system. As shown, its front and rear hard-shell housing portions (i.e. molded components) 3A and 3B are arranged in a closed configuration and sealed using its integrated zipper mechanism 4. Its telescopic-handle assembly 4 is arranged in its protracted configuration over the hinged power port cover panel 5 concealing its USB DC electrical power supply ports 6A and 6B, and its DC power recharging port 7. In the preferred embodiment, the physical dimensions of the carryon luggage system are about 22×14×9 inches which is the maximum carry-on size allowed for all major US-based carriers including Delta, United, and American Airlines. In alternative embodiments, these dimensions may vary to meet the application at hand.

Figure 1D:
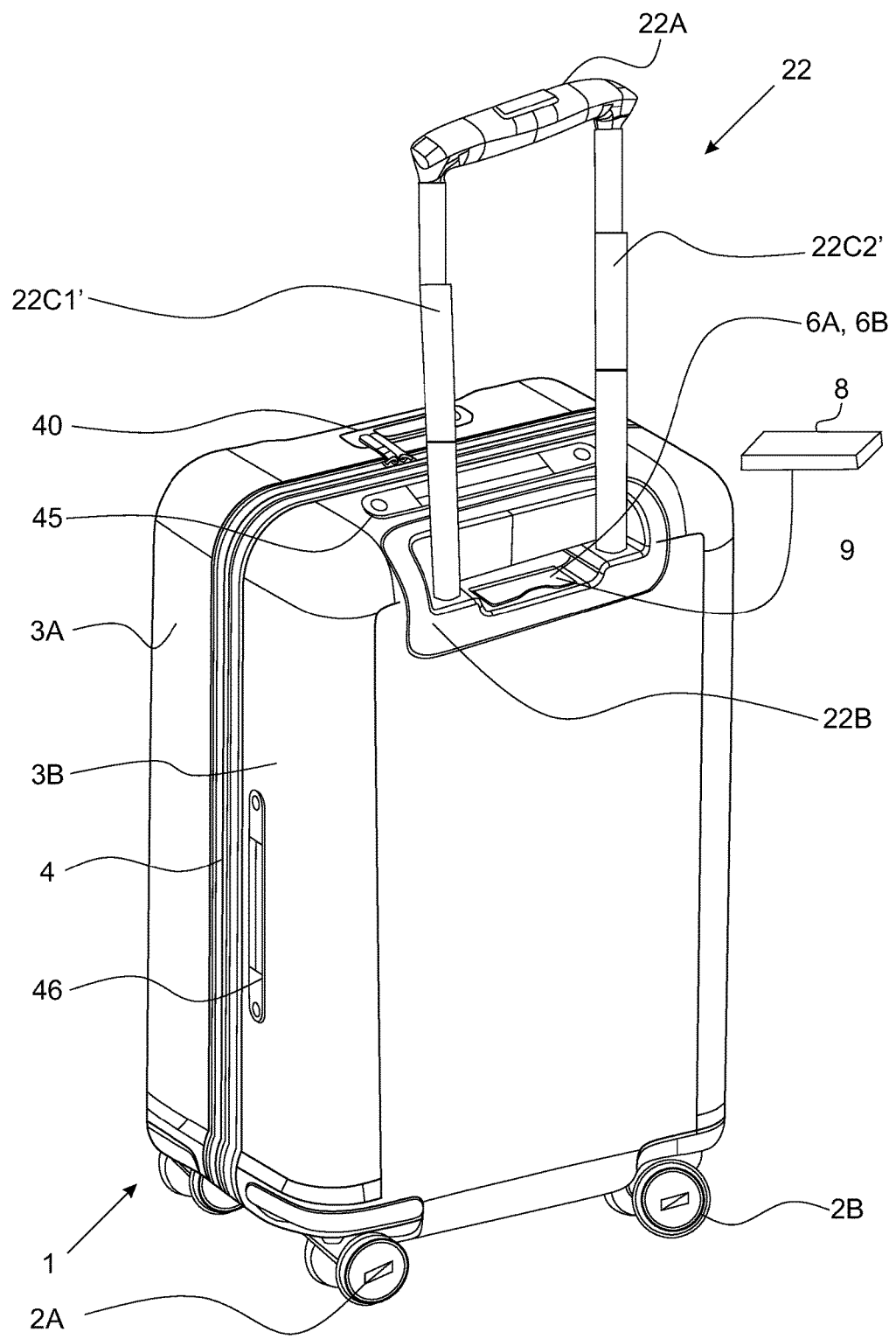
FIG. 1D is a rear perspective view of the first illustrative embodiment of the hard-shell luggage system shown in FIGS. 1A through 1C, wherein the hard-shell luggage system is positioned on its set of four spinner wheels mounted in the four corners of the luggage system, wherein its front and rear hard-shell housing portions are arranged in a closed configuration and sealed using its integrated zipper mechanism, wherein its telescopic-handle assembly is arranged in its protracted configuration with the hinged power port cover panel opened to reveal both its USB DC electrical power supply ports and DC power recharging port of the present invention, and wherein a mobile smartphone (e.g. Apple iPhone device) is being charged with electrical power being delivered from its USB DC power port via a USB cable connected between the phone and the USB DC power port.

As shown in FIG. 1D, the telescopic-handle assembly 22 is arranged in its protracted configuration with the hinged power port cover panel 5 opened to reveal both its USB DC electrical power supply ports 6A and 6B and DC power recharging port 7B, while a mobile smartphone (e.g. Apple iPhone device) 8 is being charged with electrical power being delivered from a USB DC power port 6A, 6B via a USB cable 9 connected between the phone 9 and the USB DC power port 6A, 6B. In this protracted configuration, where the power port cover panel is opened providing access to the USB DC electrical power supply ports, the user can pull (i.e. trolleys) the luggage system around during travel while holding the mobile smartphone. In the event that the user is pulling the luggage system along a rainy surface (e.g. while talking on a mobile phone that is being recharged), the USB power port cover panel 5 will automatically close down on the USB power plug 6A and unused USB power port 6B, so as to prevent rain from seeping into the USB power ports of the luggage system and prevent electrical shock or shorting.

Figure 1E:
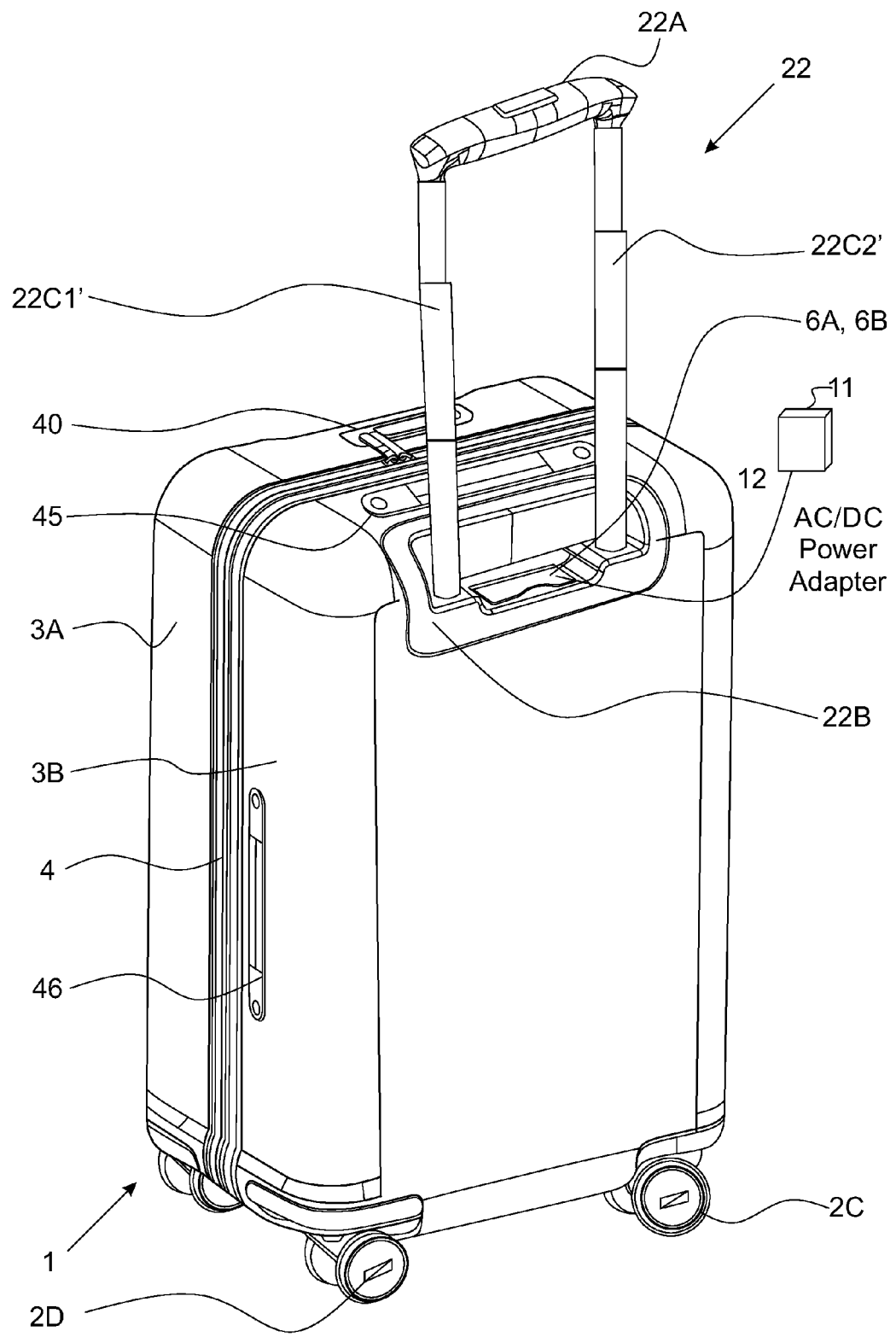
FIG. 1E is a rear perspective view of the first illustrative embodiment of the hard-shell luggage system shown in FIGS. 1A through 1D, wherein the hard-shell luggage system is positioned on its set of four spinner wheels mounted in the four corners of the luggage system, wherein its front and rear hard-shell housing portions are arranged in a closed configuration and sealed using its integrated zipper mechanism, wherein its telescopic-handle assembly is arranged in its protracted configuration with the power port cover panel opened to reveal both its USB DC electrical power supply ports, and DC power recharging port of the present invention, and wherein the onboard rechargeable DC battery module is being recharged with electrical power being delivered from an AC/DC power adapter supplying DC power to the recharge power port via a USB cable connected between the DC recharge port and the AC/DC power adapter.

As shown in FIG. 1E, the telescopic-handle assembly 22 is arranged in its protracted configuration with the hinged power port cover panel 5 opened to reveal both its USB DC electrical power supply ports 6A and 6B and DC power recharging port 7, while its onboard rechargeable DC battery module 22B1 is being recharged with electrical power being delivered from an AC/DC power adapter 11 supplying DC power to the recharge power port 7 via a USB cable 12 connected between the DC recharge port 7 and the AC/DC power adapter 11. The details of the battery discharging and recharging operations will be described in greater detail hereinafter with reference to FIGS. 1E, 5A and 14.

Figure 1F:
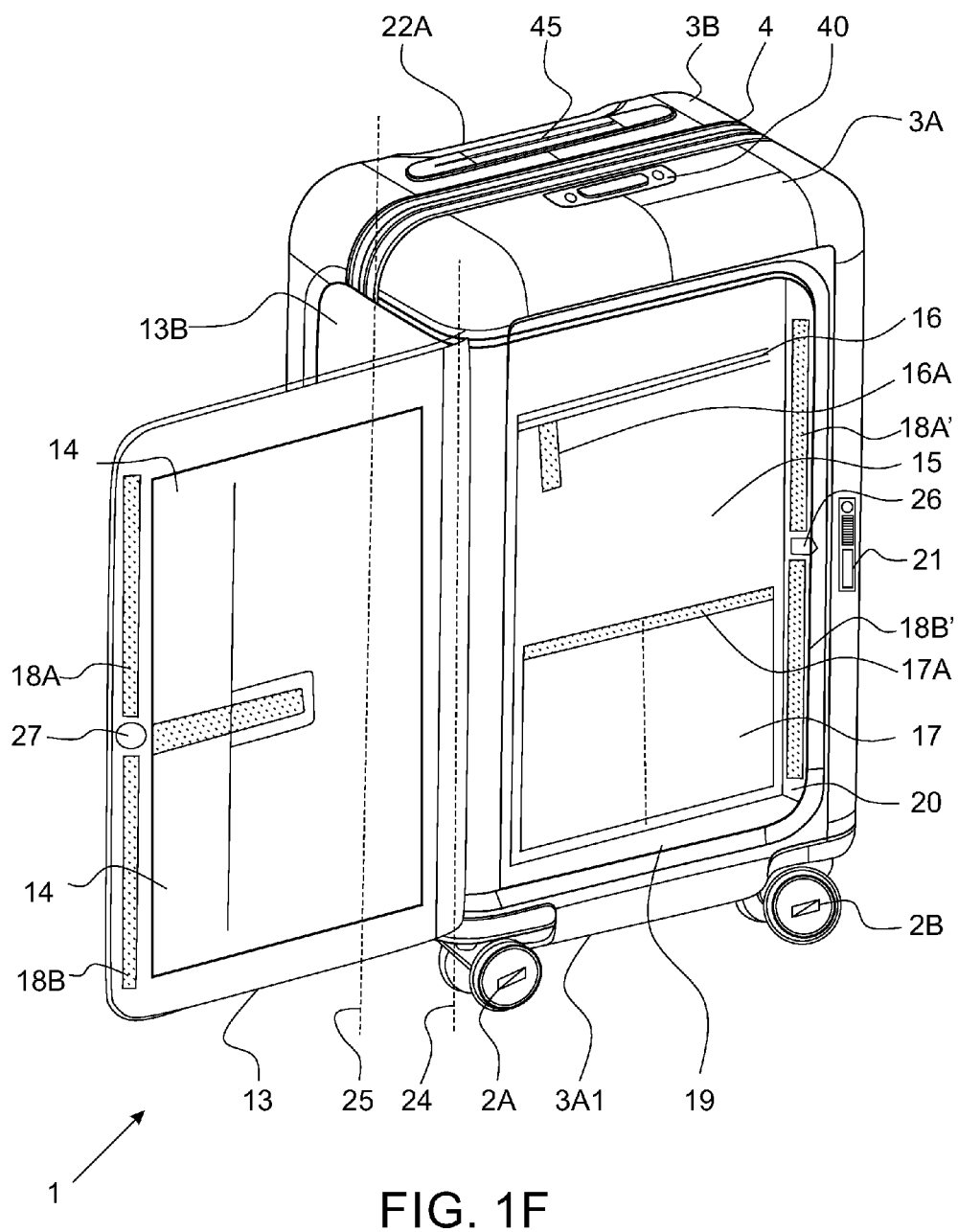
FIG. 1F is a front perspective view of the first illustrative embodiment of the hard-shell luggage system shown in FIGS. 1A through 1E, wherein the hard-shell luggage system is positioned on its set of four spinner wheels mounted in the four corners of the luggage system, wherein its front and rear hard-shell housing portions are arranged in a closed configuration and sealed using its integrated zipper mechanism, wherein its telescopic-handle assembly is arranged in its protracted configuration, and wherein the front cover flap structure is arranged in its open configuration revealing (i) its Velcro-locked laptop computer (or iPad) pouch on the inside of the front cover flap structure, (ii) interior storage volume of the front hard-shell housing portion of the luggage system, including its shallow zippered pouch for storing power adapters, memory sticks, and other items, and a lower divided mesh pouch for hold items that need to be quickly grabbed such a mobile phone, bottle of water, snacks etc., and (iii) its magnetic stripe based front cover panel retention mechanism for retaining the front cover flap panel securely in place over the front access opening when arranged in its closed configuration.

As shown in FIG. 1F, the front cover flap structure 13 is arranged in its open configuration revealing: (i) a Velcro-locked laptop computer (or iPad) pouch 14 on the inside of the front cover flap structure 5; (ii) the interior storage volume 15 of the front hard-shell housing portion 3A of the luggage system including an interior lining structure 29 supporting on its front side, a shallow zippered pouch 16 with zipper 16A for storing power adapters, memory sticks, and other items, and a divided mesh pouch 17 with elastic banding 17A, for holding items that need to be quickly grabbed such a mobile phone, bottle of water, snacks etc.; and (iii) a magnetic-stripe based front cover flap panel retention mechanism 17A employing a set of powerful magnetic strips 18A and 18B on the underside of the front cover flap panel 13, and a corresponding set of magnetic strips 18A' and 18B' on the edge 20 of the front access opening 19, for retaining the front cover flap panel 13 securely in place over the front access opening 19 when arranged in its closed configuration.

To open the front cover flap panel 13, the user only needs to gently pry back the pliant lip portion 13A of the front cover flap panel 13 at its central location, and pull the front cover flap panel 13 away from the magnetic strips 18A' and 18B' mounted along the inside edge surface 20 about the front access opening 19 against the magnetic attraction forces generated by the permanent magnet strips 18A and 18B used to realize the front panel cover flap retention system 18. To lock the front cover flap panel 13 closed, a TSA-approved combination lock assembly 21 is mounted through a port 51 formed in the front hard-shell housing portion 3A, adjacent the edge of edge of the front access opening 19, opposite the front cover flap hinge line 22. The combination lock assembly 21 includes a mechanism for rotating a clasp-like lock member 26 that engages with locking member 27 mounted to the interior surface of the edge of the front cover flap panel 13, when the user locks the front cover flap panel 13 arranged in its closed configuration, as shown in FIG. 1A. At any time, such as when being away from the carry-on luggage system, or checking the luggage piece with a luggage handling system, the user can quickly lock the front cover flap panel 13 using a preset lock combination. The lock combination can be changed at any time within a few seconds of time, in a manner known in the art.

Figures 1, 2A:
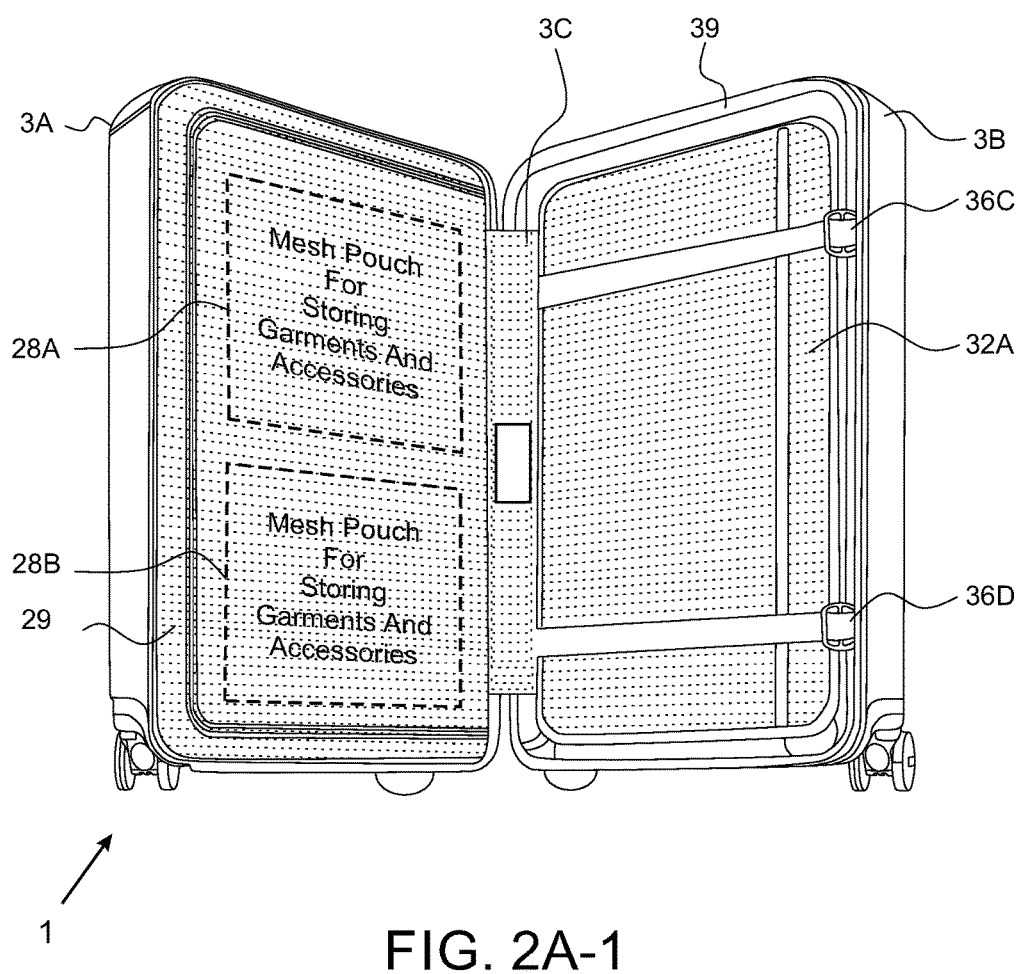
FIG. 2A-1 is a front perspective view of the first illustrative embodiment of the hard-shell luggage system shown in FIGS. 1A, 1B and 1C, wherein the hard-shell luggage system is positioned on its set of four spinner wheels mounted in the four corners of the luggage system, wherein its front and rear hard-shell housing portions are arranged in an open configuration and its integrated zipper mechanism being un-zipped, wherein its telescopic-handle assembly is arranged in its protracted configuration, wherein a set of mesh pockets are supported on the interior lining structure installed within the interior volume of the front hard-shell housing portion of the luggage system, and wherein the compression-pad structure is fastened and strapped down to the interior volume of the rear hard-shell housing portion so as to compress items disposed between the compression pad structure and the bottom of the rear hard-shell housing portion, which may include shirts, pants and other garments alone or stacked upon an expandable laundry bag rolled out from a laundry bag storage pouch supported between the molded wheel wells of the rear hard-shell housing portion, and filled with soiled clothes.

As shown in FIG. 2A-1, the hard-shell luggage system 1 is positioned on its set of four spinner wheels 2A through 2D mounted in the four corners of the luggage system 1, and its first and second hard-shell housing portions 3A and 3A are hinged together and arranged in an open configuration with its integrated zipper mechanism 4 being un-zipped. The telescopic-handle assembly 22 is arranged in its protracted configuration. As shown, a set of mesh pockets 28A and 28B are supported on the interior lining 29 installed within the interior volume 30 of the front hard-shell housing portion 3A of the luggage system. Also, a compression-pad structure 32A is fastened and strapped down to the interior volume of the rear hard-shell housing portion 3B by a set of hand-tightened belt-buckles 33A and 33B anchored to the rear hard-shell housing portion through its interior lining 34 installed in the rear hard-shell housing portion 3B. The primary function of the compression pad structure 32A is to compress the following items located between the compression pad structure 32A and the bottom surface of the rear hard-shell housing portion 3B: (i) shirts, pants and other garments stacked upon (ii) an expandable laundry bag 36A rolled out from a laundry bag storage pouch 36C supported on the molded wheel wells 3B1 and 3B2 of the rear hard-shell housing portion 3B, and filled with soiled clothes 37 through zippered access opening 36A1. The compression pad subsystem 32 and the laundry bag subsystem 36 which are integrated in the rear hard-shell housing portion 3B will be described in greater detail hereinafter.

Figures 2, 2A:
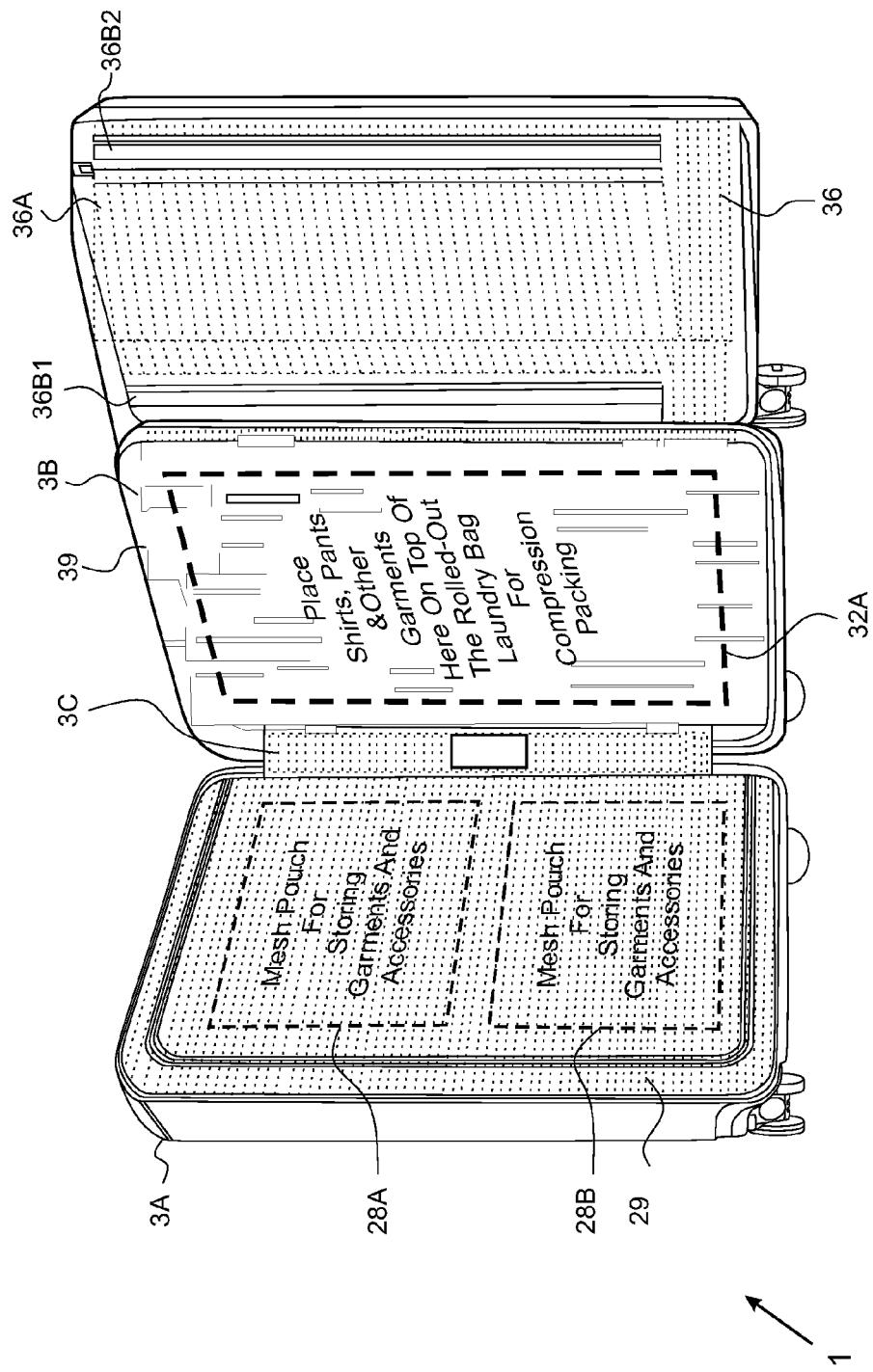

As shown in FIG. 2A-2, the compression-pad structure 32A is un-fastened and folded back away from the bottom of the rear hard-shell housing structure to reveal the interior volume of the rear hard-shell housing portion 3B and its interior lining 39. In this configuration, the user is allowed to access to the interior storage volume of the luggage system and (i) roll out the expandable laundry bag 36A from its laundry bag storage pocket 36B as illustrated in FIGS. 9A through 9G, fill it with soiled clothes to be laundered, then zipper it up, and then (ii) stack shirts, pants and other garments 37 on top of the filled and zipped up laundry bag 36A, for compression when the compression-pad 32A structure is strapped down using the associated straps and buckles 32C and 32D.

Figure 2B:
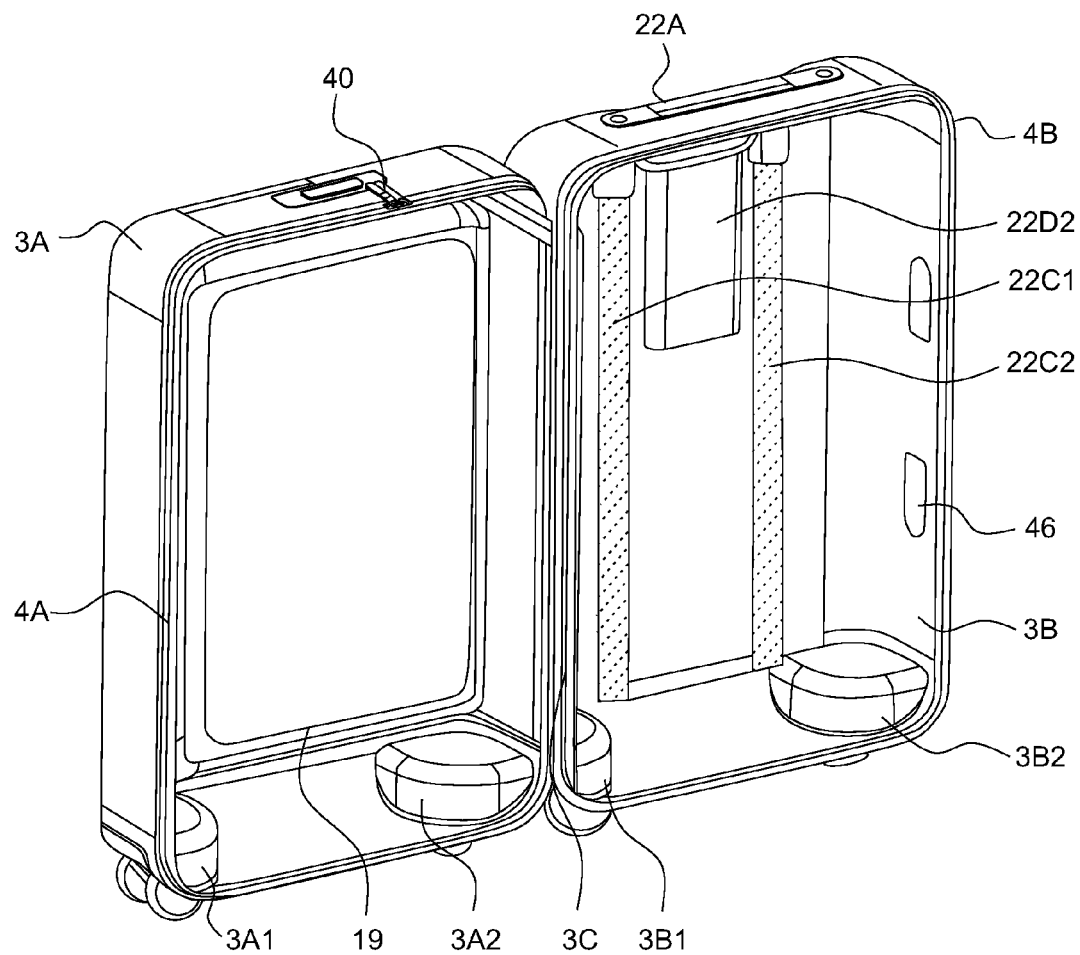
FIG. 2B is a first perspective view of the first illustrative embodiment of the hard-shell luggage system shown in FIGS. 1A, 1B and 1C, positioned on its set of four spinner wheels mounted in the four corners of the luggage system, wherein its front and rear hard-shell housing portions are arranged in an open configuration with its integrated zipper mechanism arranged in an unzipped configuration and revealing the interior volume of the luggage system with its interior lining removed for purposes of illustration, wherein its telescopic-handle assembly is arranged in its retracted configuration, wherein the front cover flap is closed to conceal the front access port opening formed through the top surface of the front hard-shell housing portion, and wherein the interior lining structures have been removed from both the interior storage volumetric regions of the front and rear hard-shell housing portions of the luggage system.
Figure 2C:
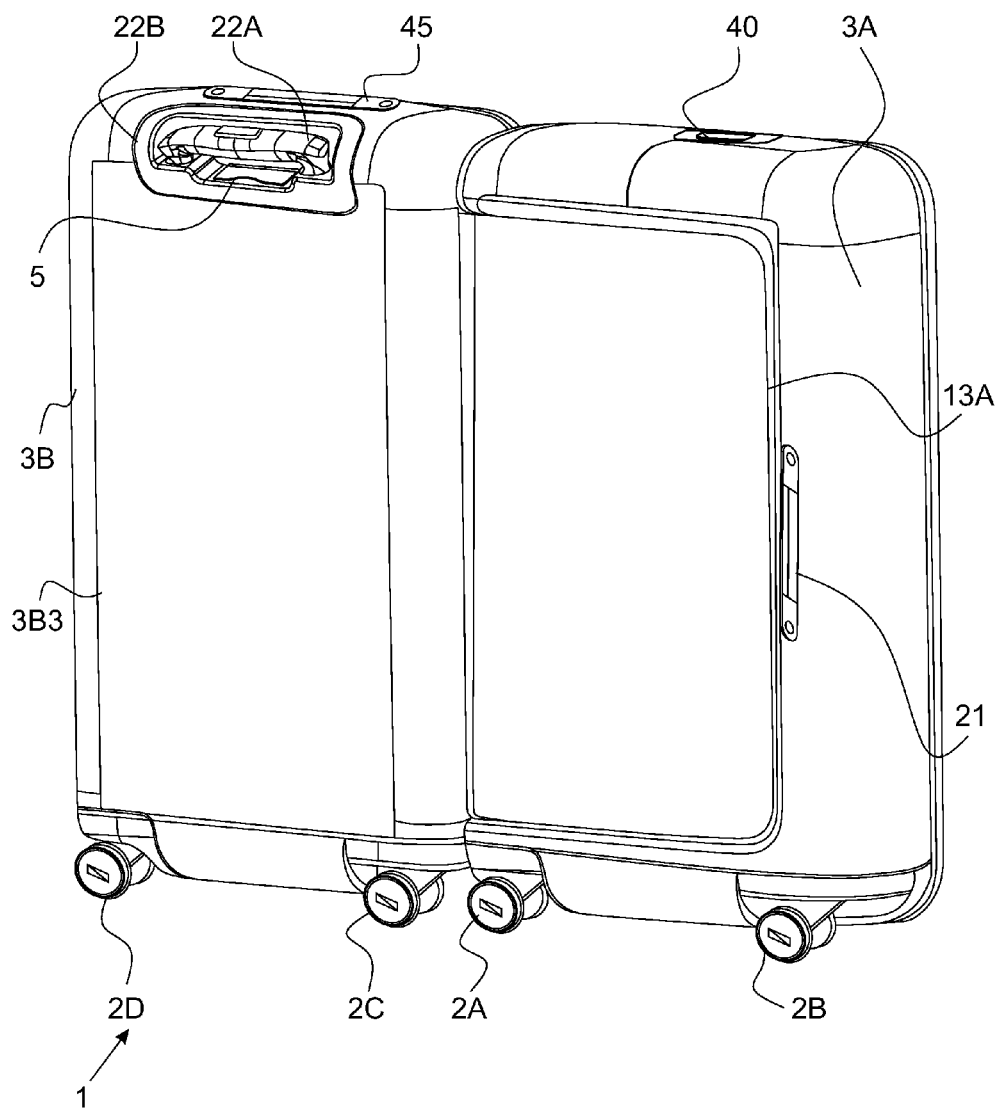
FIG. 2C is a second perspective view of the first illustrative embodiment of the hard-shell luggage system shown in FIGS. 1A, 1B and 1C, positioned on its set of four spinner wheels mounted in the four corners of the luggage system and looking into its interior volume, wherein its front and rear hard-shell housing portions are arranged in an open configuration with its integrated zipper mechanism arranged in an unzipped configuration, wherein its telescopic-handle assembly is arranged in its retracted configuration with its power port cover panel closed to conceal both its USB DC electrical power supply ports and DC power recharging port, wherein the front cover flap is closed to conceal the front access port opening formed through the top surface of the front hard-shell housing portion, and wherein the interior lining structures have been removed from both the interior storage volumetric regions of the front and rear hard-shell housing portions of the luggage system, for purposes of illustration.
Figure 2D:
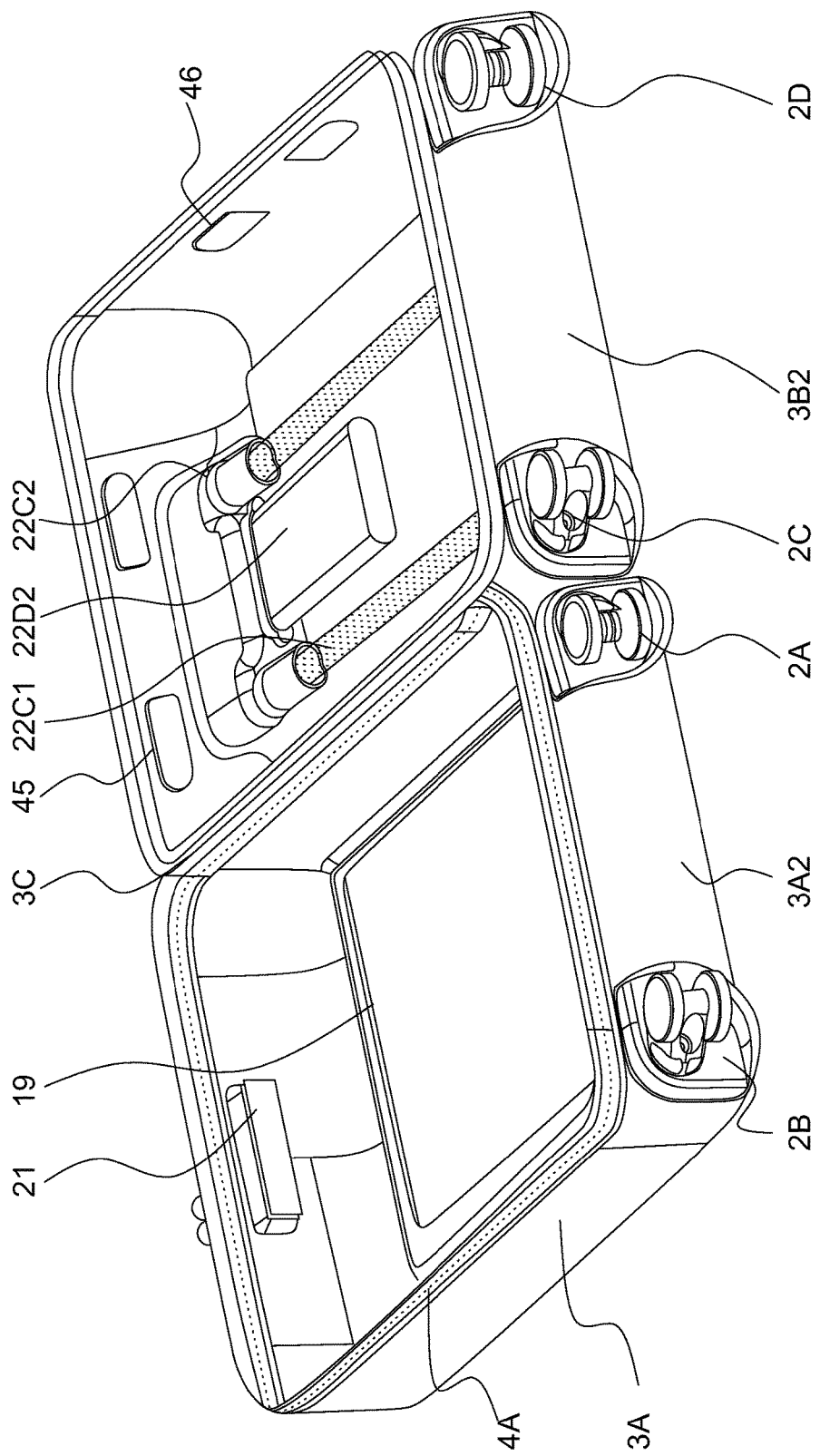
FIG. 2D is a third perspective view of the first illustrative embodiment of the hard-shell luggage system shown in FIGS. 1A, 1B and 1C, positioned on the front and rear surfaces of the front and rear hard-shell housing portions, respectively, and revealing the interior volume of the luggage system with its interior lining removed for purposes of illustration, wherein its first and second hard-shell housing portions are arranged in an open configuration with its integrated zipper mechanism arranged in an unzipped configuration, wherein its telescopic-handle assembly is arranged in its retracted configuration with its power port cover panel closed to conceal both its USB DC electrical power supply ports, and DC power recharging port, wherein its front cover flap is closed to conceal the access port opening formed through the top surface of the front hard-shell housing portion.
Figure 3A:
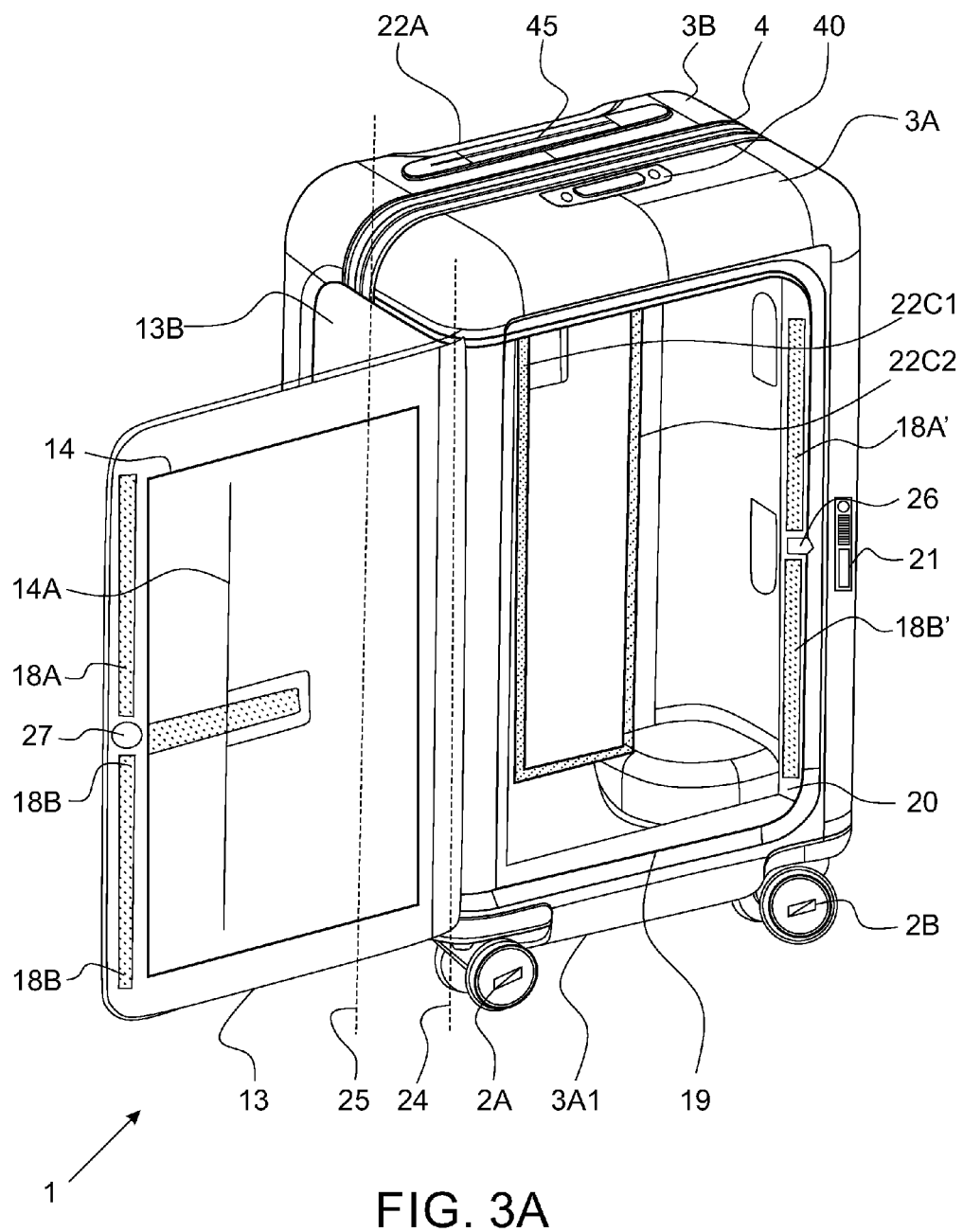
FIG. 3A is a first front perspective view of the first illustrative embodiment of the hard-shell luggage system shown in FIGS. 1A, 1B and 1C, positioned on its set of four spinner wheels mounted in the four corners of the luggage system and revealing its total interior volume, wherein its front and rear hard-shell housing portions are arranged in a closed configuration with its integrated zipper mechanism arranged in a zipped configuration and the interior volume of the luggage system having its interior lining removed for purposes of illustration, wherein its telescopic-handle assembly is arranged in its retracted configuration with the power port cover panel closed to conceal both its USB DC electrical power supply ports, and DC power recharging port, and wherein its front cover flap panel is opened to reveal the front access opening formed through the top surface of the front hard-shell housing portion, allowing user access to the interior storage volume of the front hard-shell housing portion.
Figure 3B:
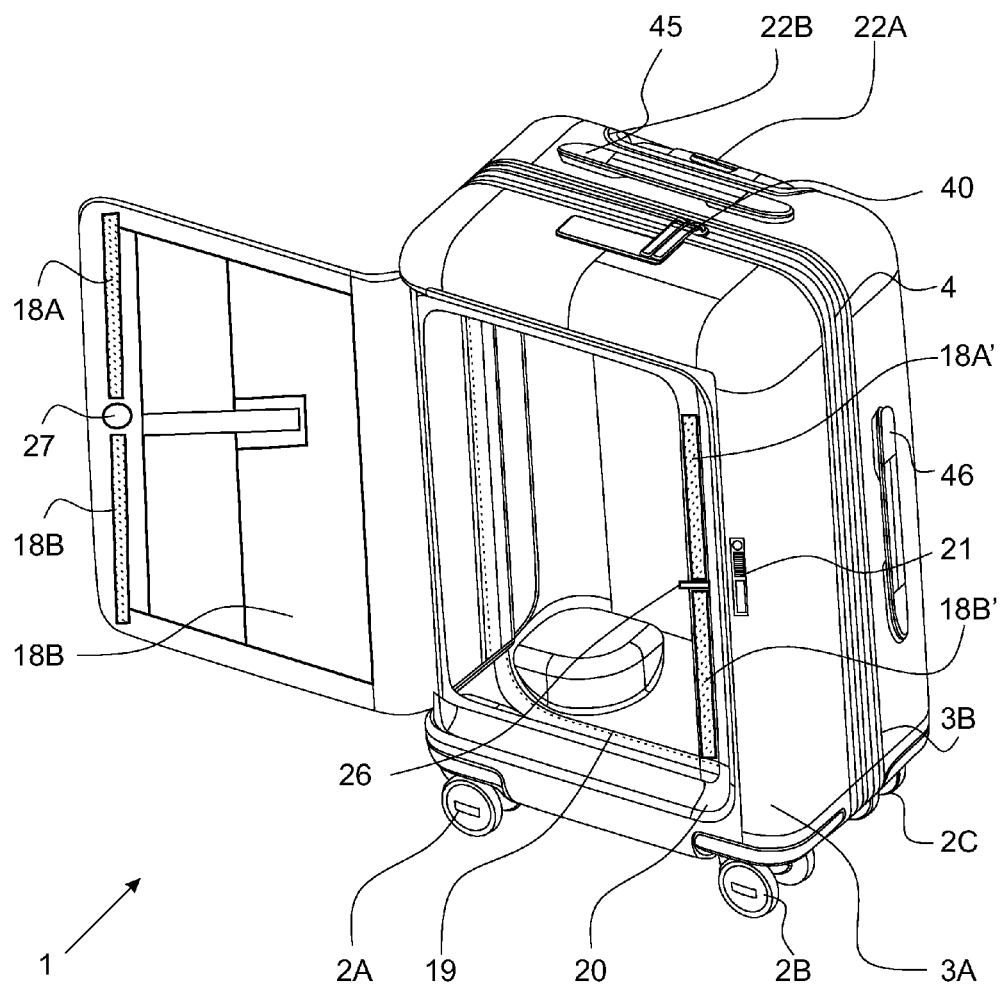
FIG. 3B is a second front perspective view of the first illustrative embodiment of the hard-shell luggage system shown in FIGS. 1A, 1B and 1C, positioned on its set of four spinner wheels mounted in the four corners of the luggage system and looking into its interior volume, wherein its front and rear hard-shell housing portions are arranged in a closed configuration with its integrated zipper mechanism arranged in a zipped configuration and the interior volume of the luggage system having its interior lining removed for purposes of illustration, wherein its telescopic-handle assembly is arranged in its retracted configuration with the power port cover panel closed to conceal both its USB DC electrical power supply ports, and DC power recharging port, and wherein its front cover flap panel is opened to reveal the front access opening formed through the top surface of the front hard-shell housing portion, allowing user access to the interior storage volume of the front shard-shell housing portion.
Figure 3C:
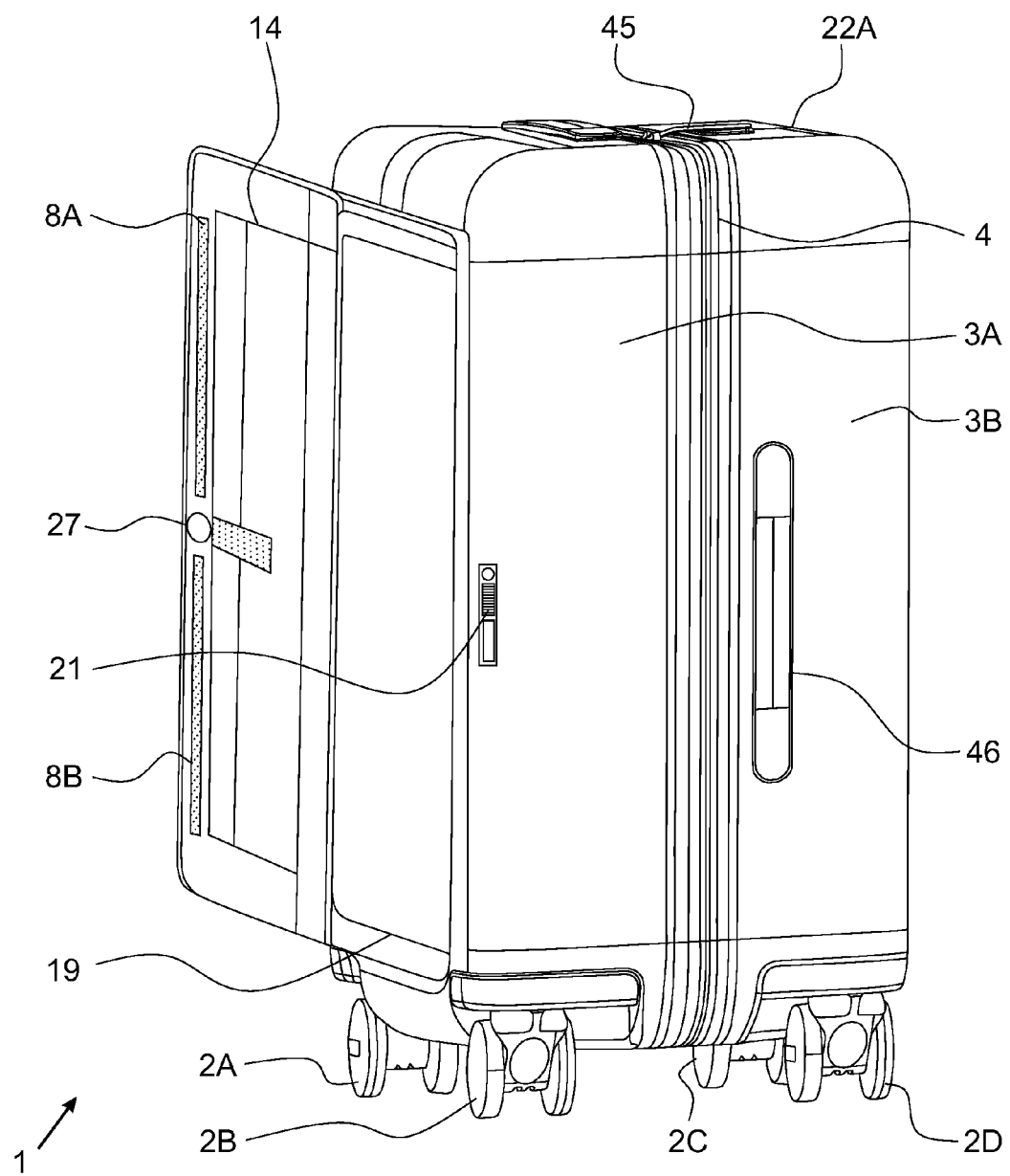
FIG. 3C is a side perspective view of the first illustrative embodiment of the hard-shell luggage system shown in FIGS. 1A, 1B and 1C, positioned on its set of four spinner wheels mounted in the four corners of the luggage system and looking into its interior volume, wherein its front and rear hard-shell housing portions are arranged in a closed configuration with its integrated zipper mechanism arranged in an zipped configuration and revealing the interior volume of the luggage system with its interior lining removed for purposes of illustration, wherein its telescopic-handle assembly is arranged in its retracted configuration with the power port cover panel closed to conceal both its USB DC electrical power supply ports, and DC power recharging port, wherein its front cover flap is opened to reveal the front access port opening formed through the top surface of the front hard-shell housing portion, allowing user access to the interior storage volume of the front hard-shell housing portion.
Figure 3D:
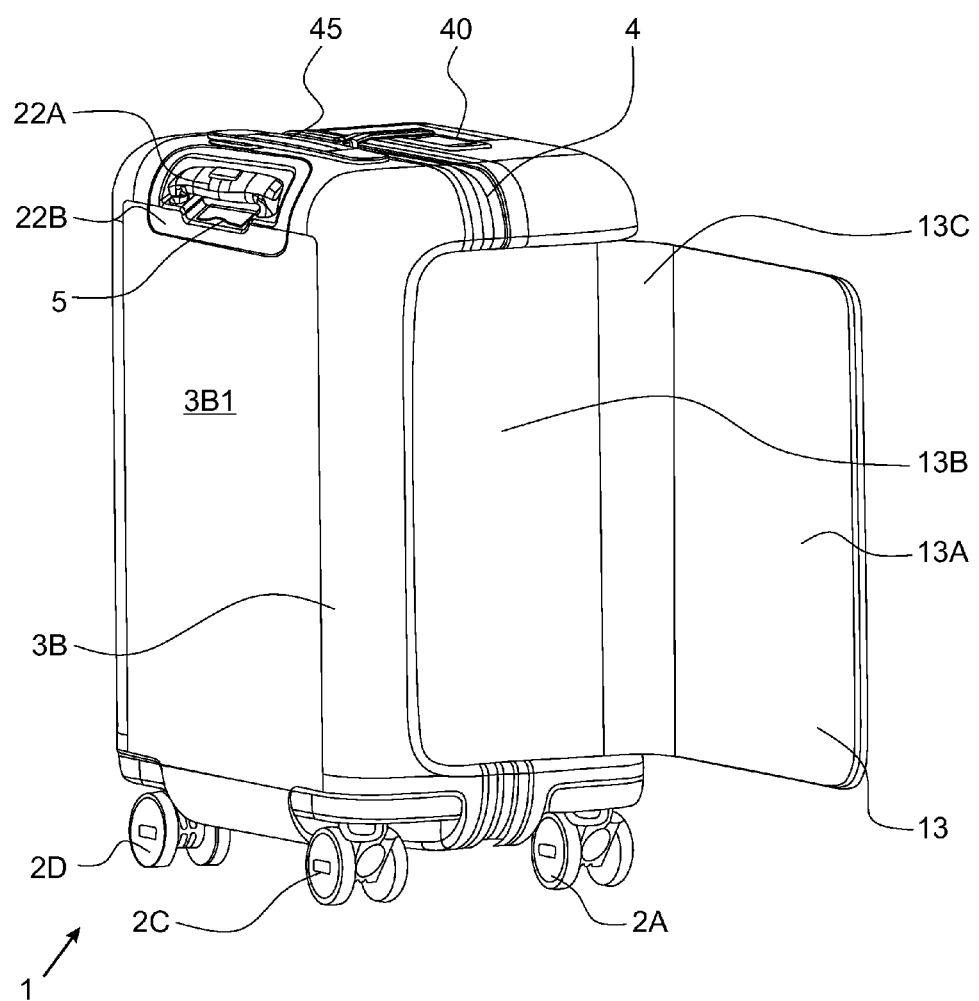
FIG. 3D is a side perspective view of the first illustrative embodiment of the hard-shell luggage system shown in FIGS. 1A, 1B and 1C, positioned on its set of four spinner wheels mounted in the four corners of the luggage system and looking into its interior volume, wherein its front and rear hard-shell housing portions are arranged in a closed configuration with its integrated zipper mechanism arranged in a zipped configuration and the interior volume of the luggage system having its interior lining removed for purposes of illustration, wherein its telescopic-handle assembly is arranged in its retracted configuration with the power port cover panel closed to conceal both its USB DC electrical power supply ports, and DC power recharging port, wherein its front cover flap is opened to reveal the front access opening formed through the top surface of the front hard-shell housing portion, allowing user access to the interior storage volume of the front hard-shell housing portion.
Figure 3E:
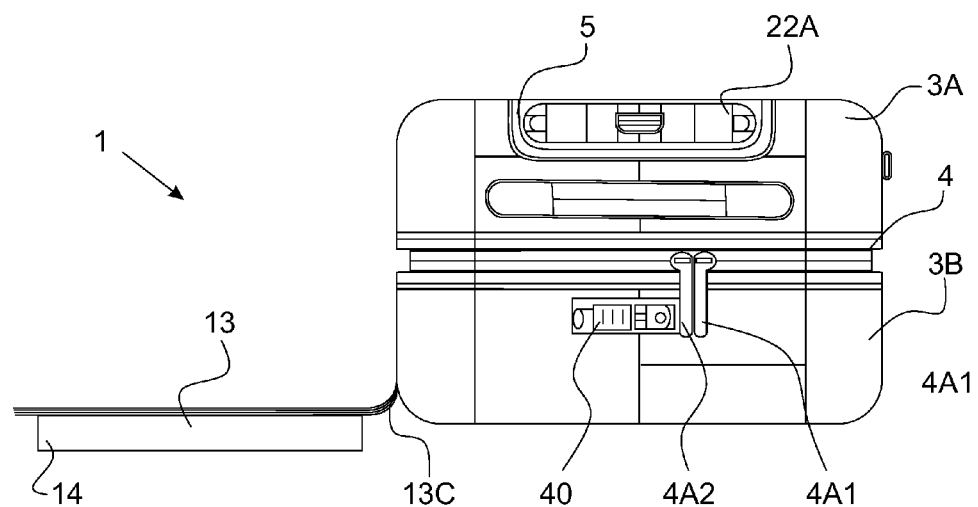
FIG. 3E is a top view of the first illustrative embodiment of the hard-shell luggage system shown in FIGS. 1A, 1B and 1C, positioned on its set of four spinner wheels mounted in the four corners of the luggage system, wherein its front and rear hard-shell housing portions are arranged in a closed configuration with its integrated zipper mechanism arranged in a zipped configuration, wherein its telescopic-handle assembly is arranged in its retracted configuration, wherein its front cover flap panel is opened to reveal the front access opening formed through the top surface of the front hard-shell housing portion, allowing user access to the interior storage volume of the front hard-shell housing portion.
Figure 3F:
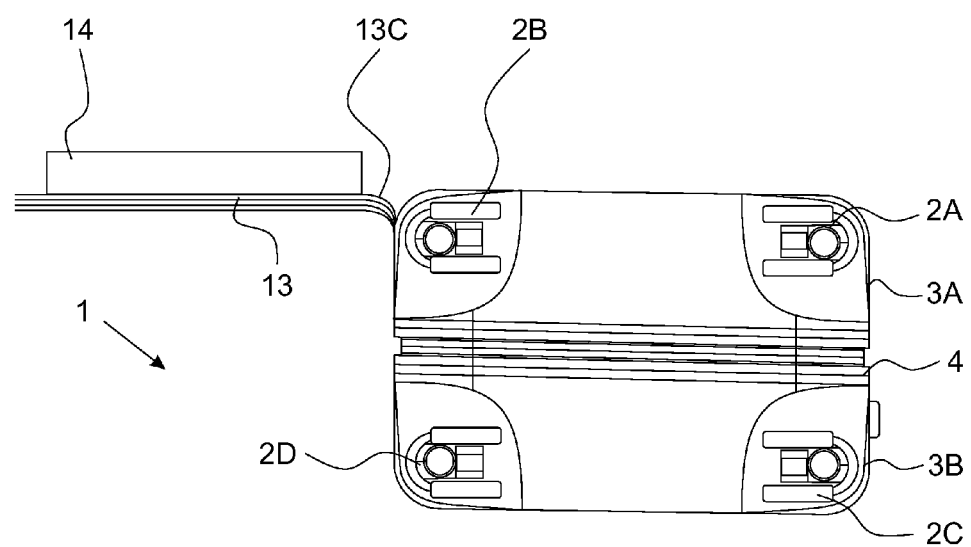
FIG. 3F is a bottom view of the first illustrative embodiment of the hard-shell luggage system shown in FIGS. 1A, 1B and 1C, positioned on the top surface of the luggage system, wherein its front and rear hard-shell housing portions are arranged in a closed configuration with its integrated zipper mechanism arranged in a zipped configuration, wherein its telescopic-handle assembly is arranged in its retracted configuration, wherein its front cover flap panel is opened to reveal the access port opening formed through the top surface of the front hard-shell housing portion, allowing user access to the interior storage volume of the front hard-shell housing portion.

FIGS. 2B through 2D show the hard-shell luggage system with its front and rear hard-shell housing portions 3A and 3B arranged in an open configuration with its integrated zipper mechanism arranged in an unzipped configuration, and its interior lining structures 29 and 39 have been removed from both the interior storage volumetric regions of the front and rear hard-shell housing portions of the luggage system. As shown, the front cover flap 13 is closed to conceal the front access port opening 19 formed through the top surface of the front hard-shell housing portion 3A. As shown the telescoping handle and rechargeable power supply assembly 22 is revealed as being mounted to the bottom surface of the rear hard-shell housing portion 3B. The details on this mounting arrangement will be described in greater detail hereinafter.

When the interior lining structure 29 is installed in the front hard-shell housing portion 3A as shown in FIG. 2A-1, the interior storage volume of the front hard-shell housing portion 3A is essentially closed off and isolated from the interior storage volume of the rear hard-shell housing portion 3B, and is made accessible to the luggage user only from the front access opening 19 when the front flap 13 is opened. Also, as shown in FIG. 2A-1, the interior lining structure 29 installed in the front hard-shell housing portion 3A supports mesh pockets 17B and 17C for storing garments and other accessories. The mesh pockets can be made of a strong nylon material, with elastic banding, allowing the user to quickly see what is stored in which mesh pocket at a glance.

Referring to FIGS. 3A through 6E, the construction of the carry-on luggage system of the first illustrative embodiment will be described in greater detail.

Figure 5A:
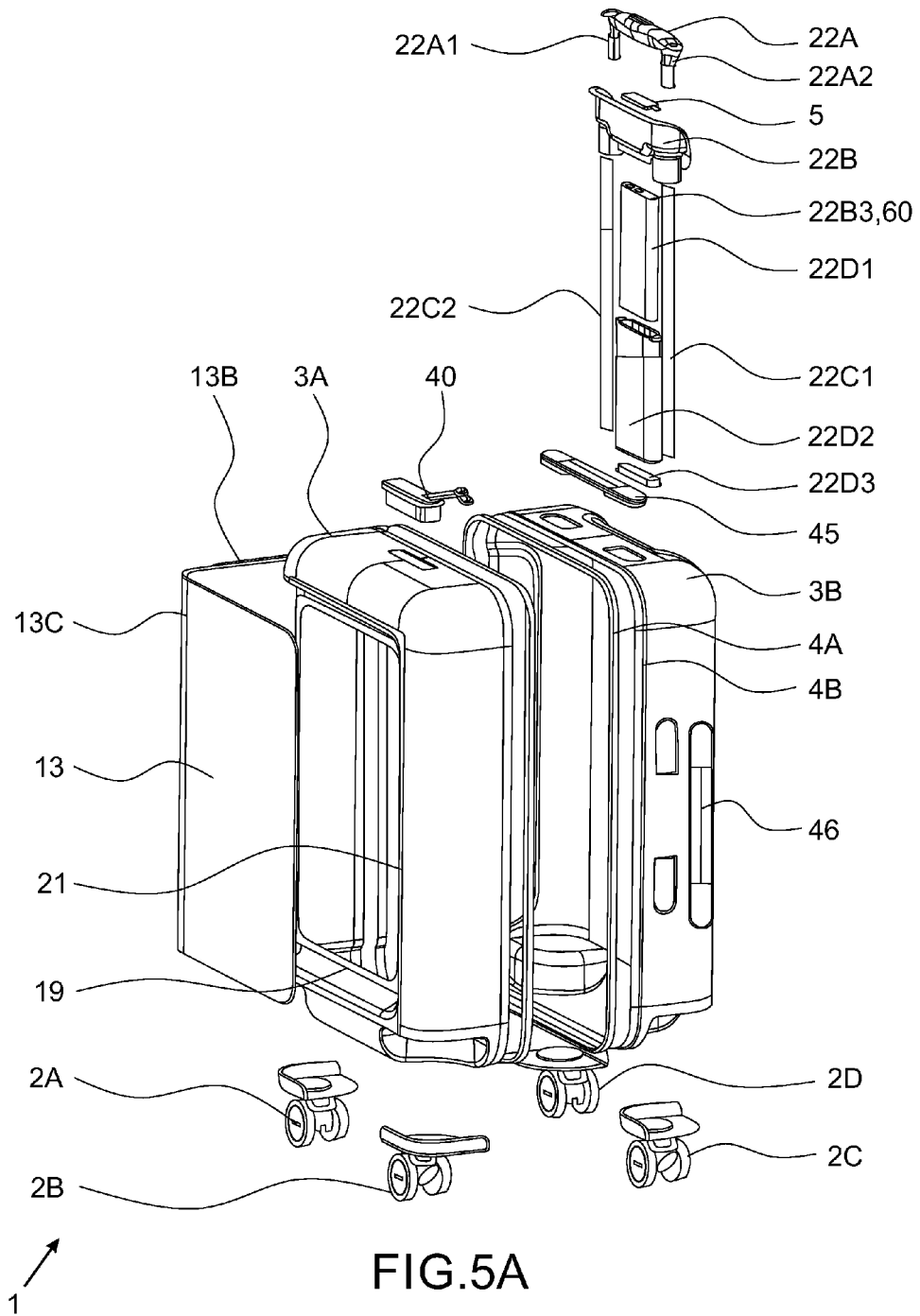
FIG. 5A is a first exploded perspective view of the first illustrative embodiment of the hard-shell luggage system shown in FIGS. 1A, 1B and 1C, shown comprising (i) a set of four spinner wheels mounted in the four corners of the luggage system, (ii) front and rear hard-shell housing portions, (iii) a front cover flap panel structure mounted to the recessed side panel regions of the front and rear hard-shell housing portions providing a hinge structure for the front and rear hard-shell housing portions and a front cover flap panel for covering a front access opening formed in the front hard-shell housing portion, (iv) telescopic handle and USB DC power supply assembly having a telescopic handle base assembly supporting a rechargeable battery power module, a set of USB DC electrical power supply ports and a DC power recharging port configured with the rechargeable battery module, (v) a two-part zipper subsystem and associated TSA-approved combination lock subassembly for sealing and securing the front and rear hard-shell housing portions when arranged in a closed configuration, and (vi) a set of top and side handles for carrying the luggage system in one of two possible configurations (i.e. upright carrying configuration or side carrying configuration)
Figure 5B:
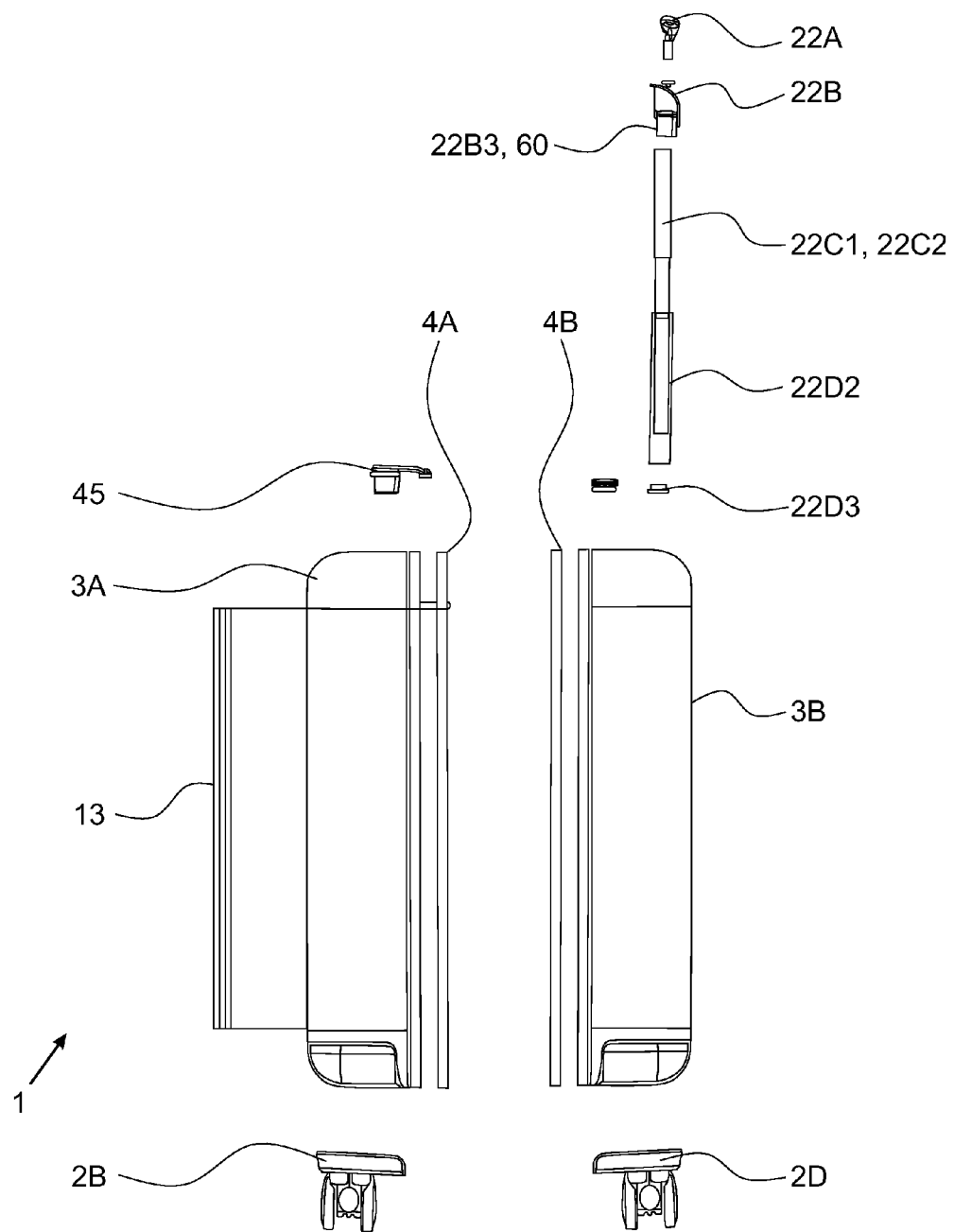
FIG. 5B is a first exploded side view of the first illustrative embodiment of the hard-shell luggage system shown in FIGS. 1A through 2A-2, showing the components described in FIG. 5A from different perspectives.
Figure 5C:
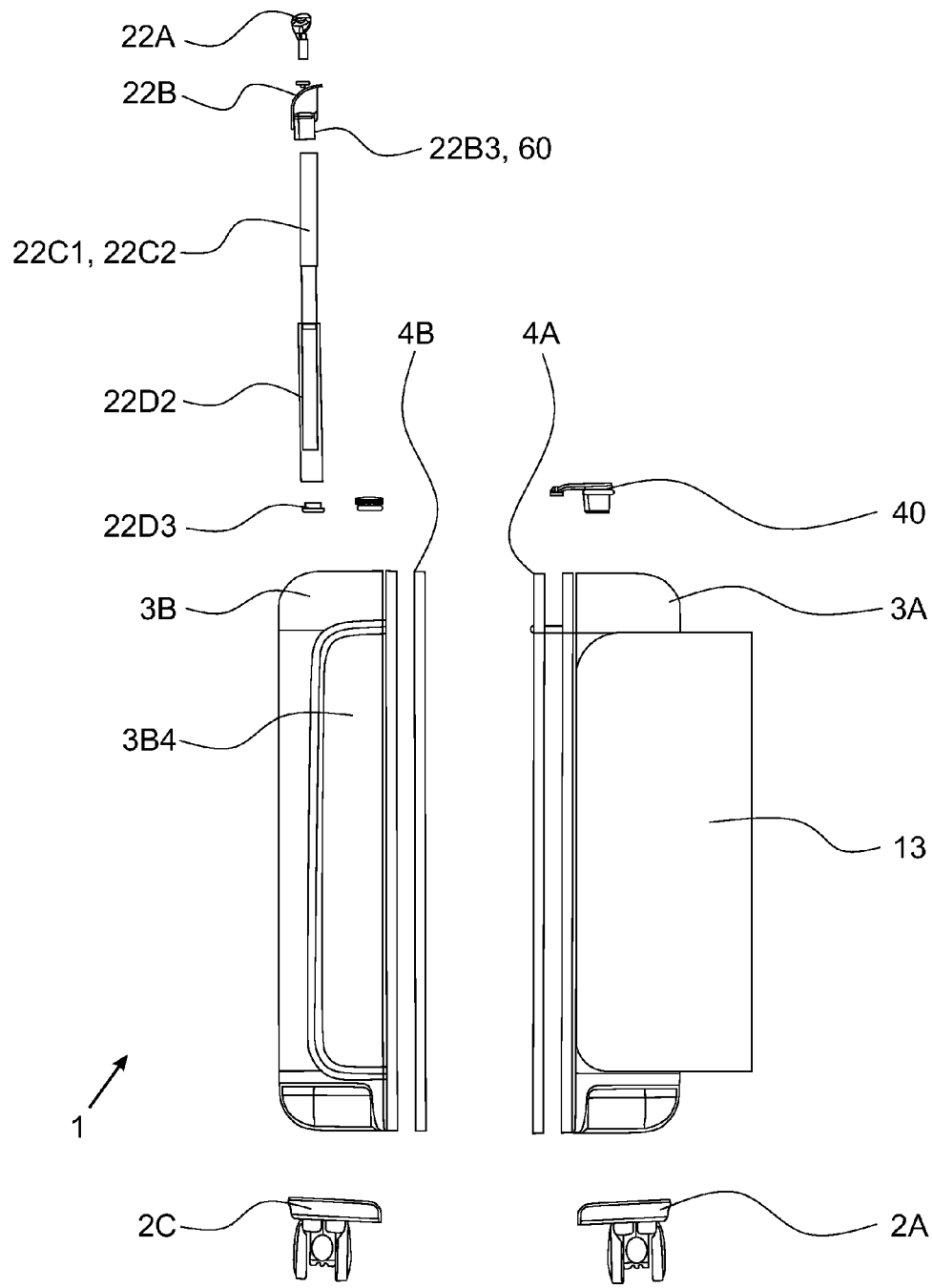
FIG. 5C is a second exploded side view of the first illustrative embodiment of the hard-shell luggage system shown in FIGS. 1A through 2A-2, showing the components described in FIG. 5A from different perspectives.
Figure 5D:
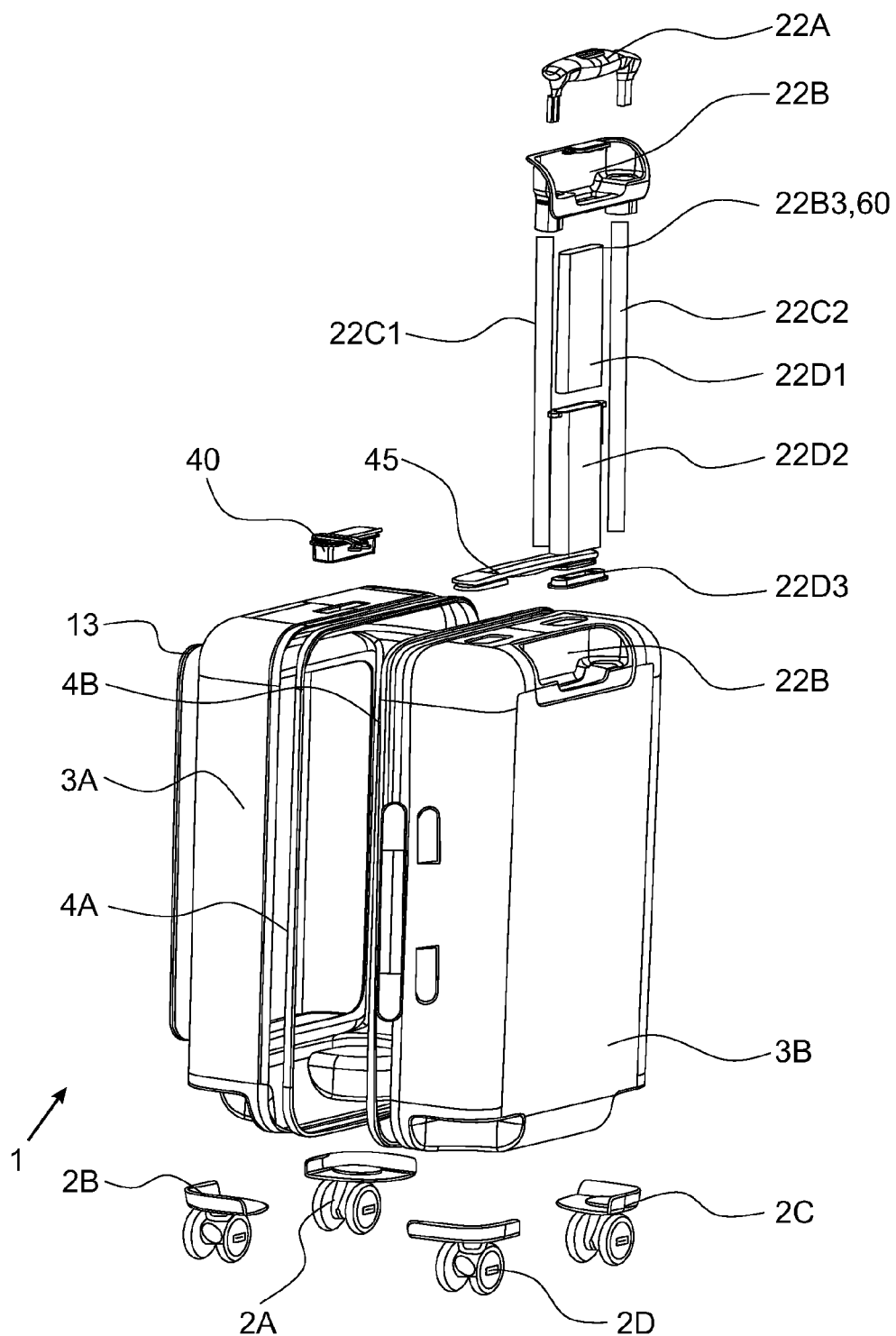
FIG. 5D is a second exploded perspective view of the first illustrative embodiment of the hard-shell luggage system shown in FIGS. 1A through 2A-2, showing the components described in FIG. 5A from different perspectives.
Figure 5E:
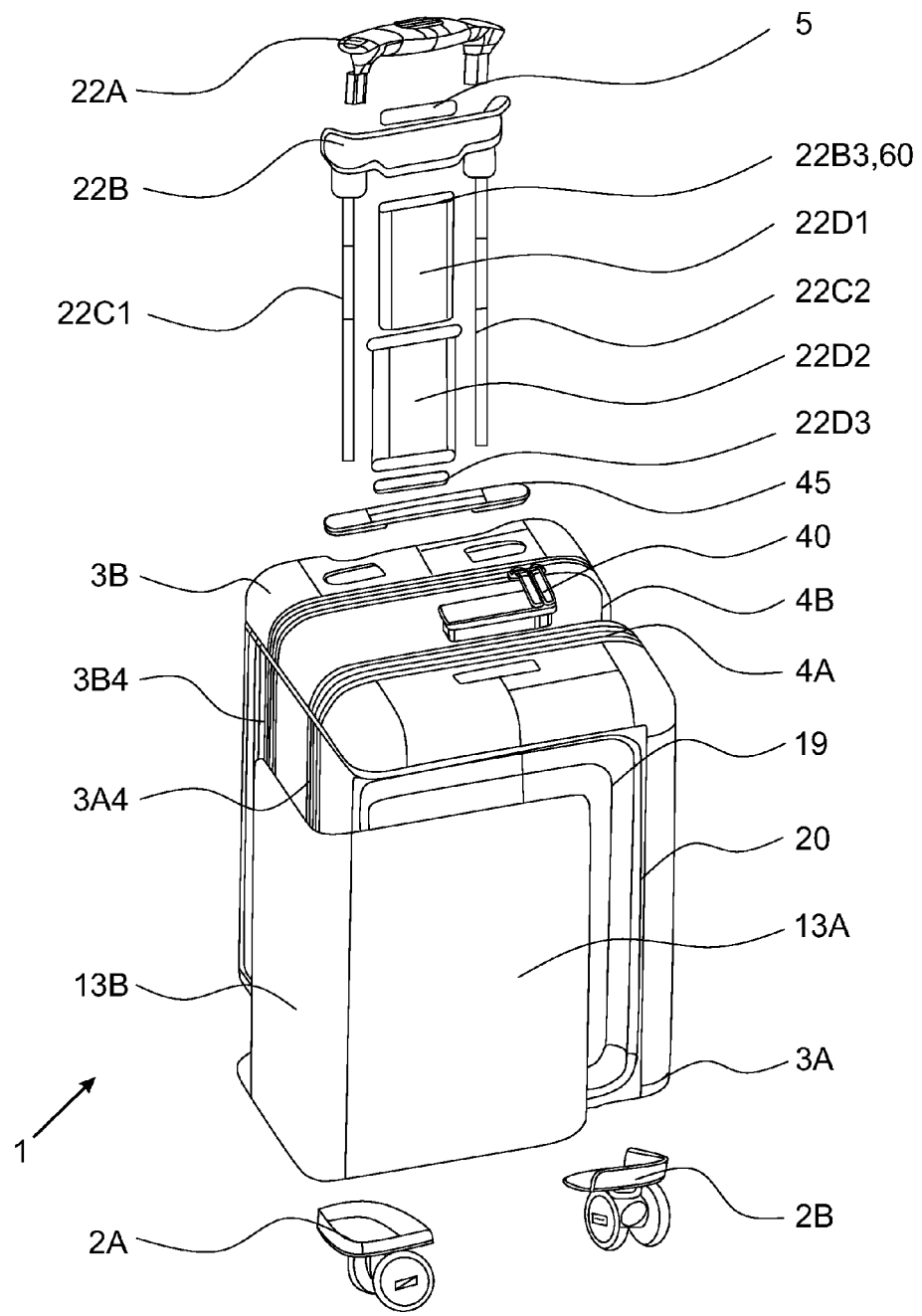
FIG. 5E is a third exploded perspective view of the first illustrative embodiment of the hard-shell luggage system shown in FIGS. 1A through 2A-2, showing the components described in FIG. 5A from different perspectives.
Figure 5F:
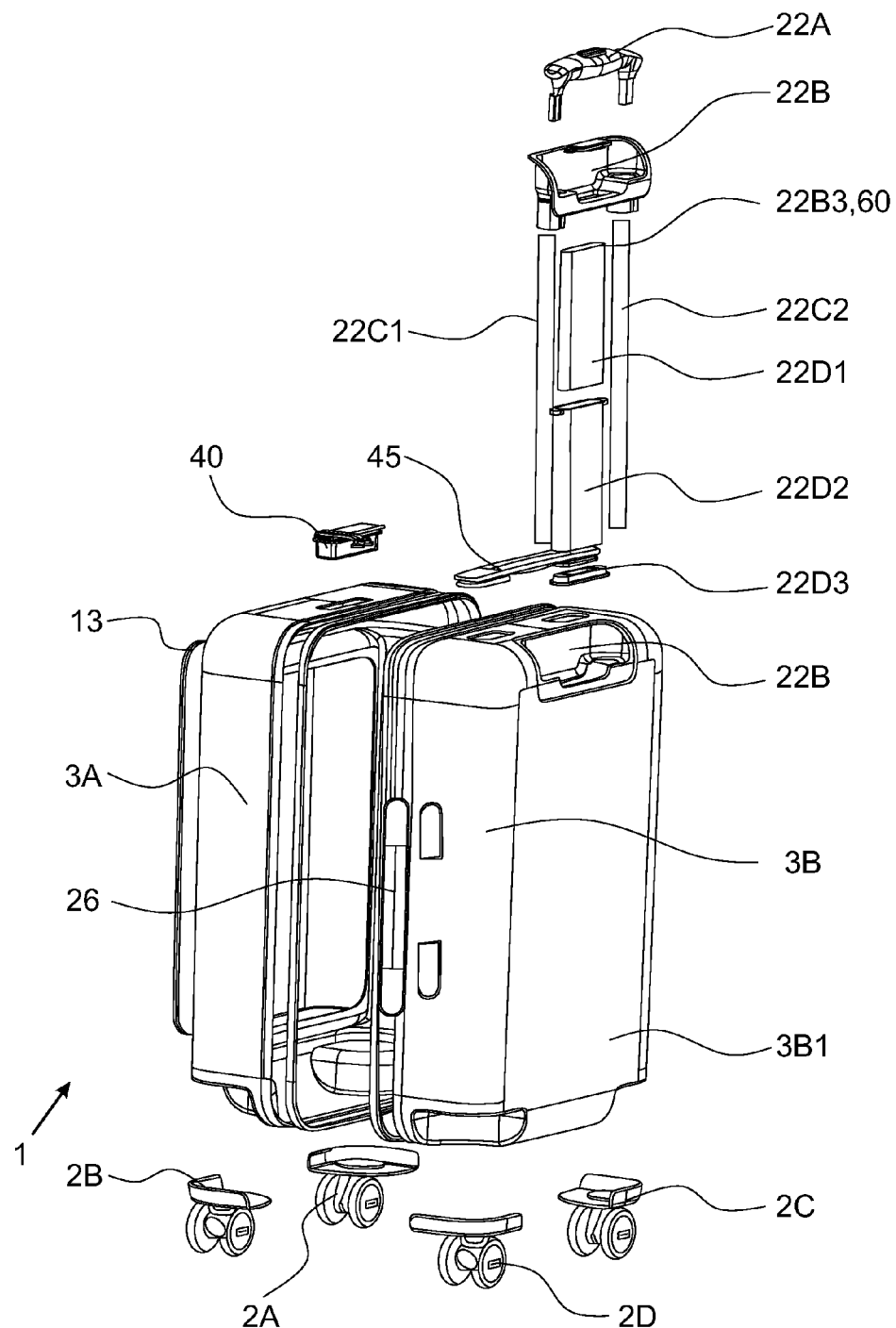
FIG. 5F is a fourth exploded perspective view of the first illustrative embodiment of the hard-shell luggage system shown in FIGS. 1A through 2A-2, showing the components described in FIG. 5A from different perspectives.
Figure 5G:
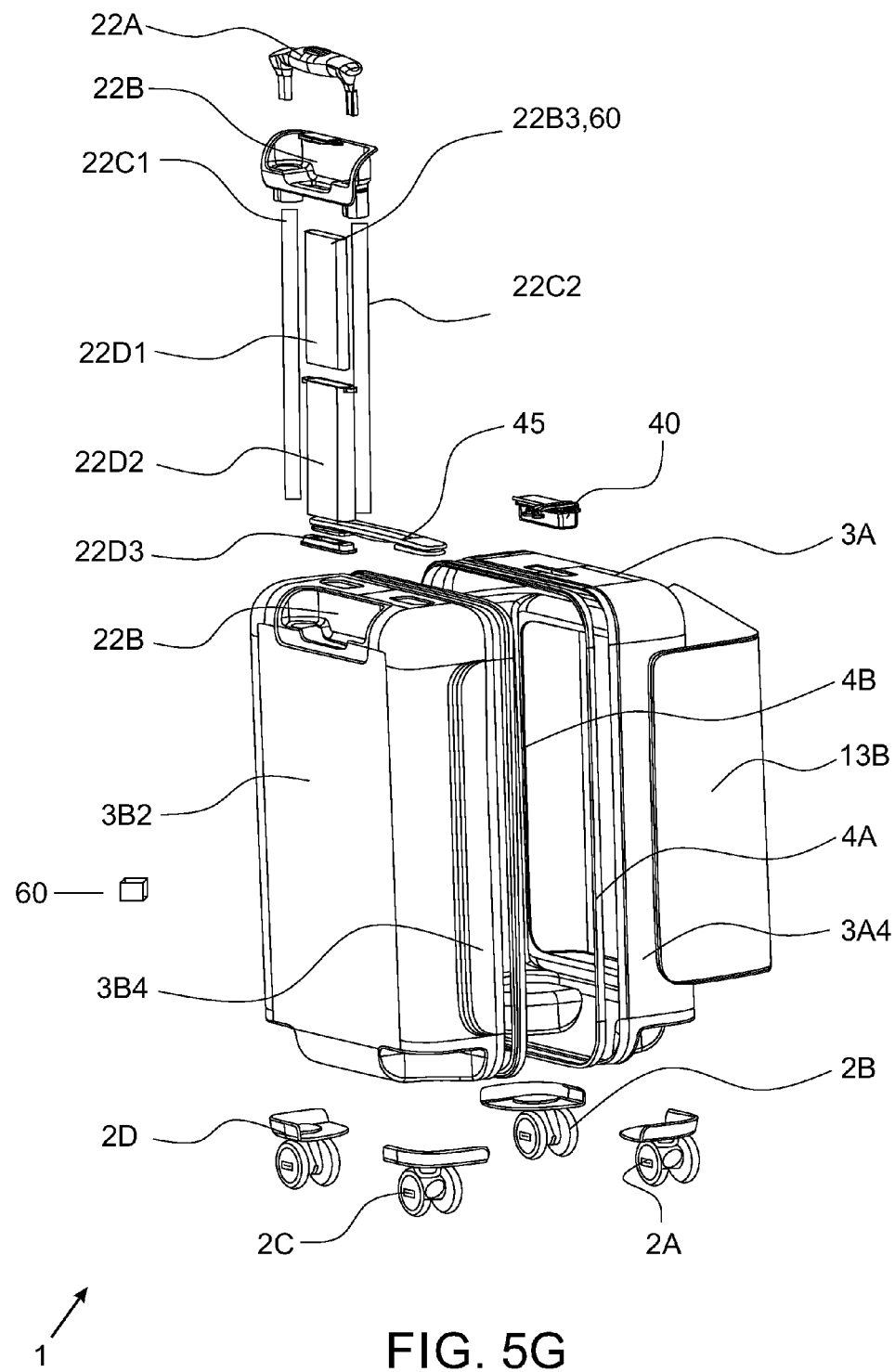
FIG. 5G is a fifth exploded perspective view of the first illustrative embodiment of the hard-shell luggage system shown in FIGS. 1A through 2A-2, showing the components described in FIG. 5A from different perspectives.
Figure 5H:
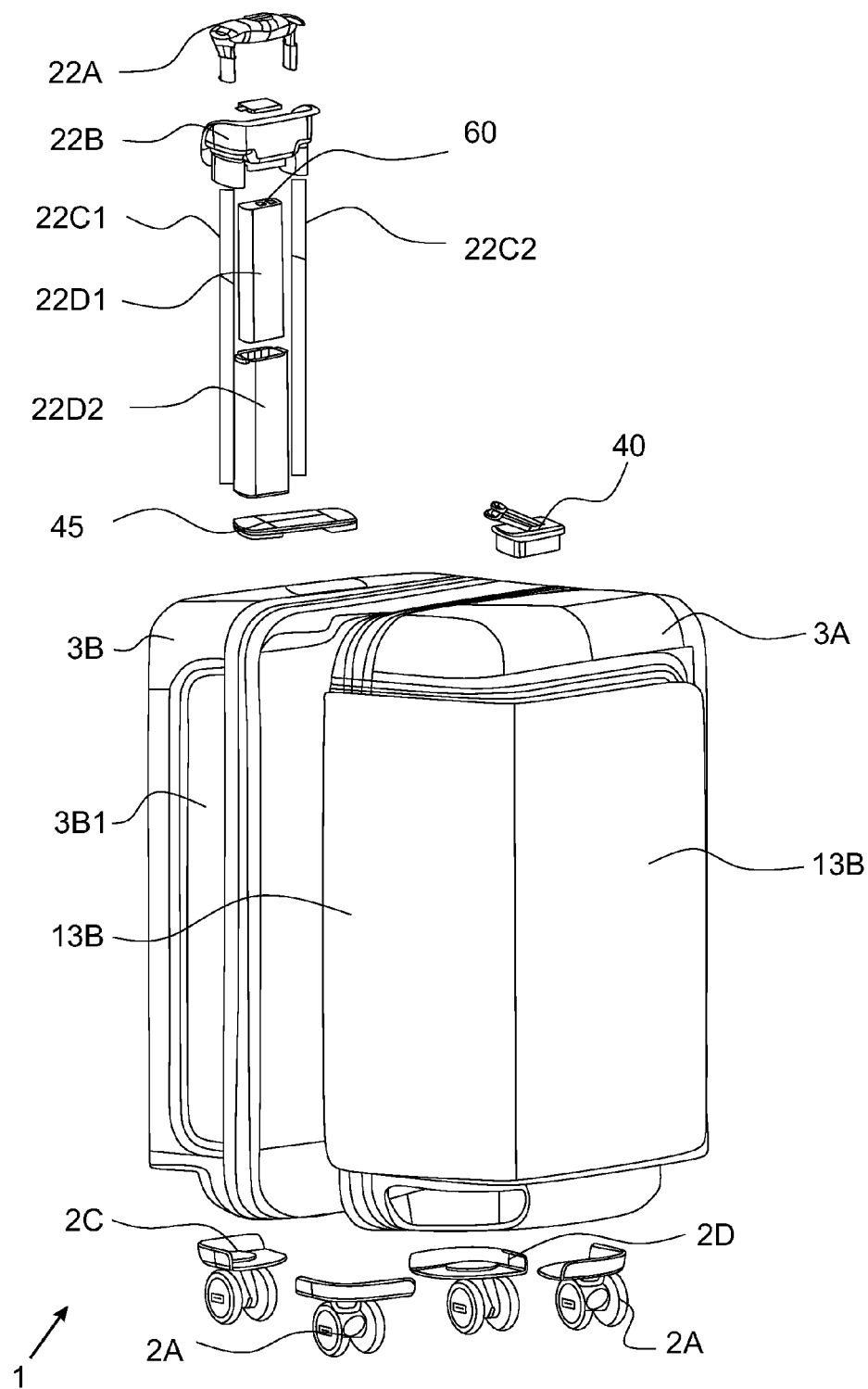
FIG. 5H is a sixth exploded perspective view of the first illustrative embodiment of the hard-shell luggage system shown in FIGS. 1A through 2A-2, showing the components described in FIG. 5A from different perspectives.
Figure 5I:
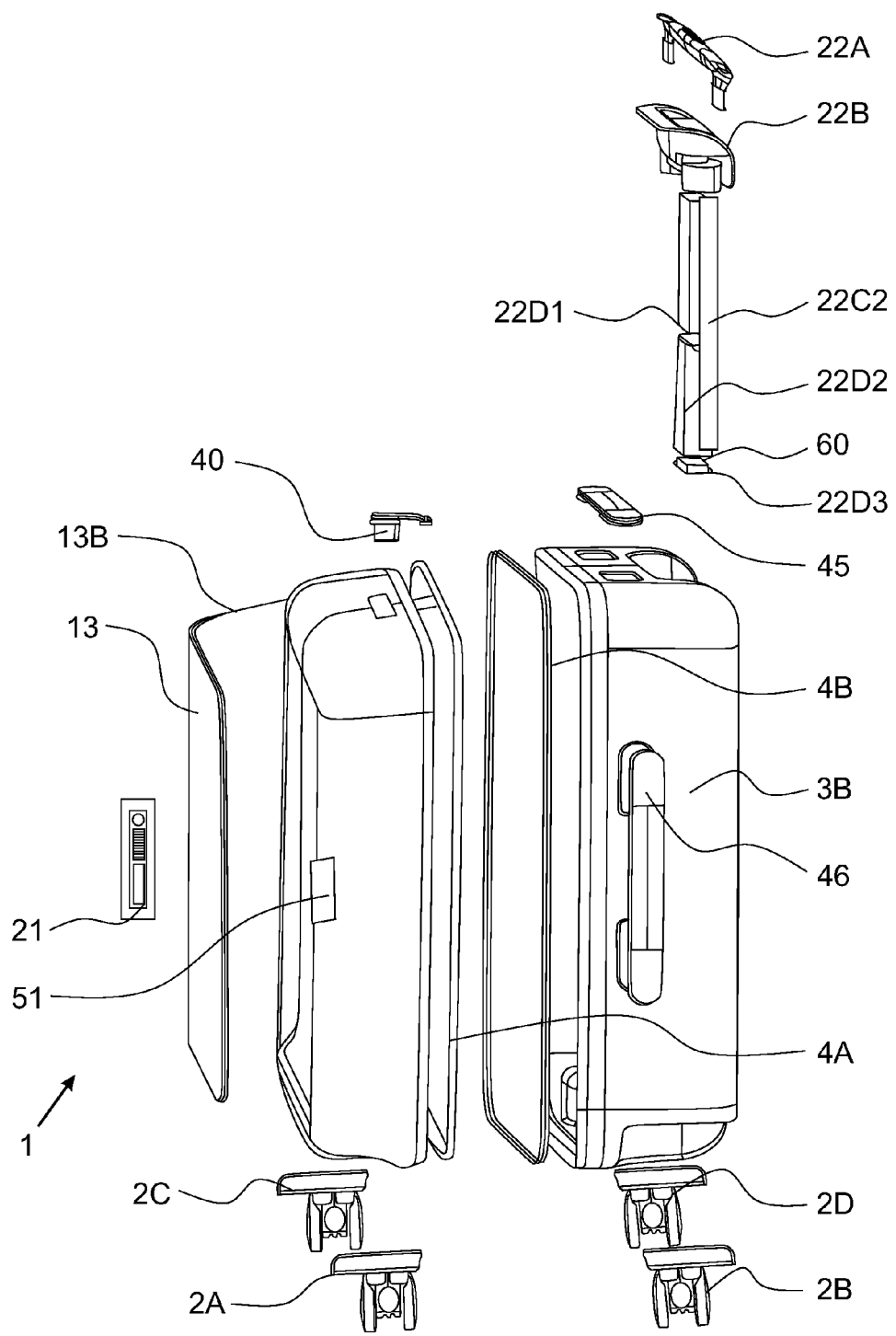
FIG. 5I is a seventh exploded side perspective view of the first illustrative embodiment of the hard-shell luggage system shown in FIGS. 1A through 2A-2, showing the components described in FIG. 5A from different perspectives.

As shown in FIGS. 3A through 3F, the hard-shell luggage system 3B comprises: (i) front and rear hard-shell housing portions 3A and 3B molded from a thermoplastic such as 100% virgin polycarbonate; (ii) a set of four spinner wheels 2A, 2B, 2C and 2D mounted in the four corners of the luggage system, in inset wheel wells 3A1, 3A2, 3B1 and 3B2 respectively, formed in the front and rear hard-shell housing portions 3A and 3B; (iii) a front cover flap structure 13 disposed over a slightly recessed front access opening 19 formed in the first hard-shell housing portion 3A so that the cover flap portion 13 covers the front access opening 19 in a flush manner (i.e. the front cover flap portion 13 resides within substantially the same plane as the front surface of the front hard-shell housing portion 3A when the front flap portion is in its closed configuration shown in FIGS. 1A, 2C, 2D, 6A, 6C, and 6E); (iv) a telescopic-handle and rechargeable power supplying assembly 22 including (a) a telescopic handle base housing assembly 22B supporting a rechargeable battery power module 22D1 supported in a battery case 22D2 closed with a cover 22D3, a PC board 22B3 supporting USB connectors 6A', 6B', 7', a set of USB DC electrical power supply ports 6A and 6B and a DC power recharging port 7 configured with the rechargeable battery module 22D1 via the PC circuit board and battery mounting receptacle 22B4 as illustrated in FIGS. 5A and 14, and (b) a telescopic handle subassembly including a manually-releasable handle structure 22A with release button 22E, and telescoping rods 22C1 and 22C2 having at least three selectable lengths for different size users; (v) a two-part zipper subsystem 4 having zipper components 4A and 4B stitched into and along the respective lip portions of the openings of the front and rear hard-shell housing portions 3A and 3B of the luggage system; (vi) a first TSA-approved combination lock subassembly 40 associated with locking together securely the zipper pull tabs 4A1 and 4A2 of the zipper components 4A and 4B, respectively, and therefore the zipper system 4; (vii) a second TSA-approved combination lock subassembly 21 associated with engaging and locking together the first connector 27 mounted on the edge of the front cover flap panel 13, and the second connector 26 associated with the inner edge portion of the front access opening 19 formed in the front hard-shell housing portion 3A; and (viii) a set of top and side handles 45 and 46 mounted through ports 47 and 48, respectively, formed in molded rear hard-shell housing portion 3B, for carrying the luggage system in one of two possible configurations (i.e. upright carrying configuration or side carrying configuration).

Referring to FIGS. 5A, and 5J1 through 5J4, the manually-releasable handle portion 22E contains an internal lock and release mechanism, installed within the elongated handle structure 22E, which is triggered by manually-depressing the manually-depressible button 22E located centrally on the handle structure 22A. Any suitable lock and release mechanism can be used to practice the present invention, and is generally known in the luggage system art. As shown, the telescopic handle subassembly 22 comprises: (i) a base housing component 22B having a set of spaced apart guide tubes 22C1' and 22C2', into which a set of telescoping rod members 22C1 and 22C1 pass and connect on one end to mounting apertures 22A1 and 22A formed in the handle portion 22A, and on the other end to mounting apertures 22F1 and 22F2 formed in a telescopic rod member mounting bracket 22F having a foot portion 22F3 that mounts to the bottom surface of the rear hard-shell housing portion 3B of the luggage system using glue or other suitable adhesive.

As shown in FIG. 5A, the base housing component 22B further comprises: an integrated receptacle 22B4 for receiving PC board 22B3 supporting GPS/GSM luggage tracking module 60, USB connectors 6A', 6B' and 6C' and circuitry illustrated in FIG. 14; USB DC power supply ports 6A and 6B and DC battery recharging port 6C allowing corresponding USB connectors 6A', 6B' and 6C' on the PC board 22B3 to extend through corresponding ports formed in the base housing component 22B and receive corresponding USB connectors associated with cables connected to mobile phones 8 and laptop computers and the AC/DC power adapter 11; and a hinged power port cover panel 5 that has soft rubber seals on its underside to plug up and seal the power ports when the hinged power port cover panel 5 is arranged in its closed configuration as shown in FIGS. 5J3 and 5K2.

As shown in FIGS. 5J1 through 5J4, a replaceable and rechargeable DC battery power module 22D1 is connected to the PC board 22B3, and contained in a battery module casing 22B2 with an end cap cover 22D3, all of which is supported within the plane of and between the pair of spaced apart telescopic guide tubes 22C1 and 22C2, beneath the base housing component or portion 22B; and (iv) a DC power port cover panel 5 that is hinged to the base housing component 22B and covers the USB DC power ports 6A, 6B and DC power recharging port 7 formed in the base housing component 22B.

In the illustrative embodiment, the two USB DC power supply ports 6A, 6B are capable of charging two devices simultaneously, whereas the 1 micro USB power recharging port 7 enables the charging of the rechargeable battery module 22B. Typically, using a 10,000 mAh battery, the module will be capable of fully charging an iPhone up to five or more times. With future advances in battery technology, such battery performance characteristics are expected to improve.

Preferably, the power port cover panel 5 is spring-biased to automatically close down upon USB plug connectors inserted into the power ports for charging and/or recharging operations, and reduce exposure of the USB ports to the elements. Also, it is desired that the USB power ports 6A and 6B and 7 are recessed within the base housing component 22B so that when USB power plugs are inserted into USB power ports, and establish connection with electrical connectors on the PC board 22B3 disposed therebeneath, the hinged power port cover panel 5 can be configured in closed configuration while cables associated with charging and/or recharging operations can pass through a small channel formed in the power cover panel 5, to prevent rain, snow and other elements from entering open USB power ports while the luggage system is being transported through environments where exposure to rain and snow is inevitable.

As shown in FIGS. 6A through 6E, the front and rear hard-shell housing portions (i.e. components) are made from molded plastic and hinged together by a single multi-layer structure that functions not only a hinge for the hard-shell housing portions 3A and 3B, but also a hinged front cover flap portion 13 that closes off the front access opening 19 formed in the front surface of the front hard-shell housing portion 3A. Together, these components form a hard-shell housing assembly that is employed in the first illustrative embodiment of the hard-shell luggage system.

Figure 6A:
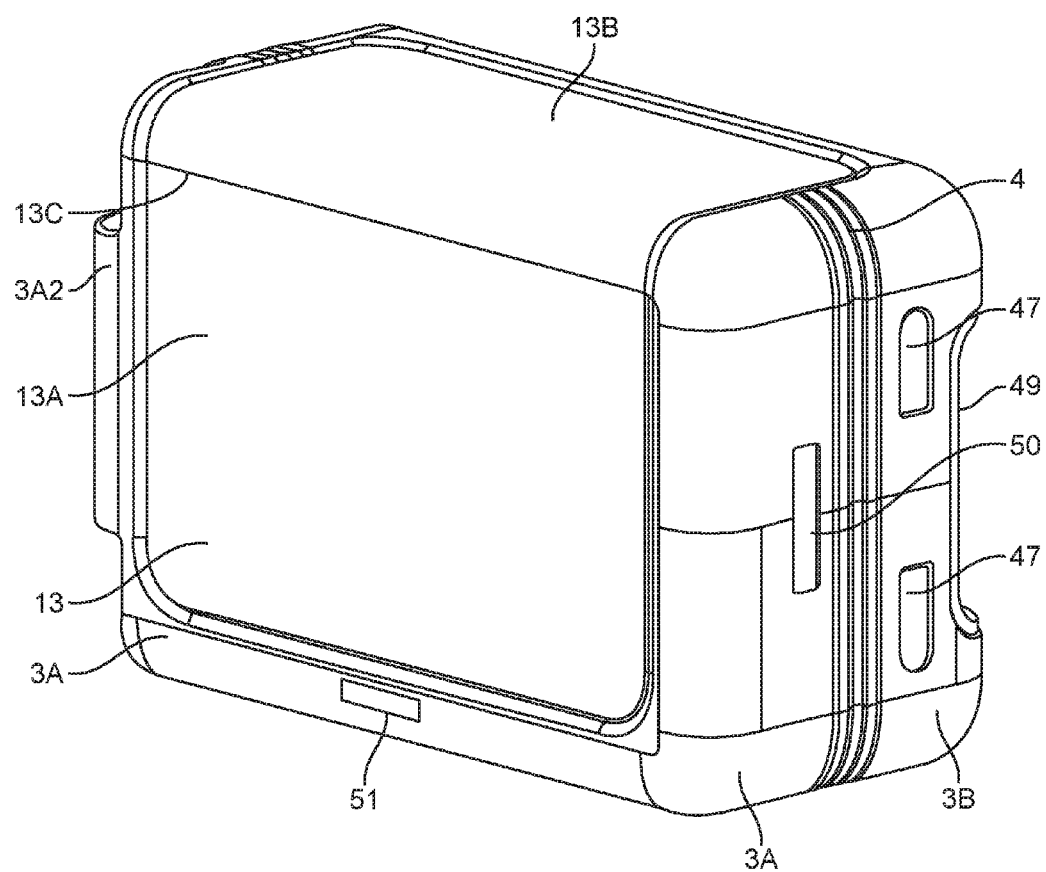
FIG. 6A is a first front perspective view of the hard-shell housing assembly employed in the first illustrative embodiment of the hard-shell luggage system shown in FIGS. 1A, 1B and 1C, in a closed and assembled manner, disposed on its side surface, and comprising (i) a front hard-shell housing portion with a molded port for mounting a first TSA-approved combination lock assembly for use in locking the two-part zipper subsystem, and a second TSA-approved combination lock for use in locking the front cover flap panel when arranged in its closed configuration, (ii) a rear hard-shell housing portion with a set of molded ports for mounting the top handle structure, a molded port for mounting the base housing component of the telescoping handle and DC power supply assembly, (iii) a two-part zipper subsystem and associated lock subassembly, (iv) a two-part zipper subsystem cooperating with the associated TSA-approved combination lock subassembly, (v) a flexible cover flap structure functioning as a hinge structure for the front and rear hard-shell housing portions, and a cover structure for covering the front access opening formed in the front surface of the front hard-shell housing portion/component for storage of a laptop computer and/or other articles without opening up the front and rear hard-shell housing portions, and (vi) a set of indented wheel-wells formed in each of the corners of the bottom portion of the front and second hard-shell housing portions, for mounting a set of four spinner wheels.
Figure 6B:
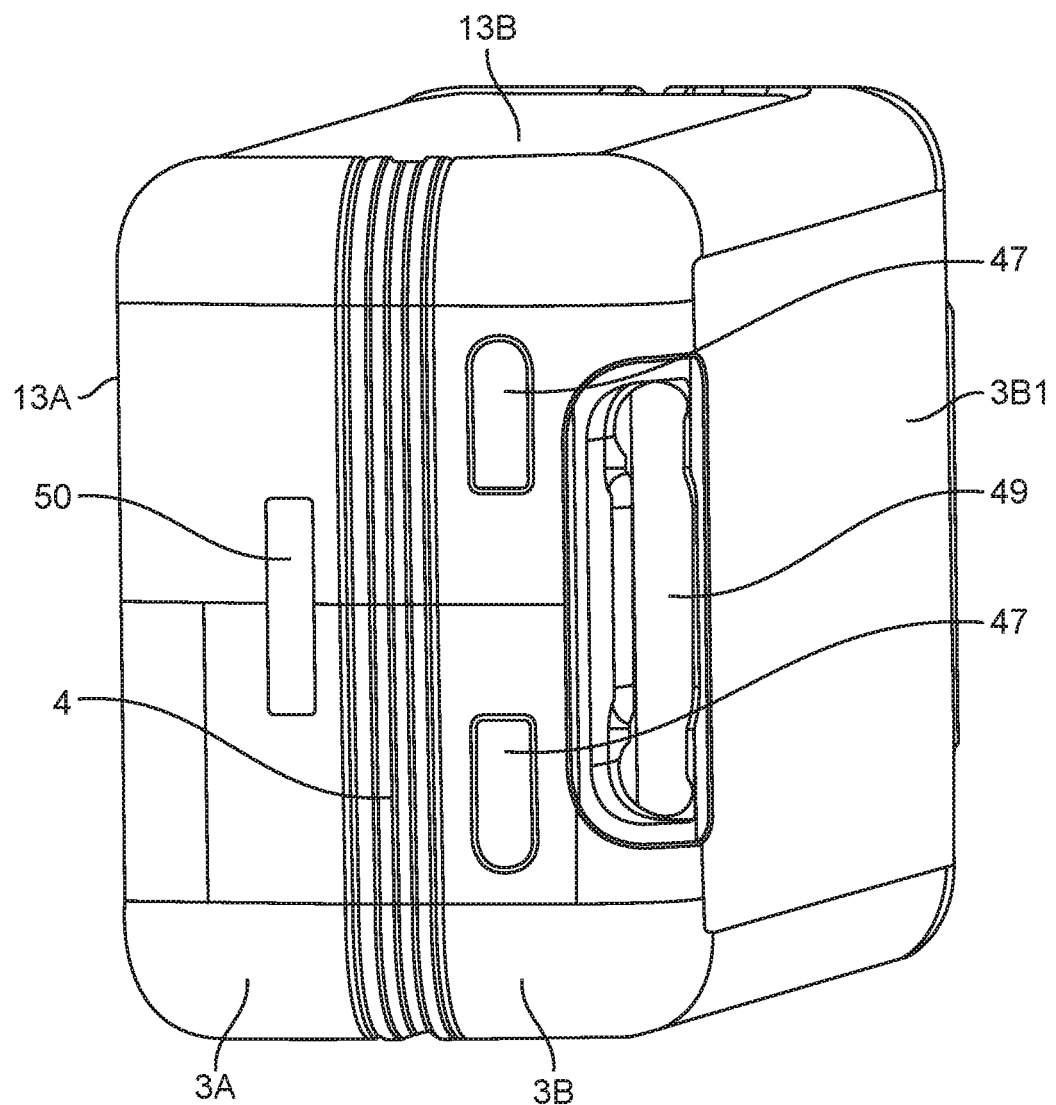
FIG. 6B is a second top end perspective view of the hard-shell housing assembly employed in the first illustrative embodiment of the hard-shell luggage system shown in FIGS. 1A, 1B and 1C, in a closed and assembled manner, disposed on its side surface, and shown comprising the elements described in FIG. 6A.
Figure 6C:
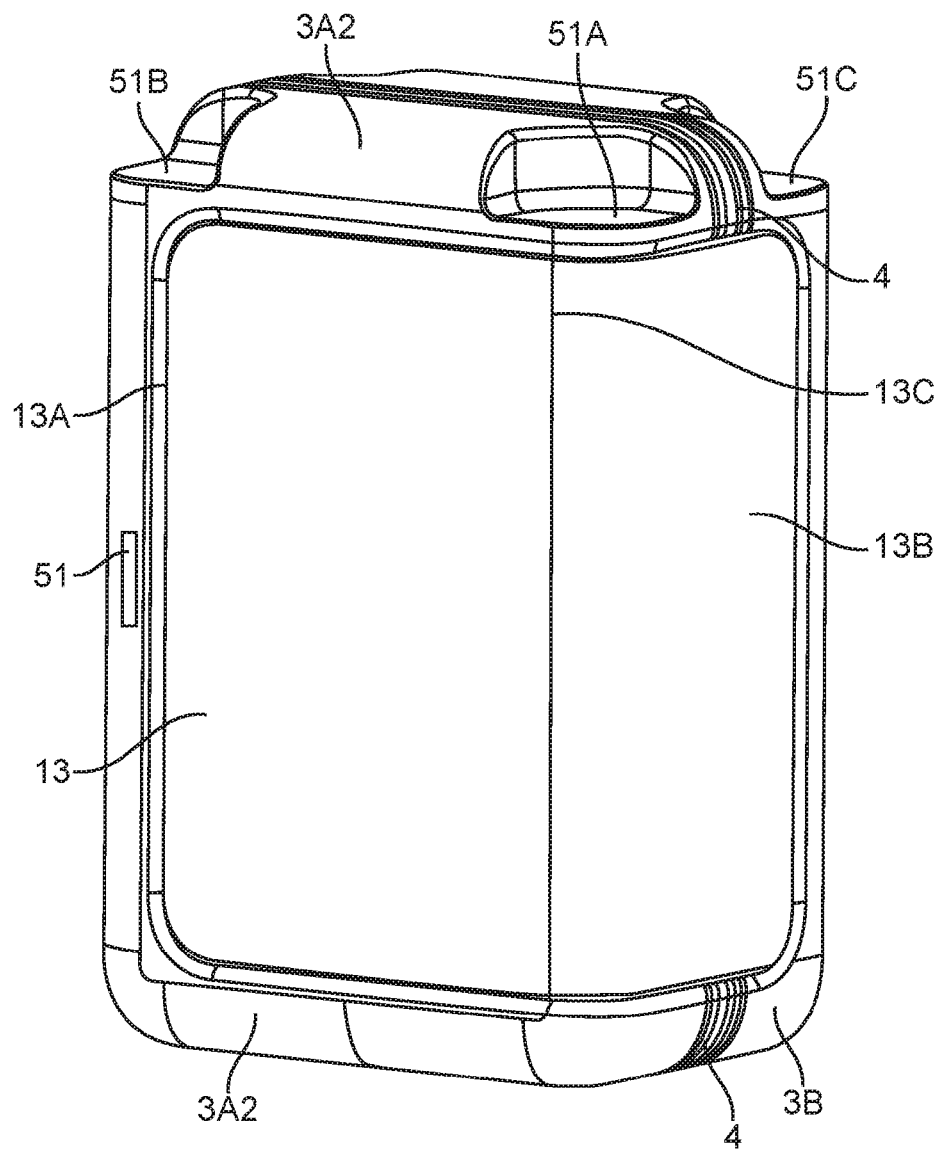
FIG. 6C is a second front perspective view of the hard-shell housing assembly employed in the first illustrative embodiment of the hard-shell luggage system shown in FIGS. 1A, 1B and 1C, in a closed and assembled manner, disposed on its bottom end surface, and shown comprising the elements described in FIG. 6A.

As shown in FIG. 6B, the front hard-shell housing portion 3A has a molded port 50 for mounting a TSA combination lock assembly 40 associated lock subassembly associated with the two-part zipper system 4 comprising (i) a first zipper structure 4A (e.g. supplied by the YKK (Yoshida Kogyo Kabushikikaisha) Group, Tokyo, Japan or other vendor) stitched or otherwise fastened to the lip portion extending about the opening of the front hard-shell housing component 3A, (ii) a second zipper structure 4B stitched or otherwise fastened to the lip portion extending about the opening of the rear hard-shell housing component 3B, and (iii) a pair of zipper pulls 4A1 and 4B1 associated with the first and second zipper structures 4A and 4B, respectively.

Figure 6D:
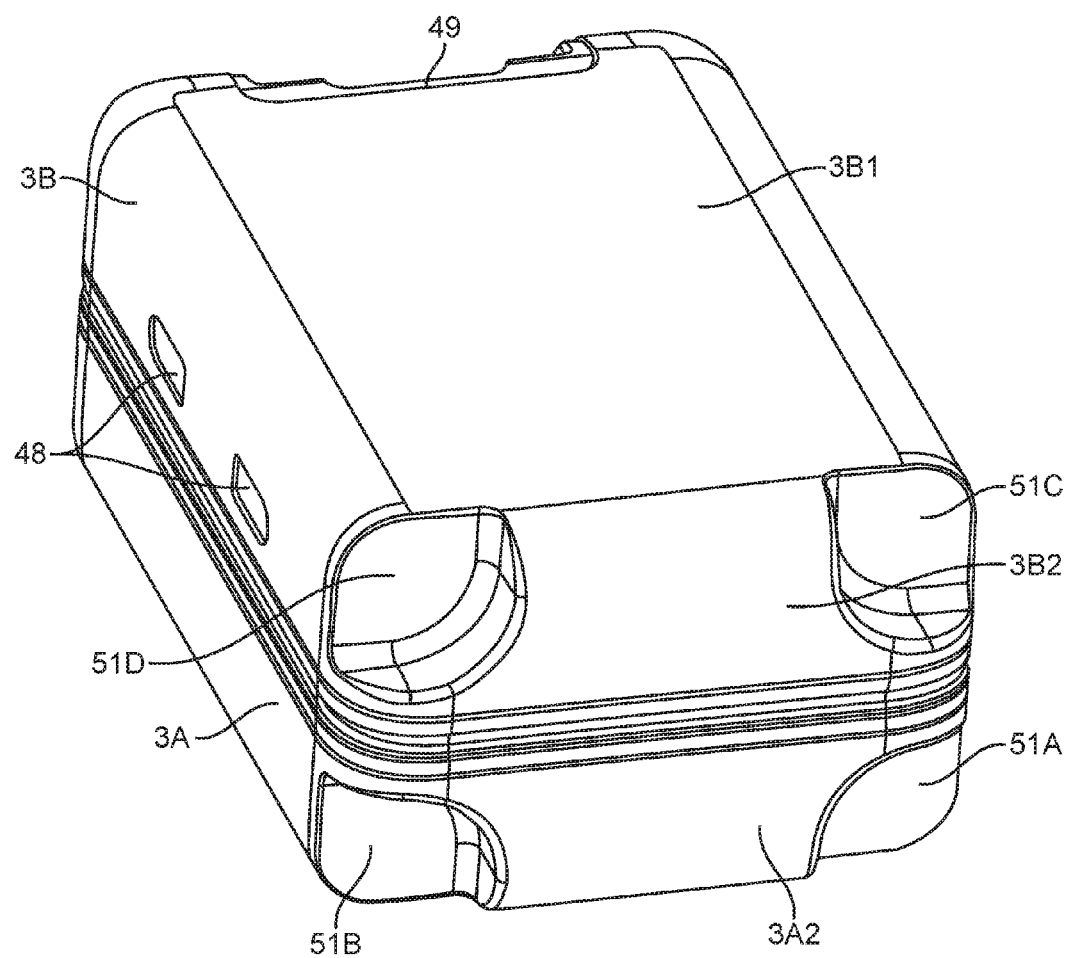
FIG. 6D is a first rear perspective view of the hard-shell housing assembly employed in the first illustrative embodiment of the hard-shell luggage system shown in FIGS. 1A, 1B and 1C, in a closed and assembled manner, disposed on its rear surface, and shown comprising the elements described in FIG. 6A.
Figure 6E:
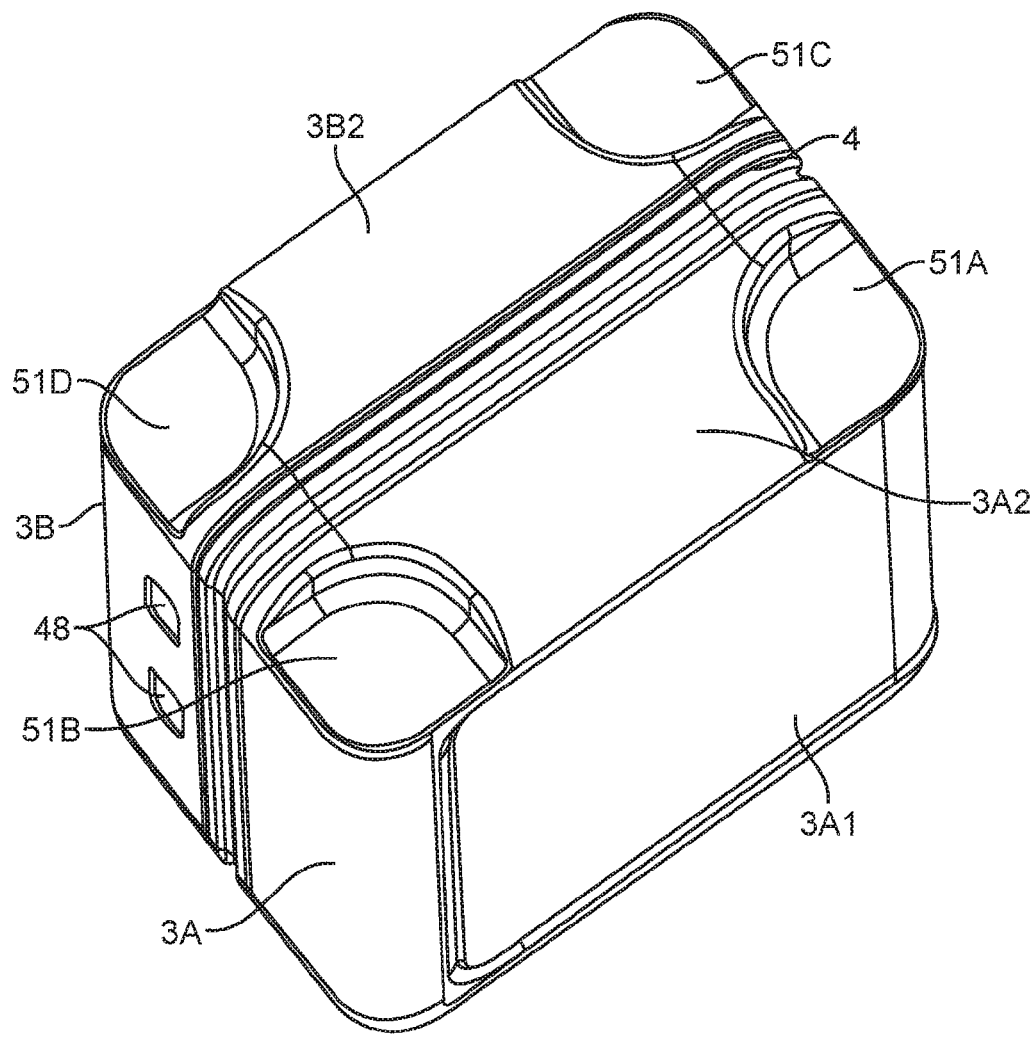
FIG. 6E is a bottom perspective view of the hard-shell housing assembly employed in the first illustrative embodiment of the hard-shell luggage system shown in FIGS. 1A, 1B and 1C, in a closed and assembled manner, disposed on its top end surface, and shown comprising the elements described in FIG. 6A.

As shown in FIGS. 6A, 6B and 6D, the rear hard-shell housing portion 3B has (i) a set of molded ports 47 for mounting the top handle structure 45, (ii) a set of a molded ports 48 for mounting the side handle structure 46, and (iii) a molded port 49 for mounting the base housing component 22A of the telescoping handle and DC power supply assembly 22. Preferably, the front and rear hard-shell components 3A and 3B are molded from 100% virgin polycarbonate plastic material providing both the lightest weight and durable characteristics required for modern luggage applications.

As shown in FIG. 6D, the bottom surfaces of the front and rear hard-shell portions 3A and 3B also have a set of indented wheel-wells 3A1, 3A2 and 3B1, 3B2 molded deep into each of the corners of the bottom portion of the first and second hard-shell housing portions 3A and 3B, for mounting the set of four 360 degree double-spinner wheels 2A and 2D using rivets or a strong adhesive cement. In the illustrative embodiment, the 360 degree double-spinner wheels 2A through 2D can be realized using double-spinner wheels made from 100% Makrolon materials, available from Hinomoto of Japan, although other equivalent spinner wheel components may be used with good results.

As shown in FIGS. 6A through 6E, the flexible cover flap structure 13' illustrated in FIGS. 4A through 4D serves several functions, namely: (i) as a hinge structure about axis 24 for the front and rear hard-shell housing portions 3A and 3B, and (ii) a flexible opaque front cover flap panel 13 hinged about axis 25 for covering the front access opening 19 formed in the front surface of the first hard-shell housing portion 3A for storage of a laptop computer and. or other articles without opening up the front and rear hard-shell housing portions 3A and 3B, respectively.

Figure 4A:
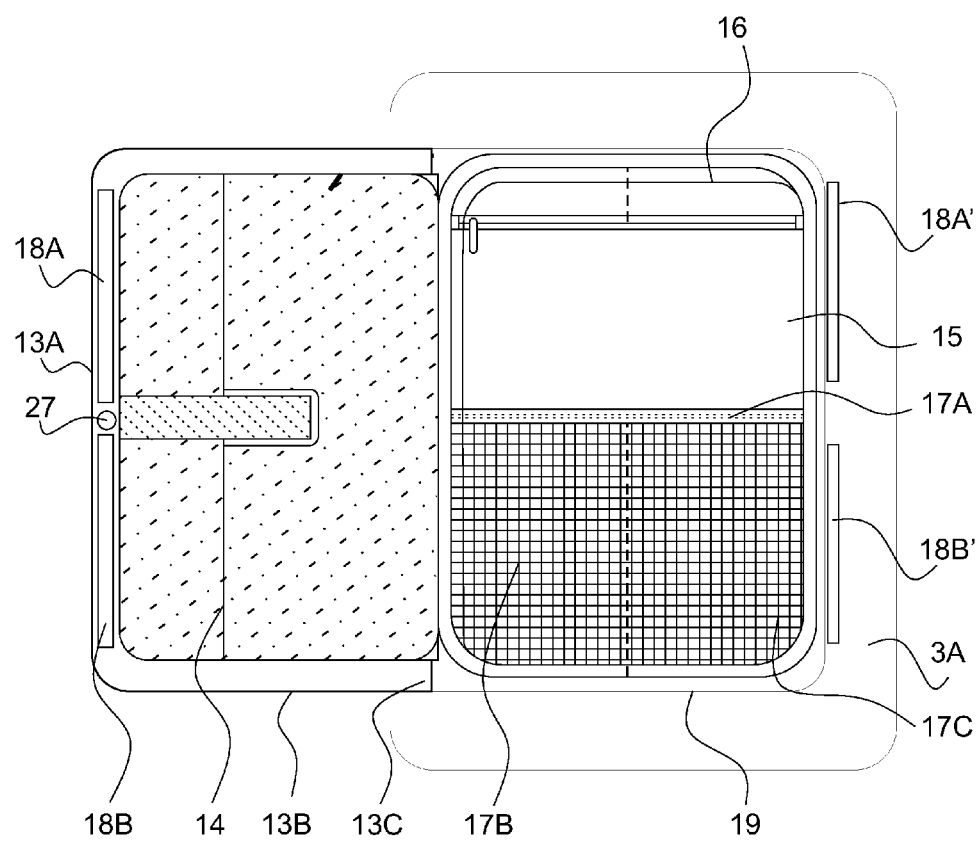
FIG. 4A is an elevated front view of the first illustrative embodiment of the hard-shell luggage system shown in FIGS. 1A, 1B and 1C, positioned on its set of four spinner wheels mounted in the four corners of the luggage system, wherein its first and second hard-shell housing portions are arranged in a closed configuration with its integrated zipper mechanism arranged in a zipped configuration, and wherein the flexible front cover flap panel is folded back to reveal (i) the laptop pouch provided on the interior side of the front cover flap panel and the magnetic-based front cover flap retention mechanism provided to releasably retain the front cover flap in its closed configuration over the front access opening, and (ii) the front access opening of the front hard-shell housing portion and the shallow zippered pouch supported on the upper portion of the interior lining structure mounted within the interior storage volume of the front hard-shell housing portion of the luggage system, and the unzippered and divided mesh pouches supported on the lower portion of the interior lining structure mounted therein.
Figure 4B:
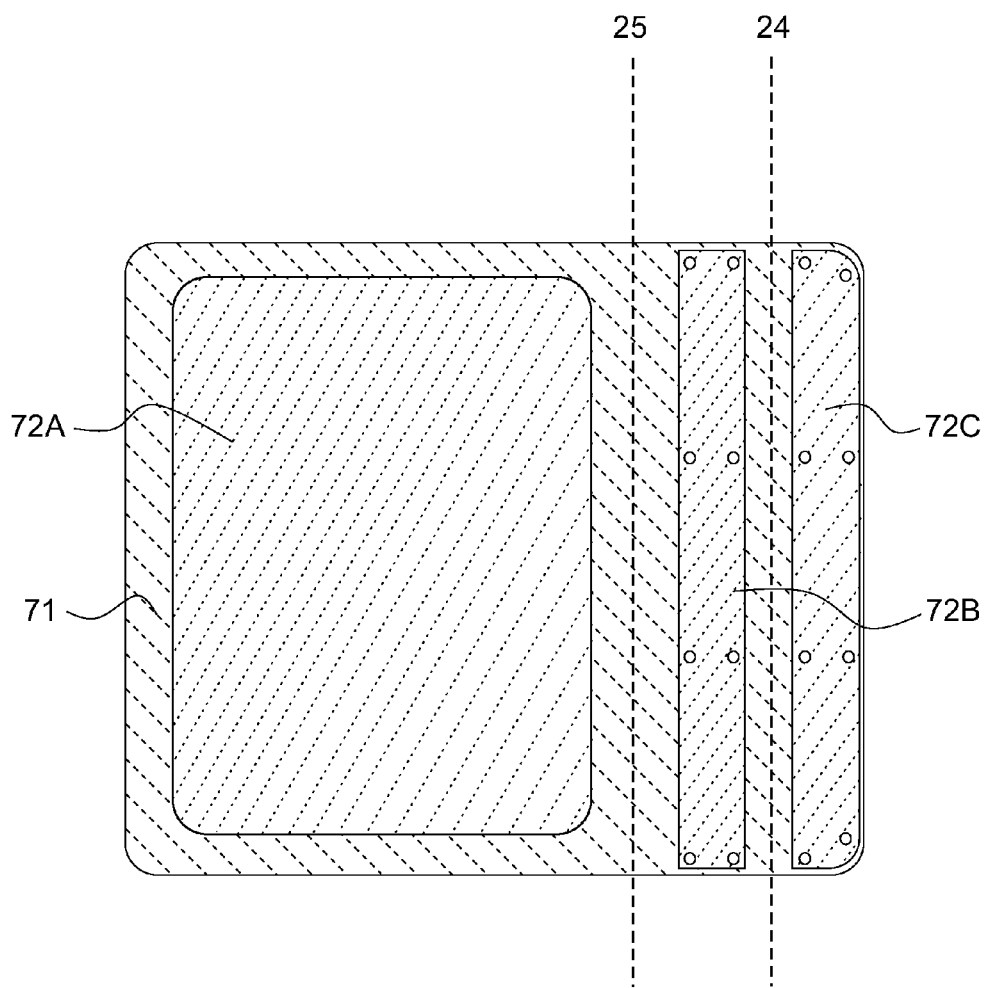
FIG. 4B is a plan view of the inner component used to construct the flexible front cover flap panel structure of the illustrative embodiment, shown comprising a sheet of dense flexible foam bonded to (i) a rigid plastic panel in the shape of a laptop perimeter to support a laptop sleeve/pouch, and (ii) a pair of rigid spaced-apart plastic panels riveted to the sheet of dense flexible foam, forming a hinge line for the flexible cover flap panel and a hinge line for the hard-shell housing portions when the front cover flap panel structure is mounted to the recessed side regions of the front and rear hard-shell housing portions of the luggage system as shown in FIGS. 3D, 5C, 5E, 5G, 5H, 6A, and 6C.
Figure 4C:
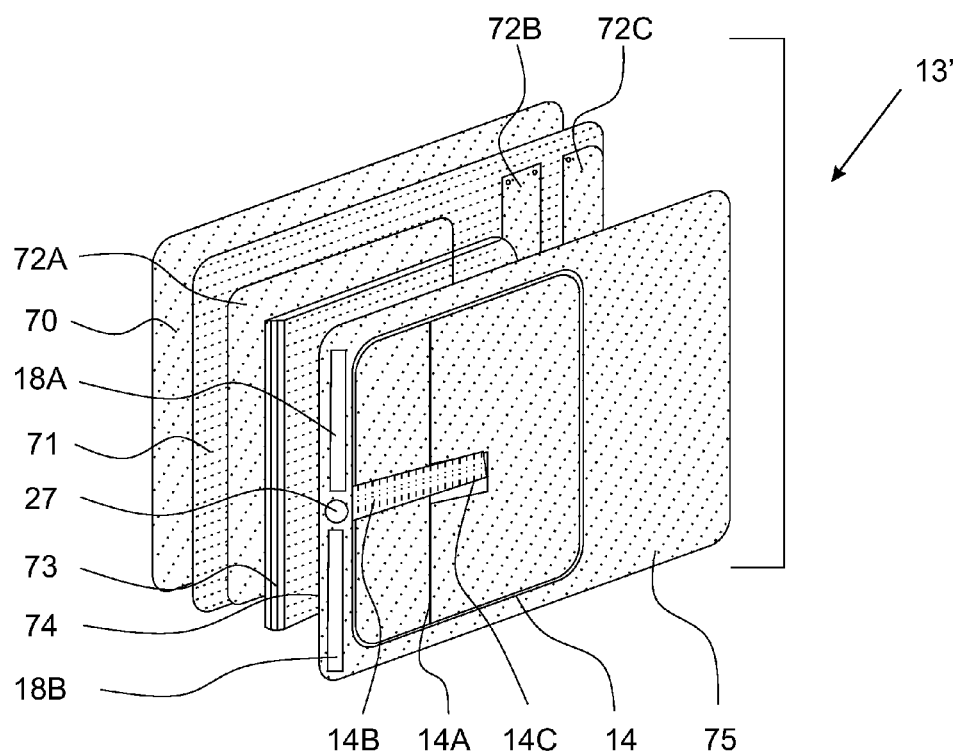
FIG. 4C is a perspective view illustrating the multi-ply construction of the flexible front cover flap structure formed by mounting the inner component described in FIG. 4B between (i) a layer of outer fabric, and (ii) a layer of dense neoprene foam in the shape of the laptop sleeve, and a layer of inner fabric, into which a Velcro-closed laptop pocket or sleeve is sewn, in a manner overlying the perimeter outlines of the neoprene foam layer and rigid plastic sheet, to provide stiffness and protection to a laptop held in the laptop sleeve, as shown in FIG. 4D.
Figure 4D:
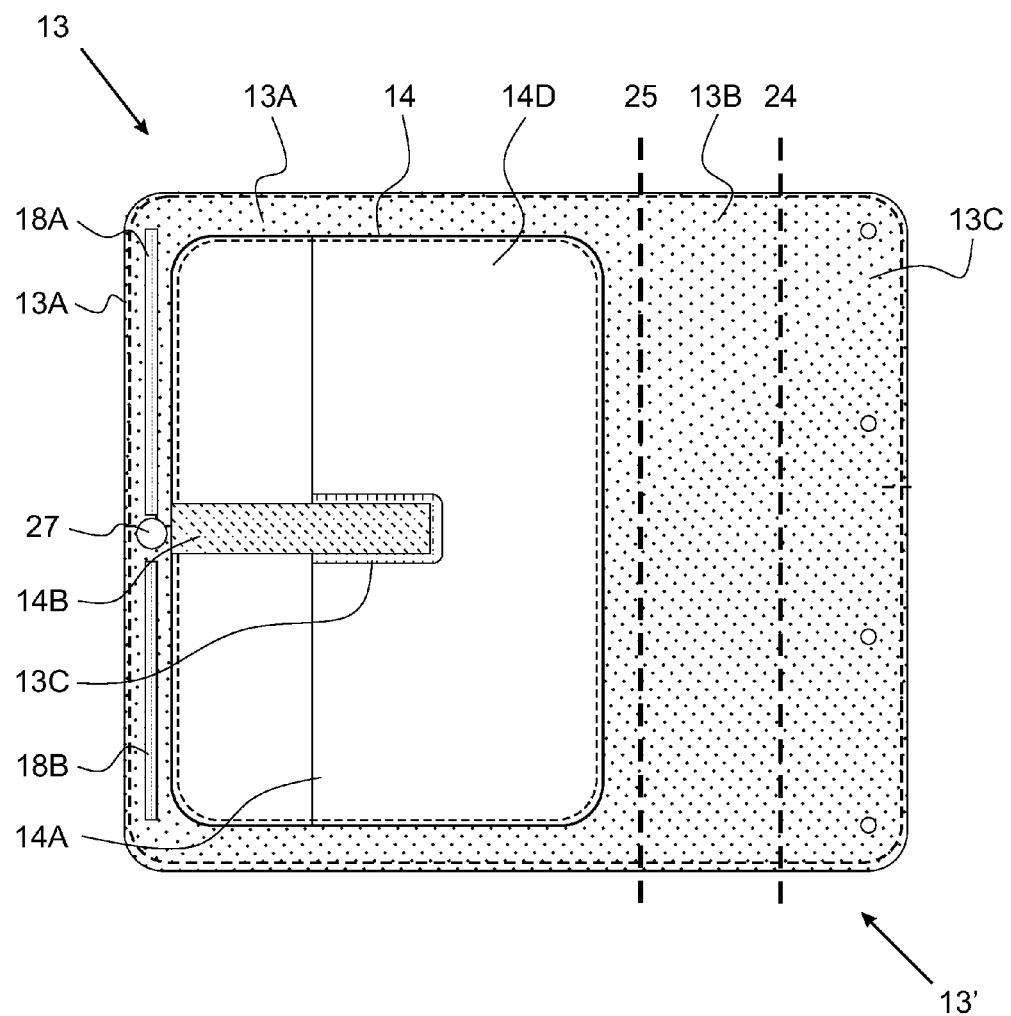
FIG. 4D is a perspective view of the flexible front cover flap structure of the illustrative embodiment of the present invention shown fully assembled and removed from the front hard-shell housing portion, supporting a laptop sleeve/pocket adapted for holding a suitably sized laptop or pad computer therein, using a manually-releasable Velcro-based strip structure.

In FIGS. 4A through 4D, a preferred construction for the flexible front cover panel structure 13' is illustrated in great technical detail. As shown, the multi-ply structure 13' comprises: (i) a sheet of dense flexible foam 71 bonded to a layer of exterior fabric 70: (ii) a rigid plastic panel 72A made of nylon or other materials in the shape of a laptop perimeter to support a laptop sleeve 14; (iii) a pair of rigid plastic panels 72B and 72C made of nylon riveted to the sheet of dense flexible foam, for forming, when mounted to the side of the first hard-shell housing portion, a first hinge line 24 about which the front and rear hard-shell housing portions 3A and 3B swings, and a second hinge line 25 about which the front cover flap panel 13 swings during opening and closing operations; (iv) a layer of dense neoprene foam 73 in the shape of the laptop sleeve, adhesively fixed to rigid plastic panel 72A; (v) a neoprene foam layer 74 arranged on top of plastic panels 72A, 72B, 72C and foam layer 71; and (v) a layer of inner fabric 75 upon which is supported (a) a laptop pouch 14 with a sleeve 14A for receiving and holding a suitably sized laptop or pad computer therein, and a Velcro-strap system 14B, 14C, as shown in FIG. 4C. After these components are assembled, sewn or otherwise fastened together, the flexible front cover panel structure 13' is then riveted to the slightly recessed side surface region 3A4 of the front hard-shell housing portion 3A, and also to the slightly recessed side surface region 3B4 of the rear hard-shell housing portion 3B4, as shown in FIGS. 3D, 5E, 5G and 5H. Once the flexible front cover flap structure 13' is mounted to the front and rear hard-shell housing portions 3A and 3B, the laptop sleeve/pocket 14 will be capable of supporting the weight of the stored laptop or iPad as the case may be, in almost any application.

FIGS. 5A through 5I show an exploded view of the luggage system of the first illustrative embodiment, whose components and subcomponents have been described above. While the assembly of most components can occur in different orders, different manufacturers will develop different procedures to reduce the time, energy and cost to manufacture, assemble and test luggage systems according to the present invention.

Referring to FIGS. 5A, 5J1 through 5J4, the telescopic handle and USB DC power supply assembly 22 is shown comprising: (i) a manually-releasable handle portion 22A containing an internal lock and release mechanism (not shown) triggered by a manually-depressible button 22E located centrally on the handle portion 22A; (ii) base housing component 22B having a set of spaced apart guide tubes 22C1 and 22C2, through which a set of telescoping rod members 22C1' and 22C2' pass and connect on one end to mounting apertures 22A1 and 22A2 formed in the handle portion 22A, and on the other end, to mounting apertures 22F1 and 22F2 formed in a telescopic rod member mounting bracket/foot 33F3 that mounts to the bottom surface of the rear hard-shell housing portion 3B of the luggage system; (iii) a set of USB DC power supply ports 6A, 6B and a DC battery mini-USB recharging port 7 formed in the base housing component 22B, and operably connected to a replaceable and rechargeable DC battery power module 22D1 contained in a battery module casing 22D2 and associated end cap 22D3 which is supported within the plane of and between the pair of spaced apart guide tubes 22C1 and 22C2, beneath the base housing portion 22B; and (iv) a DC power port cover panel 5 that is hinged to the base housing component 22B and covering the USB DC power ports 6A and 6B and DC power recharging port 7 formed in the base housing component 22B. As shown in FIG. 5J5, the battery module storage casing 22D2 is releasably fastened to the base housing component 22B by way of a pair of screws 22G1 and 22G2 or other fasteners to permit the battery module to be replaced as required.

Preferably, base housing component 22B, guide tubes 22C1 and 22C2, and the telescopic member mounting bracket 22F3 are molded from plastic material. Preferably, telescopic rods 22C1' and 22C2' are made from metal, carbon fiber or plastic materials exhibiting strength and resilience required by the application at hand where the user needs to pull (i.e. trolley) along the luggage system along sidewalks, up stairwells, and other pathways aboard airplanes, trains, ocean liners and other travel vessels.

Specification of the Compression-Pad Subsystem Installed within the Rear Hard-Shell Housing Portion of the Luggage System Referring to FIGS. 2A-1, 2A-2, 7A and 7B, the compression pad subsystem 32 installed in the interior volume region of the rear hard-shell housing portion 3B will now be described in greater technical detail. As shown, the compression pad subsystem 32 comprises: a compression pad like structure 32A and a pair of buckled straps 32C and 32D for holding (i) a stack of shirts, pants and other garments 85 in the interior volume region within the interior lining system 39 beneath the pad structure 32, (ii) a stack of shirts, pants and garments 85 resting upon directly upon a rolled-out expandable laundry bag 36A while filled with soiled clothes, while the compression pad structure 32A is strapped down under compression using the set of buckles 32C and 32D that pass through compression pad structure 32 and are anchored to the rear hard-shell housing portion 3B using screw or other fasteners known in the art. Notably, the compression pad subsystem 32 can be used alone or in combination the laundry bag subsystem 36 of the present invention supported at the bottom of the rear hard-shell housing portion 3B—also compressed in volume using the compression-pad structure of the compression pad subsystem.

Figure 7A:
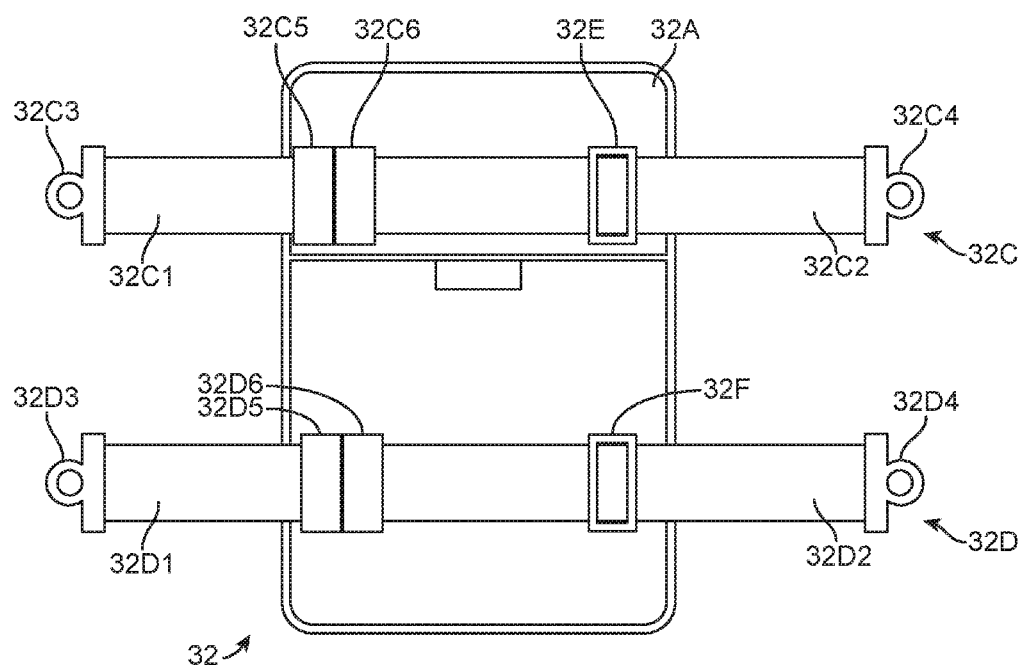
FIG. 7A is a schematic illustration providing a front view of the compression pad subsystem of the present invention installed in the interior volume region of the rear hard-shell housing portion, shown comprising a compression pad like structure for holding a stack of shirts, pants and other garments in the interior volume region, beneath the pad structure, while it is strapped down under tension using two spaced-apart sets of male-female snap-together-type releasable buckle straps that pass through loops sewn or otherwise formed in the compression pad structure and are anchored (on bother ends) to the rear hard-shell housing portion using screws or other fasteners known in the art, while a laundry bag subsystem supported at the bottom of the rear hard-shell housing portion is also compressed in volume using the compression-pad structure of the compression pad sub system.

As shown in FIG. 7A, each fabric strap 32C2, 32D2 has a male buckle portion 32C6, 32D6 and a female buckle portion 32C5, 32D5 which releasably engage each other in conventional manner with pressure applied to the spring-biased front surface of the make buckle component. As shown, the first fabric strap 32C2 is anchored at one end to the rear hard-shell housing portion 3B by an anchor mechanism (e.g. plastic structure) 32C4 that is cemented or riveted in place to provide a point of engagement with the anchor 32C4 by way of a screw or other fastener, while the other end of the other strap is anchored at one end to the rear hard-shell housing portion 3B (or alternatively, 3A) by an anchor mechanism (e.g. plastic structure) 32C3 that is cemented or riveted in place to provide a point of engagement with the anchor 32C3 by way of a screw or other fastener. As shown, the fabric strap 32C2 passes through a loop 32E that is sewn into the fabric of the compression pad structure 32.

As shown, the second fabric strap 32D2 is anchored at one end to the rear hard-shell housing portion 3B by an anchor mechanism (e.g. plastic structure) 32D4 that is cemented or riveted in place to provide a point of engagement with the anchor 32D4 by way of a screw or other fastener, while the other end of the other strap is anchored at one end to the rear hard-shell housing portion 3B by an anchor mechanism (e.g. plastic structure) 32D3 that is cemented or riveted in place to provide a point of engagement with the anchor 32D3 by way of a screw or other fastener.

Figure 7B:
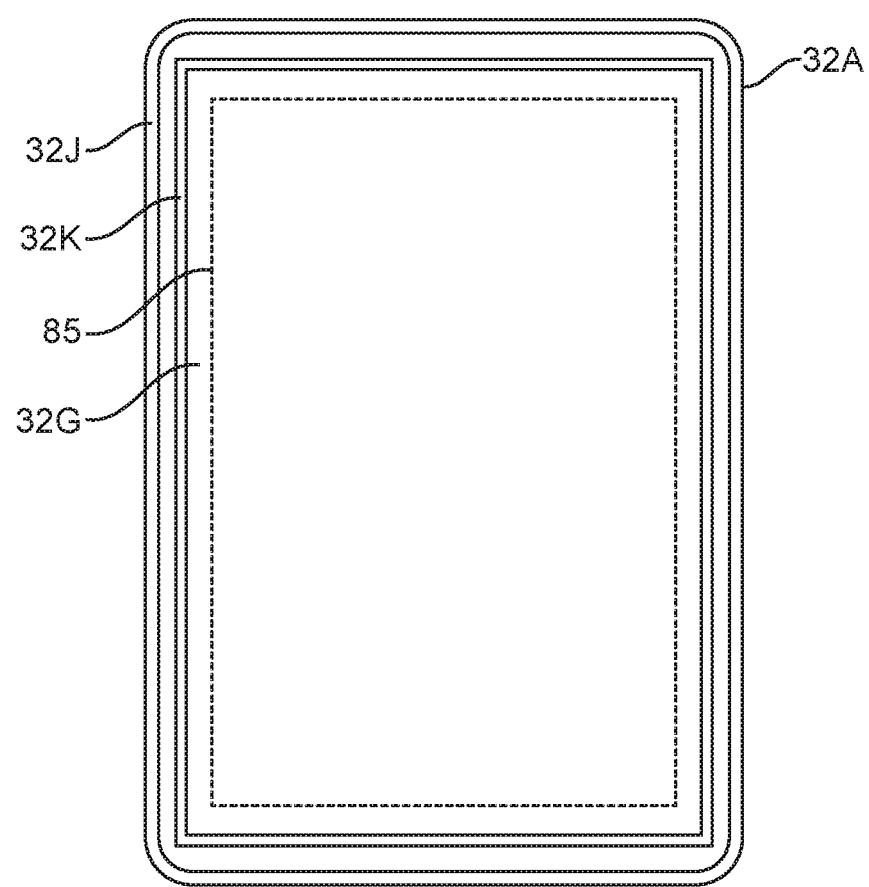
FIG. 7B is a schematic representation illustrating the rear view of the compression pad structure employed in the compression pad subsystem illustrated in FIG. 7A, showing a perimeter extending lip or ridge extending about the compression-pad structure to maintain shirts, slacks and other stacked items from slipping around while tightening the compression straps of the compression pad subsystem of the present invention.

Preferably, the compression pad structure 32 contains a very stiff plastic panel 32J about which foam and external fabric lining 32K is sewn to provide a unitary very stiff compression pad structure that is resistant to bending and distortion when compression forces are generated by tightening the compression straps 32C and 32D. Also, as shown in FIG. 7B, the underside of the compression pad structure 32A has a ridge like structure 32G extending about the perimeter of the compression-pad structure to maintain shirts, slacks and other stacked items from shifting around while the compression pad is arranged and fastened down using the buckled straps 32C and 32D. The ridge structure 32G can have a height as short as a ½ inch and may extend up to a few inches in height as desired, and be compressible when the compression pad structure 32A is arranged in its compression state.

Figure 8A:
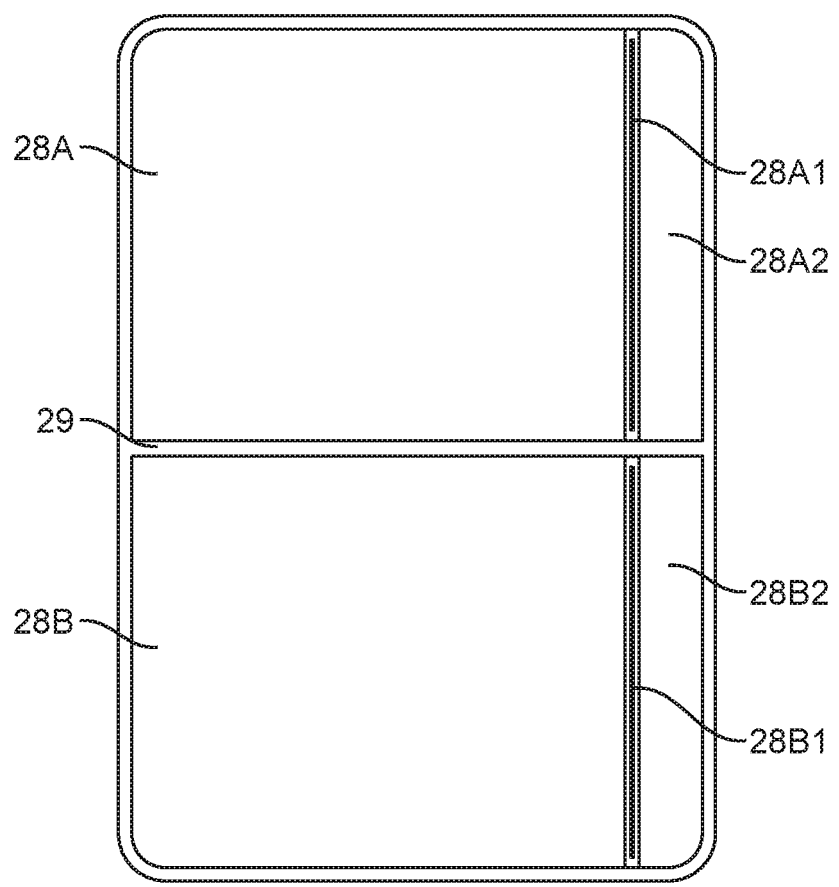
FIG. 8A is a schematic illustration of the rear hard-shell facing side of the interior lining subsystem installed in the interior volume region of the front hard-shell housing portion, showing an upper mesh pocket structure with a zippered access opening for storing clothing and other goods, and a lower mesh pocket structure with a zippered access opening for storing clothing and other goods during travel.

Specification of the Interior Lining Subsystem Installed within the Front Hard-Shell Housing Portion of the Luggage System As shown in FIG. 8A, the front hard-shell facing side of the interior lining subsystem 29 installed in the interior volume region of the front hard-shell housing portion 3A, comprises: an upper mesh pocket structure 28A with a zippered access opening 28A1 for storing clothing and other goods; and a lower mesh pocket structure 28B with a zippered access opening 28B1 for storing clothing and other goods during travel. As shown, in the illustrative embodiment, the zippered access openings 28A1 and 28B1 are offset slightly by a small space from the edge of the lining structure, indicated by 28A2 and 28B2, respectively.

Figure 8B:
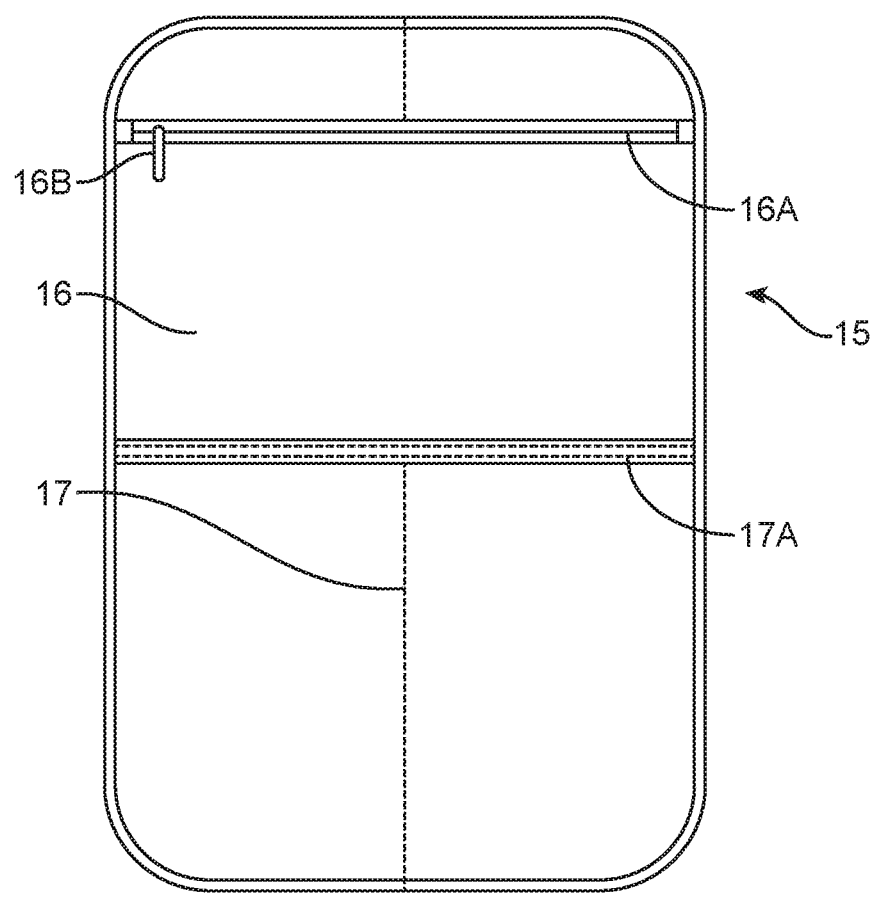
FIG. 8B is a schematic illustration of the front access opening facing side of the interior lining subsystem installed in the interior volume region of the front hard-shell housing portion, showing an upper shallow zippered pocket structure for storing items such a power supplies, memory sticks, pens, and other items, and a lower divided un-zippered mesh pocket structure for storing items such as water bottles, snacks and other others requiring quick access during travel.
Figure 9C:
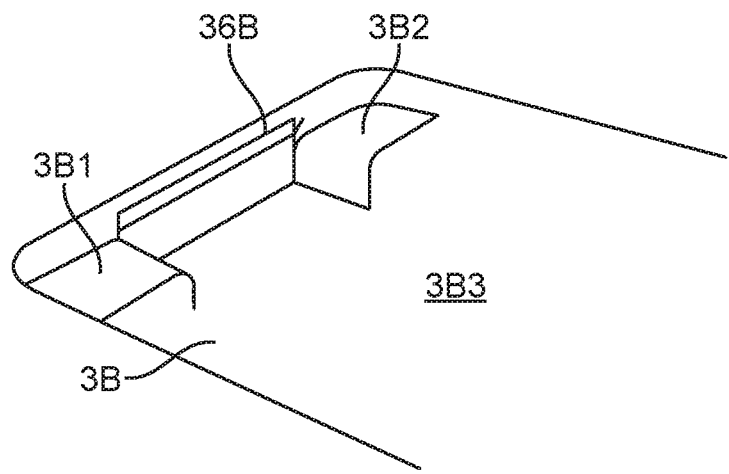
FIG. 9C is a schematic illustration providing a perspective view of a portion of the rear hard-shell housing component, wherein the laundry bag storage pouch is ready to be un-zippered to reveal its pull-out and releasable laundry bag for containing soiled laundry while traveling.
Figure 9D:
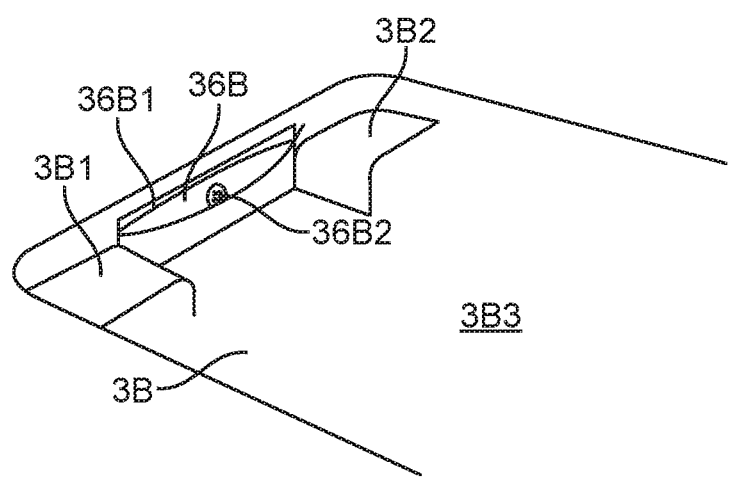
FIG. 9D is a schematic illustration providing a perspective view of a portion of the rear hard-shell housing component, showing the laundry bag storage pouch opened and revealing a button or like structure in the storage pouch to releasable engage the tab formed on the pull-out and releasable laundry bag.
Figure 9E:
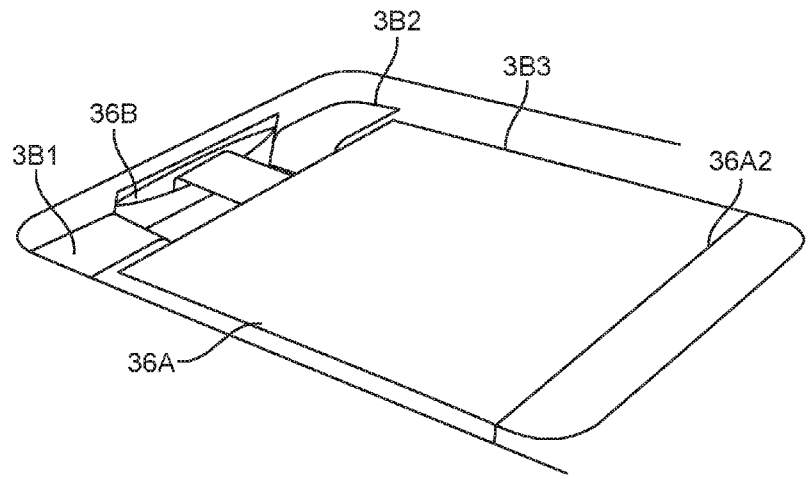
FIG. 9E is a schematic illustration providing a perspective view of a portion of the rear hard-shell housing component, showing the laundry bag storage pouch opened and the tab portion of the pull-out and releasable laundry bag component being releasably connected to the button or like structure in the storage pouch.
Figure 9F:
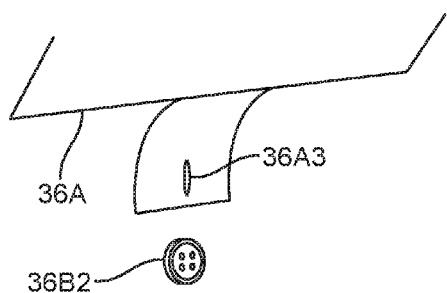
FIGS. 9F and 9G illustrate the buttoning of the tab on the laundry bag being connected to the button in the storage pouch.
Figure 9G:
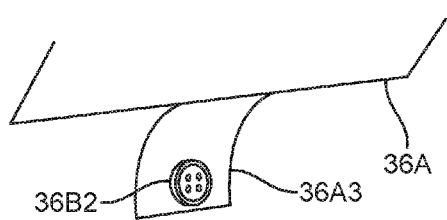

As shown in FIG. 8B, the front access opening facing side of the interior lining subsystem 29 installed in the interior volume region of the front hard-shell housing portion 3A, comprises: a shallow zippered pocket structure 16, having a zippered opening 16A with a zipper pull 16B, for storing items such a as power supplies, memory sticks, pens, and other items; and a divided un-zippered mesh pocket structure 17, having an elastic opening 17A, with divided mesh pockets, for storing items such as water bottles, snacks and other others requiring quick access during travel.

Specification of the Laundry Bag Subsystem Installed within the Rear Hard-Shell Housing Portion of the Luggage System Referring to FIGS. 9A through 9G, the laundry bag subsystem 36 of the present invention will now be described in greater technical detail.

As shown in FIG. 9A, the laundry bag component 36A of the laundry bag subsystem 36 is made from a nylon material sewn together and expandable when filled with soiled clothing through its zippered opening 36A1 shown in the drawings. Preferably, the nylon material will contain air and orders with the zippered laundry bag 36A during travel. The length and width of the laundry bag component 36A will typically be slightly less than the length and width dimensions of the bottom surface of the rear hard-shell housing portion 3B, to allow the laundry bag to be taken out of its zippered storage pouch 36B between the wheel wells 3B1 and 3B2, and unfolded and extended to lie flat on the bottom surface of the hard shell portion 3B3. Then the user fills the laundry bag 36A with soiled clothes during travel and then pulls the zipper pull tag 36A2 and zips up the bag to separate soiled clothes from fresh clean clothing. The user can then stack clean shirts, pants and other garments on the flatly extended laundry bag and then compress the entire stack and laundry bag 36A using the compression pad subsystem 32 described above. When convenient, the user removes the laundry bag component 36A from the luggage system by unbuttoning the button 36B1 sewn into the laundry bag storage pouch 36B and passing through the hole 36A4 in the tab projection 36A3, as shown in FIGS. 9D through 9G. Once detached from the laundry bag storage pouch 36B, the laundry bag 36A containing soiled clothes can be taken to an appropriate location where the clothes can be washed and/or dry cleaned in a conventional manner.

Figure 10A:
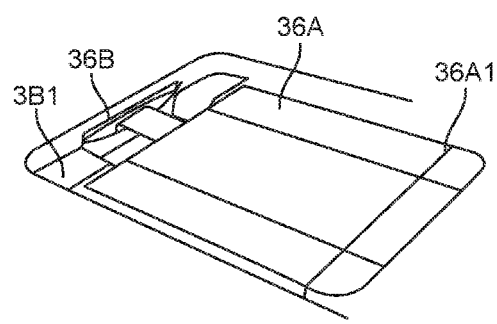
FIGS. 10A, 10B, 10C and 10D illustrate the four steps employed when folding-up, rolling-up and packing away the laundry bag component its zippered storage pouch, starting with the emptied laundry bag rolled out and extended about the bottom of the rear hard-shell housing component, and ending up folded and rolled-up and packed away in the zippered laundry bag storage compartment.
Figure 10B:
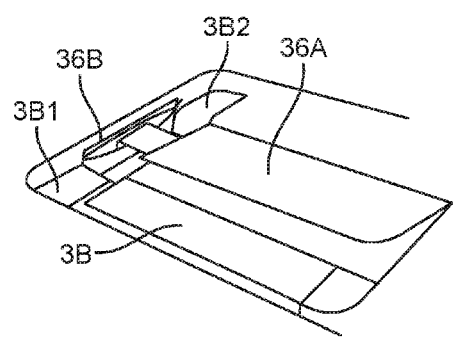
Figure 10C:
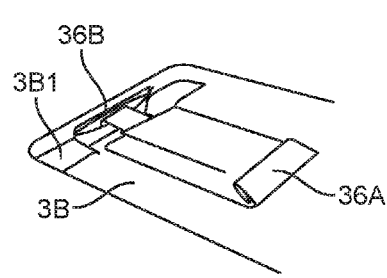
Figure 10D:
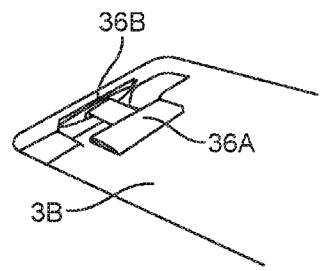
Figure 11A:
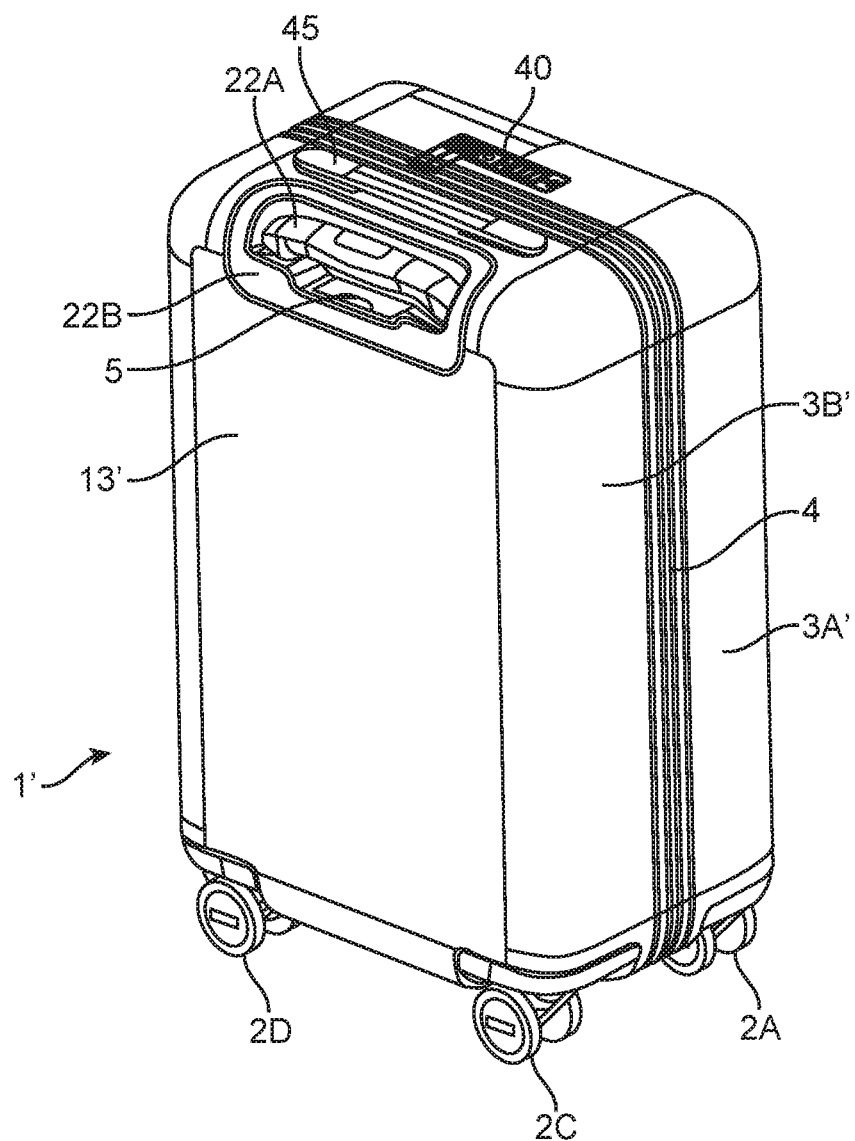
FIG. 11A is a first front perspective view of a second illustrative embodiment of the hard-shell luggage system of the present invention, wherein the hard-shell luggage system is positioned on its set of four spinner wheels mounted in the four corners of the luggage system, wherein its front and rear hard-shell housing portions are arranged in a closed configuration and sealed using its integrated zipper mechanism, and wherein its telescopic-handle assembly is arranged in its retracted configuration over the hinged cover panel concealing its USB DC electrical power supply ports and DC power recharging port.
Figure 11B:
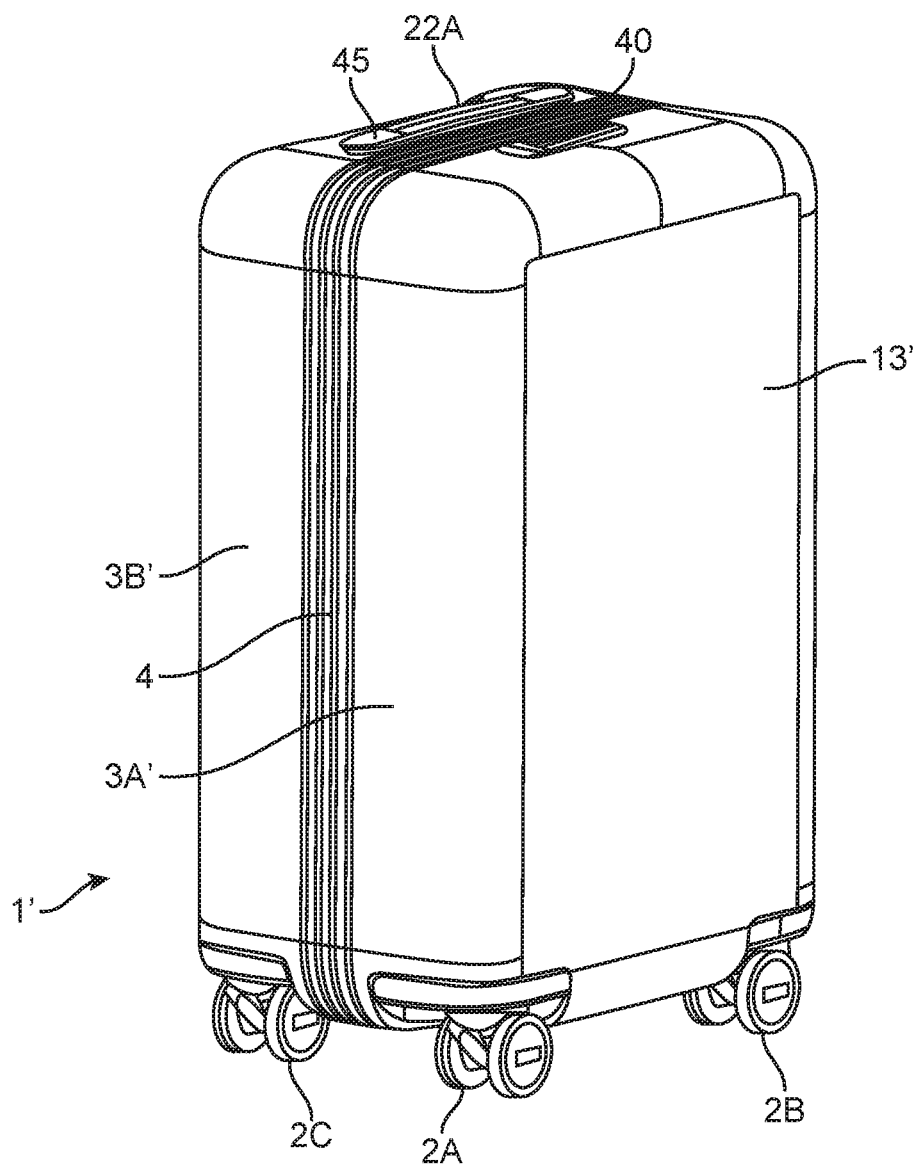
FIG. 11B is a second front perspective view of the second illustrative embodiment of the hard-shell luggage system shown in FIG. 11A, wherein the hard-shell luggage system is positioned on its set of four spinner wheels mounted in the four corners of the luggage system, wherein its front and second hard-shell housing portions are arranged in a closed configuration and sealed using its integrated zipper mechanism, and wherein its telescopic-handle assembly is arranged in its retracted configuration over the hinged cover panel concealing its USB DC electrical power supply ports and DC power recharging port.
Figure 11C:
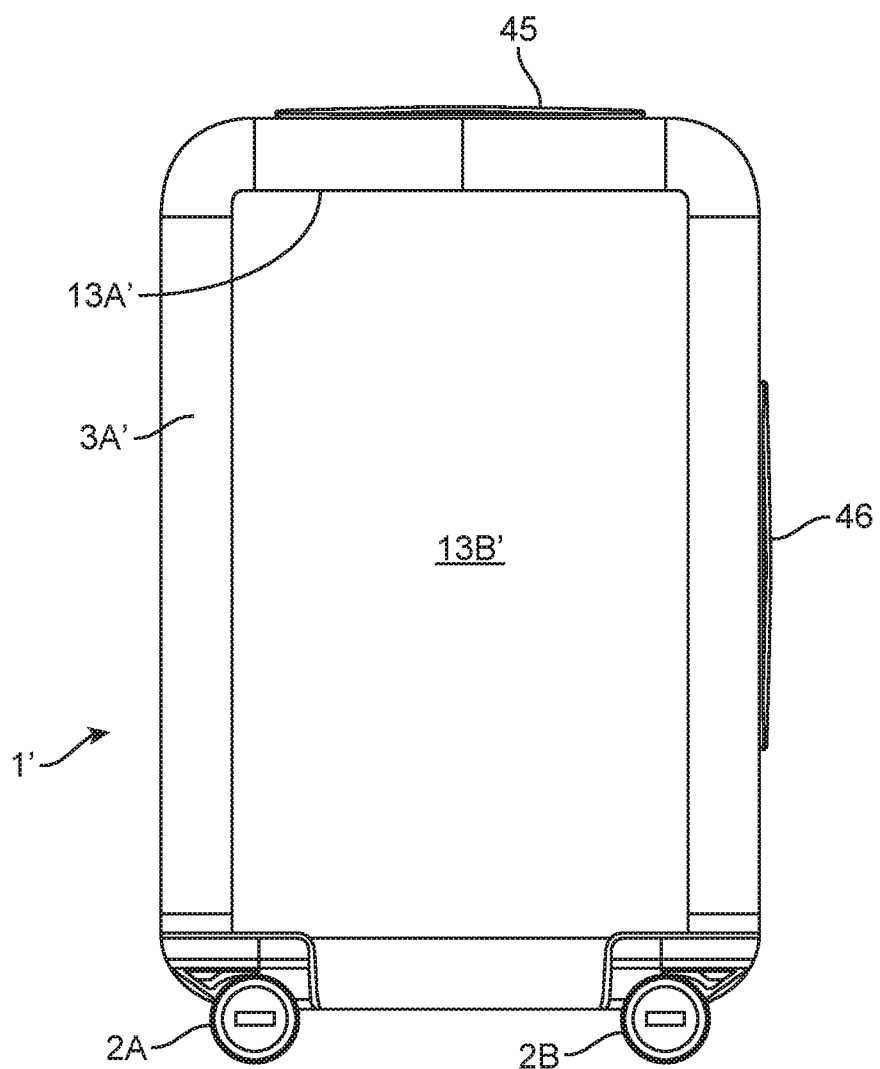
FIG. 11C is an elevated front view of the second illustrative embodiment of the hard-shell luggage system shown in FIG. 11A, wherein the hard-shell luggage system is positioned on its set of four spinner wheels mounted in the four corners of the luggage system, wherein its front and second hard-shell housing portions are arranged in a closed configuration and sealed using its integrated zipper mechanism, and wherein its telescopic-handle assembly is arranged in its retracted configuration over the hinged cover panel concealing its USB DC electrical power supply ports and DC power recharging port.
Figure 11D:
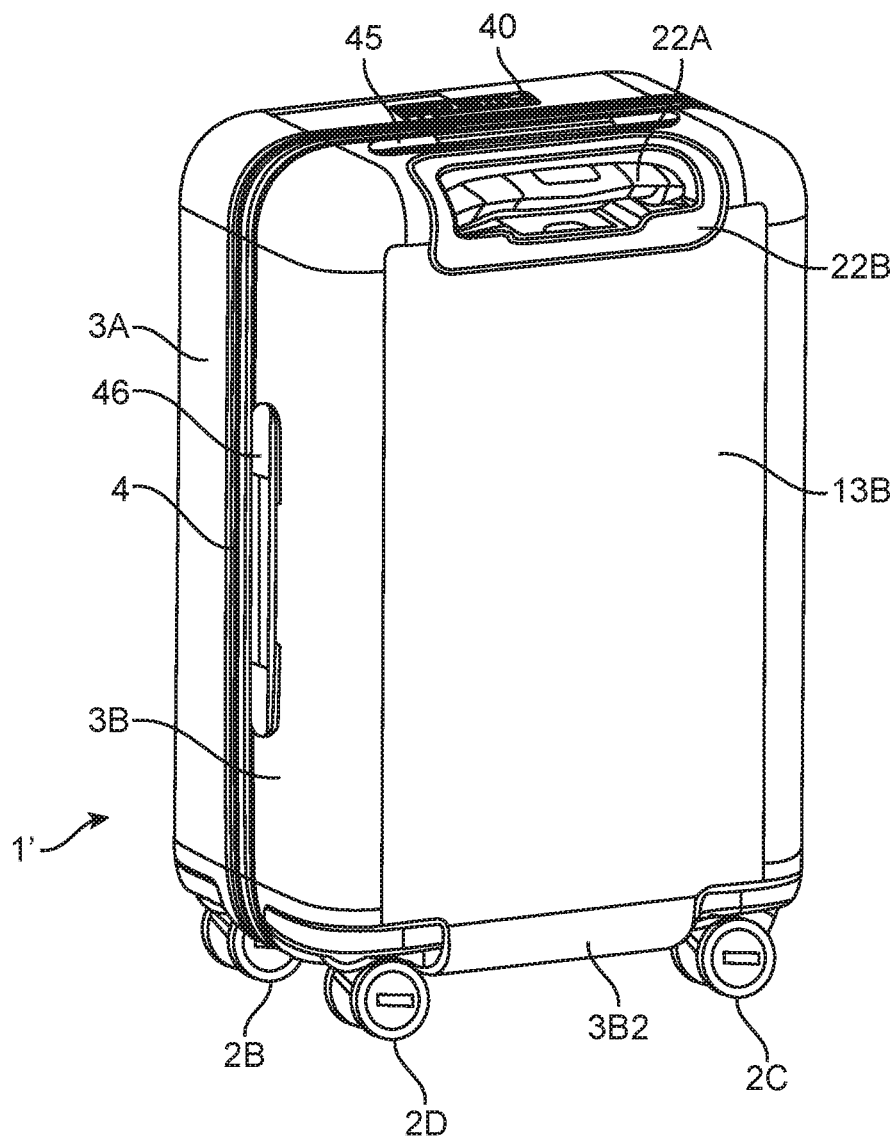
FIG. 11D is a rear perspective view of the second illustrative embodiment of the hard-shell luggage system shown in FIG. 11A, wherein the hard-shell luggage system is positioned on its set of four spinner wheels mounted in the four corners of the luggage system, wherein its front and rear hard-shell housing portions are arranged in a closed configuration and sealed using its integrated zipper mechanism, and wherein its telescopic-handle assembly is arranged in its retracted configuration over the hinged cover panel concealing its USB DC electrical power supply ports and DC power recharging port.
Figure 11E:
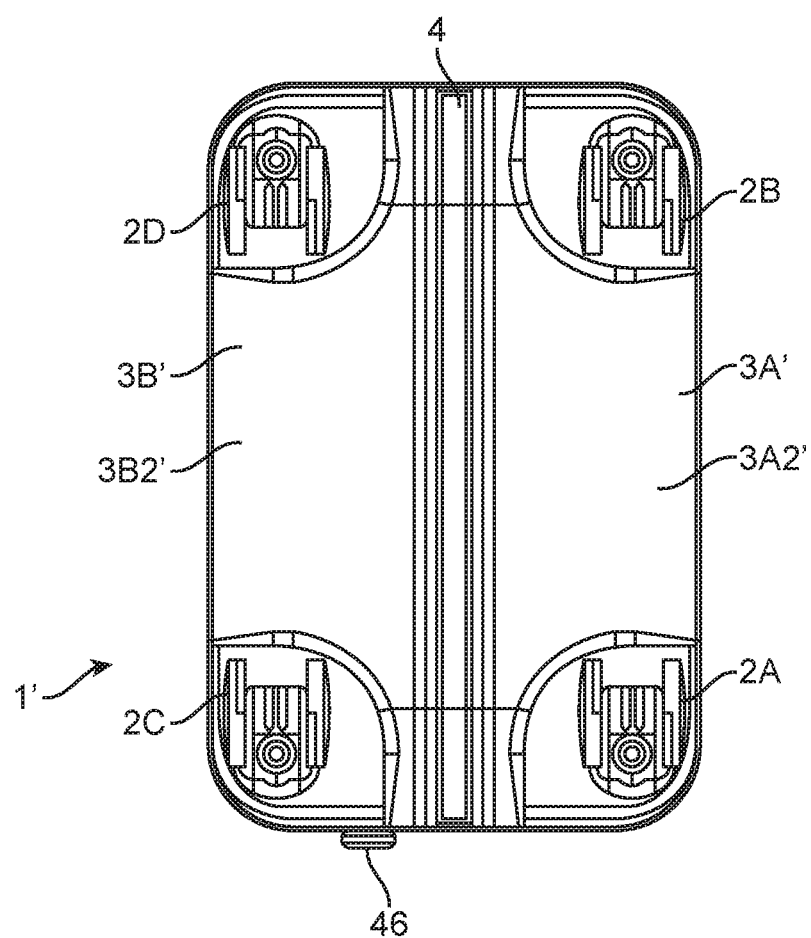
FIG. 11E is a bottom view of the second illustrative embodiment of the hard-shell luggage system shown in FIG. 11A, wherein the hard-shell luggage system is positioned on top surface, wherein its front and rear hard-shell housing portions are arranged in a closed configuration and sealed using its integrated zipper mechanism, and wherein its telescopic-handle assembly is arranged in its retracted configuration over the hinged cover panel concealing its USB DC electrical power supply ports and DC power recharging port.
Figure 12A:
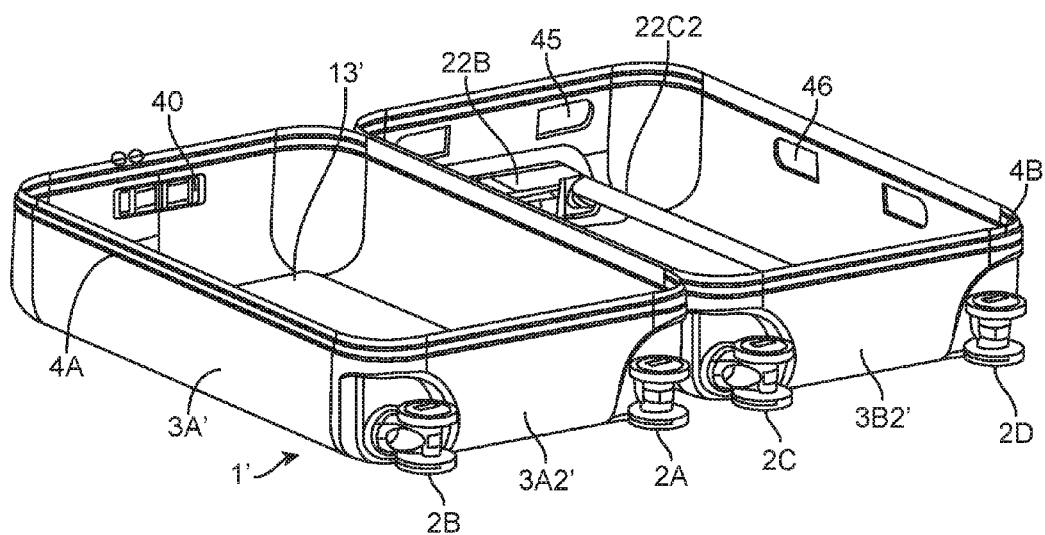
FIG. 12A is a first perspective view of the second illustrative embodiment of the hard-shell luggage system shown in FIG. 11A, positioned on the front and rear surfaces of the first and second hard-shell housing portions, respectively, and looking inside into the interior volume of the luggage system, wherein its front and rear hard-shell housing portions are arranged in an open configuration with its integrated zipper mechanism arranged in an unzipped configuration, with the interior lining structures removed from both the interior storage volumetric regions of the front and rear hard-shell housing portions of the luggage system for purposes of illustration, wherein its telescopic-handle assembly is arranged in its retracted configuration with the power port cover panel closed to conceal both its USB DC electrical power supply ports, and DC power recharging port.
Figure 12B:
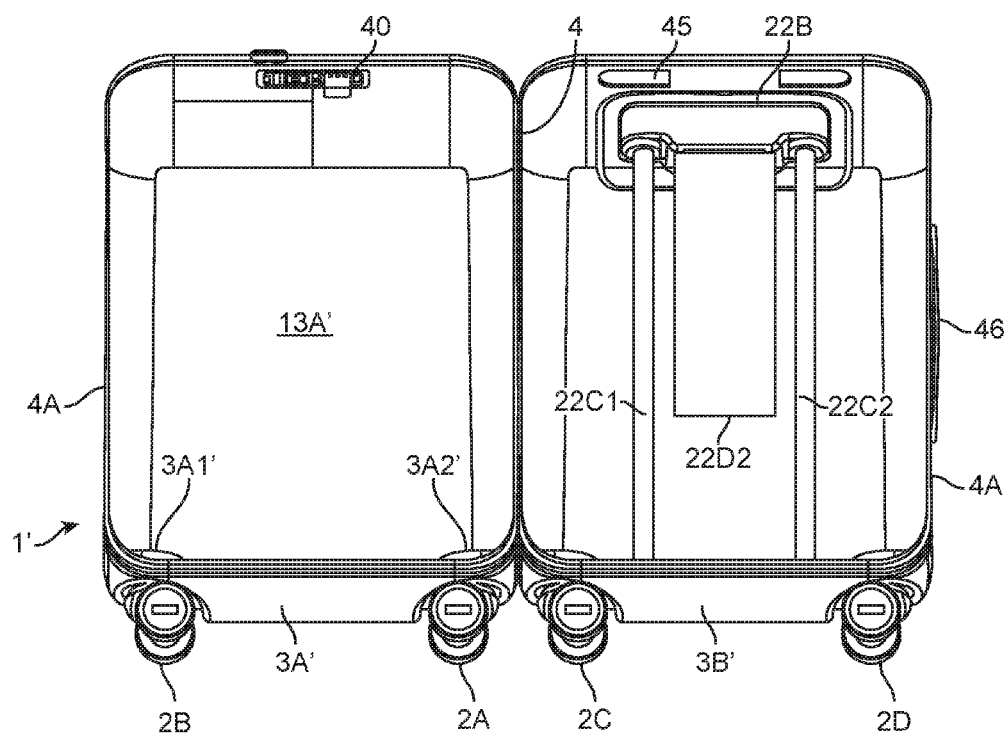
FIG. 12B is a second perspective view of the second illustrative embodiment of the hard-shell luggage system shown in FIG. 11A, showing the components from different perspectives.
Figures 1, 12C:
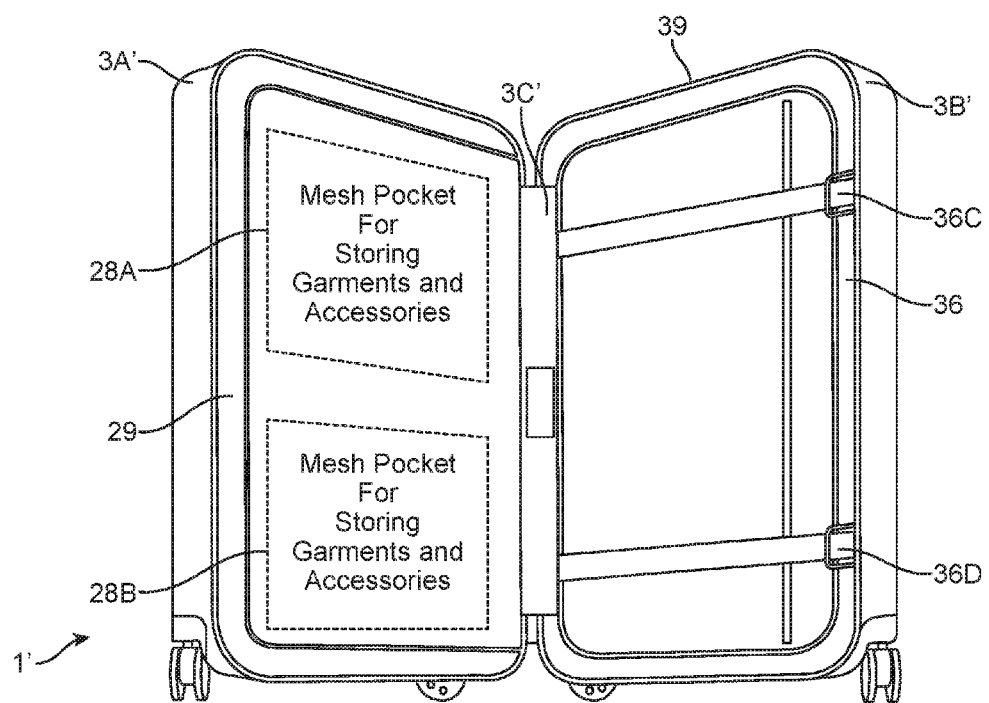
Figures 2, 12C:
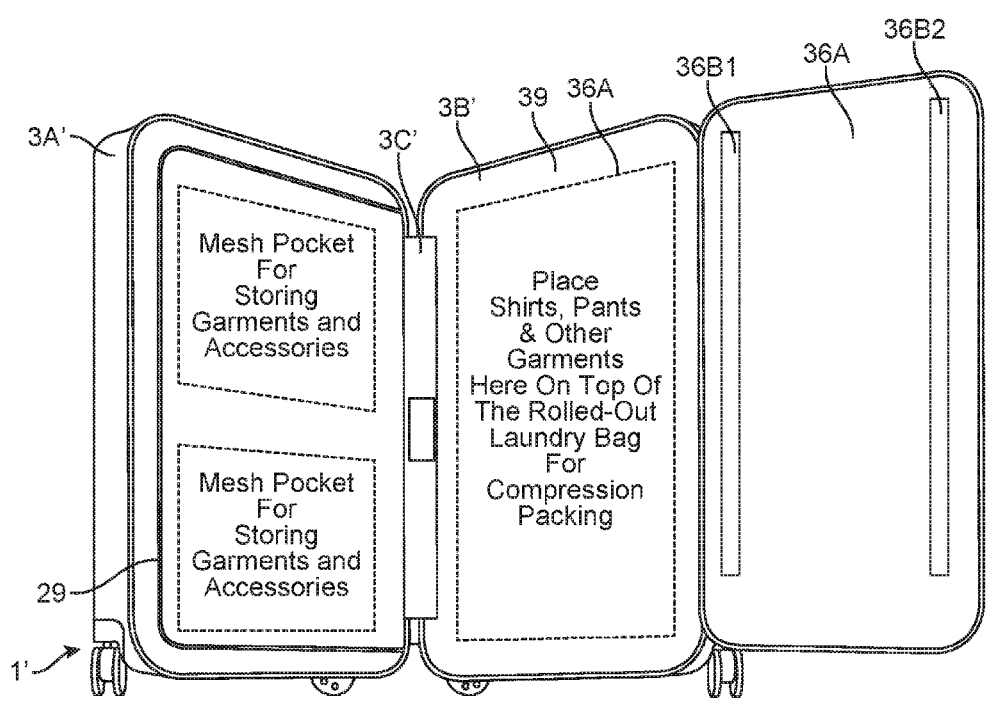
Figure 13A:
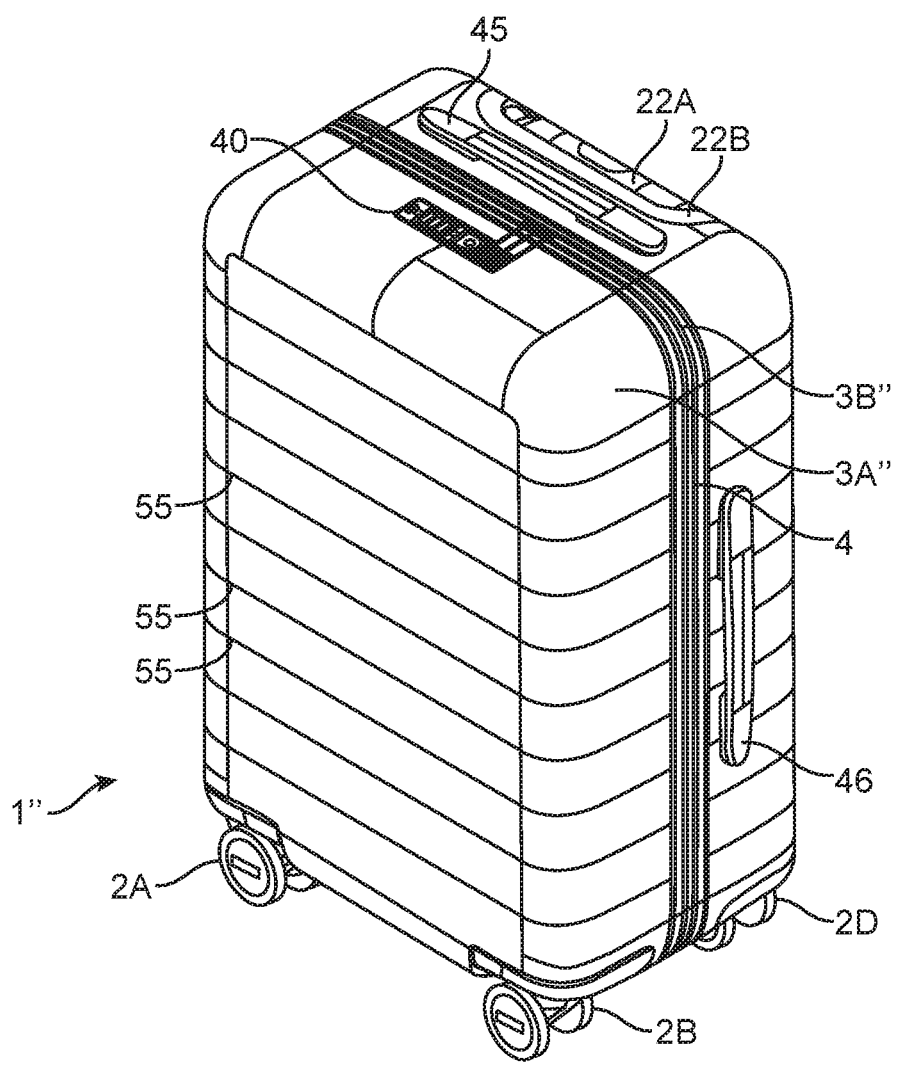
FIG. 13A is a front perspective view of the third illustrative embodiment of the hard-shell luggage system of the present invention, wherein the hard-shell luggage system is positioned on its set of four spinner wheels mounted in the four corners of the luggage system, wherein its front and rear hard-shell housing portions are arranged in an closed configuration with its integrated zipper mechanism arranged in a zipped configuration, wherein its telescopic-handle assembly is arranged in its retracted configuration with the power port cover panel closed to conceal both its USB DC electrical power supply ports, and DC power recharging port, and wherein the front and rear hard-shell housing portions of the luggage system have a series of horizontally-formed, evenly spaced-apart ridges (i.e. corrugations) formed around the circumference of the front and rear hard-shell housing portions molded from durable plastic material, and up and down along the longitudinal axis of the luggage system, as shown, to provide added strength to the housing portions and create an attractive business-like appearance for its user.
Figure 13B:
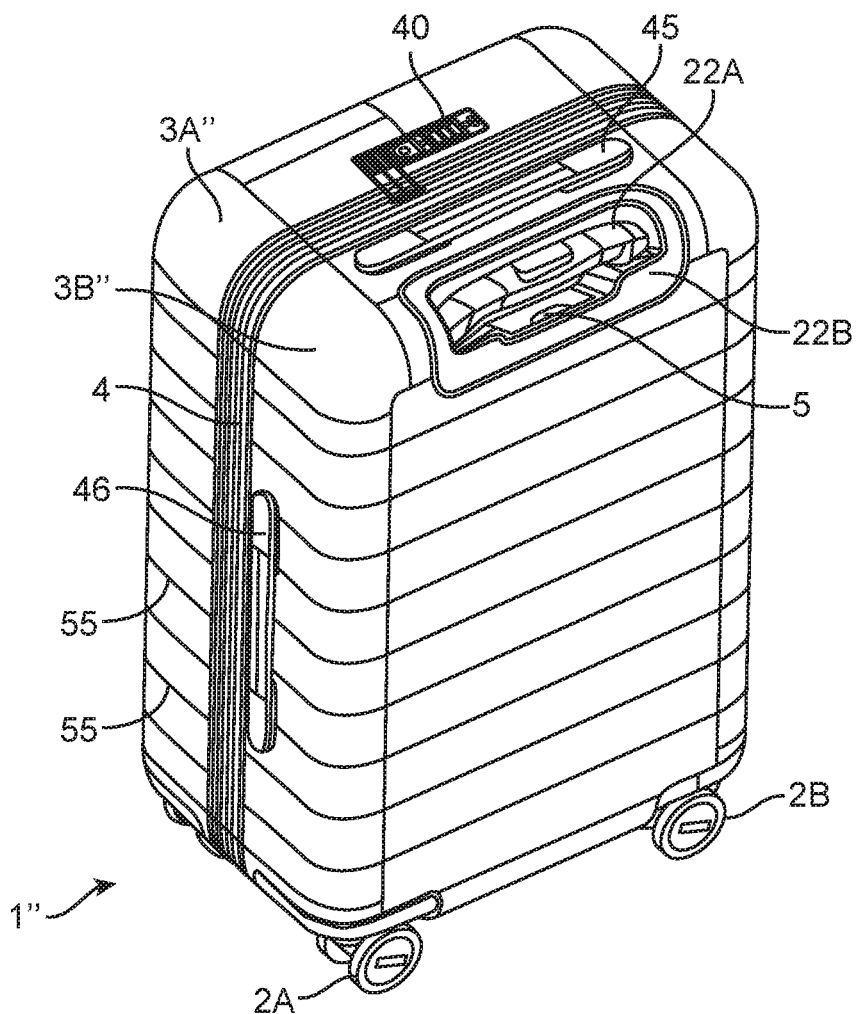
FIG. 13B is a rear perspective view of the third illustrative embodiment of the hard-shell luggage system of the present invention shown in FIG. 13A, showing the components of the system from a different perspective.
Figure 13C:
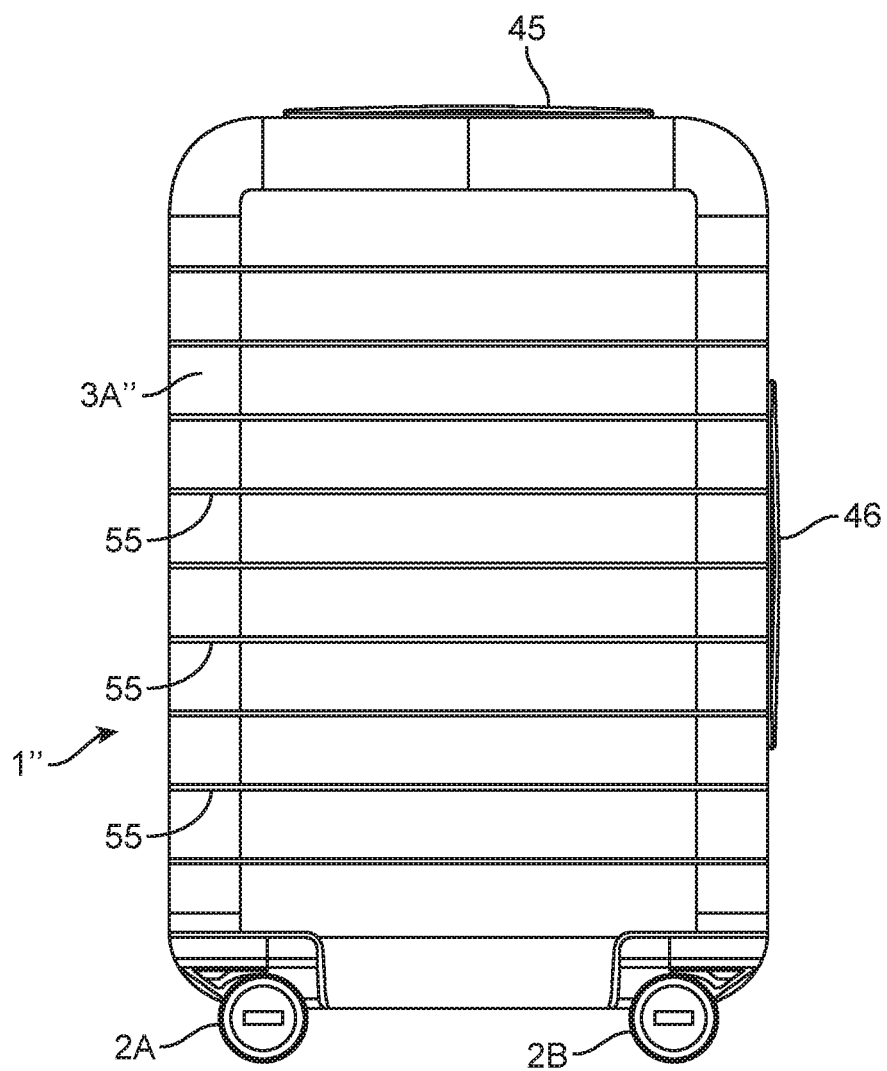
FIG. 13C is an elevated front view of the third illustrative embodiment of the hard-shell luggage system of the present invention shown in FIGS. 13A through 13B, showing the components of the system from a different perspective.
Figure 13D:
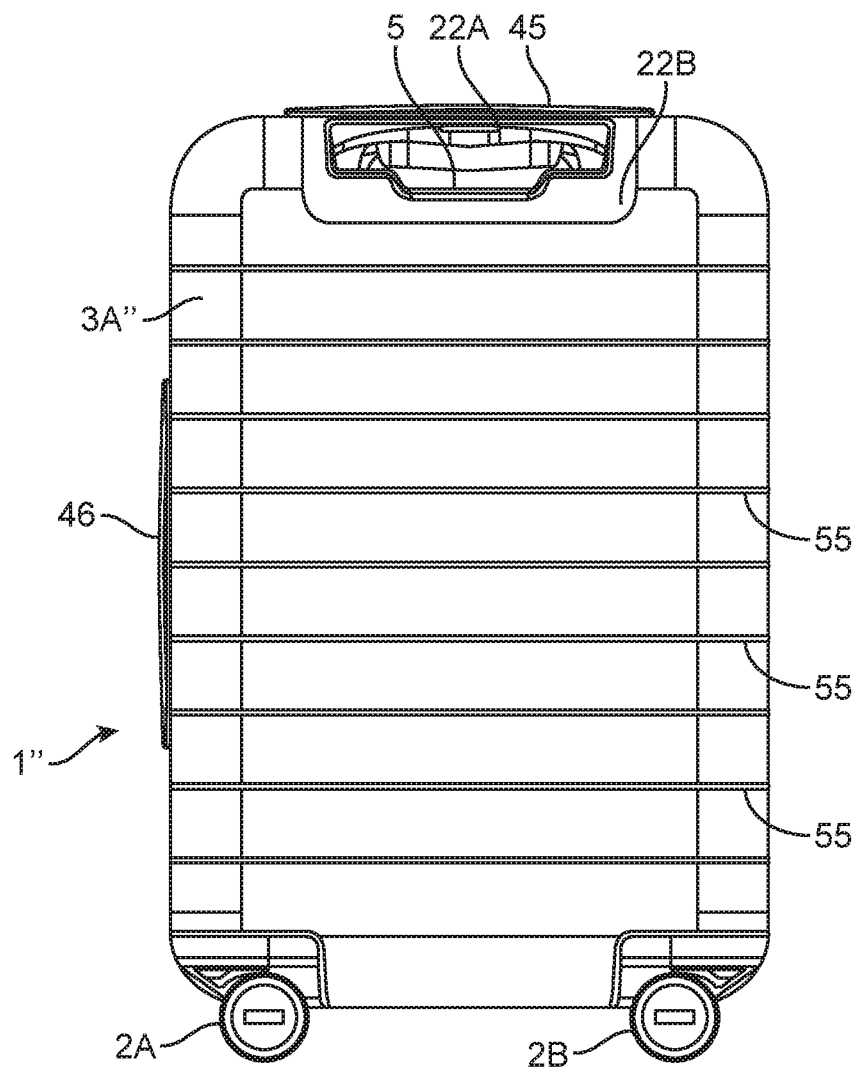
FIG. 13D is an elevated rear view of the third illustrative embodiment of the hard-shell luggage system of the present invention shown in FIGS. 13A through 13C showing the components of the system from a different perspective.
Figure 13E:
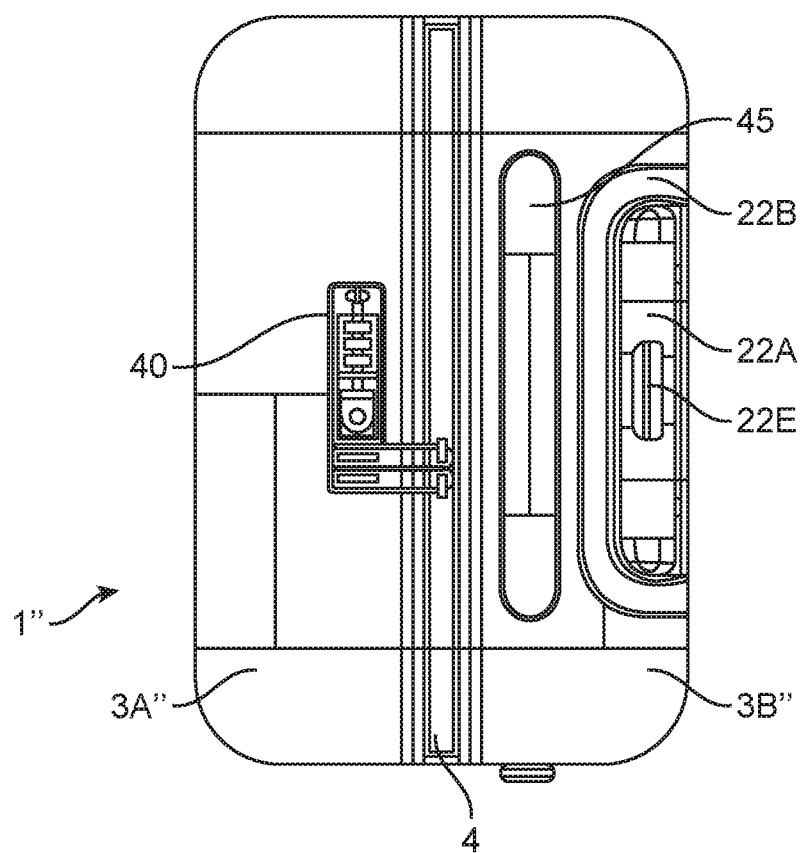
FIG. 13E is a top view of the third illustrative embodiment of the hard-shell luggage system of the present invention shown in FIGS. 13A through 13D, showing the components of the system from a different perspective.
Figure 13F:
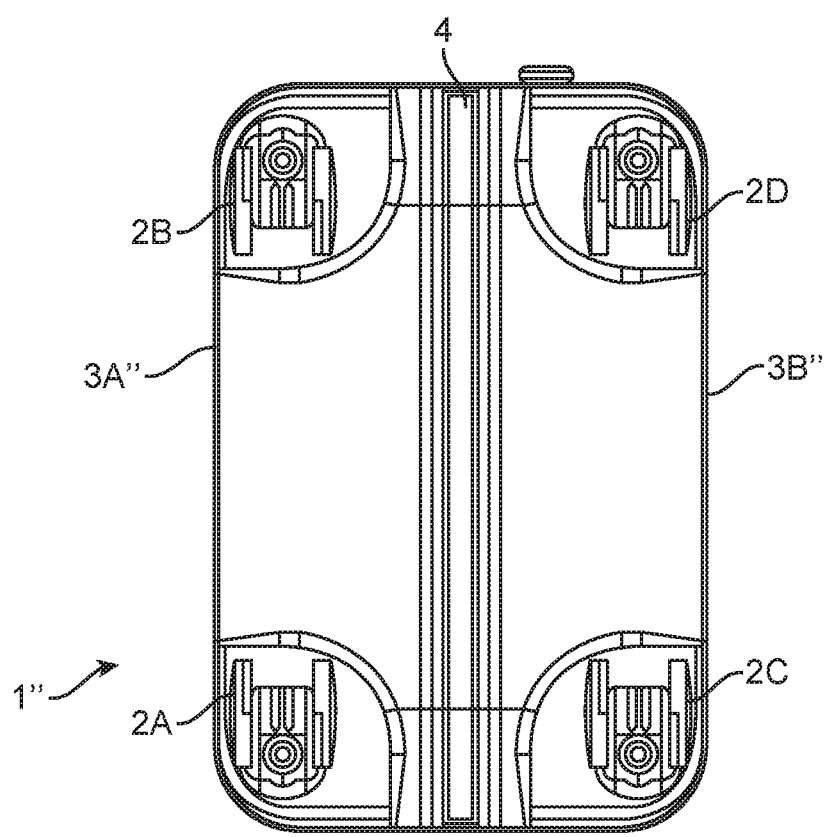
FIG. 13F is a bottom view of the third illustrative embodiment of the hard-shell luggage system of the present invention shown in FIGS. 13A through 13E, showing the components of the system from a different perspective.
Figure 13G:
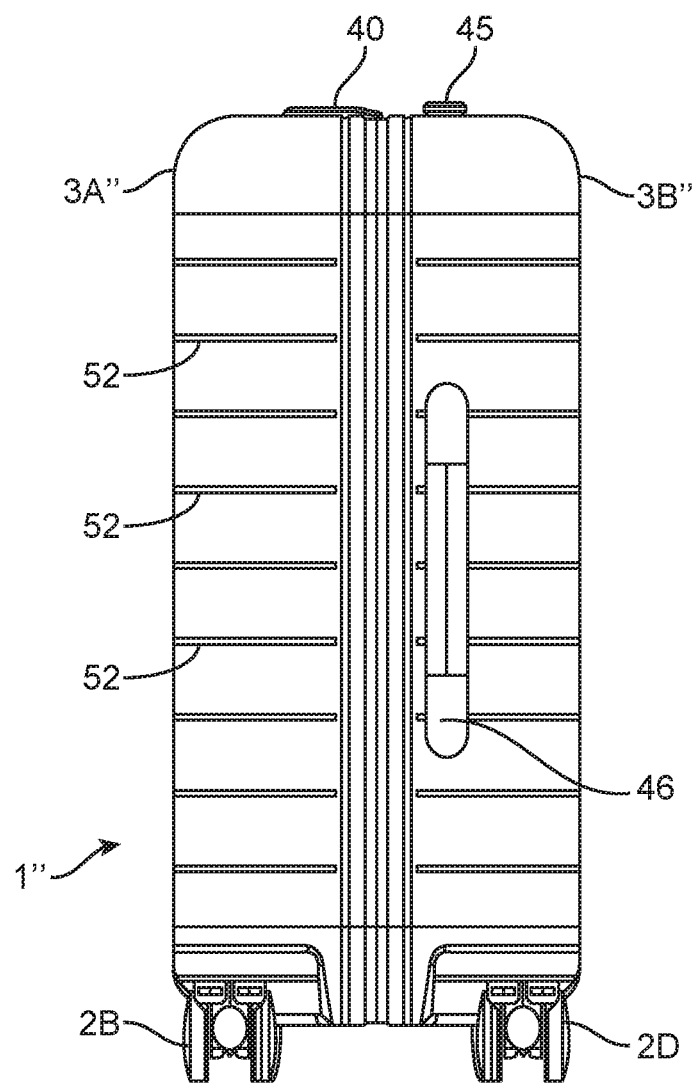
FIG. 13G is a first elevated side view of the third illustrative embodiment of the hard-shell luggage system of the present invention shown in FIGS. 13A through 13F, showing the components of the system from a different perspective.
Figure 13H:
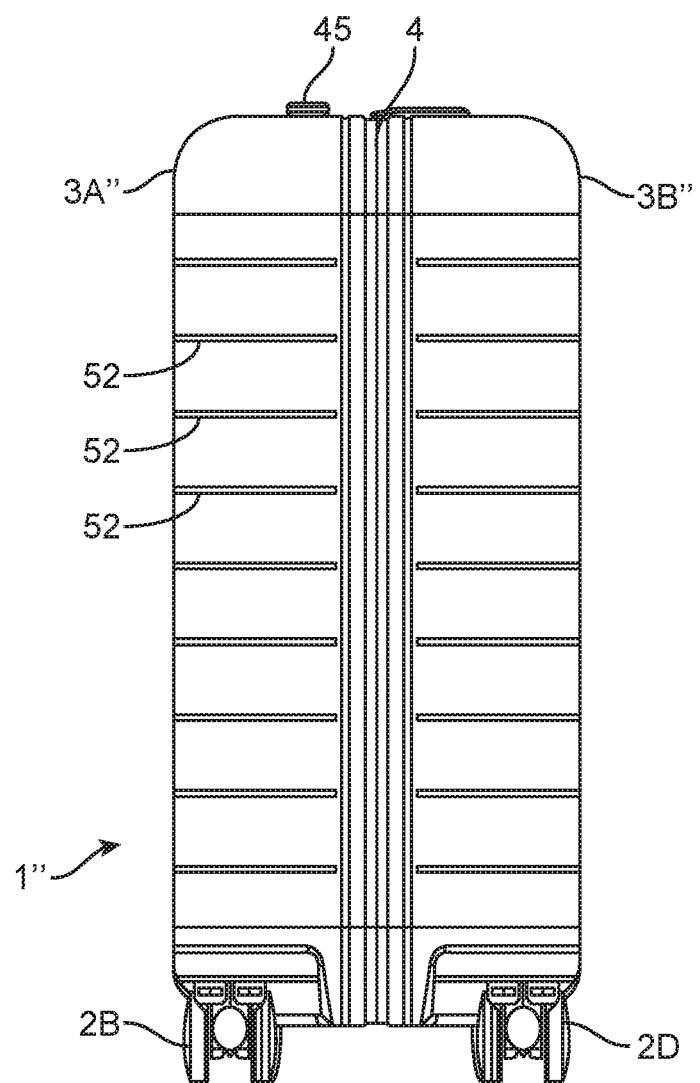
FIG. 13H is a second elevated side view of the third illustrative embodiment of the hard-shell luggage system of the present invention shown in FIG. 13A, showing the components of the system from a different perspective.

Once a user has emptied the laundry bag component 36A of soiled clothes collected during travel, typically the user will perform the following operations: (i) arrange the laundry bag 36A in a flat fashion as illustrated in FIG. 10A; (ii) then fold it up as illustrated in FIG. 10B; (iii) then roll it up as shown in FIG. 10C; and (iv) finally, stuff the folded and rolled up laundry bag 36A into the laundry bag storage pouch 36B and zipper it up as illustrated in FIG. 10D. In this state, the compression pad system 32 of the present invention will be used initially during packing operations, with only fresh clean shirts, pants and other garments, and the laundry bag subsystem 36 will be deployed and used in conjunction with the compression pad subsystem 32 as soiled clothes are produced during travel.

Specification of the Carry-on/Check-in Luggage System of the Second Illustrative Embodiment of the Present Invention Referring to FIGS. 11A through 12B, the carry-on/check-in luggage system of the second illustrative embodiment of the present invention will now be described in detail.

In all respects, the luggage system 1' of the second illustrative is similar to the luggage system 1 of the first illustrative embodiment with the following exceptions, specifically: the luggage system of the second illustrative embodiment 1' does not support a front access opening 19 it does not employ a flexible front cover flap panel structure 13 as used in the first illustrative embodiment, and it does not employ a second TSA-approved combination lock assembly 21. Instead, the hinge structure employed in the second illustrative embodiment 1' is realized within the dual-zipper system 4 as illustrated in FIGS. 11B, 11E, 12A and 12B. In all other respects, the luggage system of the second illustrative embodiment '1 is similar to the luggage system of the first illustrative embodiment 1.

Specification of the Carry-on/Check-in Luggage System of the Third Illustrative Embodiment of the Present Invention Referring to FIGS. 13A through 13F, the carry-on/check-in luggage system of the third illustrative embodiment 1" of the present invention will now be described in detail below.

In all respects, the luggage system 1" of the third illustrative embodiment is similar to the luggage system of the second illustrative embodiment 1' with the following exceptions. Specifically, the front and rear hard-shell housing portions 3A" and 3B" of the luggage system 1" has a series of horizontally-formed, evenly spaced-apart ridges (i.e. corrugations) 52 formed around the circumference of the front and rear hard-shell housing portions molded from durable plastic material, and up and down along the longitudinal axis of the luggage system 1", as shown, to provide added strength to the housing portions and create an attractive business-like appearance for its user. In all other significant respects, it is similar to the luggage system of the second illustrative embodiment.

Figure 14A:
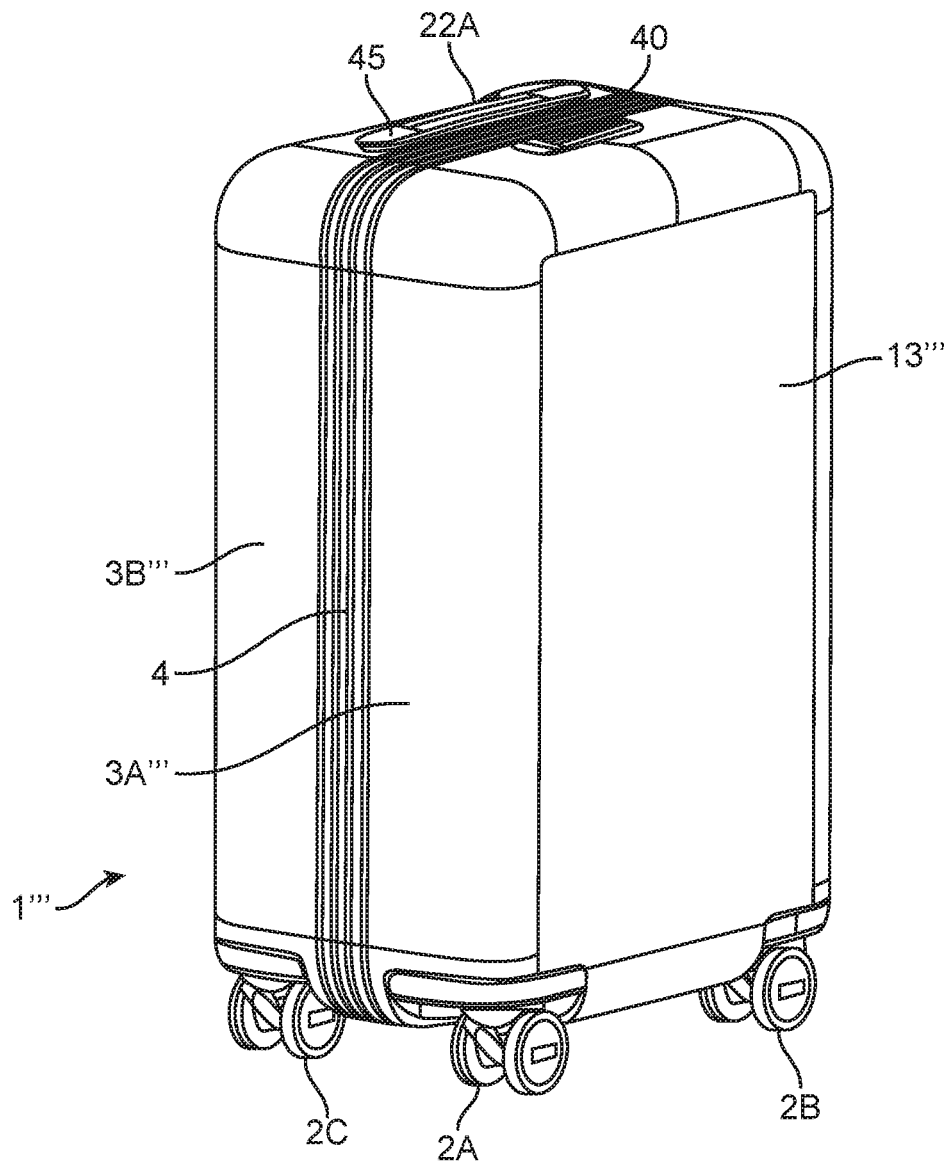
FIG. 14A is a front perspective view of a fourth illustrative embodiment of the hard-shell luggage system of the present invention, wherein the hard-shell luggage system is positioned on its set of four spinner wheels mounted in the four corners of the luggage system, wherein the front cover flap panel is shown configured to cover and close off the front access opening formed in the front hard-shell housing portion and its front and rear hard-shell housing portions are arranged in a closed configuration and sealed using its integrated zipper mechanism, and wherein its telescopic-handle assembly is arranged in its protracted configuration over the hinged power port cover panel concealing its USB DC electrical power supply ports, and DC power recharging port.
Figure 14B:
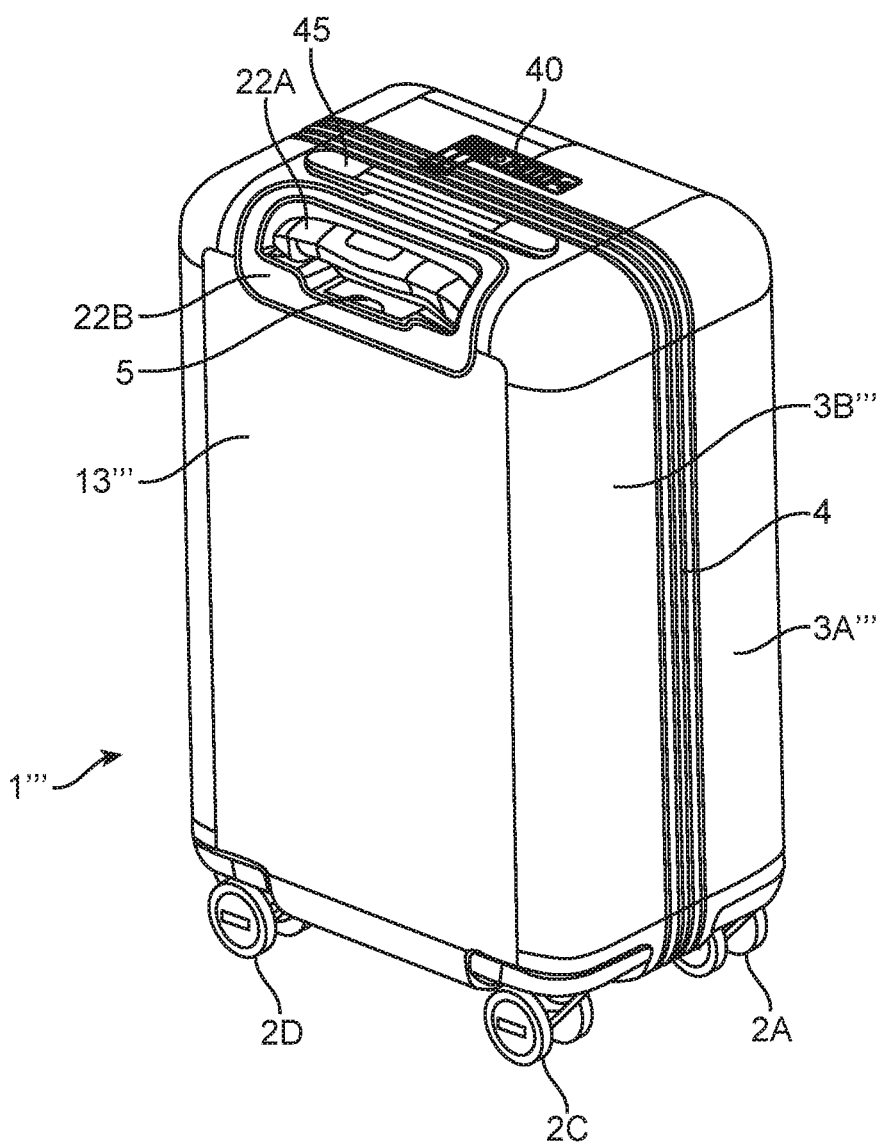
FIG. 14B is a rear perspective view of a fourth illustrative embodiment of the hard-shell luggage system of the present invention, wherein the front cover flap panel is shown configured to cover and close off the front access opening formed in the front hard-shell housing portion and its front and rear hard-shell housing portions are arranged in a closed configuration and sealed using its integrated zipper mechanism, and wherein its telescopic-handle assembly is arranged in its protracted configuration over the hinged power port cover panel concealing its USB DC electrical power supply ports, and DC power recharging port.
Figure 14C:
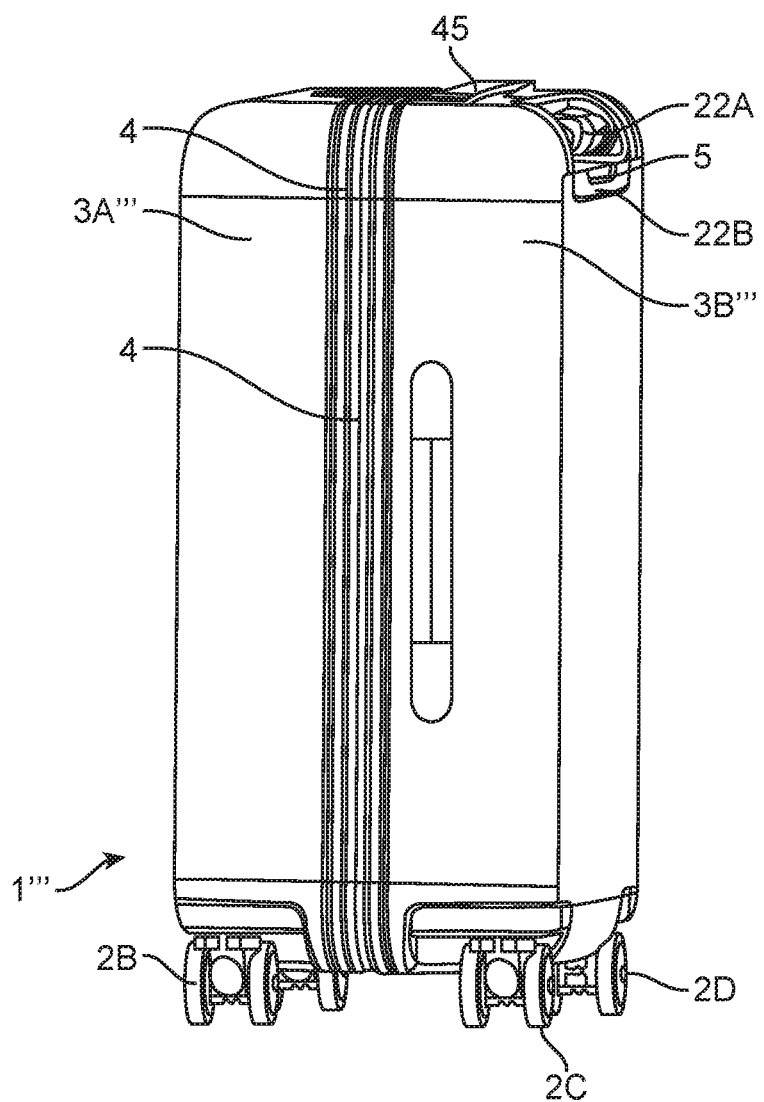
FIG. 14C is a side perspective view of the fourth illustrative embodiment of the hard-shell luggage system shown in FIGS. 14A and 14B.
Figure 14D:
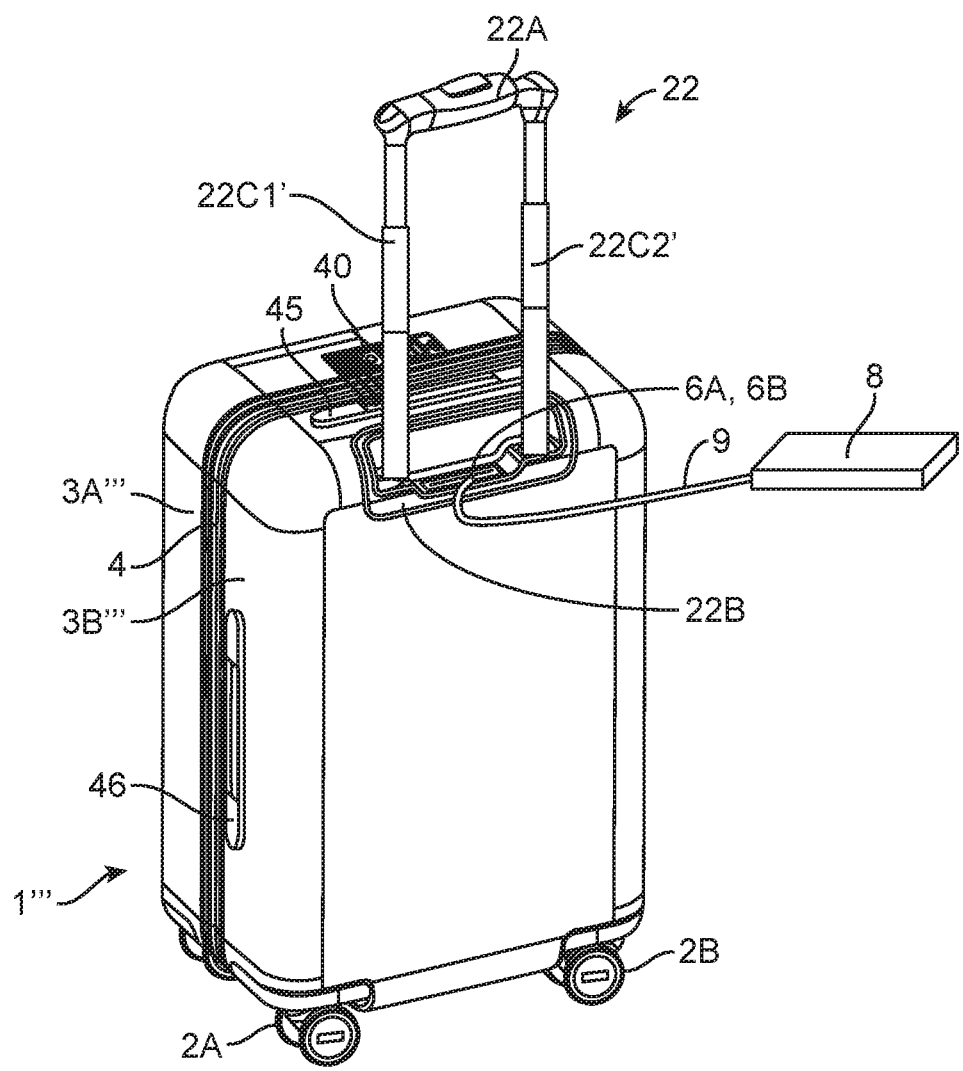
FIG. 14D is a rear perspective view of the fourth illustrative embodiment of the hard-shell luggage system shown in FIGS. 14A through 14C, wherein the front cover flap panel is configured to cover and close off the front access opening formed in the front hard-shell housing portion and its front and rear hard-shell housing portions are arranged in a closed configuration and sealed using its integrated zipper mechanism, wherein its telescopic-handle assembly is arranged in its protracted configuration with the hinged power port cover panel opened to reveal both its USB DC electrical power supply ports and DC power recharging port of the present invention, and wherein a mobile smartphone (e.g. Apple iPhone device) is being charged with electrical power being delivered from its USB DC power port via a USB cable connected between the phone and the USB DC power port.
Figure 14E:
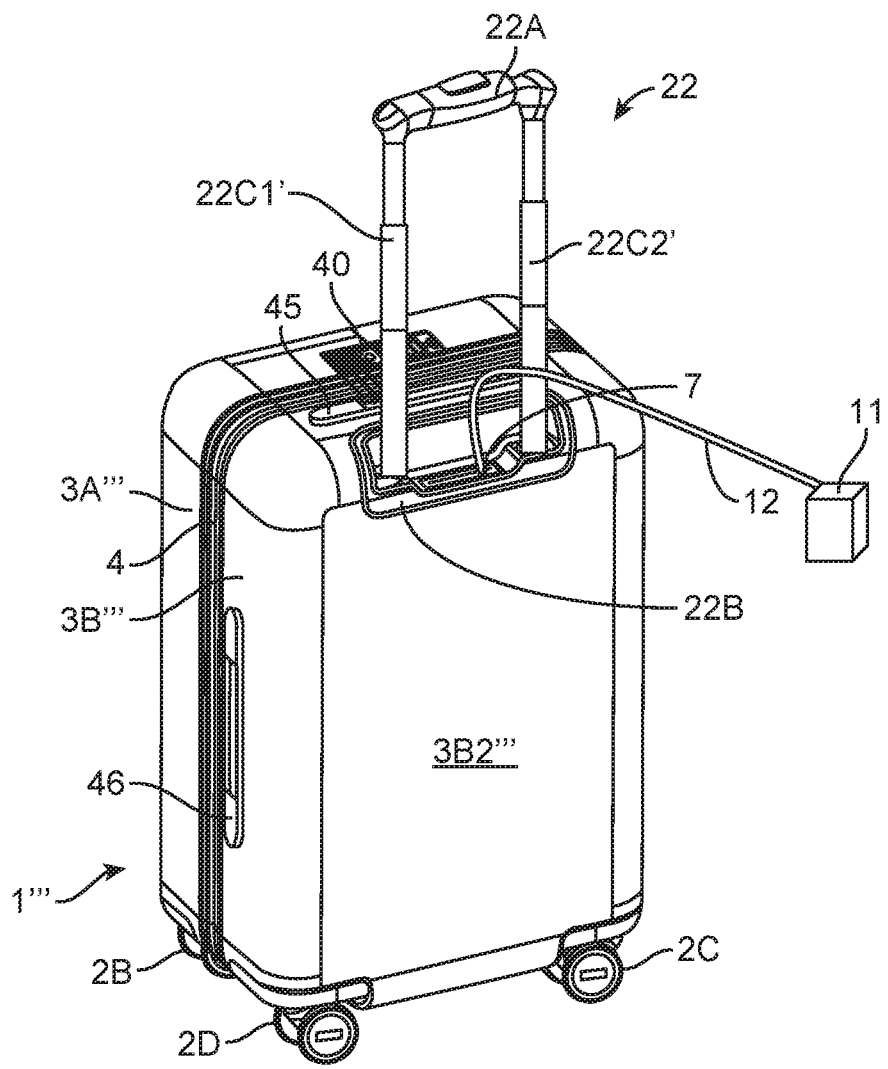
FIG. 14E is a rear perspective view of the fourth illustrative embodiment of the hard-shell luggage system shown in FIGS. 14A through 14D, wherein the front cover flap panel is shown configured to cover and close off the front access opening formed in the front hard-shell housing portion and its front and rear hard-shell housing portions are arranged in a closed configuration and sealed using its integrated zipper mechanism, wherein its telescopic-handle assembly is arranged in its protracted configuration with the power port cover panel opened to reveal both its USB DC electrical power supply ports, and DC power recharging port of the present invention, and wherein the onboard rechargeable DC battery module is being recharged with electrical power being delivered from an AC/DC power adapter supplying DC power to the recharge power port via a USB cable connected between the DC recharge port and the AC/DC power adapter.
Figure 14F:
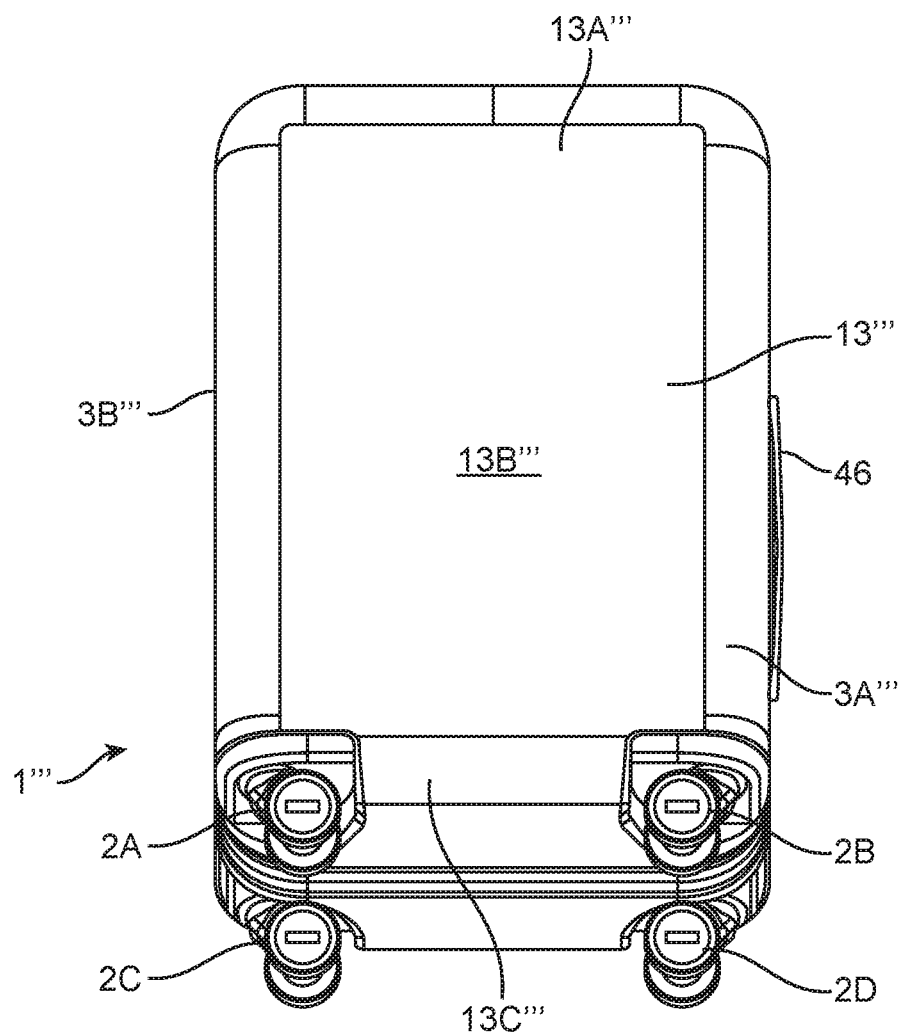
FIG. 14F is a bottom front perspective view of the fourth illustrative embodiment of the hard-shell luggage system shown in FIGS. 14A through 14E, wherein the front cover flap panel is shown hinged to the bottom of the front hard-case housing portion and configured to cover and close off the front access opening formed in the front hard-shell housing portion and its front and rear hard-shell housing portions are arranged in a closed configuration and sealed using its integrated zipper mechanism.
Figure 14G:
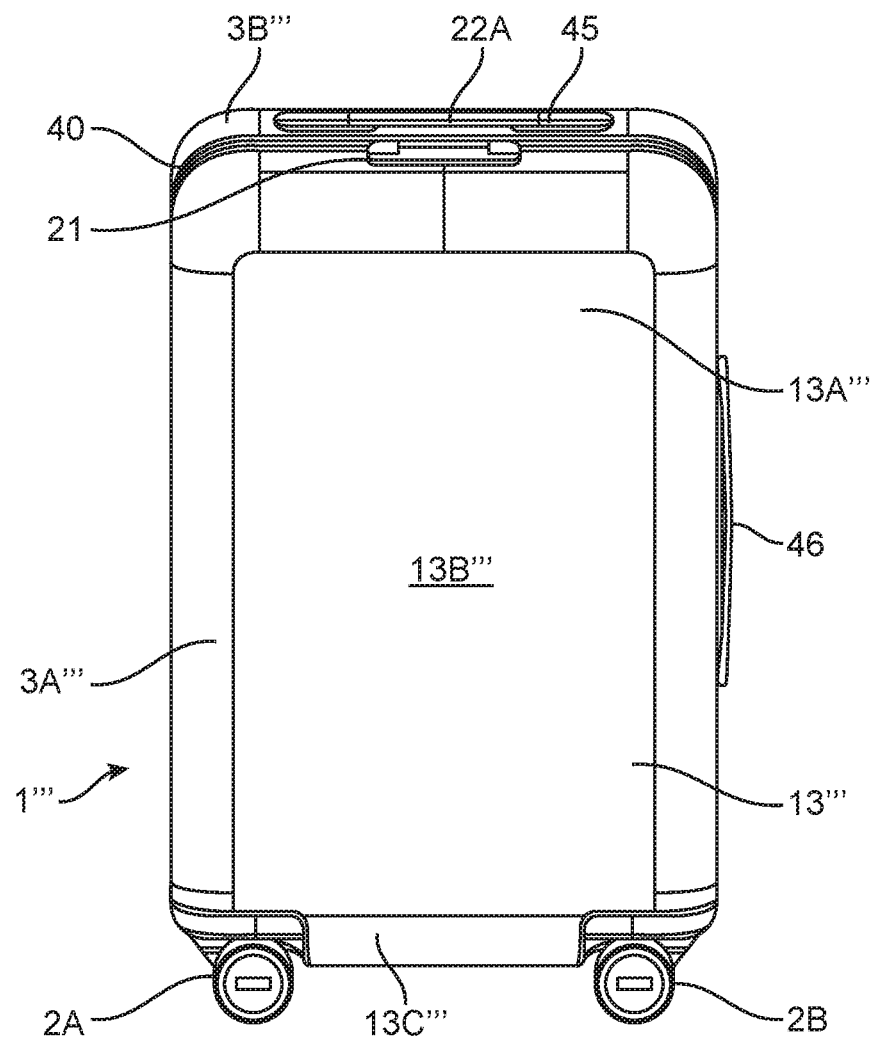
FIG. 14G is a front perspective view of the fourth illustrative embodiment of the hard-shell luggage system shown in FIGS. 14A through 14F, wherein the front cover flap panel is shown hinged to the bottom of the front hard-case housing portion and configured to cover and close off the front access opening formed in the front hard-shell housing portion, and its front and rear hard-shell housing portions are arranged in a closed configuration and sealed using its integrated zipper mechanism.

Specification of the Carry-on/Check-in Luggage System of the Fourth Illustrative Embodiment of the Present Invention Referring to FIGS. 14A through 15B2, the carry-on/check-in luggage system of the fourth illustrative embodiment 1''' of the present invention will now be described in detail below.

In all respects, the luggage system 1''' of the fourth illustrative embodiment is similar to the luggage system of the second and third illustrative embodiments 1' and 1" with the following exceptions. Specifically, the front cover panel 13''' in the fourth illustrative embodiment is mounted to the bottom surface of the front hard-shell housing portions 3A''' using its bottom mounted hinge portion 13C''', secured in position using rivets, adhesive or a combination thereof. Also the laptop pouch 14 is mounted on the inside surface of the front cover flap panel 13'''. Also in all other significant respects, it is similar to the luggage system of the second and third illustrative embodiments.

Figure 16A:
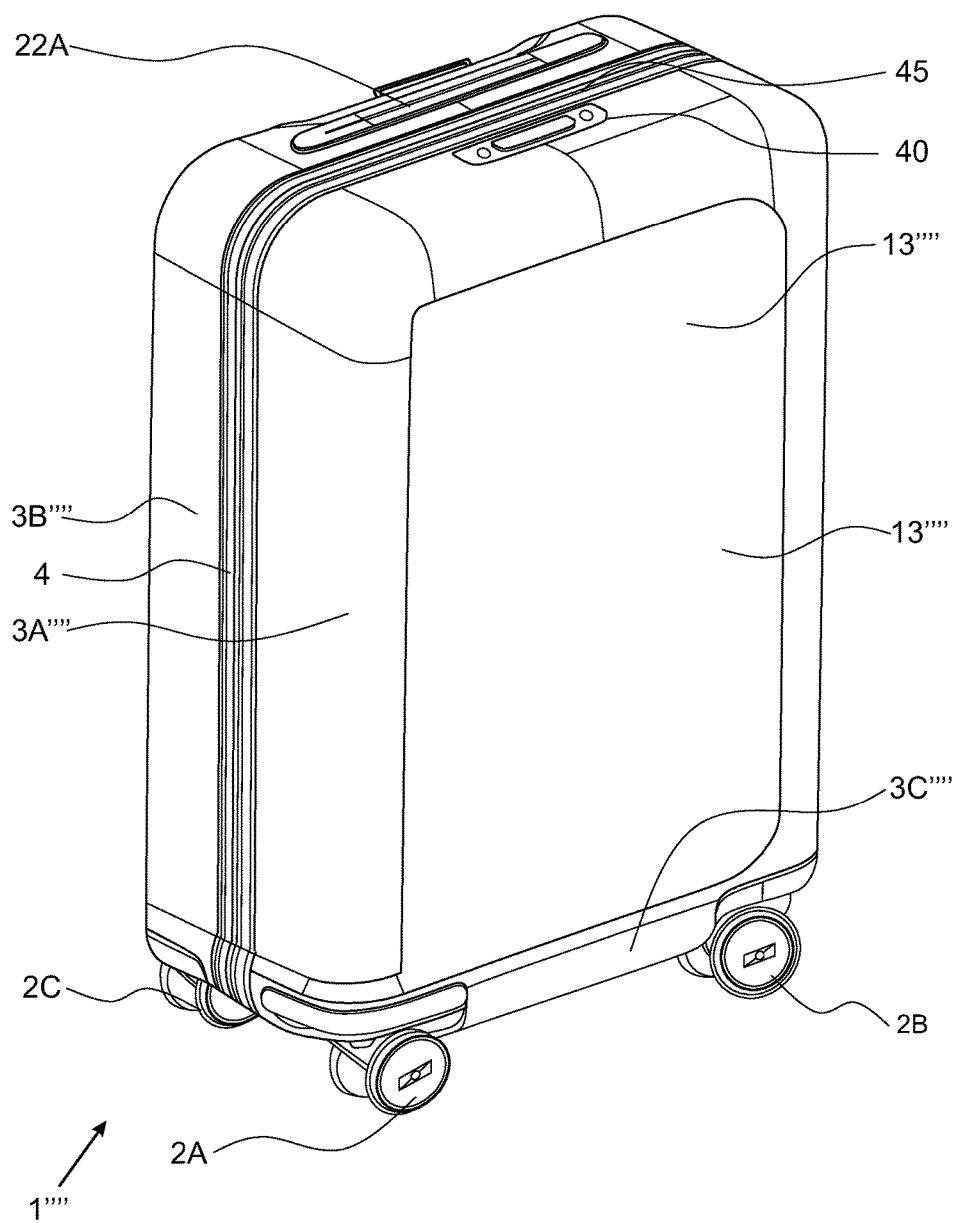
FIG. 16A is a front perspective view of a fifth illustrative embodiment of the hard-shell luggage system of the present invention, wherein the hard-shell luggage system is positioned on its set of four spinner wheels mounted in the four corners of the luggage system, wherein its front and rear hard-shell housing portions are arranged in a closed configuration and sealed using its integrated zipper mechanism, and wherein its telescopic-handle assembly is arranged in its protracted configuration over the hinged power port cover panel concealing its USB DC electrical power supply ports, and DC power recharging port.
Figure 16B:
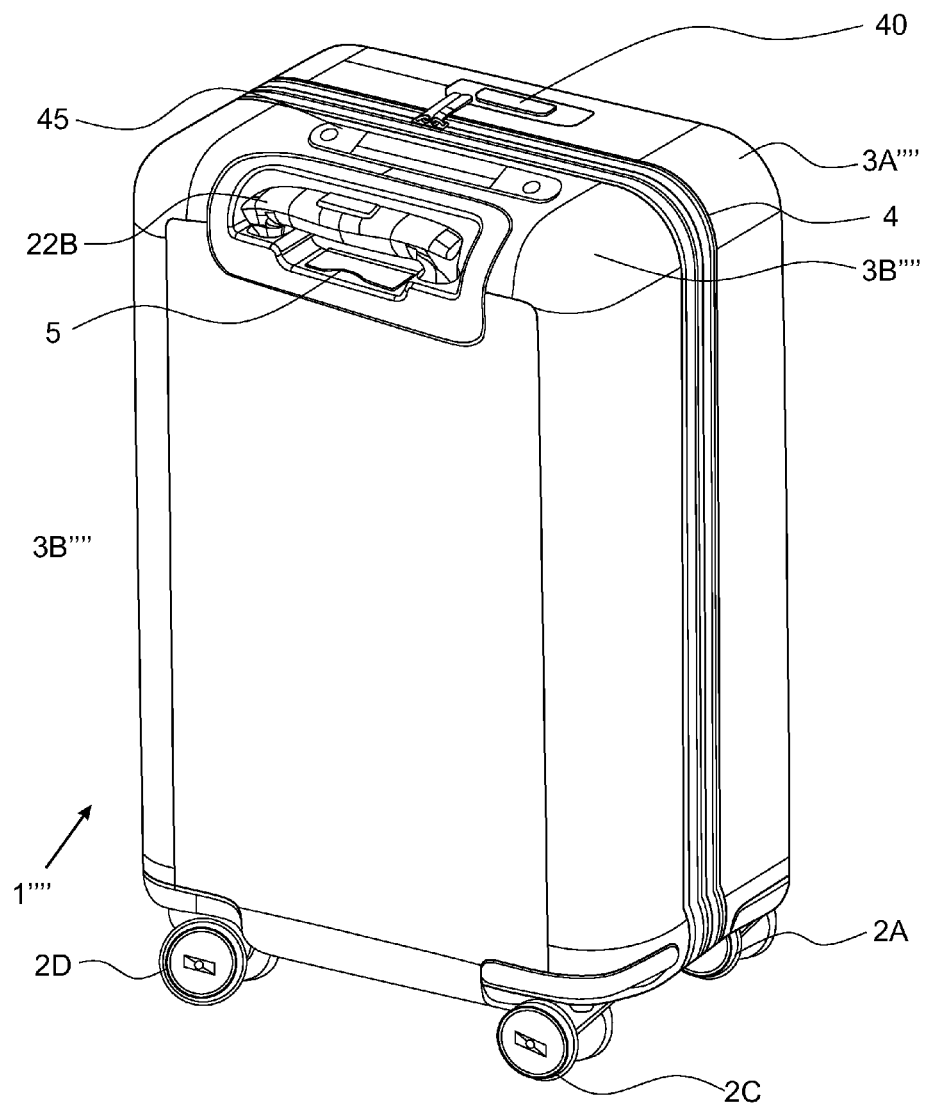
FIG. 16B is a rear perspective view of a fifth illustrative embodiment shown in FIG. 16A, wherein its front and rear hard-shell housing portions are arranged in a closed configuration and sealed using its integrated zipper mechanism, and wherein its telescopic-handle assembly is arranged in its protracted configuration over the hinged power port cover panel concealing its USB DC electrical power supply ports, and DC power recharging port.
Figure 16C:
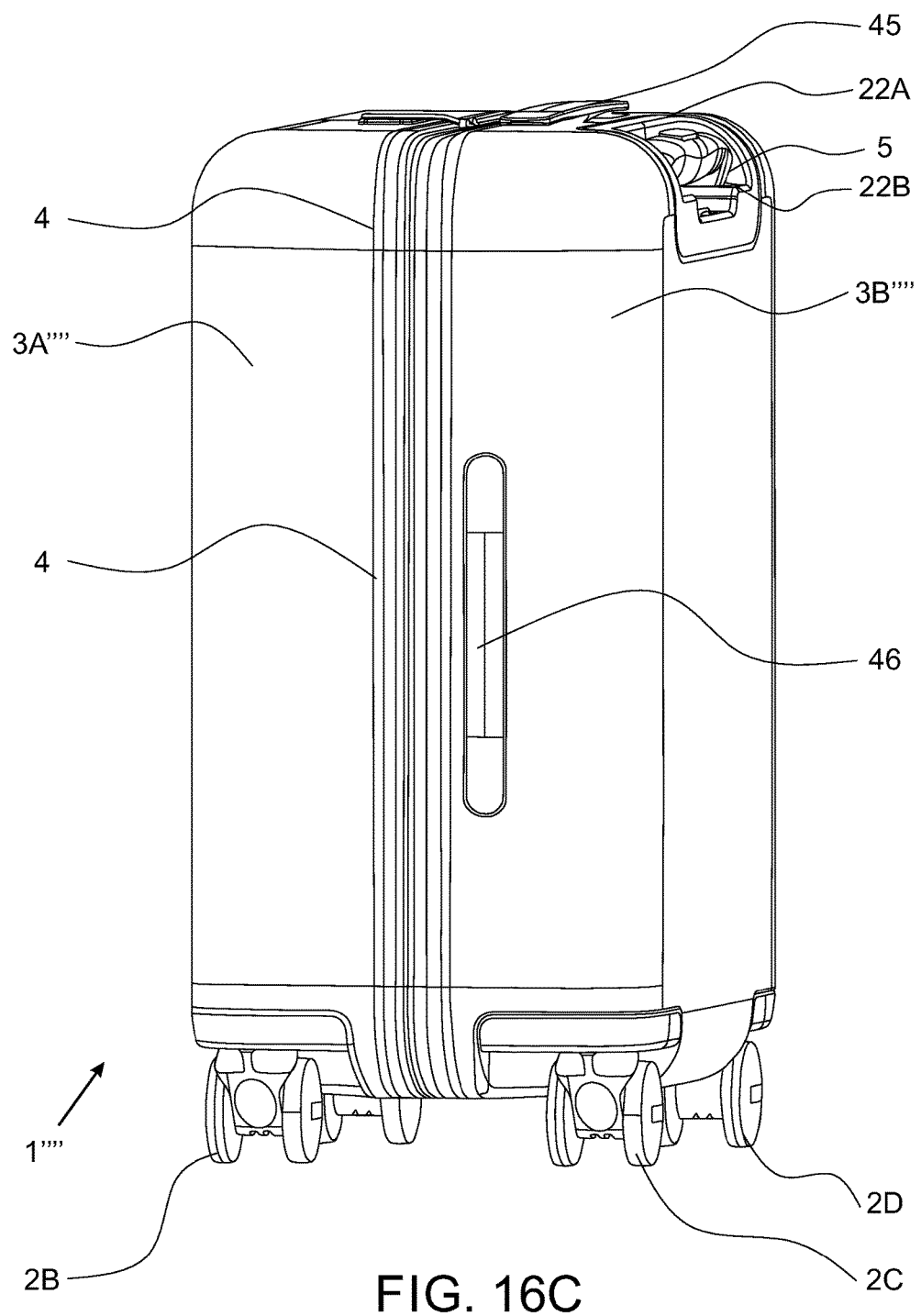
FIG. 16C is a side perspective view of the fifth illustrative embodiment of the hard-shell luggage system shown in FIGS. 16A and 16B.
Figure 16D:
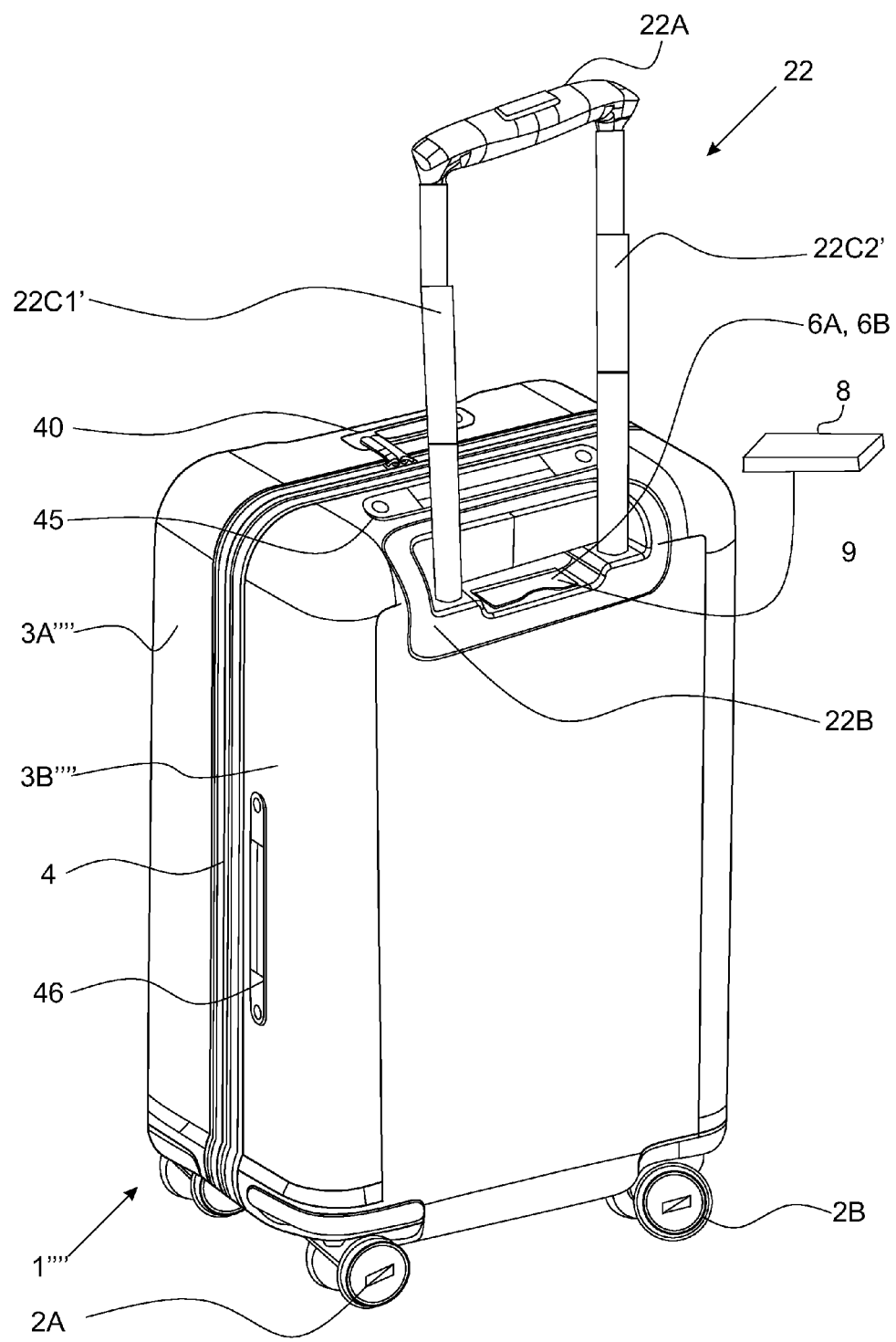
FIG. 16D is a rear perspective view of the fifth illustrative embodiment of the hard-shell luggage system shown in FIGS. 16A through 16C, wherein its front and rear hard-shell housing portions are arranged in a closed configuration and sealed using its integrated zipper mechanism, wherein its telescopic-handle assembly is arranged in its protracted configuration with the hinged power port cover panel opened to reveal both its USB DC electrical power supply ports and DC power recharging port of the present invention, and wherein a mobile smartphone (e.g. Apple iPhone device) is being charged with electrical power being delivered from its USB DC power port via a USB cable connected between the phone and the USB DC power port.
Figure 16E:
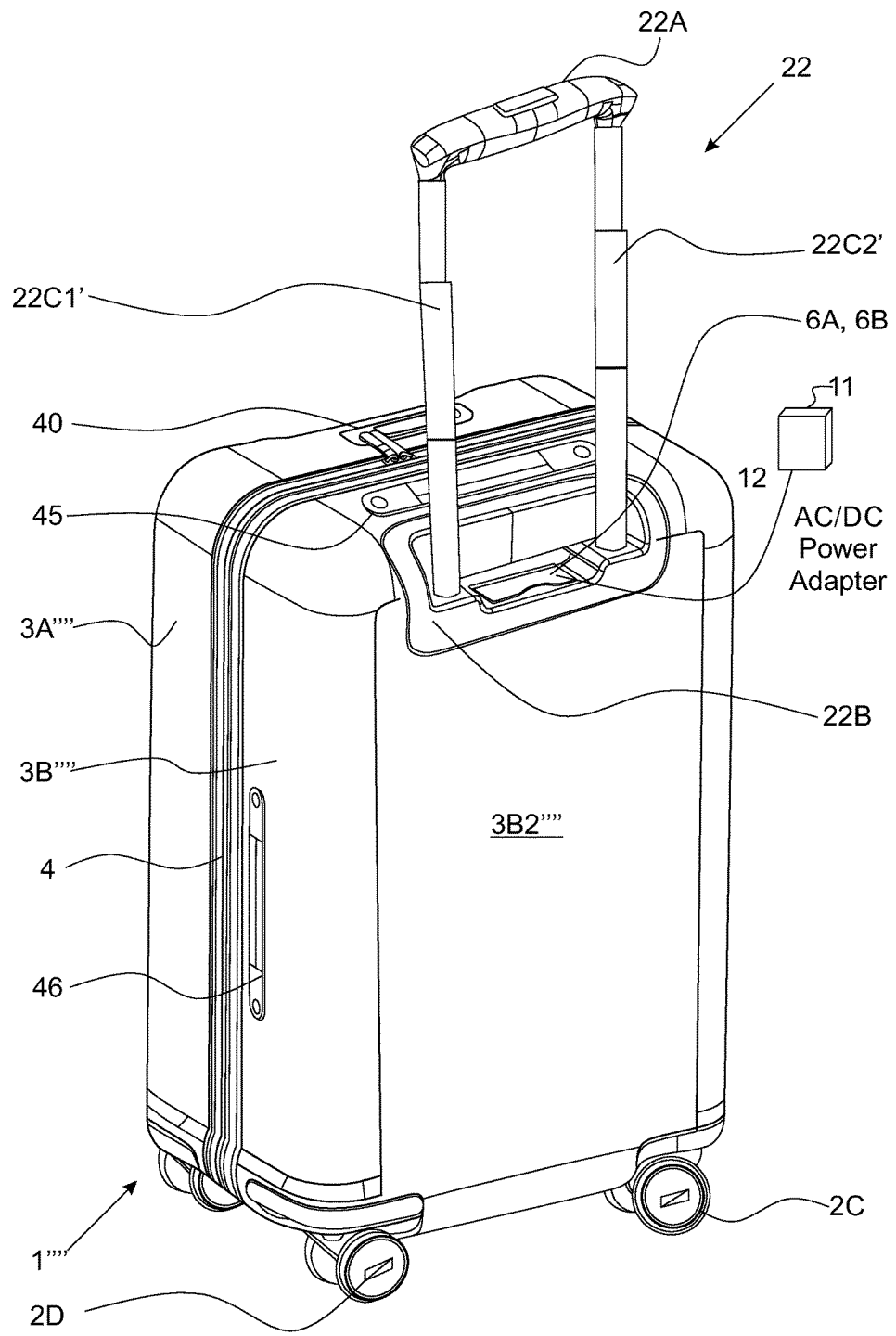
FIG. 16E is a rear perspective view of the fifth illustrative embodiment of the hard-shell luggage system shown in FIGS. 16A through 16D, wherein its front and rear hard-shell housing portions are arranged in a closed configuration and sealed using its integrated zipper mechanism, wherein its telescopic-handle assembly is arranged in its protracted configuration with the power port cover panel opened to reveal both its USB DC electrical power supply ports, and DC power recharging port of the present invention, and wherein the onboard rechargeable DC battery module is being recharged with electrical power being delivered from an AC/DC power adapter supplying DC power to the recharge power port via a USB cable connected between the DC recharge port and the AC/DC power adapter.
Figure 16F:
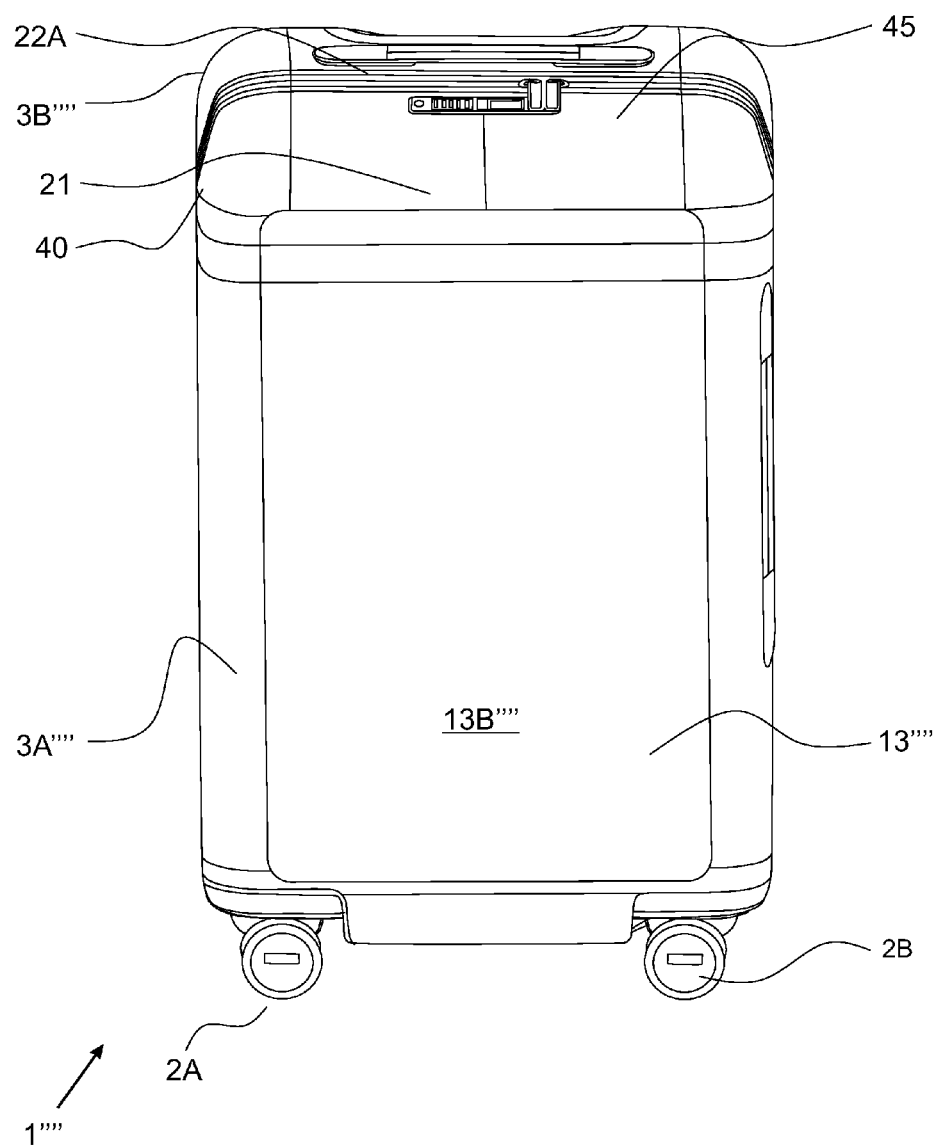
FIG. 16F is a front perspective view of the fifth illustrative embodiment of the hard-shell luggage system shown in FIGS. 16A through 16E, wherein its front and rear hard-shell housing portions are arranged in a closed configuration and sealed using its integrated zipper mechanism, wherein its telescopic-handle assembly is arranged in its retracted configuration, and wherein the front cover flap structure is arranged in its closed configuration.
Figure 16G:
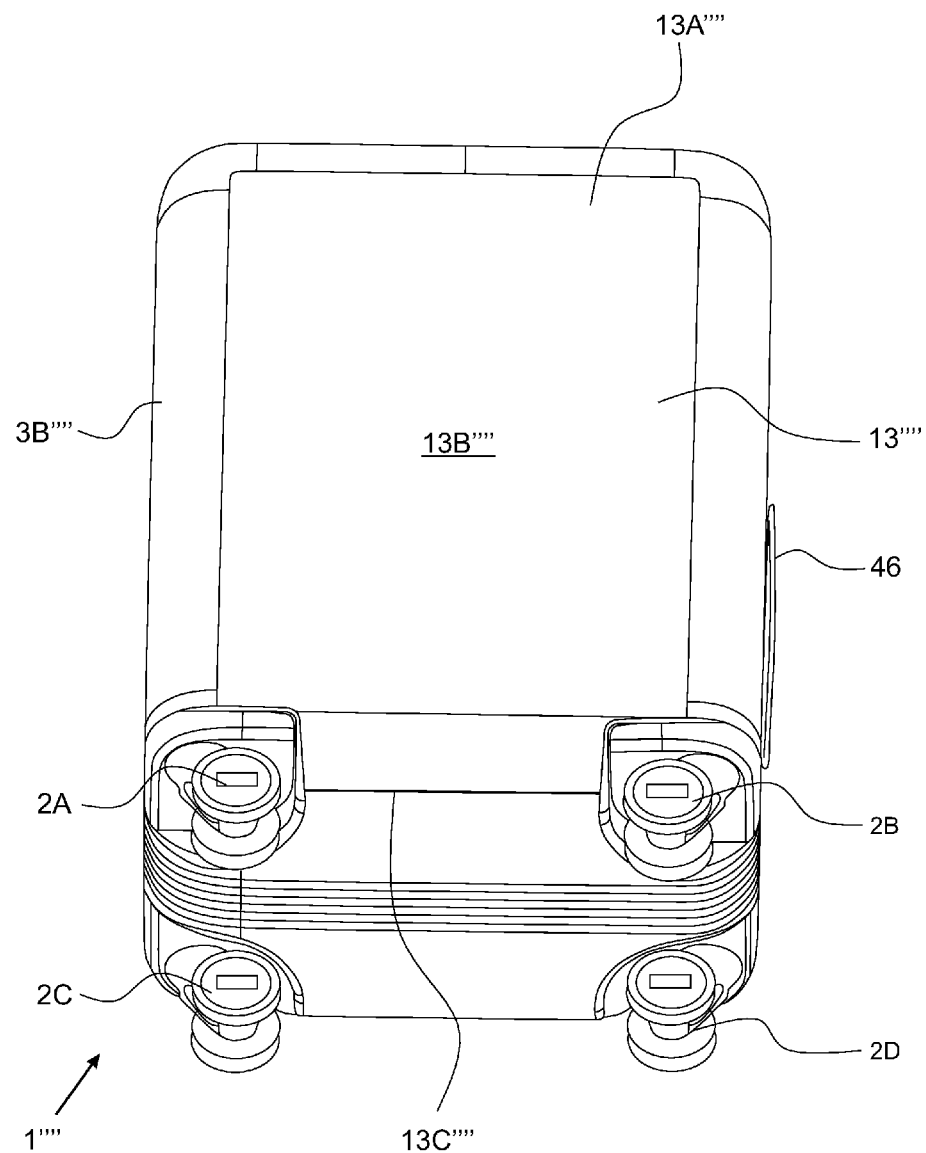
FIG. 16G is a front bottom perspective view of the fifth illustrative embodiment of the hard-shell luggage system shown in FIGS. 16A through 16F, wherein the front cover flap panel is shown being hinged from the bottom of the hard-shell housing assembly of the present invention.
Figure 16H:
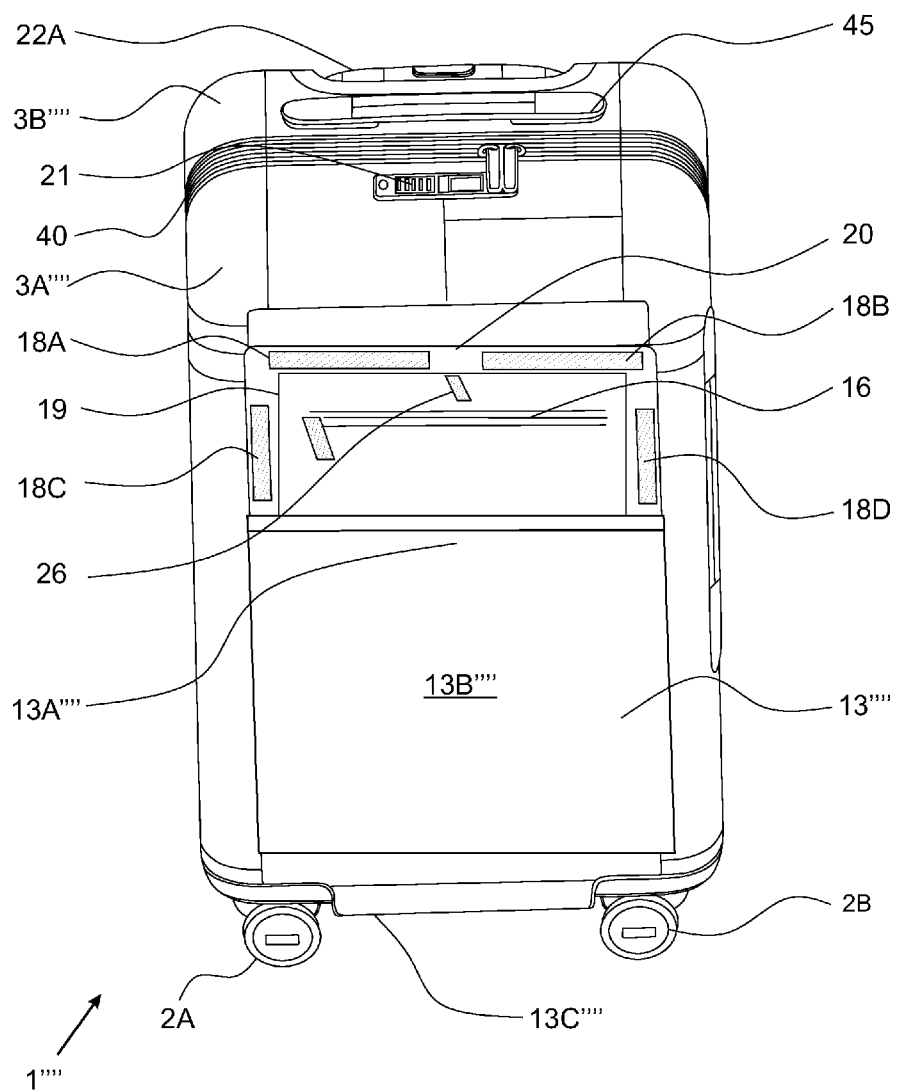
FIG. 16H is a front perspective view of the fifth illustrative embodiment of the hard-shell luggage system shown in FIGS. 16A through 16G, wherein its telescopic-handle assembly is arranged in its retracted configuration, and wherein the front cover flap panel is being opened partially to reveal through its front access opening, the interior storage volume of the front hard-shell housing portion of the luggage system and its shallow zippered pouch for storing power adapters, memory sticks, and other items, and a lower divided mesh pouch for hold items that need to be quickly grabbed such a mobile phone, bottle of water, snacks etc., and also its magnetic stripe based front cover panel retention mechanism for retaining the front cover flap panel securely in place over the front access opening when arranged in its closed configuration.
Figure 16I:
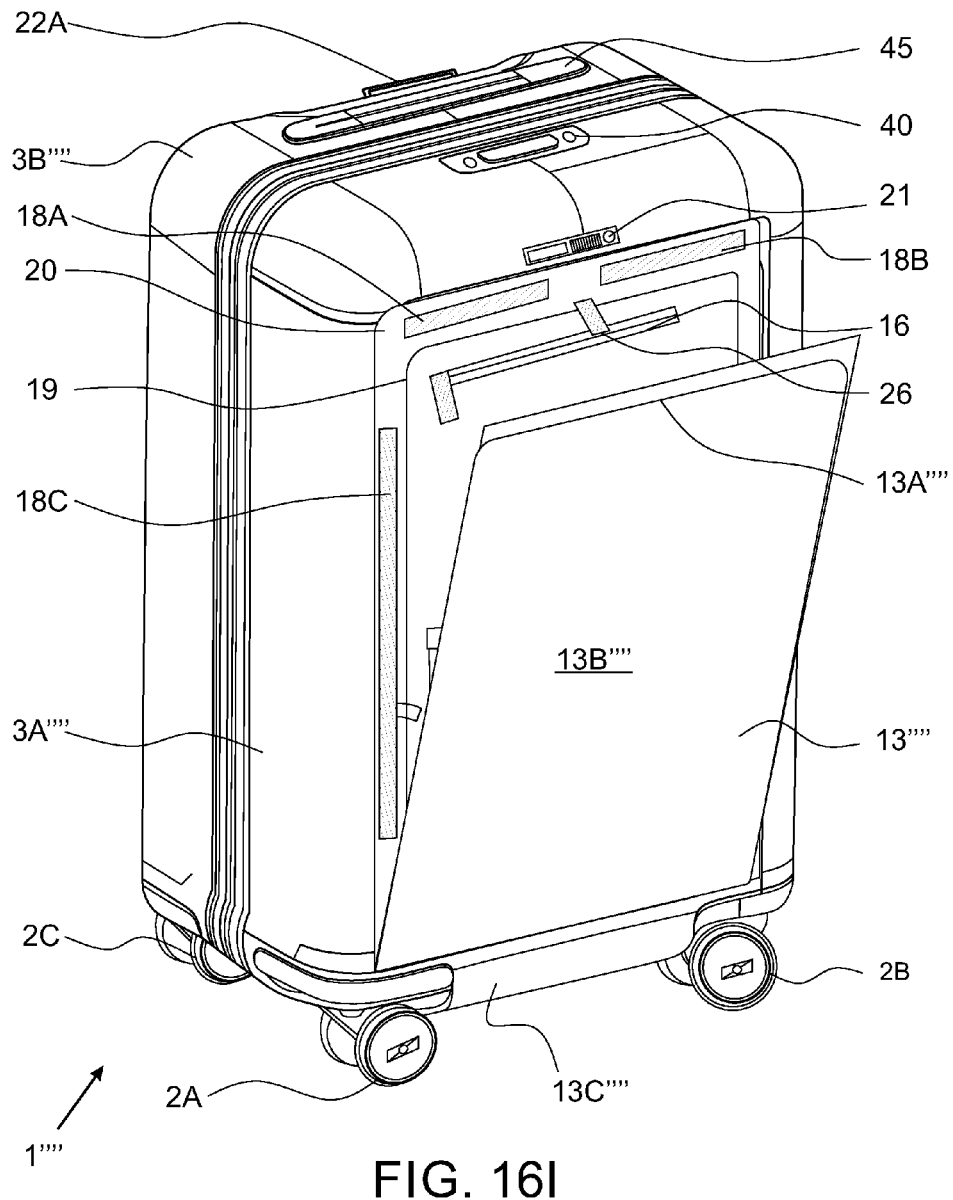
FIG. 16I is a side perspective view of the fifth illustrative embodiment of the hard-shell luggage system shown arranged in FIG. 16H.
Figure 16J:
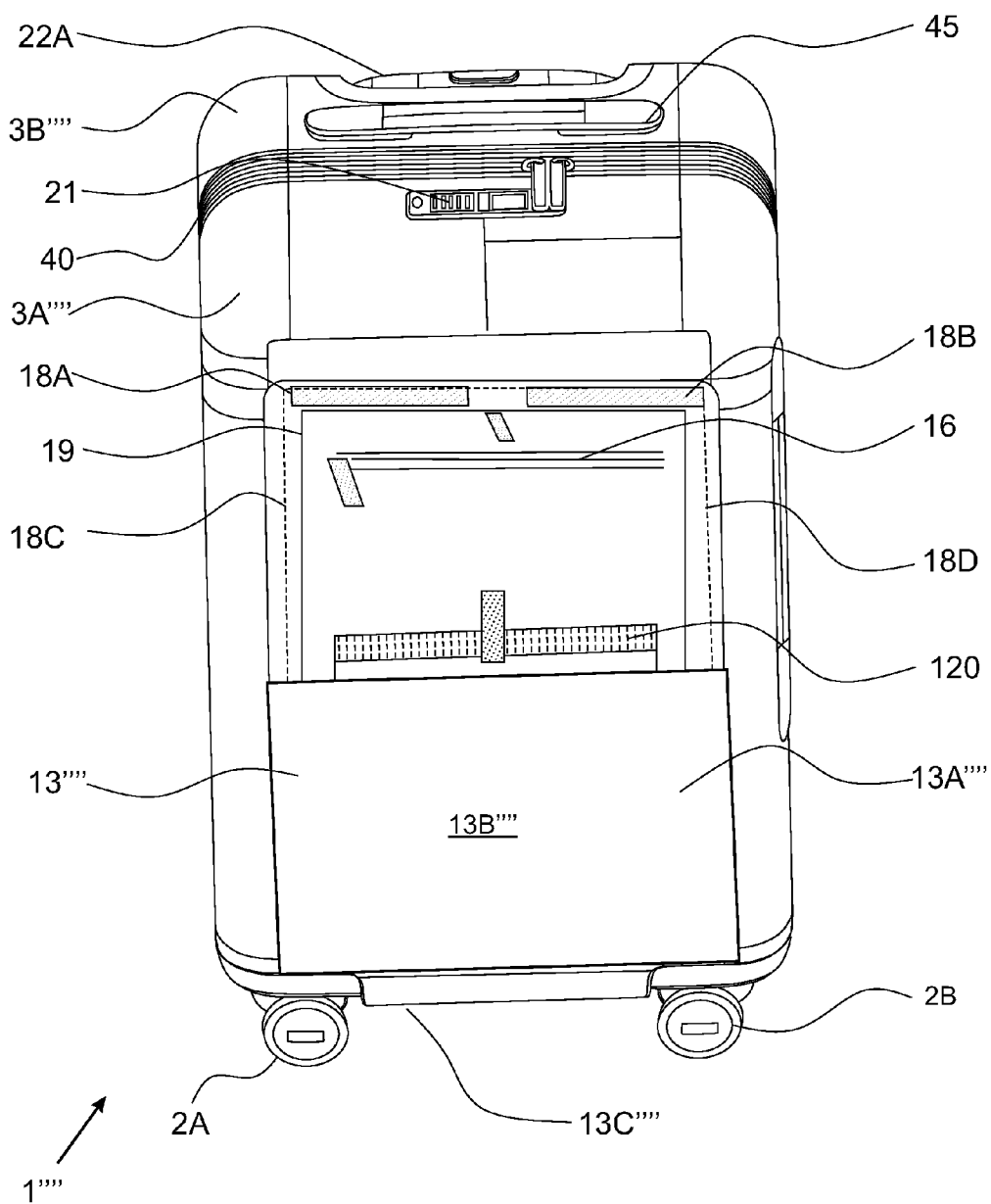
FIG. 16J is a front perspective view of the fifth illustrative embodiment of the hard-shell luggage system shown in FIGS. 16A through 16E, wherein its telescopic-handle assembly is arranged in its retracted configuration, and wherein the front cover flap structure is arranged in its partially opened configuration revealing (i) interior storage volume of the front hard-shell housing portion of the luggage system, (ii) its Velcro-locked laptop computer (or iPad) pouch on the inside surface of the interior lining structure, and (iii) its magnetic stripe based front cover panel retention mechanism for retaining the front cover flap panel securely in place over the front access opening when arranged in its closed configuration.
Figure 18A:
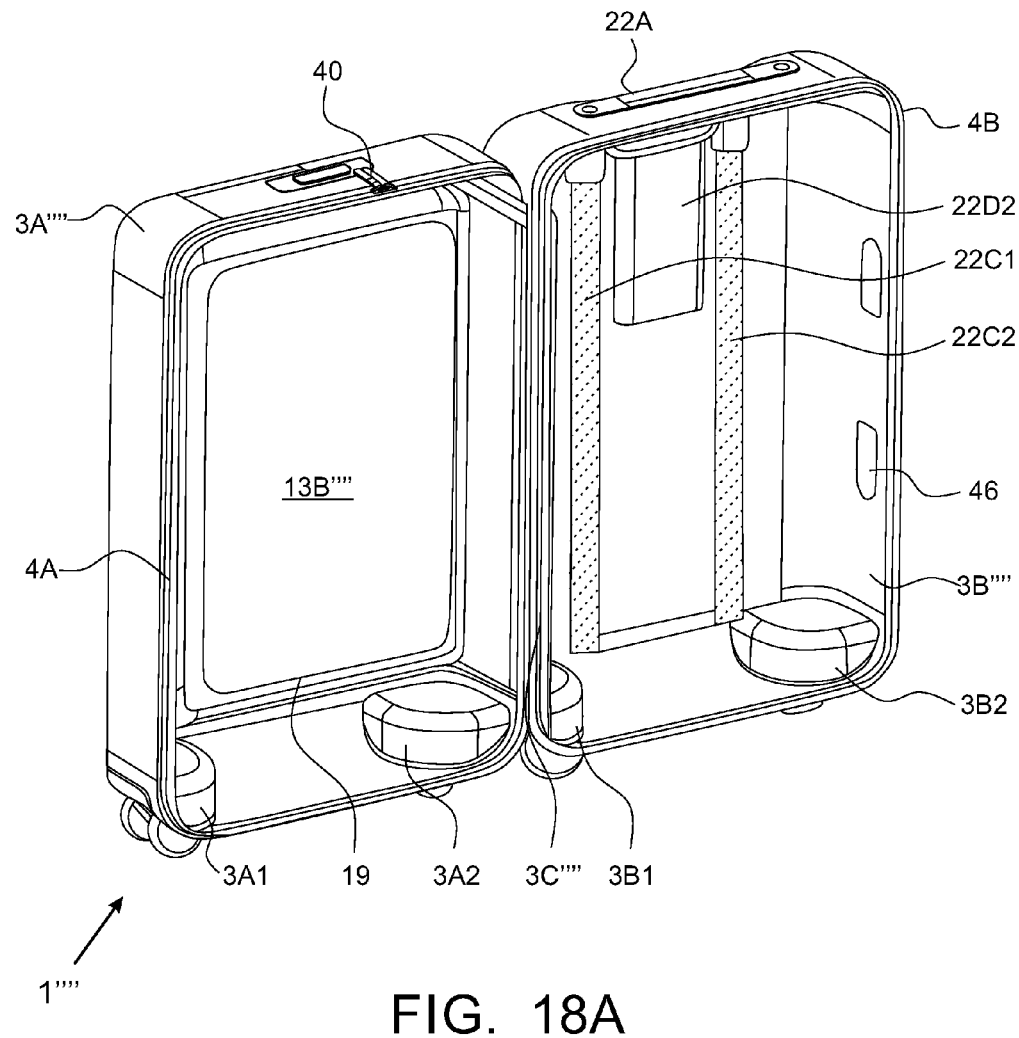
FIG. 18A is a first perspective view of the fifth illustrative embodiment of the hard-shell luggage system shown in FIGS. 17A, 17B and 17C, positioned on its set of four spinner wheels mounted in the four corners of the luggage system, wherein its telescopic-handle assembly is arranged in its retracted configuration, wherein the front cover flap panel is closed to conceal the front access port opening formed through the top surface of the front hard-shell housing portion, wherein its front and rear hard-shell housing portions are arranged in an open configuration with its integrated zipper mechanism arranged in an unzipped configuration and revealing the interior volume of the luggage system with its interior lining removed for purposes of illustration, and wherein the interior lining structures have been removed from both the interior storage volumetric regions of the front and rear hard-shell housing portions of the luggage system.
Figure 18B:
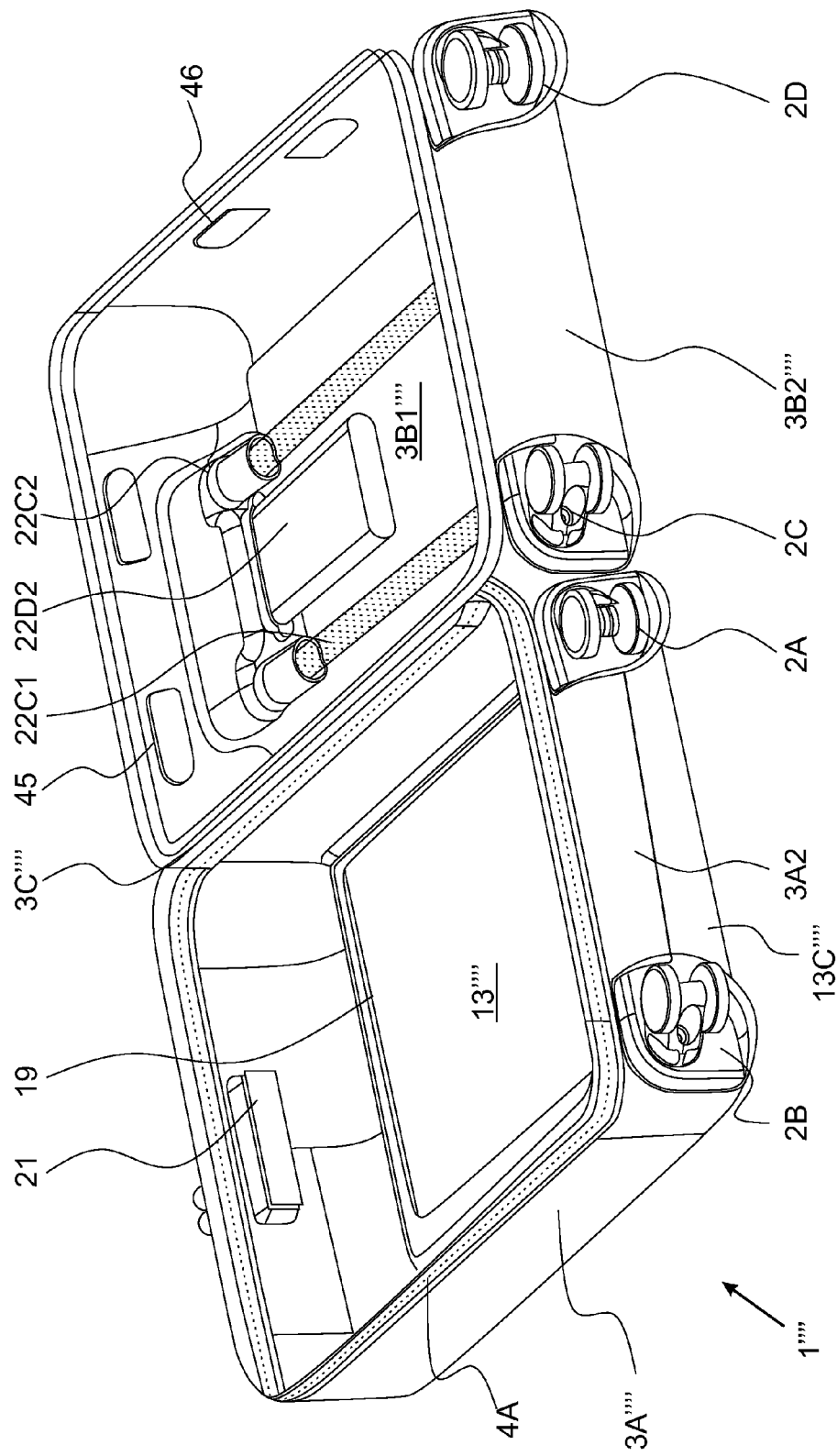
FIG. 18B is a second perspective view of the fifth illustrative embodiment of the hard-shell luggage system shown in FIGS. 17A, 17B and 17C, positioned on its set of four spinner wheels mounted in the four corners of the luggage system and looking into its interior volume, wherein its front and rear hard-shell housing portions are arranged in an open configuration with its integrated zipper mechanism arranged in an unzipped configuration, wherein its telescopic-handle assembly is arranged in its retracted configuration, and wherein the interior lining structures have been removed from both the interior storage volumetric regions of the front and rear hard-shell housing portions of the luggage system, for purposes of illustration.

Specification of the Carry-on/Check-in Luggage System of the Fifth Illustrative Embodiment of the Present Invention Referring to FIGS. 16A through 18B2, the carry-on/check-in luggage system of the fifth illustrative embodiment 1'''' of the present invention will now be described in detail below.

In all respects, the luggage system 1'''' of the fifth illustrative embodiment is similar to the luggage system of the fourth illustrative embodiment 1''' with the following exceptions. Specifically, the laptop pouch 14'''' is mounted on the inside surface of the interior lining structure 29, below the shallow zippered pouch 16. Also the nylon mesh pouch 17'''' of mounted on the laptop pouch 14'''', and/or on the inside surface of the front cover flap panel 13''''. In all other significant respects, it is similar to the luggage system of the second and third illustrative embodiments.

Figure 19A:
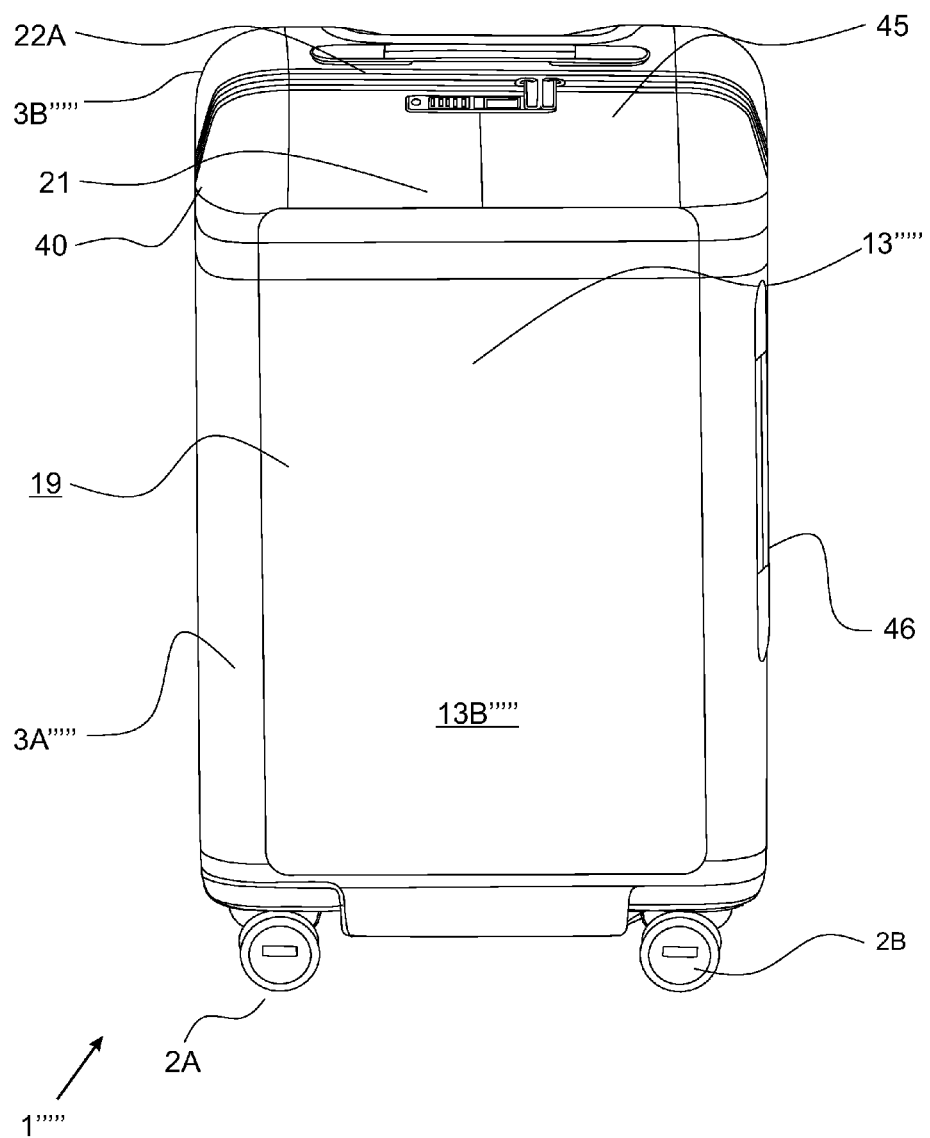
FIG. 19A is a front perspective view of the sixth illustrative embodiment of the hard-shell luggage system of the present invention, positioned on its set of four spinner wheels mounted in the four corners of the luggage system and looking into its interior volume, wherein its front and rear hard-shell housing portions are arranged in an open configuration with its integrated zipper mechanism arranged in an unzipped configuration, wherein its telescopic-handle assembly is arranged in its retracted configuration, and wherein its front panel flap panel shown in its closed configuration is hinged from the bottom portion of the hard-shell housing assembly and sealed using a two-part zipper subsystem mounted about the front access opening and the interior inside surface of the front cover flap panel, and also a magnetic strip front flap retention sub system.
Figure 19B:
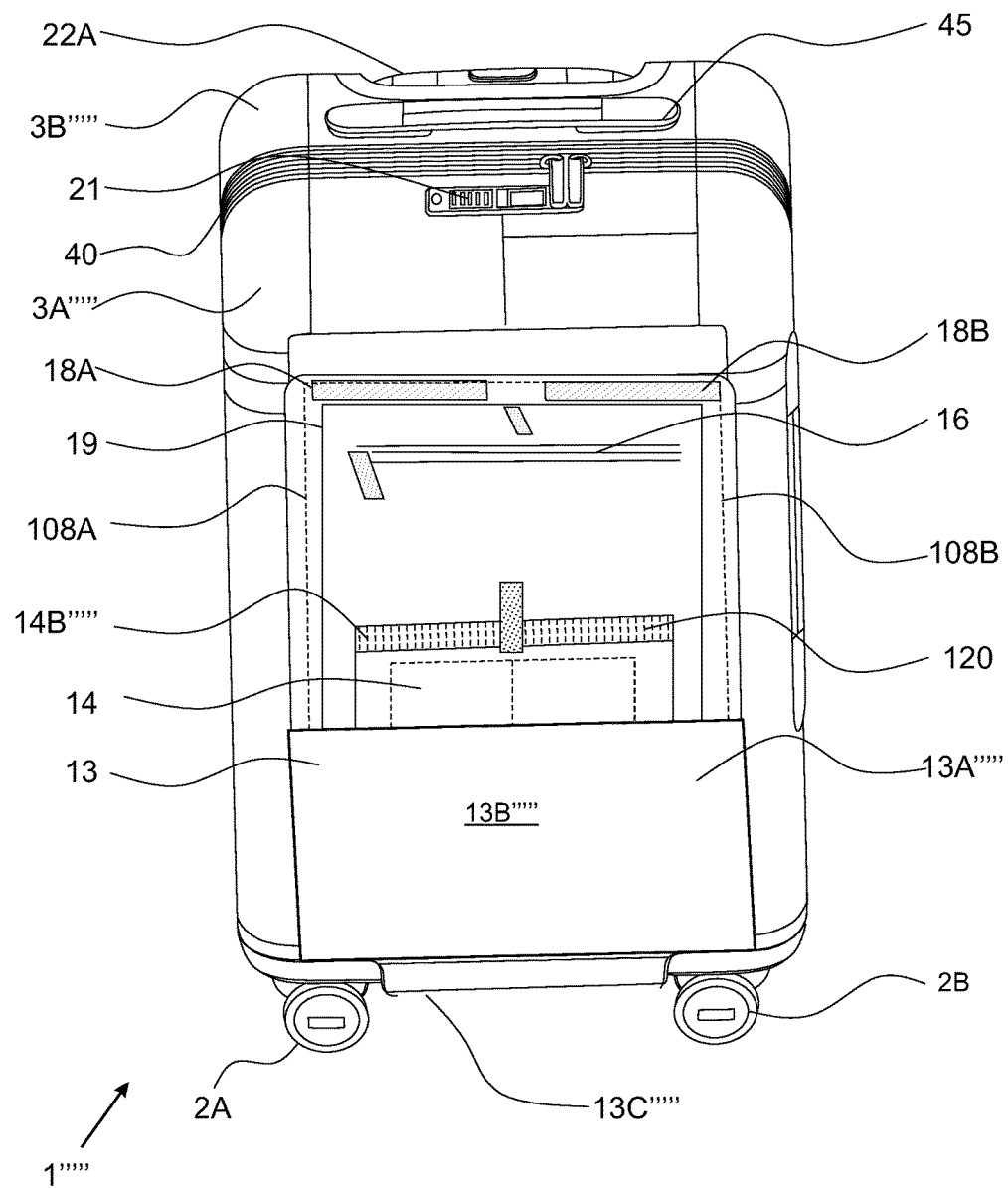
FIG. 19B is a front perspective view of the sixth illustrative embodiment of the hard-shell luggage system shown in FIG. 19A, wherein its front flap panel is shown in its fully opened configuration and hinged from the bottom portion of the hard-shell housing assembly.

Specification of the Carry-on/Check-in Luggage System of the Sixth Illustrative Embodiment of the Present Invention Referring to FIGS. 19A and 19B, the carry-on/check-in luggage system of the sixth illustrative embodiment 1''''' of the present invention will now be described in detail below.

In all respects, the luggage system 1''''' of the sixth illustrative embodiment is similar to the luggage system of the fourth and fifth illustrative embodiments 1''' and 1'''' with the following exceptions. In this embodiment, the luggage system of the present invention 1''''' is modified to support a zipper-based front cover flap panel retention system 108, which may replace or be used as a supplement to a magnetic-stripe based subsystem 18, as disclosed and described hereinabove. Specifically, a zipper-based front cover flap retention/sealing subsystem 108, having zipper components 108A and 108B, is used to seal the front cover flap panel 13''''' to the interior surface about the front access opening 19'''''. This zipper-based subsystem 108 installed by stitching zipper component 108A to the lip opening about the left side of the front access opening 19 and the left inside surface of the outer perimeter of the front cover flap panel 13''''', and by stitching zipper component 108B to the lip opening about the right side of the front access opening 19 and the right inside surface of the outer perimeter of the front cover flap panel 13''''', as indicated in FIG. 19B. Preferably, the outer perimeter of the front cover flap panel 13''''' is pliant to allow the edge lip portion thereof to flex and bend, especially when the zippers 108A and 108B are manually manipulated into either their closed or opened configurations by the user pulling their respective zipper pull members. Optionally, a magnetic-based front cover panel retention subsystem 18, similar to the one employed in other illustrative embodiments, can be used in combination with the zipper-based subsystem 108, as the application at hand requires. In all other significant respects, the luggage system of the sixth illustrative embodiment 1''''' is similar to the luggage systems of the fourth and fifth illustrative embodiments of the present invention.

Figure 20:
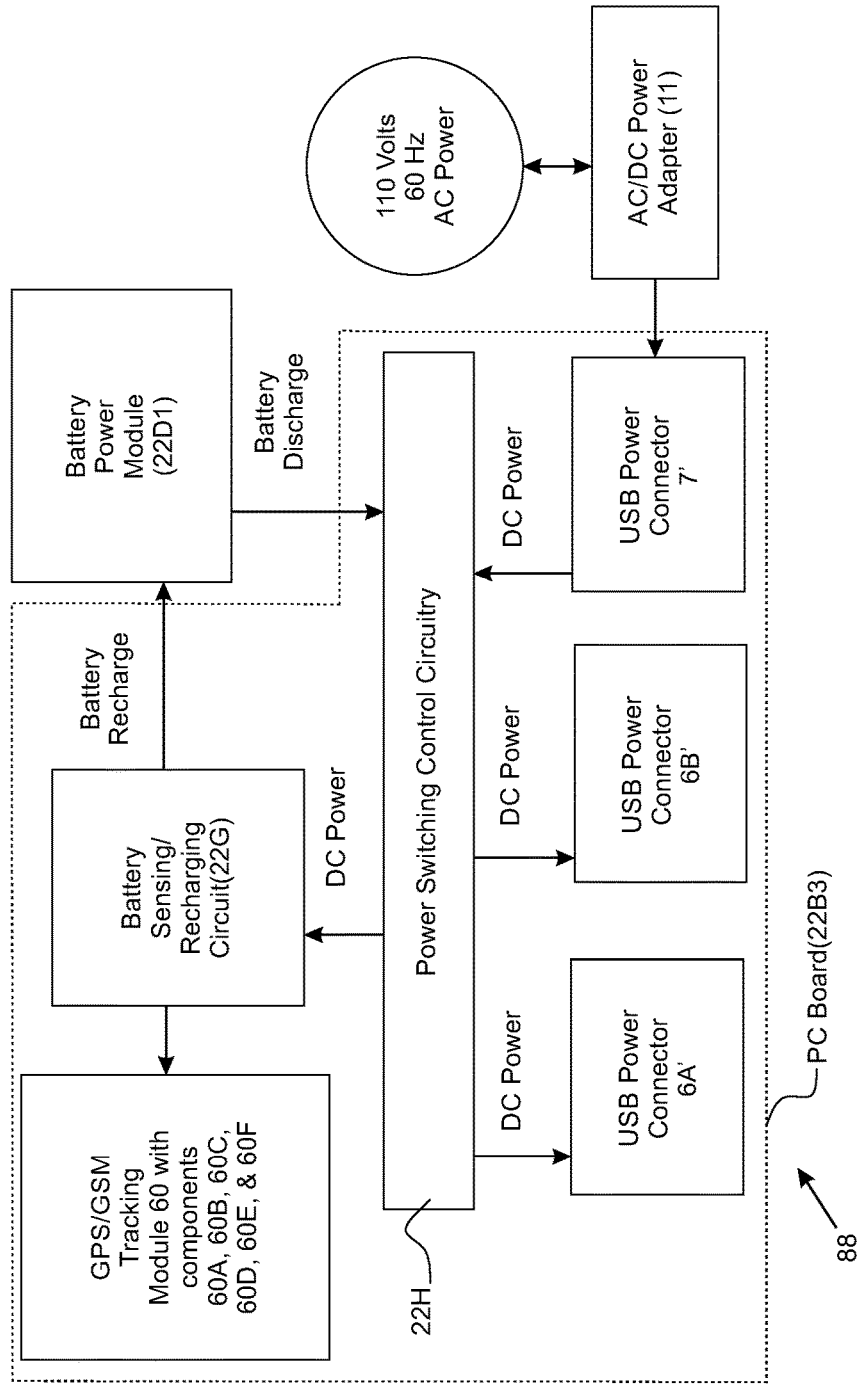
FIG. 20 is a block-type schematic diagram representative of the USB rechargeable DC battery power supply subsystem integrated within the luggage systems of the present invention, and shown comprising (i) an AC/DC power adapter connected to a 100-120 Volt (60 Hz) or like AC power receptacle by way of a conventional power cord, (ii) a battery recharging circuit operably connected to the AD/DC power adapter by way of a USB or like power cord, (iii) a battery power storage module operably connected to the battery recharging circuit by way of electrical conductors, (iv) a power switching control circuit operably connected to the battery power storage module, the battery recharging circuit and the AC/DC power adapter, and also a set of USB power output ports for receiving the USB plugs of electrically-powered devices (e.g. smartphones, laptops iPads, etc.) and supplying electrical DC power to these devices in a regulated manner.

Specification of Rechargeable Power Supply Subsystem Integrated Aboard the Luggage Systems of the Present Invention FIG. 20 shows the USB rechargeable battery power supply subsystem 88 of the illustrative embodiment that is integrated within the various luggage systems of the present invention disclosed herein. As shown, the USB rechargeable electrical battery power supply subsystem 88 comprises: (i) an AC/DC power adapter 11 connected to a 100 volt (60 Hz) or like AC power receptacle by way of a conventional power cord 12; (ii) a battery recharging circuit 22G supported on PC board 22D3 shown in FIGS. 5J1 and 5J2, operably connected to the AD/DC power adapter 11 by way of a micro-USB or like power cord; (iii) a rechargeable electrical power storage module (e.g. electro-chemical cell or battery) 22D1 operably connected to the battery recharging circuit 22G by way of electrical conductors; (iv) the GPS/GSM luggage tracking module 60 associated with the GPS/GSM luggage location tracking system illustrated in FIG. 21, and supplied DC electrical power from the rechargeable battery storage module 22D; (iv) a power switching control circuit 22H operably connected to the battery power storage module 22D1, the battery recharging circuit 22G and the AC/DC power adapter 11, and also to a set of USB power output ports 6A and 6B for receiving the USB plugs of electrically-powered devices (e.g. smartphones, laptops, iPads, etc.) 7 and supplying electrical DC power to these devices in a voltage regulated manner.

Preferably, components 22G, 22H, 6A', 6B' and 7' are realized on PC board 22B3, mounted within the base housing component 22B. While not preferred, the AC/DC power adapter 11 may be realized aboard the base housing component 22B or within the battery storage module 22D1, while providing an AC power receptacle port within the base housing component 22B under the hinged power port cover panel 5. In such an alternative embodiment, the user connects an AC power cord directly to the AC power port aboard the base housing component, and AC to DC power conversion occurs aboard the luggage system to recharge its battery storage module 22D2.

In the preferred embodiment, both the battery storage module 22B1 and the PC board 22B3 are contained or housed in casing 22D2. At any instant in time, airport safety regulations will likely impact particular design choices on whether or not battery storage devices are permitted within check-in type luggage systems, as well as carry-on type luggage systems. Therefore, in one alternative embodiment of the present invention, the rechargeable battery storage module 22D1 might be eliminated, and instead the PC board 22B3 is housed in casing 22D2. In other alternative embodiment of the present invention, the GPS/GSM tracking module 60 might be eliminated and only the battery storage module 22D1 is stored in the casing 22D2. The advantages of integrating the GPS/GSM luggage tracking module 60 within the base component of the telescoping-handle and DC power supply assembly of the present invention 22 are many, including easy recharge of device 60 from battery storage module 22D1, and reduced risk of the device 60 being removed or misappropriated from the luggage system.

Figure 21:
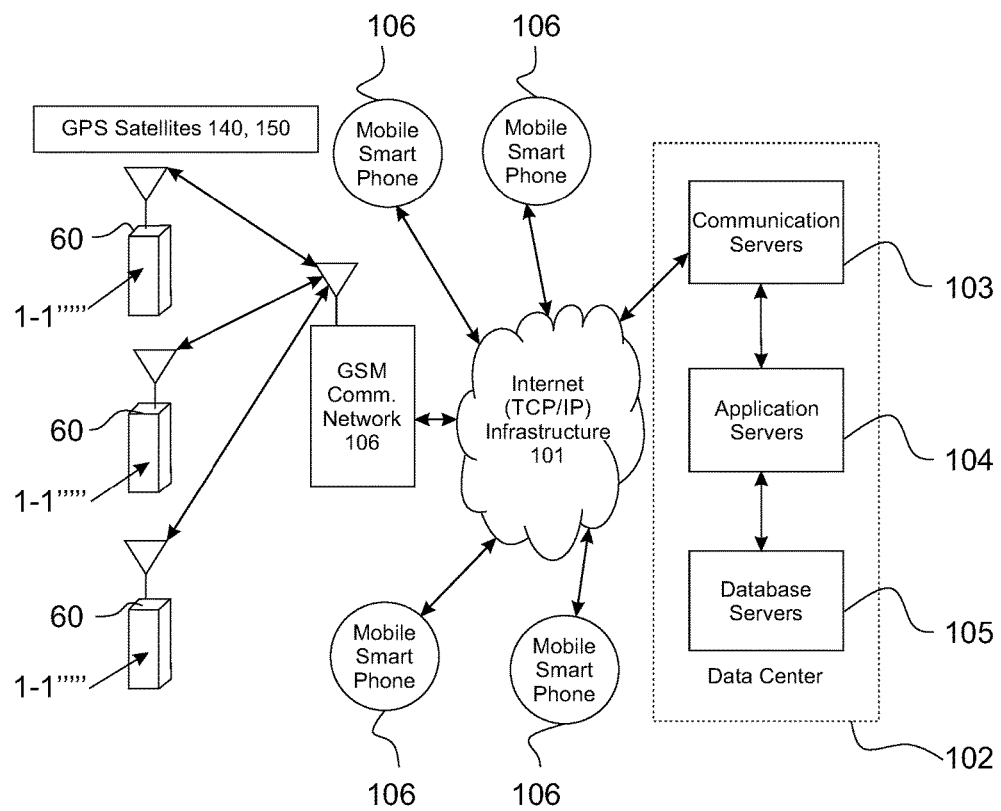
FIG. 21 is a block system diagram of the Internet infrastructure supporting packet switched communication amongst (i) a plurality of mobile luggage systems of the present invention containing GPS-based position tracking devices integrated therein, and (i) a data center with communication, application and database servers supporting real-time luggage tracking operations using mobile smartphones (e.g. iPhone, Android phone, etc.) and mobile applications installed thereon.

Specification of the Luggage Tracking System for Use with the Luggage Systems of the Present Invention In FIG. 21, an Internet-based luggage location tracking system 100 is shown for use with the luggage system of the present invention. As shown, the system 100 comprises: a plurality of mobile luggage systems 1 through 1'''', each containing a GPS/GSM-based luggage location tracking device 60 integrated within the base component 22B of the luggage system, and configured in operable communication with a system of GPS satellites 140 of a GPS system 150, and one or more GSM (or CDMA or other cellular data) communication networks 106 connected to the (TCP/IP) infrastructure of the Internet 101; a plurality of client communication devices (e.g. smartphones, mobile computers, desktop computers etc.) used by the owners of luggage seeking real-time information on the location of their luggage pieces; and a data center 102 operably connected to the infrastructure of the Internet 101, for processing data packets received from the GSM communication network 106, and plurality of client communication devices 106.

As shown in FIG. 20, each luggage system 1 through 1'''' contains a GPS/GSM-based luggage location tracking device 60 comprising a number of components preferably realized in a system-on-a-chip (SOC) architecture, namely: a GPS transceiver circuit/chip 60A for receiving GPS signals transmitted from the GPS satellites 140 of a deployed GPS system 150; an onboard programmed microprocessor 60B with memory storing program code for processing these received GPS signals in real-time to determine longitude and latitude position coordinates of the luggage piece on Earth; local memory storage 60C for storing computed position/location coordinates; a GSM transceiver 60D and antenna structure 60E for transmitting to a data center 102, electromagnetic GSM radio data signals encoded with time-stamped luggage location coordinates for reception, storage and processing within the data center 102; and a rechargeable battery storage cell 60F for providing electrical power to all such circuits and systems 60A-60E realized aboard each device 60. In some embodiments, the battery storage device 60F may be implemented as a thin-film capacitor structure embodied within the SOC package, and in other embodiments, the battery storage device 60F may be realized outside of the SOC package.

While the SOC-based luggage position tracking devices 60 of the illustrative embodiments is shown realized using a combination of GPS tracking and GSM communication technologies, it is understood that alternative tracking and communication technologies can be used to implement the luggage position/location tracking and communication system 100. Examples of such alternative technologies include, but are not limited to, the technologies employed in the LUG LOC® luggage locator system, or other functionally equivalent systems and devices, or any other suitable object tracking device, suitably modified for the purpose at hand.

As shown in FIG. 21, the data center 102 component of the system 100 comprises: one or more communication servers 103 supporting http, ftp and other communication protocols; application servers 104 running one or more object-oriented application programs supporting the various luggage location tracking and notification services on the system 1001; and database servers 105 running RDBMS software for managing the data collected and generated by the system. In general, these server systems are configured together to process received luggage location coordinate data from luggage systems being tracked by the system 100, and supporting various real-time luggage tracking and monitoring operations of the luggage devices 1 through 1'''' using mobile smartphones (e.g. iPhone, Android phone, etc.) with GUI-based mobile applications installed thereon, as well as mobile and desktop computers running as web-browsers to access a luggage location tracking website at which luggage owners can visit and access information about the whereabouts of their luggage pieces at any instant in the time. Using the GPS/GSM-based luggage tracking system 100, users can track the whereabouts of their luggage systems (i.e. in terms of GPS coordinates) using a mobile application supported on their smartphone, or any web browser running on any computer system, providing an added level of comfort and security knowing where ones luggage is located.

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present invention disclosure.

For example, the luggage system of the present invention 1 can be modified so that the telescopic handle and rechargeable power supply module 22 is adapted to provide one or more additional USB power supply ports mounted within the interior volume of the front hard-shell housing portion 3A (e.g. mounted on the front surface of the interior lining system 29, or on a interior wall surface of the front hard-shell housing portion 3A) so that a USB power cable can be connected to (i) this USB power extension port, and (ii) the laptop or iPad computer system that might be supported in the laptop pouch 14 (through 14'''') while the front cover flap panel 13 (through 13'''') is either opened or closed, as the case may be.

While the luggage system 1 has been described as a "carry-on" type piece of luggage piece, and luggage systems 1' through 1'''' have been described as "carry-on/check-in" luggage pieces, it is understood that the any of these luggage systems can be used in either carry-on, check-in and/or carry-on/check-in applications and that how any such system of the present invention may be used by a user will depend on various factors including prevailing governmental regulations operating in the airline, ocean-liner, railway and other travel-related industries.

These and all other such modifications and variations are deemed to be within the scope and spirit of the present invention as defined by the accompanying Claims to Invention.

What is claimed is:

1. A rechargeable power supply assembly for mounting in a piece of luggage comprising:
   a front housing portion hinged together with a rear housing portion;
   an interior volumetric storage region defined by the front and rear housing portions;
   a pair of spaced apart guide tubes configured to be mounted in the rear housing portion, and supporting a pair of telescopically-extendable rods coupled to a handle structure;
   a base housing component configured to be mounted in an aperture formed adjacent an exterior surface of the luggage, extending into the interior volumetric storage region, and having a top surface, the base housing component defining a recess along the top surface and an opening exposing one or more power supply ports and a battery recharging port;
   a battery module casing mounted to, or integrally formed with, and beneath the base housing component within the interior volumetric storage region;
   a rechargeable battery power module configured to fit within the battery module casing and beneath the top surface, and providing the battery recharging port and the one or more power supplying ports and
   a power port cover panel connected to the base housing component and being configured to move between: i) a closed configuration to cover the one or more power supply ports and the battery recharging port, in which the power port cover panel is disposed within the recess defined by the base housing component and an upper surface of the power port cover panel is substantially flush with the top surface of the base housing component, and ii) an open configuration in which the one or more power supply ports and the battery recharging port are accessible through the recess defined by the base housing component.

2. The rechargeable power supply assembly of claim 1, wherein the battery recharging port comprises a mini-USB-type rechargeable battery recharging port, and wherein the power supplying ports comprise USB-type power supplying ports.

3. The rechargeable power supply assembly of claim 2, wherein the USB-type power supplying ports are adapted for receiving the USB plugs of electrically-powered devices and supplying electrical power to the electrically-powered devices in a voltage regulated manner, and wherein the mini-USB-type rechargeable battery recharging port is adapted to receive electrical power by way of a flexible power cord.

4. The rechargeable power supply assembly of claim 1, wherein the rechargeable battery power module is removable from the battery module casing.

5. The rechargeable power supply assembly of claim 2, wherein the mini-USB-type rechargeable battery recharging port and the USB-type power supplying ports are recessed beneath the recess formed within the base housing component so that when power plugs are inserted into the USB-type power supplying ports, the power port cover panel is configured to allow power supply cables to pass through a small channel defined by the power port cover panel while the power port cover panel limits elements from entering open USB-type power ports.

6. The rechargeable power supply assembly of claim 1, wherein the power port cover panel comprises one or more soft rubber seals along its underside to seal the battery recharging port and the one or more power supplying ports when the power port cover panel is arranged in the closed configuration.

7. The rechargeable power supply assembly of claim 1, wherein the power port cover panel is biased to automatically close down upon power plug connectors inserted into the power supplying ports during charging operations, and reduce exposure of the power supplying ports to natural elements.

8. The rechargeable power supply assembly of claim 1, wherein the battery module casing is releasably fastened to the base housing component.

9. A rechargeable power supply assembly for mounting in a piece of luggage, comprising:
   a housing with a set of wheels, the housing defining an interior volumetric storage region;
   a pair of spaced apart guide tubes for mounting in the housing of the luggage, and supporting a pair of telescopically-extendable rods joined to a handle structure;
   a base housing component configured to be mounted in an aperture formed in the housing of the luggage, extending into the interior volumetric storage region, and having a top surface, the base housing component defining a recess along the top surface and an opening exposing one or more power supply ports and a battery recharging port;
   a battery module casing mounted to, or integrally formed with, and beneath the base housing component within the interior volumetric storage region;
   a rechargeable and replaceable DC battery power module configured to fit within the battery module casing and beneath the top surface, and providing the battery recharging port and the one or more power supplying ports, each the port being directly accessible through recess along the top surface of the base housing component; and
   a power port cover panel connected to the base housing component and being configured to move between: i) a closed configuration to cover the one or more power supply ports and the battery recharging port, in which the power port cover panel is disposed within the recess defined by the base housing component and an upper surface of the power port cover panel is substantially flush with the top surface of base housing component, and ii) an open configuration in which the one or more power supply ports and the battery recharging port are accessible through the recess defined by the base housing component.

10. The rechargeable power supply assembly of claim 9, wherein the battery recharging port comprises a mini-USB-type rechargeable battery recharging port, and wherein the power supplying ports comprise USB-type power supplying ports.

11. The rechargeable power supply assembly of claim 10, wherein the USB-type power supplying ports are adapted for receiving the USB plugs of electrically-powered devices and supplying electrical power to the electrically-powered devices in a voltage regulated manner, and wherein the mini-USB-type rechargeable battery recharging port is adapted to receive electrical power by way of a flexible power cord.

12. The rechargeable power supply assembly of claim 10, wherein the mini-USB-type rechargeable battery recharging port and the USB-type power supplying ports are recessed beneath the recess formed within the base housing component so that when power plugs are inserted into the USB-type power supplying ports, the power port cover panel is configured to allow power supply cables to pass through a small channel defined by the power port cover panel while the power port cover panel limits elements from entering open USB-type power ports.

13. The rechargeable power supply assembly of claim 9, wherein the power port cover panel comprises one or more soft rubber seals on its underside to seal the battery recharging port and the power supplying ports when the power port cover panel is arranged in the closed configuration.

14. The rechargeable power supply assembly of claim 9, wherein the power port cover panel is biased to automatically close down upon power plug connectors inserted into the power supplying ports during charging operations.

15. The rechargeable power supply assembly of claim 9, wherein the battery module casing is releasably fastened to the base housing component.

16. A rechargeable power supply assembly for mounting in a piece of luggage having a housing provided with a set of wheels, the telescopically-extendable handle and rechargeable power supply assembly comprising:
   a pair of telescopically-extendable rods mounted to the housing, and joined to a handle structure;
   a base housing component configured to be mounted in an aperture formed in the housing, and having a top surface, the base housing component defining a recess along the top surface and an opening exposing one or more power supply ports and a battery recharging port, the base housing component extending into the housing;
   a battery module casing mounted to, or integrally formed with, and beneath the base housing component within the housing, and disposed substantially along a common plane with, and between, the pair of telescopically-extendable rods;
   a rechargeable battery power module configured to be received within the battery module casing and beneath the top surface, and providing the battery recharging port and the one or more power supplying ports; and
   a power port cover panel pivotably coupled to the base housing component and having: i) a closed configuration to cover the one or more power supply ports and the battery recharging port, in which the power port cover panel is disposed within the recess defined by the base housing component and an upper surface of the power port cover panel is substantially flush with the top surface of the base housing component, and ii) an open configuration in which the one or more power supply ports and the battery recharging port are accessible through the recess defined by the base housing component.

17. The rechargeable power supply assembly of claim 16, wherein the battery recharging port comprises a mini-USB-type battery recharging port, and wherein the power supplying ports comprise USB-type power supplying ports.

18. The rechargeable power supply assembly of claim 17, wherein the USB-type power supplying ports are adapted for receiving USB plugs of electrically-powered devices and supplying electrical power to the electrically-powered devices in a voltage regulated manner, and wherein the mini-USB-type battery recharging port is adapted to receive electrical power by way of a power cord.

19. The rechargeable power supply assembly of claim 16, wherein the rechargeable battery power module is removable from the battery module casing.

20. The rechargeable power supply assembly of claim 1, wherein the battery module casing is releasably fastened to the base housing component to permit the rechargeable DC battery power module to be replaced.

* * * * *